(12) United States Patent
Hellfajer et al.

(10) Patent No.: US 11,483,191 B2
(45) Date of Patent: Oct. 25, 2022

(54) METHODS AND DEVICES FOR COMMUNICATIONS IN DEVICE-TO-DEVICE NETWORKS

(71) Applicant: Intel Corporation, Santa Clara, CA (US)

(72) Inventors: Roland Hellfajer, Bochum (DE); Michael Speth, Krefeld (DE); Peter Ascheuer, Duesseldorf (DE); Frank Huertgen, Krefeld (DE); Tobias Scholand, Essen (DE); Jan Ellenbeck, Gruenwald (DE); Admir Burnic, Duisburg (DE); Giuseppe Lipuma, Bochum (DE); Sven Dortmund, Essen (DE); Thomas Esch, Kaarst (DE); Romeo Lopez Soto, Hamminkeln (DE); Markus Schlamann, Moers (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/118,690

(22) Filed: Dec. 11, 2020

(65) Prior Publication Data
US 2021/0099329 A1    Apr. 1, 2021

Related U.S. Application Data

(63) Continuation of application No. PCT/EP2019/082073, filed on Nov. 21, 2019.

(30) Foreign Application Priority Data

Dec. 28, 2018   (EP) ..................................... 18248282

(51) Int. Cl.
  *H04L 27/26* (2006.01)

(52) U.S. Cl.
  CPC ...... *H04L 27/2607* (2013.01); *H04L 27/2657* (2013.01); *H04L 27/2675* (2013.01)

(58) Field of Classification Search
  CPC ............. H04L 27/2675; H04L 27/2657; H04L 27/2659; H04L 2027/0067; H04L 27/2607
  See application file for complete search history.

(56) References Cited

U.S. PATENT DOCUMENTS 5,809,009 A  *  9/1998  Matsuoka ........... H04L 27/2273
                                                    370/514
8,380,151 B2    2/2013  Swarts et al.
(Continued)

FOREIGN PATENT DOCUMENTS

EP    1130793 A1    9/2001
EP    2086195 A2    5/2009
(Continued)

OTHER PUBLICATIONS

International Search Report based on PCT Application No. PCT/EP2019/082073 (35 pages) dated May 15, 2020 (for reference purposes only).
(Continued)

*Primary Examiner* — Sung S Ahn
(74) *Attorney, Agent, or Firm* — Viering, Jentschura & Partner MBB

(57) ABSTRACT

A wireless device includes a radio transceiver, and a digital transmitter configured to transmit, via the radio transceiver, a first data symbol, and to transmit, via the radio transceiver, a repetition of the first data symbol immediately after the first data symbol, where the first data symbol forms a cyclic prefix for the repetition of the first data symbol.

12 Claims, 74 Drawing Sheets

(56) References Cited

U.S. PATENT DOCUMENTS

| | | | |
|---|---|---|---|
| 2011/0007783 A1* | 1/2011 | Weill | G01S 19/254 |
| | | | 375/150 |
| 2014/0016722 A1* | 1/2014 | Torimoto | G01S 5/021 |
| | | | 375/295 |
| 2014/0198772 A1 | 7/2014 | Baldemair et al. | |

FOREIGN PATENT DOCUMENTS

| | | |
|---|---|---|
| EP | 2328290 A1 | 6/2011 |
| WO | 2008115377 A2 | 9/2008 |
| WO | 2018075130 A1 | 4/2018 |
| WO | 2018108295 A1 | 6/2018 |

OTHER PUBLICATIONS

Ahmed et al.: "Fast Acquisition and Time Synchronization of Freqeuncy Hopping Burst Signals"; International Conference on signals and Systems; 2017; pp. 175-179; IEEE.

Chang et al.: "Mode Switch Text for Clause 6"; IEEE P802.15 Working Group for Wireless Personal Area Networks Jan. 2011; IEEE.

AT&T: "Remaining details of NR-LTE coexistence in overlapping spectrum"; 3GPP TSG NR Ad-Hoc#2; Jun. 26, 2017; 4 pages; retrieved on Jun. 26, 2017, from http://www.3gpp.org/ftp/Meetings_3GPP_SYNC/RAN1/Docs/.

Qualcomm Inc.: "NB-PSS and NB-SSS Design (Revised)"; 3GPP TSG RAN WG1 NB-IoT Ad-Hoc Meeting; Mar. 22, 2016; 24 pages; retrieved on Mar. 22, 2016, from http://www.3gpp.org/ftp/tsg_ran/WG1_RL1/TSGR1/LTE_NB-IoT_1603/Docs/.

Intel Corporation: "Receiver algorithms and complexity analyses dor NB-IoT synchronization"; 3GPP TSG RAN WG1 NB-IoT Ad-Hoc#2; Mar. 16, 2016; 9 pages; retrieved on Mar. 16, 2016, from http://www.3gpp.org/ftp/tsg_ran/WG1_RL1/TSGR1/LTE_NB-IoT_1603/Docs/.

Huawei et al.: "Synchronization signal evaluation"; 3GPP RAN WG1 Meeting #84; Feb. 24, 2016; 7 pages; retrieved on Feb. 24, 2016, from http://3gpp.org/ftp/tsg_ran/WG1_RL1/TSGR1_84/Docs/.

Iith et al.: "Design considerations for DL Reference Signals"; 3GPP TSG-RAN WG1 NB-IoT Ad-Hoc Meeting; Jan. 18, 2016; retrieved on Jan. 18, 2016, from http://www.3gpp.org/ftp/tsg_ran/WG1_RL1/TSGR1/LTE_NB-IoT_1603/Docs/.

Wang et al.: "Optimal Blind Transport Format Detection for the UMTS Uplink"; IEEE Transactions on Communications; Jun. 2008, 5 pages; vol. 56; No. 6.

Extended European Search Report based on European Application No. 18248282.8 (10 pages) dated Jun. 5, 2019 (for reference purposes only).

* cited by examiner

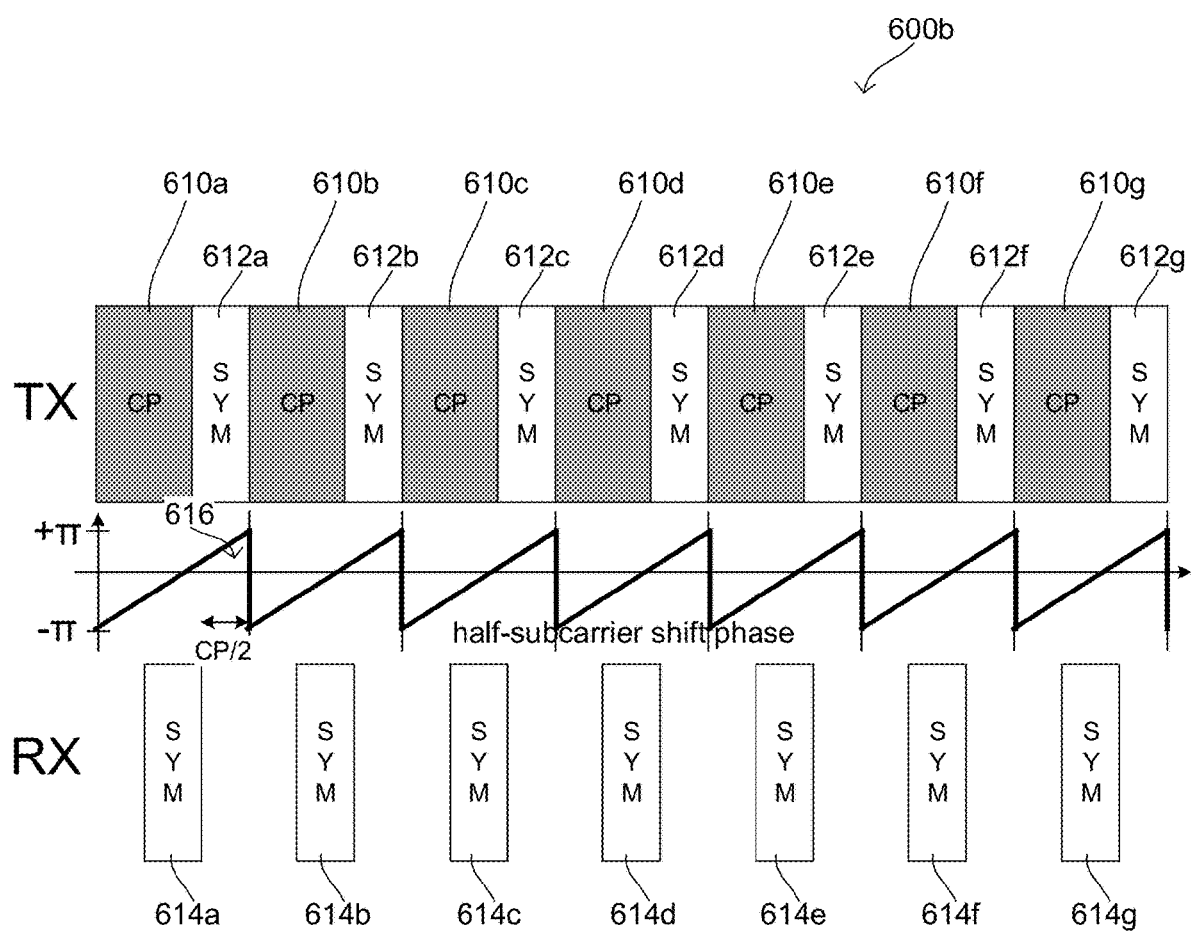

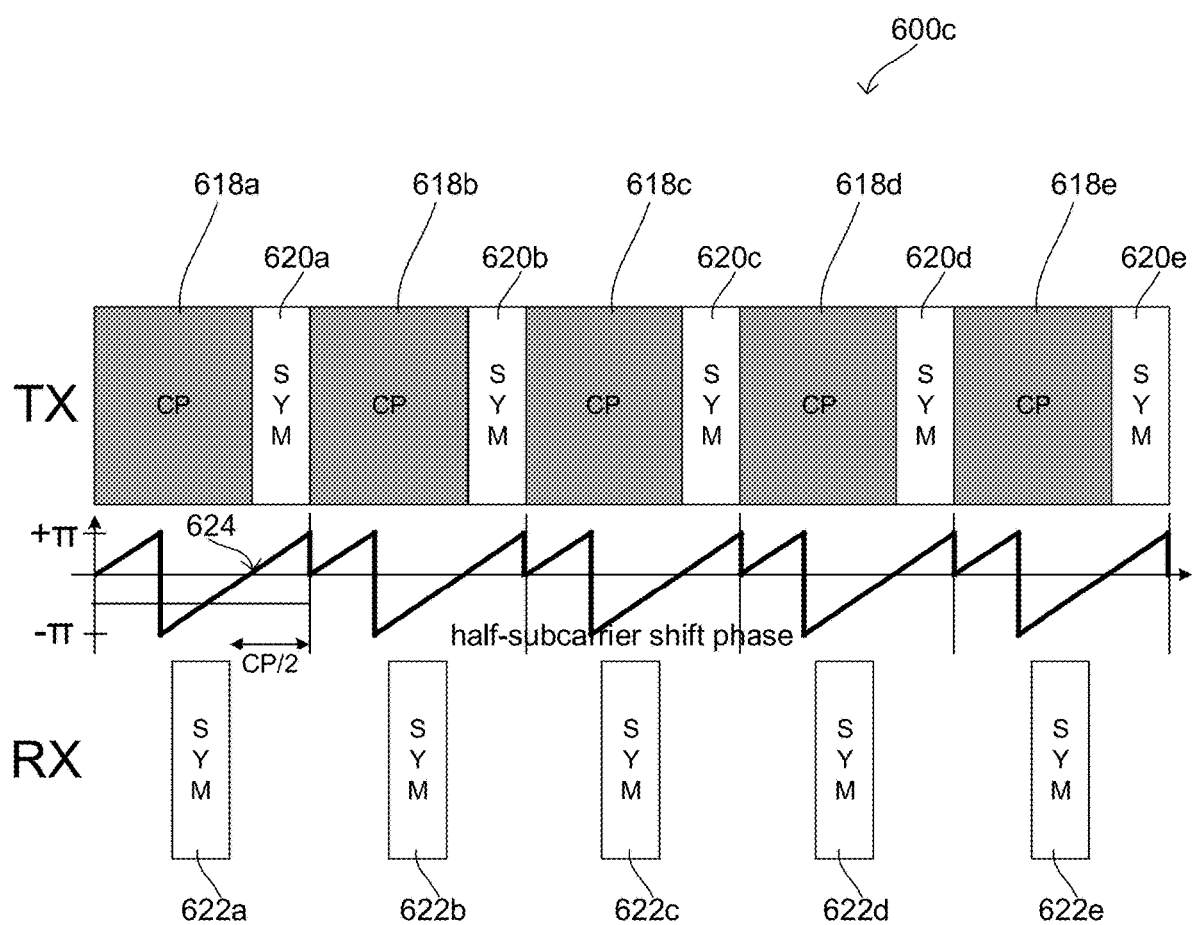

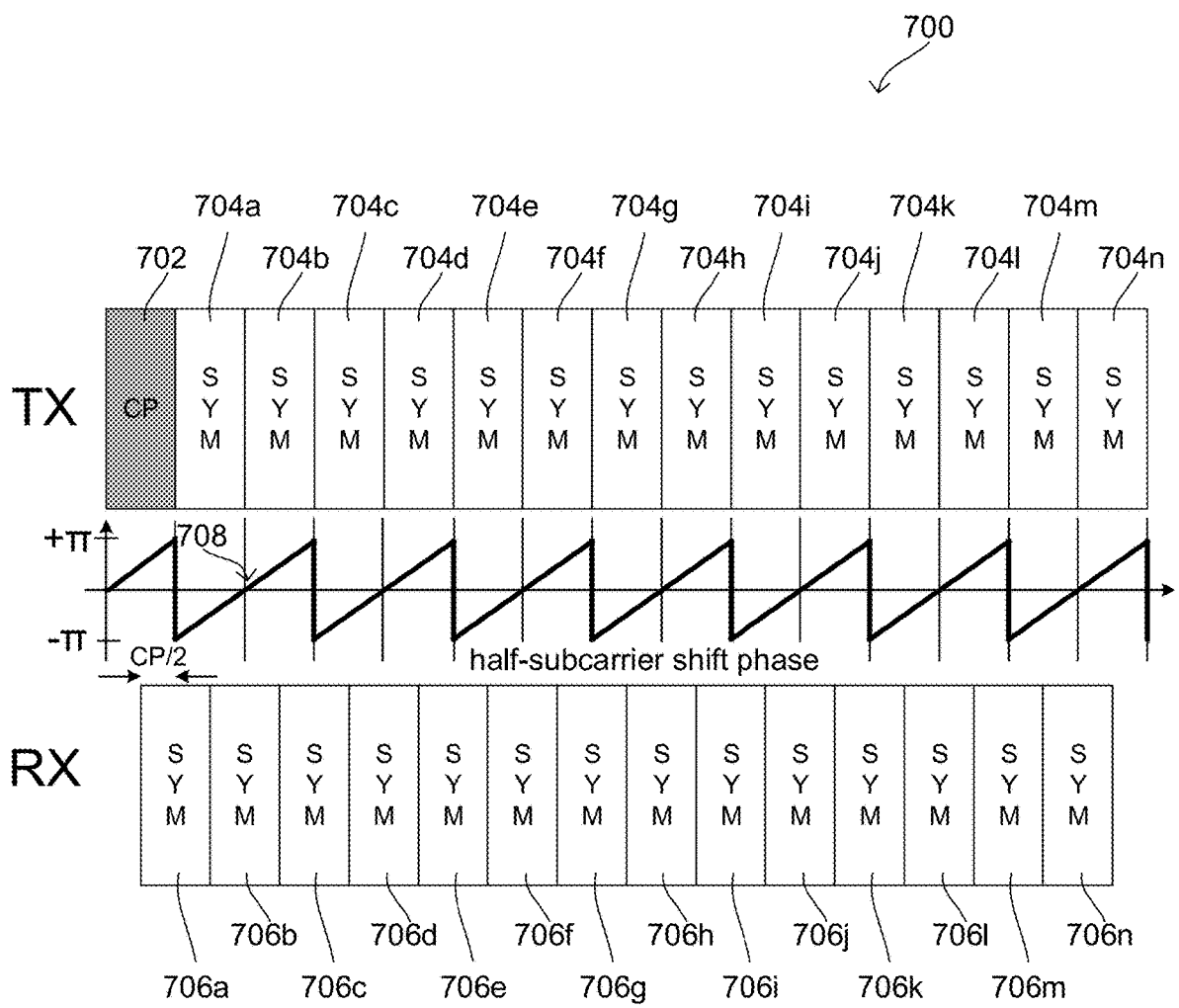

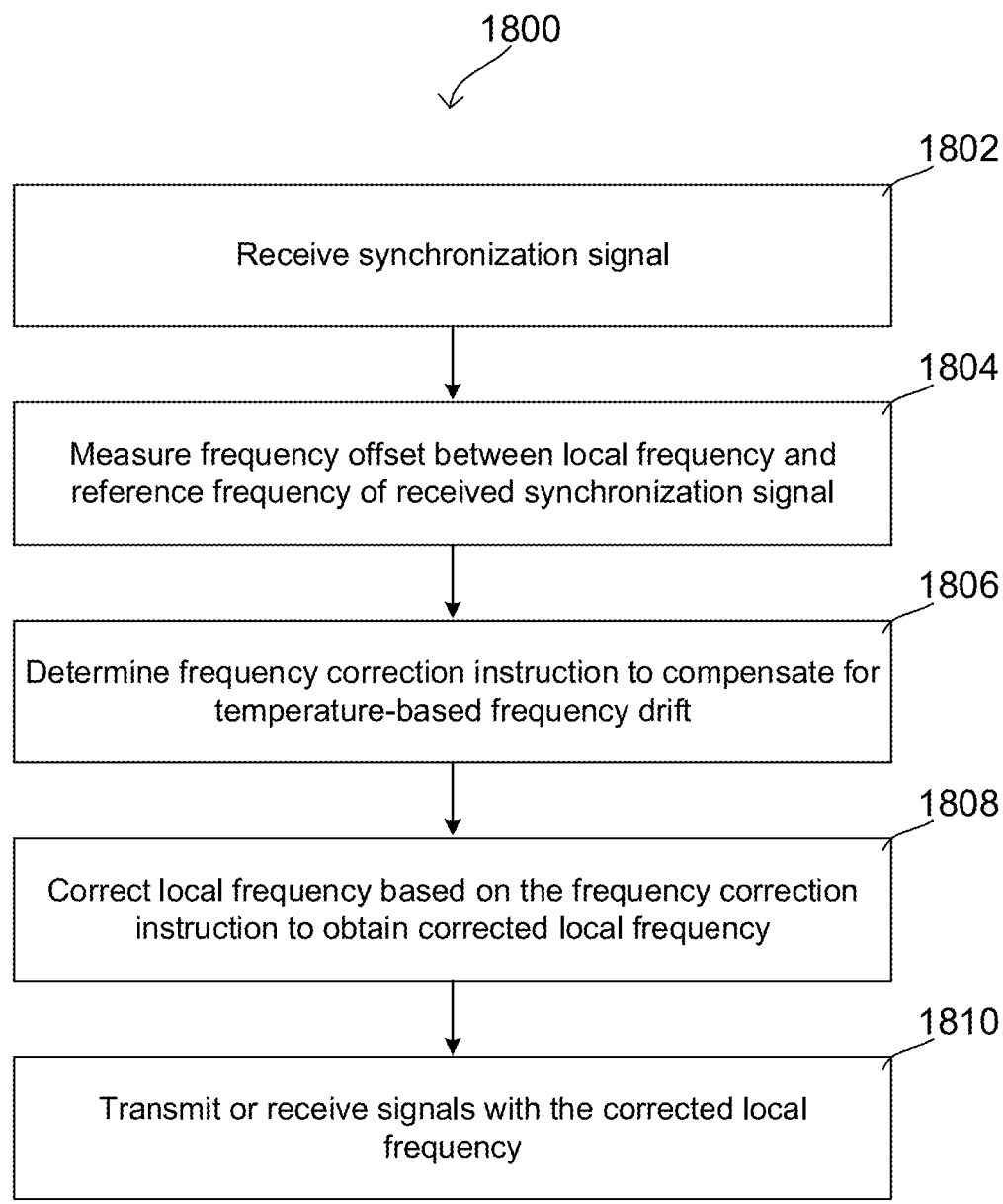

FIG 55
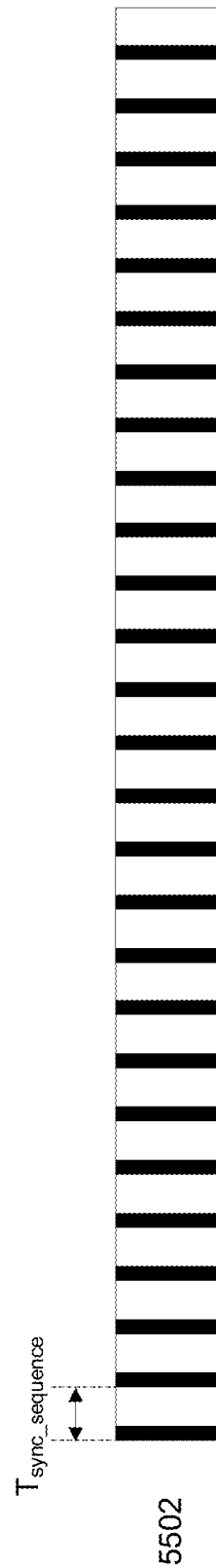
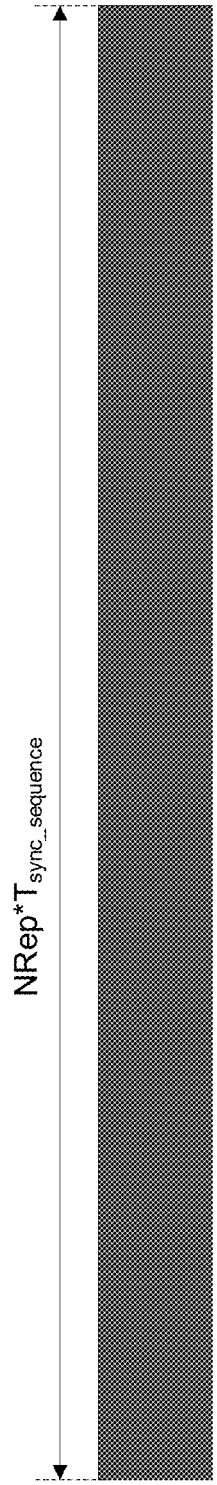

METHODS AND DEVICES FOR COMMUNICATIONS IN DEVICE-TO-DEVICE NETWORKS

CROSS-REFERENCE TO RELATED APPLICATIONS

This application is a continuation of PCT/EP2019/082073 filed on Nov. 21, 2019, which claims priority under Patent Cooperation Treaty (PCT) Article 8(1) to European Patent Application No. 18 248 282 filed on Dec. 28, 2018, both of which are incorporated by reference in their entirety.

TECHNICAL FIELD

Various aspects relate generally to methods and device for communications in device-to-device (D2D) networks.

BACKGROUND

Various communication networks use device-to-device (D2D) communications to enable devices to communicate directly with each other. The devices may therefore establish direct communication links with each other and use these links to transfer data between each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIGS. 6A-6C show examples of transmitted subframes and received subframes according to some aspects;

FIG. 7 shows an exemplary subframe configuration according to some aspects;

FIG. 18 shows an exemplary flow chart of frequency synchronization according to some aspects;

FIG. 55 shows an exemplary diagram depicting RF receiver power activity for a synchronization procedure according to some aspects according to some aspects;

DESCRIPTION

Figure 1:
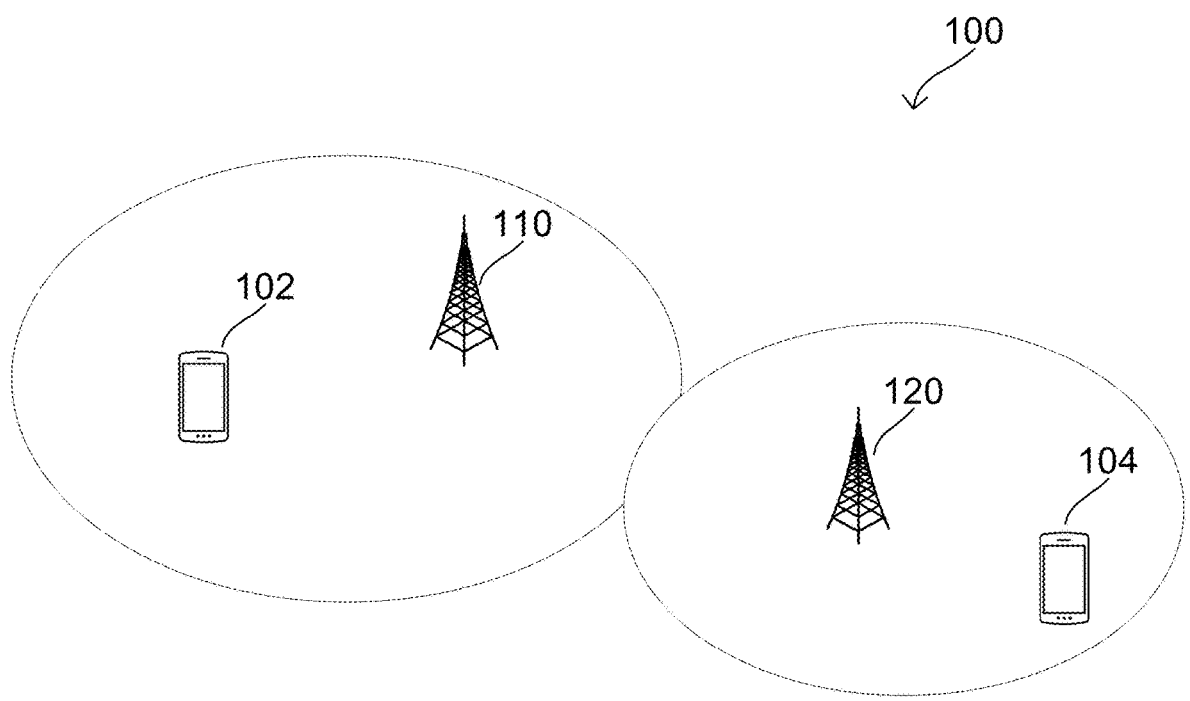
FIG. 1 shows an exemplary communication network according to some aspects.

The following detailed description refers to the accompanying drawings that show, by way of illustration, specific details and aspects of aspects in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
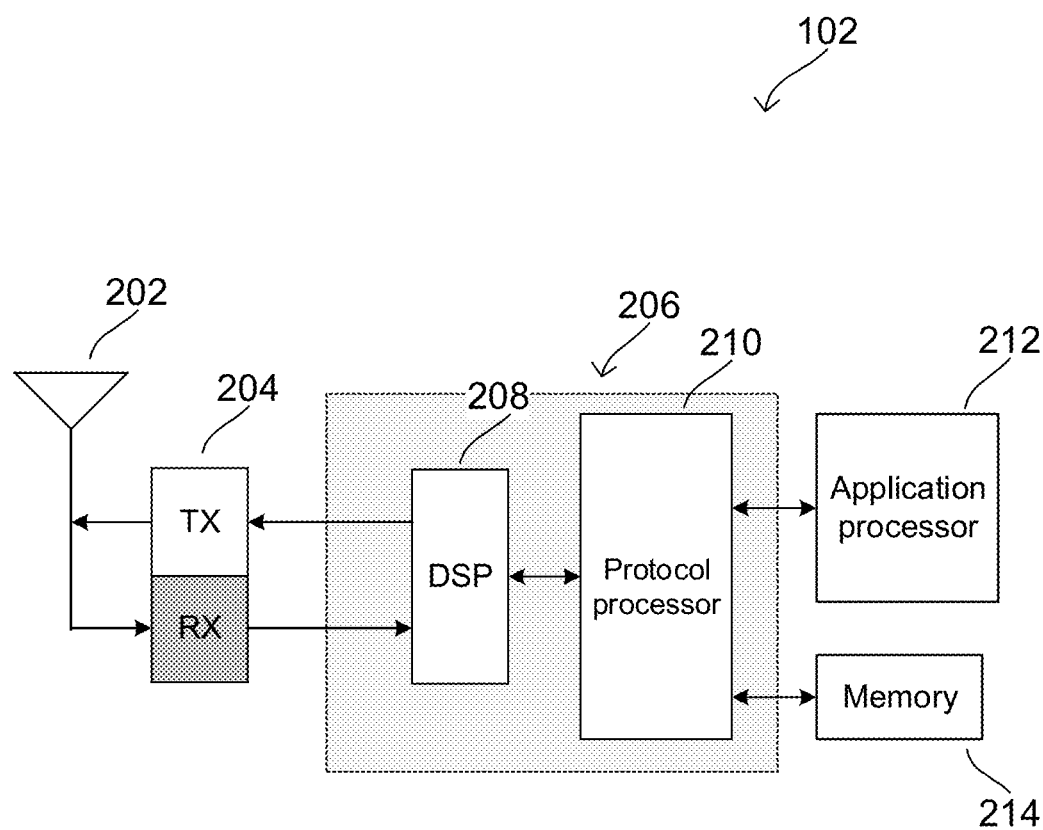
FIG. 2 shows an exemplary configuration of a terminal device according to some aspects.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device (s), memory, power supply, external device interface (s), subscriber identity module (s) (SIMs), user input/output devices (display(s), keypad(s), touchscreen(s), speaker(s), external button(s), camera(s), microphone (s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Many wireless networks may use time and frequency synchronization to support communications between wireless devices. Some of these wireless networks use a slotted communication schedule, which divides a communication schedule into frames that are individually composed of multiple slots. Wireless devices following the communication schedule may then arrange their transmission and reception operations around the slots and frames. Wireless devices may align their operations with the communication schedule through a synchronization process, which may vary in operation depending on the particular radio access technology. In cellular networks, the synchronization is generally provided by the cellular infrastructure, such as where cells broadcast synchronization signals that terminal devices can use to acquire time and frequency synchronization with the cellular network.

Various aspects of this disclosure relate to device-to-device (D2D) networks that are decentralized. Accordingly, wireless devices operating in these D2D networks may not have centralized network infrastructure to assist with synchronization. Wireless devices may instead use external synchronization sources, such as satellite-based synchronization sources (e.g., Global Navigation Satellite System (GNSS)), internal synchronization sources, such as internal device clocks (e.g., based on Coordinated Universal Time (UTC)), or peer-based synchronization sources (e.g., another D2D device broadcasting its own synchronization signal, which may be in turn based on an internal synchronization source of this device).

Figure 3:
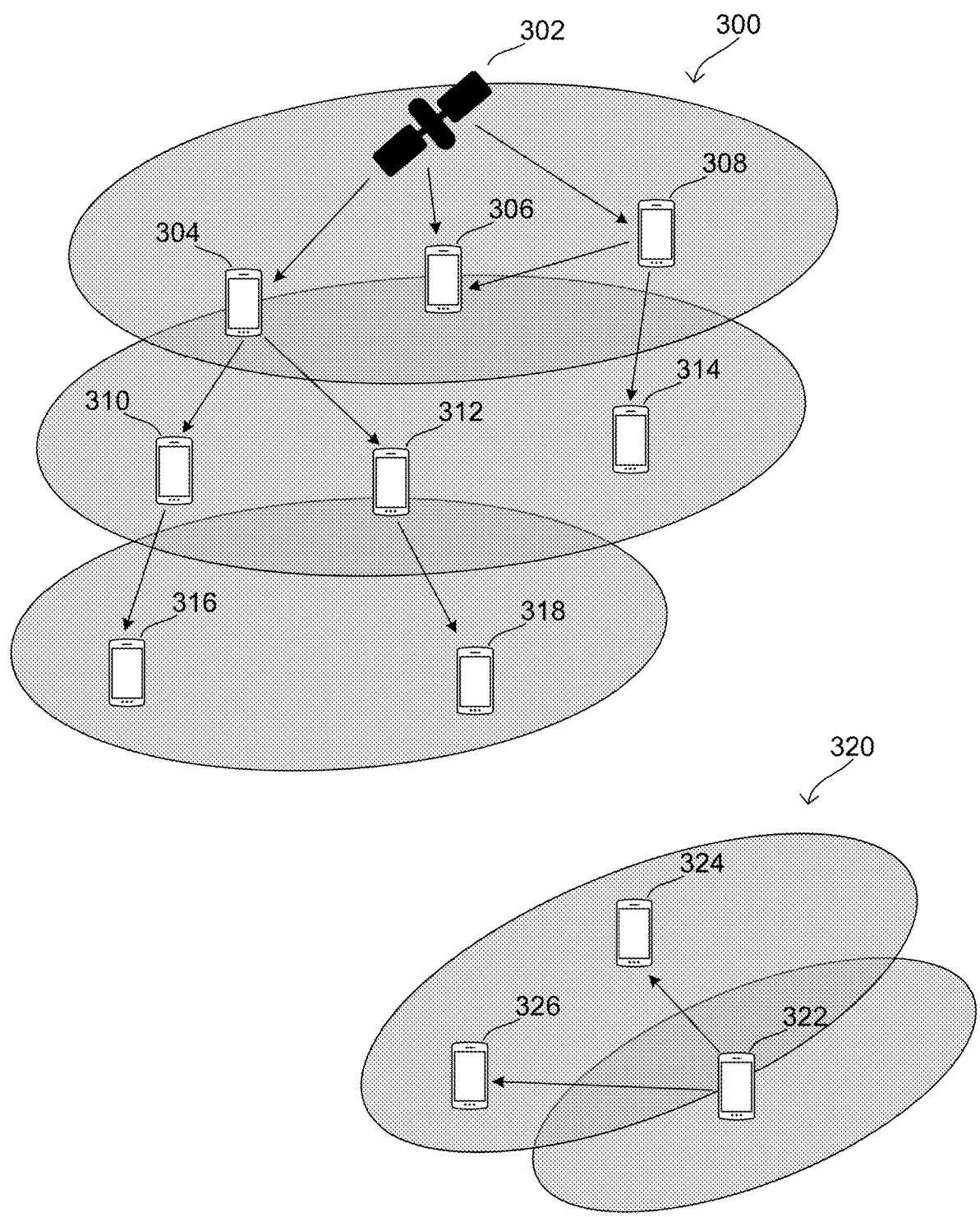
FIG. 3 shows exemplary synchronization clusters for device-to-device (D2D) communications according to some aspects.

Various aspects of this disclosure may use a tiered system of synchronization, where certain synchronization tiers of devices may act as synchronization masters, synchronization relays, and synchronization slaves. FIG. 3 shows an exemplary synchronization arrangement of wireless devices according to some aspects. As shown in FIG. 3, there may be satellite-based synchronization cluster 300 and peer-based synchronization cluster 320. Satellite-based synchronization cluster 300 may be synchronized with satellite-based synchronization source 302, such as with a synchronization signal broadcasted by satellite-based synchronization source 302 (e.g., a GNSS synchronization signal). This includes both wireless devices that are synchronized directly with satellite-based synchronization source 302 and wireless devices that are synchronized via relay with satellite-based synchronization source 302. By contrast, peer-based synchronization cluster 320 may be synchronized with wireless device 322. Wireless device 322 may use an internal synchronization source, such as its internal device clock (e.g., based on UTC), to generate synchronization signals to which the other wireless devices in peer-based synchronization cluster 320 can synchronize.

The wireless devices of satellite-based synchronization cluster 300 and peer-based synchronization cluster 320 may assume either master, relay, or slave roles. Synchronization masters may broadcast synchronization signals that synchronization relays and synchronization slaves can use to synchronize with the synchronization master. The synchronization masters may in turn be synchronized with a satellite-based or internal synchronization source, where the synchronization relays and slaves can also synchronize with the same synchronization source using the synchronization signals broadcasted by the synchronization masters. In the example of FIG. 3, wireless devices 304 and 308 may be synchronization masters that are synchronized with satellite-based synchronization source 302. The synchronization masters may form a zeroth synchronization tier of synchronization arrangement. Wireless devices 304 and 308 may therefore broadcast synchronization signals that are synchronized with satellite-based synchronization source 302. As shown in FIG. 3, wireless devices 306, 310, 312, and 314 may receive these synchronization signals from the synchronization masters.

Wireless device 306 may receive both a synchronization signal from satellite-based synchronization source 302 and a synchronization signal from wireless device 308. Wireless device 306 may not broadcast a synchronization signal, and may therefore be a synchronization slave (e.g., synchronized to both satellite-based synchronization source 302 and wireless device 308). Wireless device 314 may also receive a synchronization signal from wireless device 308 but may not receive a synchronization signal from satellite-based synchronization source 302. Wireless device 314 may not broadcast a synchronization signal, and may therefore be a synchronization slave to wireless device 308. As wireless device 314 receives a synchronization signal that is once-removed from the synchronization master, wireless device 314 may form part of the first synchronization tier of satellite-based synchronization cluster 300.

Similar to wireless device 314, wireless devices 310 and 312 may also receive synchronization signals from a synchronization master. Wireless devices 310 and 312 may therefore also be part of the first synchronization tier of satellite-based synchronization cluster 300. As shown in FIG. 3, wireless devices 310 and 312 may then broadcast their own synchronization signals, or in other words, may relay the synchronization signals from the synchronization master. Wireless devices 310 and 312 may therefore assume the role of synchronization relays.

Wireless devices 316 and 318 may then receive these synchronization signals from the synchronization relays. As these synchronization signals are two levels removed (e.g., forwarded twice) from the synchronization source, wireless devices 316 and 318 may be part of the second synchronization tier of satellite-based synchronization cluster 300. Wireless devices 316 and 318 may not transmit their own synchronization signals, and may therefore assume a synchronization slave role.

While satellite-based synchronization cluster 300 includes three synchronization tiers (zeroth, first, and second), additional synchronization tiers can also be used. However, as each additional synchronization tier includes an additional relay of the synchronization signal, the synchronization reliability will progressively decrease in each synchronization tier (e.g., with relay hop of the synchronization signal). For example, the probability that an nth synchronization tier synchronization relay becomes unsynchronized increases with n, leading to a time drift between the different synchronization tiers within the synchronization cluster. Furthermore, the designation of synchronization masters may change over time, such as through a contention or handover process where synchronization masters switch places with synchronization relays or slaves and the synchronization relays or slaves become synchronization masters. As synchronization masters can consume large levels of power, this can avoid scenarios where some devices share a disproportionate amount of the power usage burden.

In contrast to the satellite-based synchronization source of satellite-based synchronization cluster 300, peer-based synchronization cluster 320 may be synchronized with an internal clock of wireless device 322. In one example, the wireless devices of peer-based synchronization cluster 320 may be indoors, or in another location where satellite-based synchronization signals are unavailable or unreliable. Accordingly, wireless device 322 may begin broadcasting synchronization signals that are synchronized with its own internal synchronization source (e.g., its internal UTC clock). Wireless device 322 may therefore be a synchronization master. Wireless devices 324 and 326 may receive this synchronization signal and thus synchronize themselves with wireless device 322. In the example of FIG. 3, wireless devices 324 and 326 may not transmit their own synchronization signals, and may therefore be synchronization slaves in the first synchronization tier of peer-based synchronization cluster 320. In other scenarios, wireless devices 324 and 326 may be synchronization relays and therefore may relay the synchronization signal from wireless device 322.

In aspects, synchronization clusters may attempt to align themselves with a universal reference time. For example, synchronization cluster 300 may align itself with Global Positioning System (GPS) time, which is provided by the synchronization signals broadcasted by satellite-based synchronization source 302. Each wireless device may have its own local reference time, which it may periodically update based on synchronization signals to be aligned with the universal reference time. Similarly, synchronization cluster 320 may align itself with UTC time, which is provided by the synchronization signal broadcasted by wireless device 322. In some aspects, synchronization clusters may align their frame timings with certain timing positions in the universal reference time, such as where frame boundaries are located at certain points in time relative to the universal reference time. As further described below, this alignment with a universal reference time may help wireless devices when they are searching for synchronization signals. While wireless devices may not be able to perfectly align their local reference times with the universal reference time in proactive, it may help provide approximate frame timings to unsynchronized wireless devices. For example, even though the local reference time of a wireless device may not be precisely aligned with the communication schedule and universal reference time, it may still provide a baseline for wireless devices to approximately identify frame timings in the communication schedule.

Figure 4:
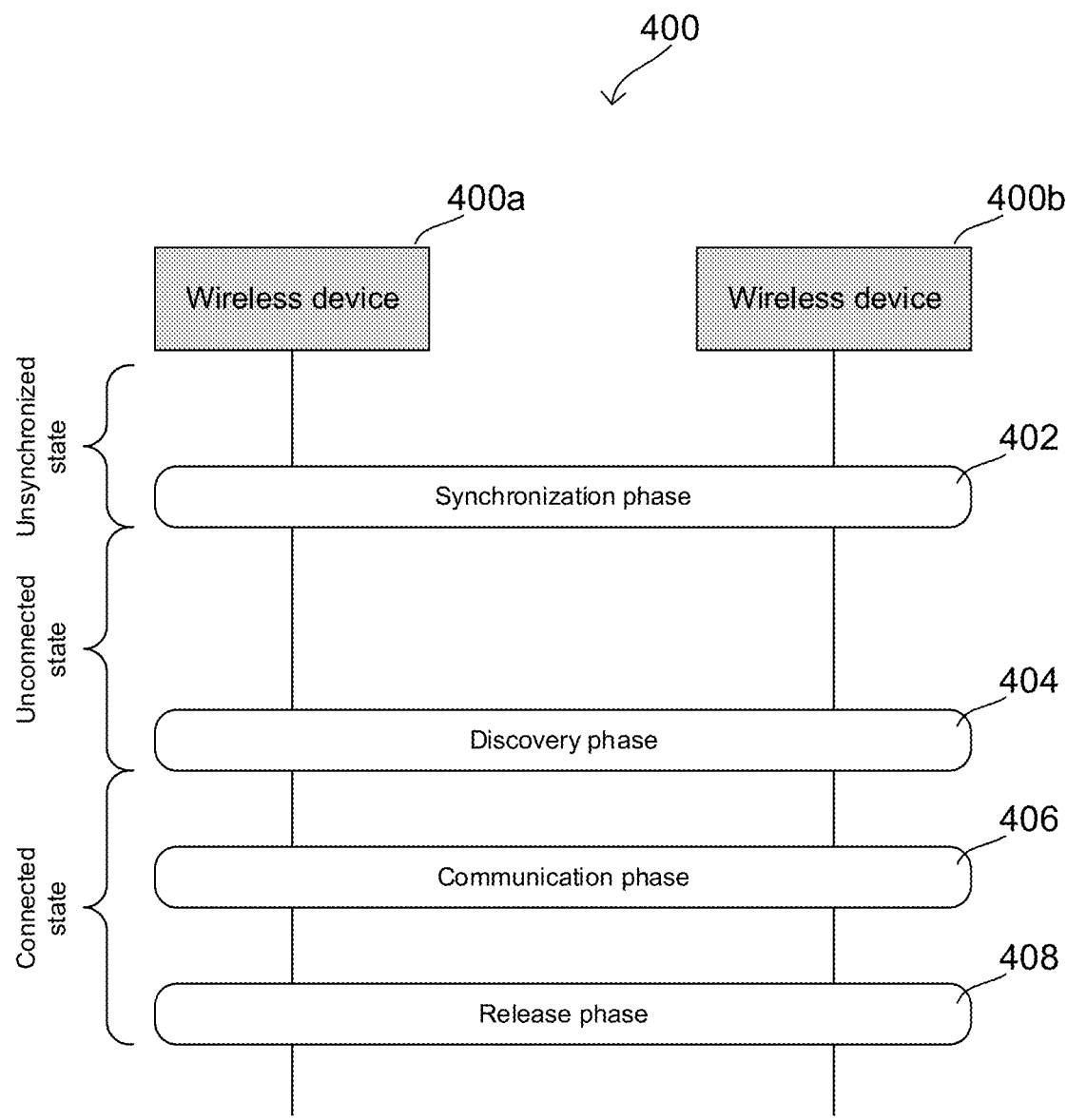
FIG. 4 shows an exemplary flow chart of D2D communications between wireless devices according to some aspects.

The respective wireless devices in satellite-based synchronization cluster 300 and peer-based synchronization cluster 320 may use the synchronization with each other to establish communication links. FIG. 4 shows exemplary message sequence chart 400 illustrating use of synchronization according to some aspects. As shown in FIG. 400, wireless devices 400a and 400b may initially be in an unsynchronized state with each other, or in other words, may not have a reliable synchronization reference between them. Wireless devices 400a and 400b may then perform a synchronization phase in stage 402. For example, wireless devices 400a and 400b may receive synchronization signals that are synchronized with the same synchronization source, and may therefore obtain common time references that are synchronized with each other. Wireless devices 400a and 400b may also align their tuning frequencies to a common frequency reference and thus obtain frequency synchronization.

Figure 5:
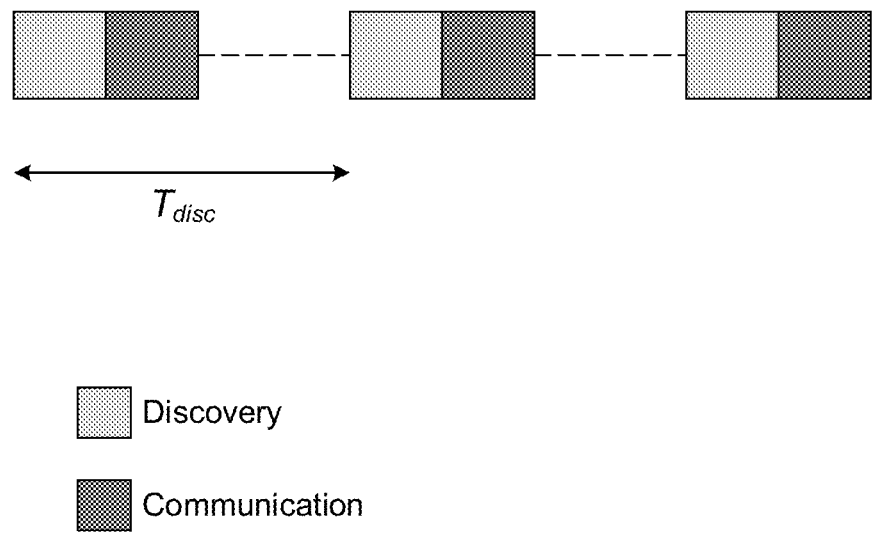
FIG. 5 shows an exemplary slotted communication schedule according to some aspects.

Following stage 402, wireless devices 400a and 400b may be in a synchronized but unconnected state. Wireless devices 400a and 400b may then execute a discovery phase in stage 404. In particular, wireless devices 400a and 400b may use the time and frequency synchronization to align their respective discovery operations in time and frequency. For example, wireless devices 400a and 400b may operate on a slotted communication schedule that allocates certain time slots and frequencies for discovery during each frame (or sequence of frames). These time slots and frequencies allocated for discovery are referred to herein as discovery resources. FIG. 5 shows an example where discovery resources are allocated with a periodicity of $T_{disc}$. The frames may also include communication and other resources, between which the discovery resources are interleaved. Wireless devices 400a and 400b may therefore use the time and frequency synchronization (e.g., the common time and frequency references) to align their discovery operations, such as by identifying the timing of the discovery resources using the common time reference. This can include exchanging discovery messages (e.g., a discovery initiation message and a discovery confirmation message) on the discovery resources. Without time and frequency synchronization, wireless devices 400a and 400b may not be able to effectively perform discovery. For example, if misaligned in time, wireless devices 400a and 400b may transmit and receive the discovery messages at different times and experience irreversible decode errors (e.g., if the misalignment is larger than a guard interval). Similarly, if misaligned in frequency wireless devices 400a and 400b may use different modulation and demodulation frequencies that may likewise result in irreversible decode errors.

After discovering each other, wireless devices 400a and 400b may enter a connected state and perform a communication phase in stage 406, such as where wireless devices 400a and 400b exchange data. This may likewise rely on the time and frequency synchronization obtained in the synchronization phase of stage 402. For example, wireless devices 400a and 400b may use this time and frequency synchronization to align their transmission and reception on the same communication resources (as shown in FIG. 5). In some aspects, wireless devices 400a and 400b may use the synchronization from the synchronization phase for initial coarse synchronization and may apply time and frequency tracking on exchanged communication signal for fine synchronization. After communication is finished, wireless devices 400a and 400b execute a release phase in stage 408 to end the communication link. Without proper synchronization between them, wireless devices 400a and 400b may not be able to perform stages 404-408.

Many radio access technologies use cyclic prefixes to compensate for propagation delays and delay spreads. These cyclic prefixes act similarly to guard intervals; however, instead of being empty space, cyclic prefixes take a final section of a data symbol and append (or prefix) the final section to the beginning of the data symbol. Accordingly, when a device transmits the cyclic prefix and data symbol, a copy of the final section of the data symbol will be prefixed the beginning.

These cyclic prefixes can help with propagation delays and delay spreads. In particular, the duration of the cyclic prefix acts a guard interval and helps to avoid intersymbol interference from the previous data symbol. Additionally, because the cyclic prefix repeats the final section of the data symbol, the cyclic prefix turns the linear convolution with the channel into a circular convolution. This helps to simplify frequency domain processing like channel estimation and equalization (e.g., using single-tap equalization).

Radio access technology standards may select the duration of the cyclic prefix based on the expected propagation delays and delay spreads. For example, if wireless devices are expected to transmit over long distances, there may be high propagation delays between some wireless devices. This means that a longer cyclic prefix should be selected (compared to radio access technologies that expect to mainly transmit over shorter distances). Longer cyclic prefixes should similarly be selected if high delay spreads are expected (e.g., where the multipaths produce multipath arrival times that are spread apart in time).

These concepts for selecting cyclic prefixes are also relevant for D2D networks. Some D2D networks may be designed for large coverage ranges. As there is the potential for large propagation delays between the wireless devices, these D2D networks may use longer cyclic prefixes. The unique peer-to-peer nature of D2D networks may also be a factor in cyclic prefix selection. For example, a wireless device in a D2D network may maintain connections with many other users (instead of with a single network access node in traditional cellular cases). This means that the cyclic prefix duration should be long enough to cover the time offsets of all desired users (e.g., ranging from close to distant users); cyclic prefix durations should therefore be large to cover the wide range of offsets.

Figure 6A:
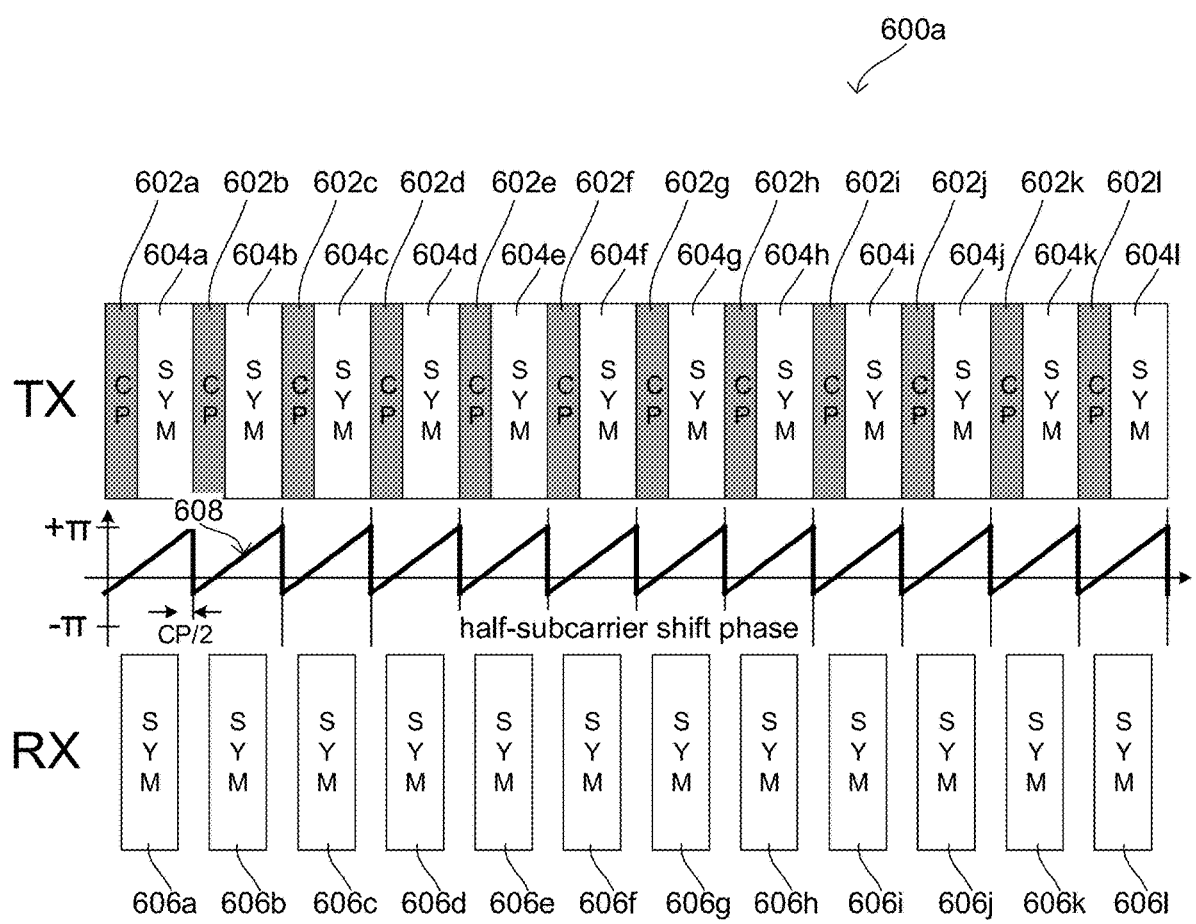

Some D2D networks may use long cyclic prefixes to cope with long coverage ranges. For example, while some cellular radio access technologies (such as LTE) use cyclic prefix durations of 10-20 microseconds, certain D2D networks may use cyclic prefixes in the range of 50-100 or even 100-200 microseconds. While these long cyclic prefixes may help account for long propagation delays, they may also lead to excessive overhead. Because the cyclic prefixes are repeated data (namely, copies of the final sections of the data symbols), they may occupy transmission time that could otherwise be used for information data. The inclusion of long cyclic prefixes may thus reduce the time for data transmission. FIGS. 6A-6C show exemplary subframes with varying cyclic prefix durations according to some aspects. The examples of FIGS. 6A-6C use an exemplary subframe duration of 1 millisecond and an exemplary symbol duration of ~66.7 microseconds; in various aspects, these parameters can be scaled to any time value.

FIGS. 6A-6C show several examples of transmitted subframes (the upper subframe in each figure) and received subframes (the lower subframe in each figure). A transmitting wireless device may transmit the transmitted subframe and a receiving wireless device may receive the received subframe. In some aspects, the transmitting wireless device may modulate the cyclic prefixes and the data symbols of the subframes with Single Carrier Frequency Division Multiple Access (SC-FDMA) modulation. The cyclic prefixes and data symbols of FIGS. 6A-6C may therefore be spread across a plurality of orthogonal subcarriers. In other aspects, the transmitting wireless device may modulate the cyclic prefixes and the data symbols of the subframes with orthogonal frequency division multiplexing (OFDM).

As shown in FIG. 6A, subframe 600a may use the shortest cyclic prefix duration out of FIGS. 6A-6C. For example, subframe 600a may use a cyclic prefix duration of ~16.7 microseconds. This can be the same length as an extended cyclic prefix (ECP) specified in the 3GPP LTE standard. Given this cyclic prefix duration, subframe 600a may include 12 cyclic prefixes 602a-602l and 12 data symbols 604a-604l. In this example, data symbols 604a-604l may each be ~66.7 microseconds in duration (e.g., the length of an LTE data symbol).

In some aspects, the transmitting wireless device may apply a half-subcarrier shift phase to the transmitted subframe (before wirelessly transmitting the transmitting subframe). The half-subcarrier shifts are identified at markers 608, 616, and 624 of FIGS. 6A-6C, respectively. As shown by the modulating phases at markers 608, 616, and 624, the transmitting wireless device may apply a slowly modulating sinusoidal (according to the half the subcarrier spacing) to the modulated baseband symbols (cyclic prefix plus data symbols), which may shift the baseband symbols by half a subcarrier in frequency. This half-subcarrier shift phase follows a linear phase across a cyclic prefix and the immediately following data symbol, where the linear phase goes from zero to π within each data symbol (and starts at slightly below zero at the beginning of each cyclic prefix so that the linear phase increases to zero at the beginning of the data symbol). The phase re-sets at the start of each cyclic prefix. This half-subcarrier shift phase removes the presence of a DC subcarrier and can help to reduce the Peak-to-Average Power Ratio (PAPR). Reducing the PAPR in this manner can in turn reduce the complexity and cost of transmitter components at the transmitting wireless device.

As shown in the received subframe of subframe 600a, the receiving wireless device may receive subframe 600a. The receiving wireless device may then, for each data symbol, remove the cyclic prefix by truncating the signal to obtain a truncated signal (e.g., truncating the signal from the truncation point of the cyclic prefix (such as the midpoint of the cyclic prefix) through a subsequent symbol period, thus obtaining a truncated signal including the remaining part of the cyclic prefix and the subsequent symbol period). These truncated signals are shown as data symbols 602a-602g. The receiving wireless device may then convert the data symbols to frequency (e.g., using a Fast Fourier Transform (FFT) and process the resulting baseband samples in the frequency domain.

Subframes 600b and 600c may use longer cyclic prefixes than subframe 600a. This causes subframes 600b and 600c to have more overhead and thus less transmission time for data. In the example of FIG. 6B, subframe 600b may use a cyclic prefix duration of ~66.7 microseconds (e.g., a Further Enhanced Cyclic Prefix (FECP)). Because the cyclic prefixes of subframe 600b are longer than those subframe 600a, the cyclic prefixes of subframe 600b occupy a higher proportion of subframe 600b. This reduces the amount of transmission time available for data symbols. Accordingly, subframe 600b (also 1 millisecond in duration) may include seven cyclic prefixes 602a-610g and seven data symbols 612a-612g (compared to 12 in subframe 600a). Like subframe 600b, subframe 600b may use a half-subcarrier shift phase that re-sets at the start of each cyclic prefix and goes from 0 to π over the duration of each data symbol. While FIGS. 6A-6C show each of the cyclic prefixes having the same length, in some cases certain cyclic prefixes may be longer than others. For example, the earliest-occurring cyclic prefix in a given subframe may be longer than some or all of the other cyclic prefixes in the subframe.

Subframe 600c in FIG. 6C shows an example where the cyclic prefix duration is further increased to ~133 microseconds while the data symbol duration is kept at ~66.7 microseconds. As shown in FIG. 6C, this subframe configuration may leave subframe 600c with five cyclic prefixes 618a-618e and five data symbols 620a-620e. Subframe 600c may also use a half-subcarrier shift phase the linearly increases at the start of each cyclic prefix until hitting π at the end of each data symbol.

While the longer cyclic prefixes of subframes 600b and 600c may better address long propagation delays and delay spreads, they may significantly reduce the amount of transmission time for data in each subframe (approximately 8/5=~53.3% and 10/15=~66.7% overhead in subframes 600b and 600c, respectively). Furthermore, in some use cases the transmitting wireless device may fill most or all of the data symbols with reference symbols (e.g., demodulation reference symbols or channel estimation reference symbols). The receiving wireless device may then perform demodulation or channel estimation based on receiving each of the multiple reference symbols in the subframe. When longer cyclic prefixes are used, the transmitting wireless device may transmit fewer reference symbols. Consequently, the receiving wireless device may have fewer reference symbols on which to base its demodulation and channel estimation. This may in turn decrease SNR robustness, such as by causing decode errors and/or inaccurate channel estimates.

Accordingly, various aspects of this disclosure may use a specialized subframe configuration to achieve SNR robustness while also accommodating for long propagation delays and delay spreads. In some aspects, wireless devices may use a subframe configuration that repeats the same data symbol in immediate succession (e.g., without a separate cyclic prefix between the successive data symbols). Because the repetitions are of the same data symbol, the repetitions may form cyclic prefixes for the immediately subsequent repetition. The transmitting wireless device may therefore repeatedly transmit the same data symbol (such as for use cases that involve symbol repetition in a subframe, such as for reference symbol transmission) while avoiding the excessive overhead of placing separate cyclic prefixes between the data symbols. Optionally, the subframe configuration may start with a separate cyclic prefix (e.g., having long duration, such as over 50 microseconds) that is followed by multiple repeated data symbols in immediate succession. A receiving wireless device may therefore select how many of the data symbols to use (in addition to the separate cyclic prefix) as a modified cyclic prefix for receiving other data symbols in the subframe. Because this modified cyclic prefix is longer than the separate cyclic prefix, the receiving wireless device may cope with longer propagation delays.

FIG. 7 shows an exemplary subframe configuration according to some aspects. The illustrated numerology, including subframe duration, number of data symbols, symbol duration, and cyclic prefix duration, is exemplary and can be scaled to any set of values. FIG. 7 shows both a transmitted subframe (upper subframe) and a received subframe (lower subframe) for subframe 700. As shown in this example, the transmitting wireless device may transmit subframe 700 with cyclic prefix 702 and data symbols 704a-704n. In one example, cyclic prefix 702 may be between 50-100 microseconds, such as ~66.7 microseconds, and data symbols 704a-704n may also be between 50-100 microseconds, such as ~66.7 microseconds.

In some aspects, the transmitting wireless device may transmit data symbols 704a-704n in immediate succession. For example, as shown in FIG. 7, there may not be any guard period or other signaling between data symbols 704a-704n. In use cases where data symbols 704a-704n are the same (e.g., repetitions of the same data symbol, such as the same reference symbol), a first data symbol may form a cyclic prefix for the data symbol immediately after that first data symbol. In other words, because data symbols 704a-704n are repetitions of the same data symbol, the final section of one data symbol will be the same as a beginning section of the immediately subsequent data symbol. This is the same as a cyclic prefix, which copies the end portion of a given data symbol and places it immediately before the start of the data symbol. The subframe configuration of subframe 700 can therefore avoid transmitting separate cyclic prefixes (separate from the data symbols) while still transmitting the data symbols in a manner that provides cyclic prefixes for the data symbols.

FIG. 7 also shows half-subcarrier shift 708. In some aspects, the transmitting wireless device may apply a continuous phase shift (e.g., without re-setting the phase) across each of data symbols 704a-704n (e.g., across each of the immediate succession of data symbols). This contrasts with the half-subcarrier shifts of FIGS. 6A-6C, where the transmitting wireless device re-set the phase at the beginning of each separate cyclic prefix. Because subframe 700 does not have separate cyclic prefixes between data symbols 704a-704n, the transmitting wireless device may not re-set the phase, and may instead use a continuous phase across the duration of data symbols 704a-704n. In some aspects, odd-numbered data symbols 704a, 704c, 70e, 704, 704i, 704k, and 704m may start at the same phase (e.g., +m in the example of FIG. 7) while the even-numbered data symbols 704, 704d, 704f, 704h, 704j, 704l, and 704n may start at the same phase (e.g., −π in the example of FIG. 7). Odd-numbered data symbols 704a, 704c, 70e, 704, 704i, 704k, and 704m may be offset by π from even-numbered data symbols 704, 704d, 704f, 704h, 704j, 704l, and 704n.

Figure 8:
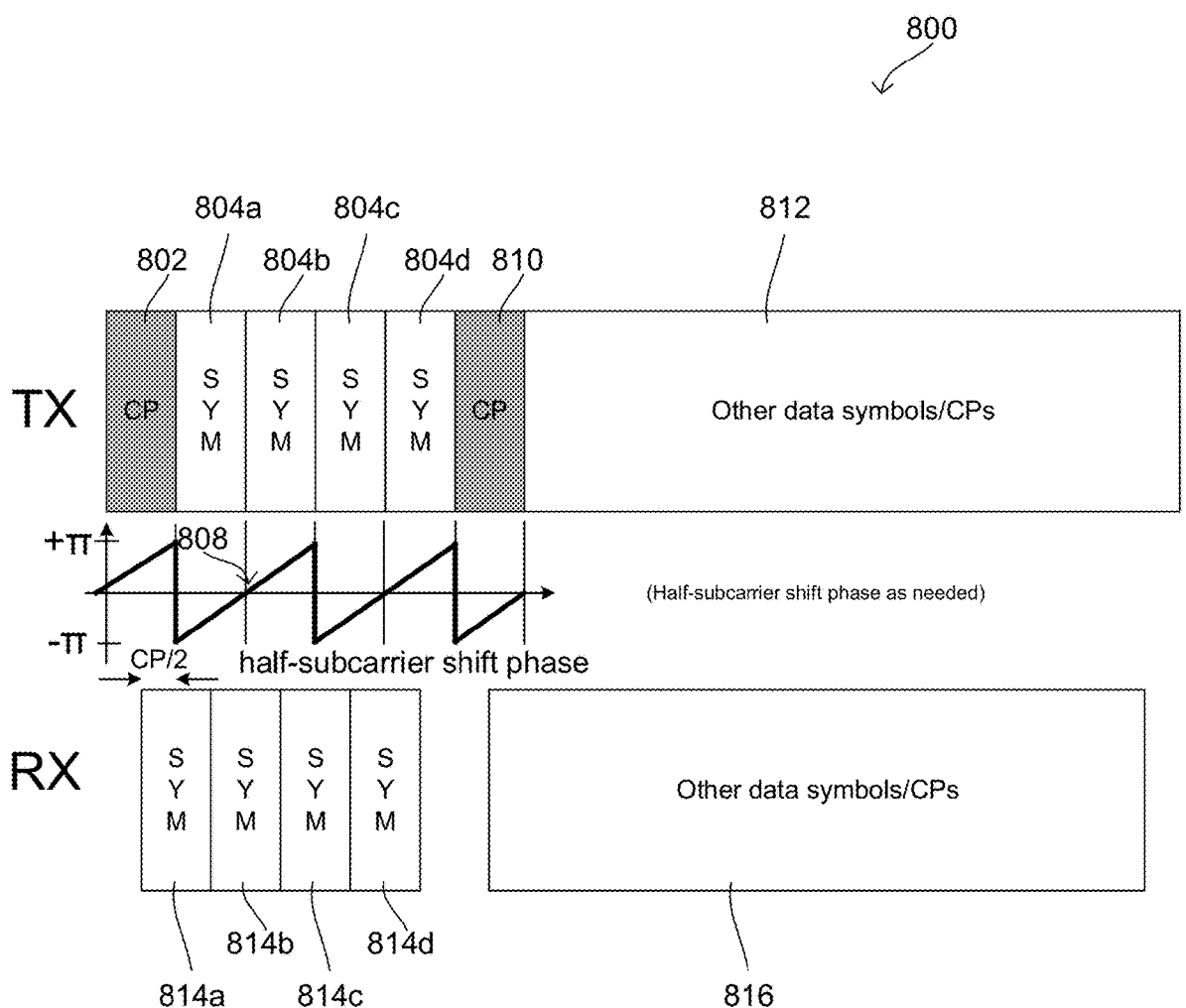
FIG. 8 shows another exemplary subframe configuration according to some aspects.

Numerous variations of this subframe configuration are also within the scope of this disclosure. FIG. 8 shows another example using subframe 800 according to some aspects. Subframe 800 may start with cyclic prefix 802 and data symbols 804a-804d, where cyclic prefix 802 and data symbols 804a-804 are in immediate succession with each other (e.g., no separate cyclic prefixes or other signaling between them). Accordingly, data symbols 804a-804c may respectively form cyclic prefixes for the data symbols immediately after them.

The example of subframe 700 in FIG. 7 fills the entire subframe with a single cyclic prefix and a plurality of data symbols (that are repetitions of the same data symbol). In the example of FIG. 8, the rest of subframe 800 may include a cyclic prefix 810 and other data symbols and/or cyclic prefixes 812. Accordingly, only some of subframe 800 includes a plurality of repetitions of a data symbol that are in immediate succession and for which each repetition (except the last-occurring repetition) forms a cyclic prefix for the immediately subsequent repetition. The receiving wireless device may then receive subframe 800 and truncate the signal to remove the cyclic prefixes and obtain a data signal including obtain data symbols 814a-81d and other data symbols and/or cyclic prefixes 816. Numerous other variations may similarly include a portion of a subframe that includes a cyclic prefix and a plurality of repetitions of the same data symbol.

Figure 9:
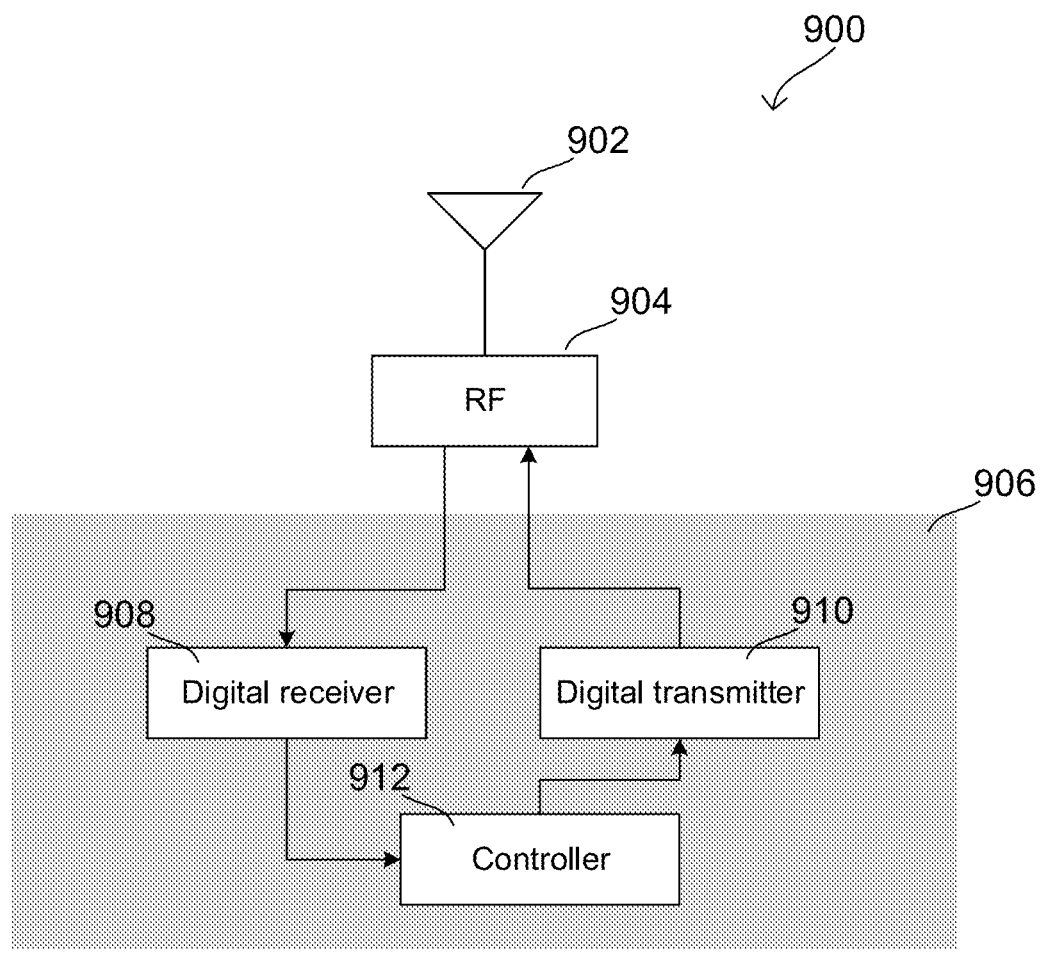
FIG. 9 shows an exemplary internal configuration of a transmitting wireless device according to some aspects.
Figure 10:
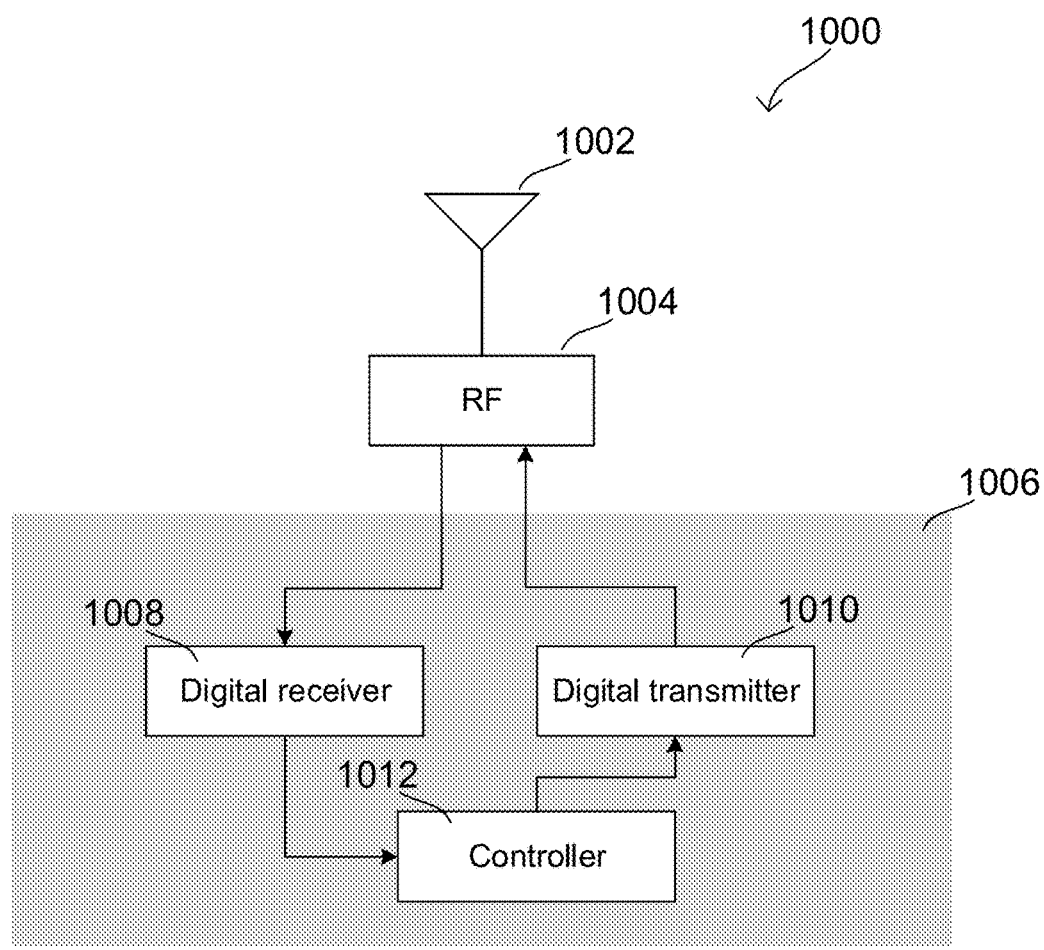
FIG. 10 shows an exemplary internal configuration of a receiving wireless device according to some aspects.

As described above, a transmitting wireless device may transmit these subframes while a receiving wireless device may receive the subframes. FIG. 9 shows an exemplary internal configuration of wireless device 900 according to some aspects, which may be a transmitting wireless device. FIG. 10 shows an exemplary internal configuration of wireless device 1000 according to some aspects, which may be a receiving wireless device. The configurations shown in FIGS. 9 and 10 are focused on the subframe configuration features of wireless devices 900 and 1000 and therefore may not expressly depict other components of wireless devices 900 and 1000 that are less directly related to subframe configurations. Accordingly, in various aspects wireless device 900 and/or wireless device 1000 may include various other components. Furthermore, while the following description may focus on wireless device 900 in a transmitting role (e.g., transmitting subframes) and wireless device 1000 in a receiving role (e.g., receiving subframes), in some aspects wireless device 900 may also be configured with the structure and functionality of wireless device 1000 and/or wireless device 1000 may be configured with the structure and functionality of wireless device 900.

Starting with FIG. 9, wireless device 900 may include antenna system 902, RF transceiver 904, and baseband modem 906. In some aspects, antenna system 902, RF transceiver 904, and baseband modem 906 may be configured as described above for antenna system 902, RF transceiver 904, and baseband modem 906 of terminal device 102. Accordingly, wireless device 900 may be configured to transmit and receive wireless signals via antenna system 902 and RF transceiver 904. In the transmit direction, RF transceiver 904 may therefore modulate and transmit baseband samples (provided by baseband modem 906) via antenna system 902. In the receive direction, RF transceiver 904 may also receive and demodulate radio signals via antenna system 902 and provide the resulting baseband samples to baseband modem 906.

FIG. 9 also depicts several internal components of baseband modem 906, including digital receiver 908, digital transmitter 910, and controller 912. In some aspects, baseband modem 906 may include a digital signal processor and a protocol controller. Digital receiver 908, digital transmitter 910, and controller 912 may therefore be subcomponents of the digital signal processor (e.g., physical layer components) and/or subcomponents of the protocol controller (e.g., protocol stack components). In some aspects, digital receiver 908 may be the physical layer receive chain while digital transmitter 910 may be the physical layer transmit chain. For example, digital receiver 908 may include a demodulator, demapper (e.g., constellation demapper), de-interleaver, decoder, and/or descrambler. Digital receiver 908 may receive wireless signals in the form of baseband samples via antenna system 902 and RF transceiver 904. Digital receiver 908 may then sequentially process these baseband samples with the demodulator, demapper (e.g., constellation demapper), de-interleaver, decoder, and/or descrambler to produce a bitstream, which digital receiver 908 may provide to controller 912 (e.g., to protocol stack layers of controller 912). Digital transmitter 910 may include a scrambler, encoder, interleaver, mapper (e.g., constellation mapper), and/or a modulator, which may sequentially process a bitstream (e.g., provided by protocol stack layers of controller 912) to produce baseband samples (e.g., complex IQ symbols). Digital transmitter 910 may then transmit these baseband samples as wireless signals via RF transceiver 904 and antenna system 902. Controller 912 may include one or more processors configured to execute the protocol stack layers as software. This may include generating messages for digital transmitter 910 to transmit (e.g., messages including user or control data) and/or recovering messages from bitstreams provided by digital receiver 908.

Wireless device 1000 may be configured in the same general manner as wireless device 900. As shown in FIG. 10, wireless device 1000 may include antenna system 1002, RF transceiver 1004, and baseband modem 1006. In some aspects, antenna system 1002, RF transceiver 1004, and baseband modem 1006 may be configured as described above for antenna system 1002, RF transceiver 1004, and baseband modem 1006 of terminal device 102. Accordingly, wireless device 1000 may be configured to transmit and receive wireless signals via antenna system 1002 and RF transceiver 1004. In the transmit direction, RF transceiver 1004 may therefore modulate and transmit baseband samples (provided by baseband modem 1006) via antenna system 1002. In the receive direction, RF transceiver 1004 may also receive and demodulate radio signals via antenna system 1002 and provide the resulting baseband samples to baseband modem 1006.

FIG. 10 also depicts several internal components of baseband modem 1006, including digital receiver 1008, digital transmitter 1010, and controller 1012. In some aspects, baseband modem 1006 may include a digital signal processor and a protocol controller. Digital receiver 1008, digital transmitter 1010, and controller 1012 may therefore be subcomponents of the digital signal processor (e.g., physical layer components) and/or subcomponents of the protocol controller (e.g., protocol stack components). In some aspects, digital receiver 1008 may be the physical layer receive chain while digital transmitter 1010 may be the physical layer transmit chain. For example, digital receiver 1008 may include a demodulator, demapper (e.g., constellation demapper), de-interleaver, decoder, and/or descrambler. Digital receiver 1008 may receive wireless signals in the form of baseband samples via antenna system 1002 and RF transceiver 1004. Digital receiver 1008 may then sequentially process these baseband samples with the demodulator, demapper (e.g., constellation demapper), de-interleaver, decoder, and/or descrambler to produce a bitstream, which digital receiver 1008 may provide to controller 1012 (e.g., to protocol stack layers of controller 1012). Digital transmitter 1010 may include a scrambler, encoder, interleaver, mapper (e.g., constellation mapper), and/or a modulator, which may sequentially process a bitstream (e.g., provided by protocol stack layers of controller 1012) to produce baseband samples (e.g., complex IQ symbols). Digital transmitter 1010 may then transmit these baseband samples as wireless signals via RF transceiver 1004 and antenna system 1002. Controller 1012 may include one or more processors configured to execute the protocol stack layers as software. This may include generating messages for digital transmitter 1010 to transmit (e.g., messages including user or control data) and/or recovering messages from bitstreams provided by digital receiver 1008.

In various aspects, wireless device 900 may be configured to transmit subframes using the subframe configurations described herein. For example, controller 912 may provide data to digital transmitter 910. Digital transmitter 910 may then modulate the data and transmit the resulting signal via RF transceiver 904 and antenna system 902. In one example, the data may represent a plurality of data symbols, such as in the manner of data symbols 704a-704n of FIG. 7 or data symbols 804a-804d in FIG. 8 (which can be any number of data symbols). The plurality of data symbols may be the same (e.g., may be the same IQ samples). Digital transmitter 910 may then perform physical layer processing on the data to produce a signal that represents the plurality of data symbols, where the signal is configured according to the subframe Using the example of FIG. 7, digital transmitter 910 may receive the data (e.g., representing data symbols 704a-704n) from controller 912. Data symbols 704a-704n may each be the same data symbol (e.g., repetitions of the same data symbol). Digital transmitter 910 may then modulate the data to obtain data symbols 704a-704n (e.g., in the time domain). Digital transmitter 910 may then generate cyclic prefix 702 from data symbol 704a, such as by copying a final section of symbol 704a (where the final section is equal to the cyclic prefix duration, such as between 50-100 microseconds) and appending it immediately before data symbol 704a. Digital transmitter 910 may then transmit, via RF transceiver 904 and antenna system 902, cyclic prefix 702. Digital transmitter 910 may then transmit data symbol 704a immediately after cyclic prefix 702 (e.g., without any guard period or other signaling between them).

Because data symbol 704b is the same as data symbol 704a, data symbol 704a may form a cyclic prefix for data symbol 704b (e.g., the final section of data symbol 704a may be the same as the final section of data symbol 704b). For example, because a cyclic prefix is normally the final section of a data symbol that is copied and appended immediately before the start of the data symbol, the final section of data symbol 704a may form a cyclic prefix for data symbol 704b. Digital transmitter 910 may therefore transmit data symbol 704b immediately after data symbol 704a (e.g., without any guard period or other signaling between them). The final section of data symbol 704a may therefore form a cyclic prefix for data symbol 704b (e.g., may be the same as the final section of data symbol 704a).

Digital transmitter 910 may continue sequentially transmitting the plurality of data symbols in subframe 700. In the example of FIG. 7, digital transmitter 910 may transmit data symbols 704a-704m in immediate succession, where each of data symbols 704a-704m forms a cyclic prefix for the immediately subsequent data symbol. As data symbol 704n is the last data symbol in subframe 700, data symbol 704n may not form a cyclic prefix for any other data symbols in subframe 700 (although could form a cyclic prefix for a first data symbol in a next subframe that begins immediately after data symbol 704n).

As indicated above regarding FIG. 8, there are numerous different subframe configurations that use this same general concept of transmitting a plurality of data symbols in immediate succession where the data symbols form cyclic prefixes for immediately subsequent data symbols. In the example of FIG. 8, controller 912 may provide data representing data symbols 804a-804d to digital transmitter 910. Data symbols 804a-804d may each be the same data symbol. Digital transmitter 910 may then modulate the data to obtain data symbols 804a-804d. Digital transmitter 910 may then generate cyclic prefix 802 for data symbol 804a and then transmit cyclic prefix 802. Digital transmitter 910 may then transmit data symbol 804a immediately after cyclic prefix 802. Digital transmitter 910 may then transmit data symbol 804b immediately after data symbol 804a. Because data symbols 804a and 804b are the same, the final section of data symbol 804a may be the same as the final section of data symbol 804b. Thus, data symbol 804a forms a cyclic prefix for data symbol 804b. Digital transmitter 910 may similarly transmit data symbols 804c and 804d in immediate succession.

Controller 912 and digital transmitter 910 may be configured to transmit data symbols in numerous variant subframe configurations. The subframe configurations described herein and exemplary, and serve to illustrate examples of digital transmitter 910 transmitting a plurality of data symbols (e.g., a plurality of repetitions of the same data symbol) in immediate succession where the data symbols form cyclic prefixes for subsequent data symbols. In some aspects, the plurality of data symbols may be reference symbols. For example, wireless device 900 may transmit a plurality of reference symbols (e.g., demodulation reference symbols or channel estimation symbols). A receiving wireless device such as wireless device 1000 may then receive the plurality of reference symbols and use them for demodulation (e.g., to assist in channel equalization when receiving other data from wireless device 900) or for link adaptation (e.g., to estimate channel quality and select a modulation and coding scheme or other parameters based thereon). In some aspects, the plurality of data symbols may be beacon symbols. For example, some wireless devices may be configured to broadcast a beacon signal to signal a predefined beacon event to other wireless devices. In one example, the predefined beacon event can be a synchronization master handover, such as where a wireless device acting as a synchronization master or synchronization relay determines to terminate its synchronization master role and decides to trigger a handover. The wireless device may therefore transmit a predefined beacon signal that wireless devices are preconfigured to recognize as indicating a handover. Other beacon signals for other predefined beacon events are also within the scope of this disclosure. Wireless device 900 may therefore transmit a plurality of data symbols (that are the same) that represent the beacon signal (or that represent multiple repetitions of the beacon signal). This subframe configuration may therefore enable wireless device 900 to transmit the beacon signal with higher propagation delay allowance and without excessive cyclic prefix overhead.

In some aspects, digital transmitter 910 may be configured to apply a half-subcarrier shift phase to the signals before transmitting them via RF transceiver 904 and antenna system 902. For example, digital transmitter 910 may modulate the signal (e.g., after modulating the data into the plurality of data symbols) with a carrier frequency equal to half the subcarrier spacing. Digital transmitter 910 may apply this half-subcarrier shift phase as a continuous phase-shift across the plurality of data symbols, such as by not resetting the phase between data symbols. Examples of this were previously discussed for half-subcarrier shift phase 708 in FIG. 7 and half-subcarrier shift phase 808 in FIG. 8.

A receiving wireless device such as wireless device 1000 may then receive the subframe (transmitted by wireless device 900). For example, digital receiver 1008 may receive the subframe as a signal via antenna system 1002 and RF transceiver 1004. Digital receiver 1008 may then process the signal to recover the plurality of data symbols. In aspects where the transmitting wireless device applied a half-subcarrier shift phase to the subframe, digital receiver 1008 may revert the half-subcarrier shift phase. Using the example of FIG. 8, digital receiver 1008 may truncate the signal at the midpoint of cyclic prefix 802 through data symbols 704a-704n to obtain a truncated signal including data symbols 814a-814d. Digital receiver 1008 may then process data symbols 814a-814d (and the other data symbols and cyclic prefixes 816 as applicable). As previously detailed for the examples in FIGS. 7 and 8, this subframe configuration may provide for longer cyclic prefixes, such as between 100-150 microseconds. For example, cyclic prefix 702 in subframe 700 may be 133.3 microseconds. Because of this long cyclic prefix (e.g., compared to LTE cyclic prefixes), digital receiver 1008 may be able to cope with long propagation delays, such as up to +/−~66.7 microseconds (as such delays will still fall within the exemplary 133.3 microsecond cyclic prefix). Even though it accommodates for longer propagation delays, the subframe configuration may still have a low cyclic prefix overhead (e.g., 2/15=~13.3%). The subframe configuration may therefore cope with long propagation delays without having excessive cyclic prefix overhead.

In some aspects, digital receiver 1008 may be configured to adaptively decide on a cyclic prefix length for processing the plurality of data symbols. Because the plurality of data symbols (e.g., data symbols 704a-704n and 804a-804d) are repetitions of a same data symbol, the data symbols form a cyclic prefix for their immediately subsequent data symbols. Digital receiver 1008 may thus treat one or more of the plurality of data symbols as a cyclic prefix for the other data symbols. This may increase the size of the cyclic prefix, and digital receiver 1008 may therefore be able to cope with even larger propagation delays.

Figure 11:
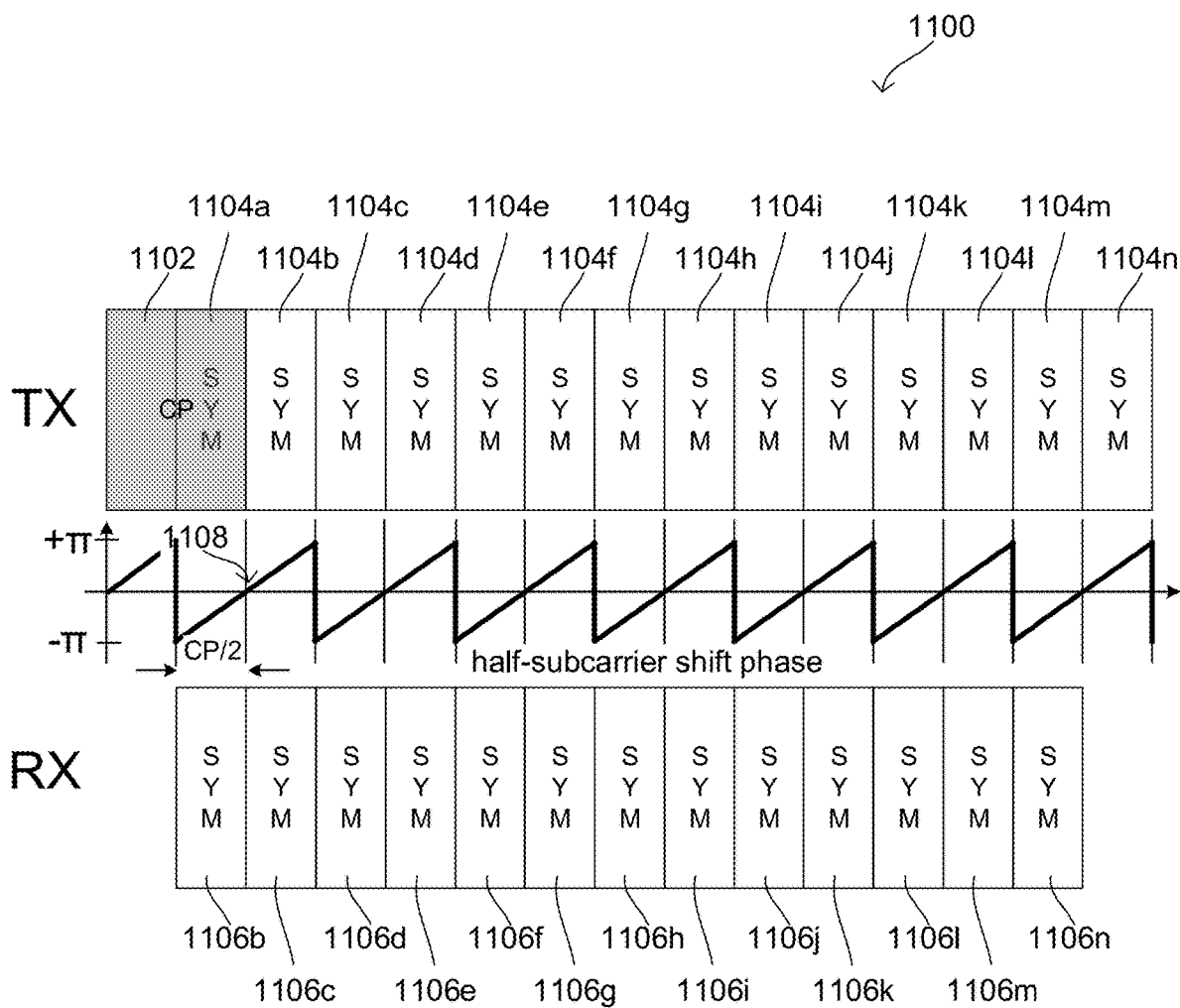
FIG. 11 shows an exemplary subframe configuration with a variable cyclic prefix according to some aspects.

FIG. 11 shows an example based on the exemplary subframe configuration of FIG. 7 according to some aspects. The transmitting wireless device may transmit subframe 1100 including cyclic prefix 1102 and data symbols 1104a-1104n (the plurality of data symbols, each being the same data symbol). Data symbol 1104a may be immediately after cyclic prefix 1102, and data symbols 1104b-1104n may be immediately after data symbol 1104a and in immediate succession to each other (this can be scaled to any number of data symbols). Because data symbols 1104a-1104n are the same and are in immediate succession, data symbols 1104a-1104m respectively form cyclic prefixes for the data symbols occurring immediately after them. For example, data symbol 1104a may form a cyclic prefix for data symbol 1104b, data symbol 1104b may form a cyclic prefix for data symbol 1104c, through data symbol 1104b that forms a cyclic prefix for data symbol 1104n.

In the example shown in FIG. 11, digital receiver 1008 may receive subframe 1100 as a signal. Digital receiver 1008 may then select a modified cyclic prefix for processing the signal that includes at least data symbol 1104a. For example, digital receiver 1008 may select a modified cyclic prefix including cyclic prefix 1102 and data symbol 1104a. Because this modified cyclic prefix includes cyclic prefix 1102 and data symbol 1104a, it can accommodate longer propagation delays than only cyclic prefix 1102 (the separate cyclic prefix in subframe 1100, e.g., that is not part of any data symbol).

Digital receiver 1008 may then truncate the signal using the modified cyclic prefix (e.g., at the midpoint of the modified cyclic prefix, as shown by the "CP/2" marker in FIG. 11). This leaves a truncated signal including data symbols 1106b-1106n (in the received subframe), which correspond to data symbols 1104b-1104n (in the transmitted subframe). Because digital receiver 1008 selected the modified cyclic prefix to include data symbol 1104*a*, digital receiver 1008 may cut data symbol 1104*a* from the received subframe. Although digital receiver 1008 may not be able to use data symbol 1104*a* (e.g., as a reference signal or beacon signal), digital receiver 1008 may be able to use data symbols 1106*a*-1106*n* (which are the same as data symbol 1104*a*). While data symbol 1104*a* may be cut, its inclusion in the modified cyclic prefix will enable digital receiver 1008 to cope with longer propagation delays. Assuming the propagation delays are +/− half of the duration of the modified cyclic prefix, digital receiver 1008 may be able to process data symbols 1106*b*-1106*n* without (or with minimal) corruption from propagation delays.

Using the examples introduced above, digital receiver 1008 may demodulate data symbols 1106*b*-1106*n* to recover the corresponding data. Because there are no separate prefixes between data symbols 1106*b*-1106*n*, digital receiver 1008 may not truncate a cyclic prefix between data symbols 1106*b*-1106*n*. Digital receiver 1008 may provide this data to controller 1012. Controller 1012 may then use the data to perform channel estimation (e.g., for channel equalization or link adaptation) or to identify a beacon signal.

The example of FIG. 11 shows digital receiver 1008 selecting data symbol 1104*a* (e.g., the first data symbol of the plurality of data symbols) as part of the modified cyclic prefix. In various other aspects, digital receiver 1008 may select, as part of the modified cyclic prefix for truncating the subframe, one or more of the plurality of data symbols that occur first in time. For example, digital receiver 1008 may select data symbols 1104*a*-1104*c*, 1104*a*-1104*g*, and so forth. Digital receiver 1008 may select, as part of the modified cyclic prefix, the first data symbol up to and including any subsequent one of the plurality of data symbols. The modified cyclic prefix may accommodate for larger propagation delays if it includes more of the plurality of data symbols.

In some aspects, digital receiver 1008 may be configured to adaptively select a length of the modified cyclic prefix, such as based on expected propagation delay. For example, digital receiver 1008 may select a longer modified cyclic prefix if digital receiver 1008 expects longer propagation delays, and may select a shorter modified cyclic prefix if digital receiver 1008 expects shorter propagation delays. In one example with a short expected propagation delay (e.g., less than half the duration of cyclic prefix 1102), digital receiver 1008 may select the modified cyclic prefix to include only cyclic prefix 1102, or may select the modified cyclic prefix to include cyclic prefix 1102 and data symbol 1104*a* (the first data symbol in the plurality of data symbols). In an example with a long expected propagation delay (e.g., more than the duration of cyclic prefix 1102), digital receiver 1008 may select the modified cyclic prefix to include cyclic prefix 1102 and data symbols 1104*a*-1104*c*, or to include cyclic prefix 1102 and data symbols 1104*a*-1104*e*. These are examples, and digital receiver 1008 may select larger or smaller modified cyclic prefixes depending on the expected propagation delay. In some aspects, controller 1012 may determine the expected propagation delay and indicate the expected propagation delay to digital receiver 1008.

In the examples of the modified cyclic prefix described above, digital receiver 1008 selects the cyclic prefix, the first data symbol of the plurality of data symbols, and optionally one or more of the plurality of data symbols in immediate succession after the first data symbol as the modified cyclic prefix. Digital receiver 1008 then uses this modified cyclic prefix as a cyclic prefix (for truncation) of the next data symbol of the plurality of data symbols (occurring immediately after the last data symbol selected for the modified cyclic prefix).

In other examples, digital receiver 1008 may select other data symbols for the modified cyclic prefix. For instance, digital receiver 1008 may select one or more successive data symbols and use the one or more successive data symbols as a modified cyclic prefix for a data symbol occurring immediately after the one or more successive data symbols in the plurality of data symbols. Using subframe 1100 of FIG. 11 as an example, digital receiver 1008 may select data symbols 1104*e* and 1104*f* (successive, e.g., in order in time) as a modified cyclic prefix for data symbol 1104*g*. Digital receiver 1008 may then perform cyclic prefix truncation for data symbol 1104*g* using this modified cyclic prefix. This may avoid intersymbol interference from data symbol 1104*d* (immediately before the one or more successive data symbols) on data symbol 1104*g*, thus allowing digital receiver 1008 to receive and process data symbol 1104*g* while coping with propagation delays. Because the plurality of data symbols are the same (e.g., repetitions of the same data symbol), digital receiver 1008 may be able to select any one or more successive data symbols (other than the last data symbol in the plurality of data symbols) to use as a modified cyclic prefix for a data symbol immediately after the one or more successive data symbols. Digital receiver 1008 may thus be able to cope with propagation delays while the subframe configuration has low overhead (as separate cyclic prefixes are unnecessary).

Figure 12A:
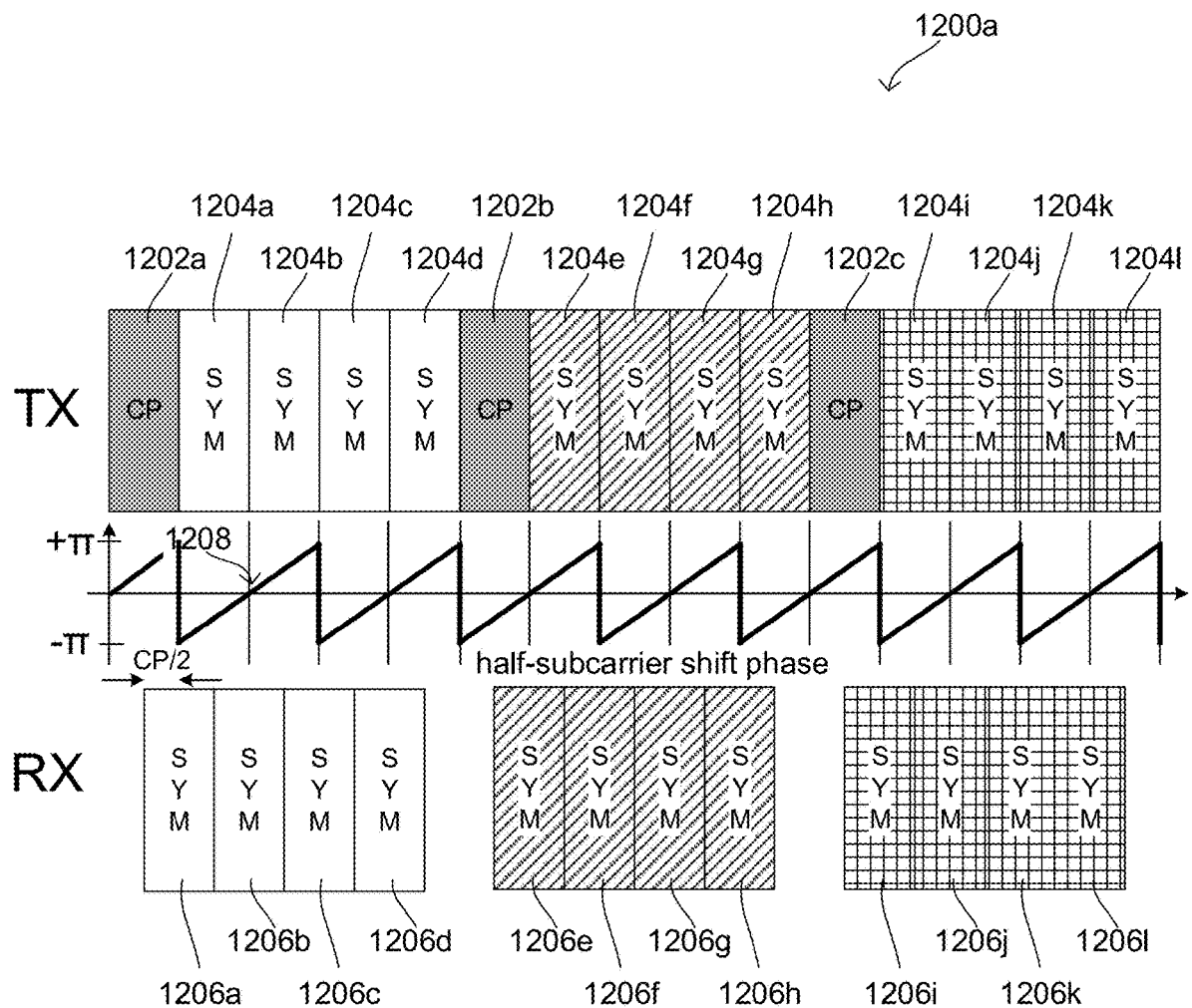
FIGS. 12A and 12B show exemplary subframe configurations with multiple sets of symbol repetitions according to some aspects.
Figure 12B:
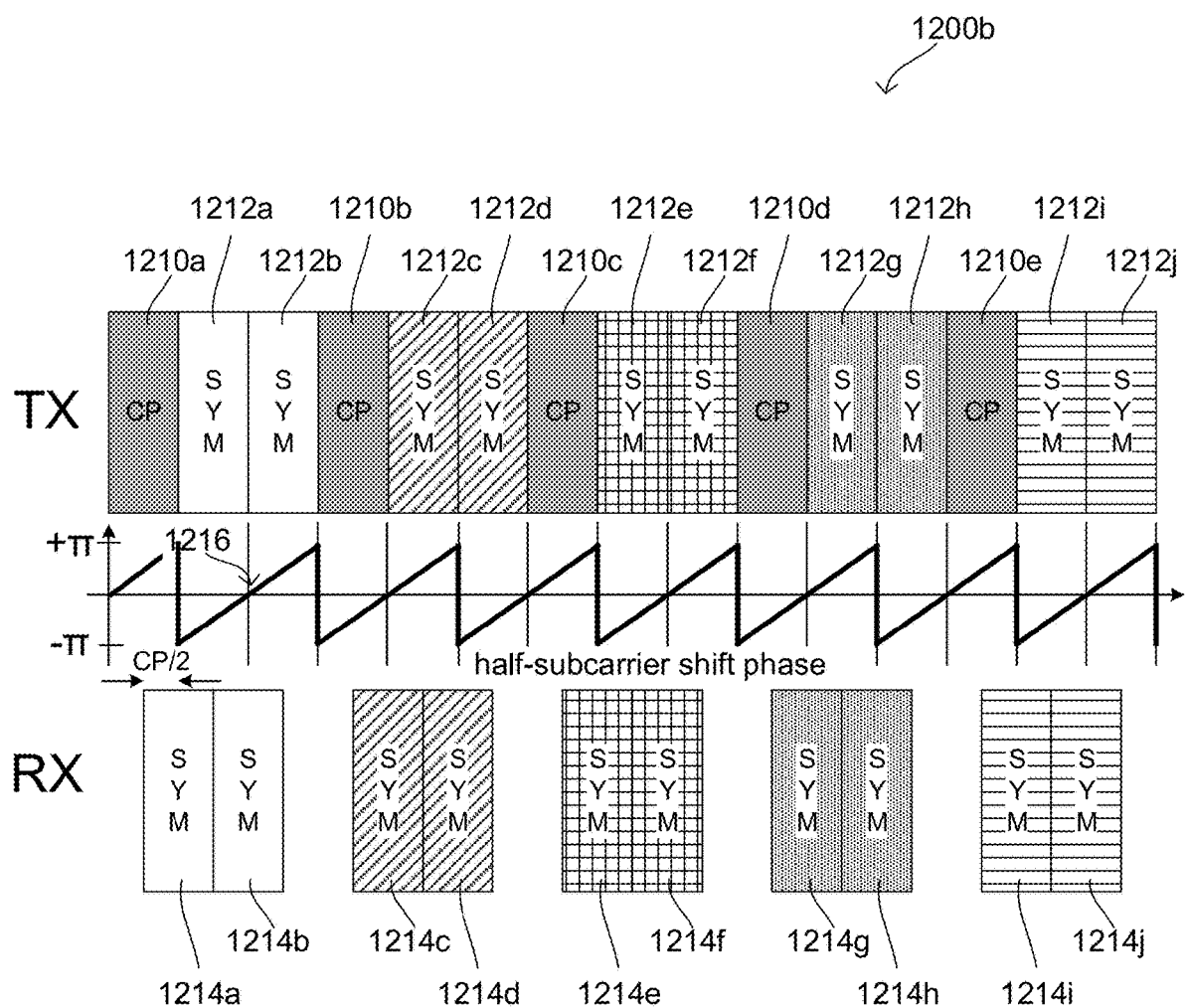

FIGS. 12A and 12B show additional exemplary subframe configurations according to some aspects. FIG. 12A shows subframe 1200*a* according to some aspects. Subframe 1200*a* may include cyclic prefixes 1202*a*-1202*c* and data symbols 1204*a*-1204*l*. In one exemplary numerology, cyclic prefixes 1202*a*-1202*c* may be between 50-100 microseconds (e.g., ~66.7 microseconds) and data symbols 1204*a*-1204*l* may also be between 50-100 microseconds (e.g., ~66.7 microseconds). This example may yield a cyclic prefix overhead of 3/15=20%. As denoted by the shading of data symbols 1204*a*-1204*l*, data symbols 1204*a*-1204*b* may be the same (repetitions of a first data symbol), data symbols 1204*e*-1204*h* may be the same (repetitions of a second data symbol), and data symbols 1204*i*-1204*l* may be the same (repetitions of a third data symbol).

Because data symbols 1204*a*-1204*l* are separated into groups (e.g., three groups) and transmitted in immediate succession, data symbols 1204*a*-1204*l* may serve as cyclic prefixes for other of data symbols 1204*a*-1204*l* in the same group. For example, data symbol 1204*a* may form a cyclic prefix for data symbol 1204*b* (and so forth for the other data symbols); generally, a given data symbol (that is not last in its group) may form a cyclic prefix for another data symbol immediately after the given data symbol.

A transmitting wireless device (e.g., wireless device 900) may transmit subframe 1200*a*, and a receiving wireless device (e.g., wireless device 1000) may receive subframe 1200*a*. As shown in the received section of subframe 1200*a* (on the bottom), the receiving wireless device may truncate the signal at cyclic prefixes 1202*a*-1202*c* (e.g., truncate cyclic prefix 1202*a* at its midpoint to obtain a truncated signal including data symbols 1206*a*-1206*d*, truncate cyclic prefix 1202*b* to obtain a truncated signal including data symbols 1206*e*-1206*h*, and truncate cyclic prefix 1202*c* to obtain a truncated signal including data symbols 1206*i*-1206*l*). The receiving wireless device may thus obtain data symbols 1206*a*-1206*l*. In some aspects, the receiving wireless device may select one or more of data symbols 1204*a*-

1204*l* as part of a modified cyclic prefix, and may then use this modified cyclic prefix to receive the remaining data symbols in its grouping (the data symbols immediately after the last-occurring data symbol in the modified cyclic prefix). For example, the receiving wireless device may select cyclic prefix 1202*a* and data symbol 1204*a* as part of the modified cyclic prefix. The receiving wireless device may then truncate the signal using the modified cyclic prefix (e.g., at the midpoint of the modified cyclic prefix) and obtain data symbols 1206*b*-1206*d*. The receiving wireless device may similarly use modified cyclic prefixes for the other groupings (data symbols 1204*e*-1204*h* and data symbols 1204*i*-1204*l*).

In some aspects, the groups of data symbols 1204*a*-1204*d*, 1204*e*-1204*h*, and 1204*i*-1204*l* may be different reference symbols. For example, data symbols 1204*a*-1204*d* may be repetitions of a first reference symbol, data symbols 1204*e*-1204*h* may be repetitions of a second reference symbol, and data symbols 1204*i*-1204*l* may be repetitions of a third reference symbol. In one example, each group may use a different reference symbol to randomize different user signals (e.g., to provide different reference symbols to different users).

FIG. 12B shows subframe 1200*b* according to some aspects. Like subframe 1200*a*, subframe 1200*b* may separate the plurality of data symbols into groups. Subframe 1200*b* may include cyclic prefixes 1210*a*-1210*e* and data symbols 1212*a*-1212*j*. Cyclic prefixes 1210*a*-1210*e* may respectively separate data symbols 1212*a*-1212*j* into different groups: data symbols 1212*a*-1212*b* (repetitions of a first data symbol), data symbols 1212*c*-1212*d* (repetitions of a second data symbol), data symbols 1212*e*-1212*f* (repetitions of a third data symbol), data symbols 1212*g*-1212*h* (repetitions of a third data symbol), and data symbols 1212*i*-1212*j* (repetitions of a fourth data symbol). In one example, cyclic prefixes 1210*a*-1210*e* may be between 50-100 microseconds (e.g., ~66.7 microseconds) and data symbols 1212*a*-1212*j* may also be between 50-100 microsecond (e.g., ~66.7 microseconds). Subframe 1200*b* may have a cyclic prefix overhead of 5/15=~33.3%.

Because data symbols 1212*a*-1212*j* are separated into groups (e.g., three groups) and transmitted in immediate succession, data symbols 1212*a*-1212*j* may serve as cyclic prefixes for other of data symbols 1212*a*-1212*j* in the same group. For example, data symbol 1212*a* may form a cyclic prefix for data symbol 1212*b* (and so forth for the other data symbols); generally, a given data symbol (that is not last in its group) may form a cyclic prefix for another data symbol immediately after the given data symbol.

A transmitting wireless device (e.g., wireless device 900) may transmit subframe 1200*a*, and a receiving wireless device (e.g., wireless device 1000) may receive subframe 1200*a*. As shown in the received section of subframe 1200*a* (on the bottom), the receiving wireless device may truncate the signal at cyclic prefixes 1210*a*-1210*e*. The receiving wireless device may thus obtain data symbols 1214*a*-1214*j*. In some aspects, the receiving wireless device may select one or more of data symbols 1212*a*-1212*j* as part of a modified cyclic prefix, and may then use this modified cyclic prefix to receive the remaining data symbols in its grouping (the data symbols immediately after the last-occurring data symbol in the modified cyclic prefix). For example, the receiving wireless device may select cyclic prefix 1210*a* and data symbol 1212*a* as part of the modified cyclic prefix. The receiving wireless device may then truncate the signal using the modified cyclic prefix and obtain data symbol 1214*b*. The receiving wireless device may similarly use modified cyclic prefixes for the other groupings of data symbols.

In some aspects, the groups of data symbols 1212*a*-1212*b*, 1212*c*-1212*d*, 1212*e*-1212*f*, 1212*g*-1212*h*, and 1212*i*-1212*j* may be different reference symbols. For example, data symbols 1212*a*-1212*b* may be repetitions of a first reference symbol, data symbols 1212*c*-1212*d* may be repetitions of a second reference symbol, data symbols 1212*e*-1212*f* may be repetitions of a third reference symbol, data symbols 1212*g*-1212*h* may be repetitions of a fourth reference symbol, and data symbols 1212*i*-1212*j* may be repetitions of a fifth reference symbol. In one example, each group may use a different reference symbol to randomize different user signals (e.g., to provide different reference symbols to different users).

Figure 13:
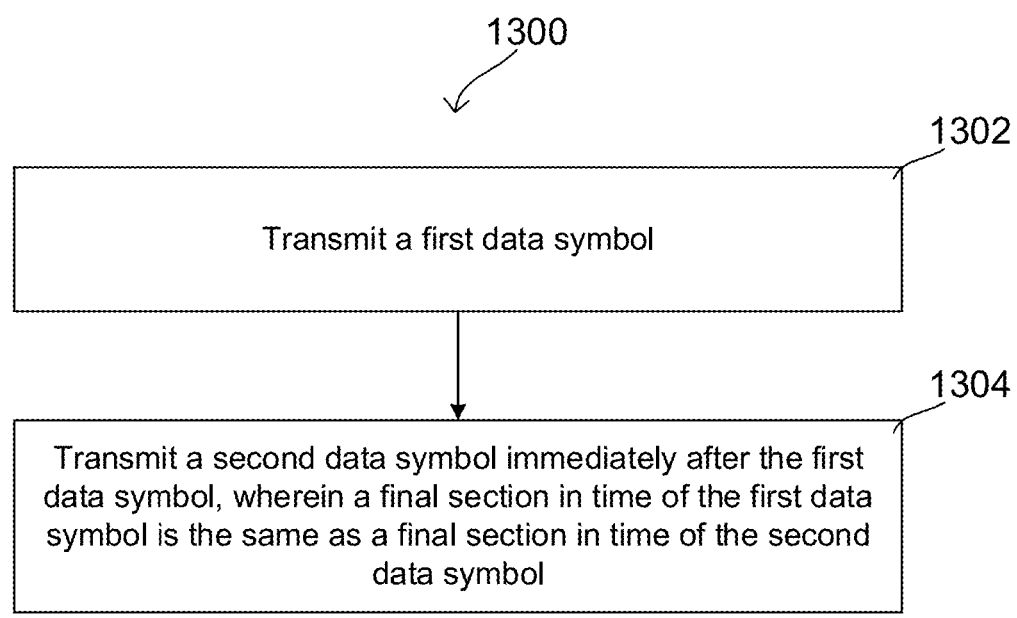
FIGS. 13-16 show exemplary methods of wireless communication at a wireless device according to some aspects.

FIG. 13 shows exemplary method 1300 of wireless communication at a wireless device according to some aspects. As shown in FIG. 13, method 1300 includes transmitting a first data symbol (1302), and transmitting a second data symbol immediately after the first data symbol (1304), wherein a final section in time of the first data symbol forms a cyclic prefix for the second data symbol.

Figure 14:
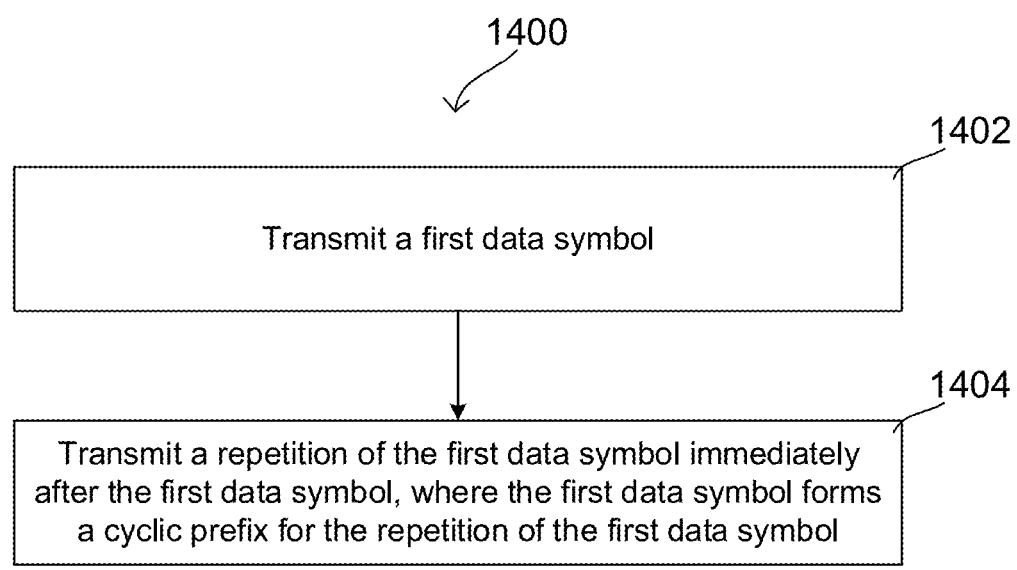

FIG. 14 shows exemplary method 1400 of wireless communication at a wireless device according to some aspects. As shown in FIG. 14, method 1400 includes transmitting a first data symbol (1402), and transmitting a repetition of the first data symbol immediately after the first data symbol (1404), where the first data symbol forms a cyclic prefix for the repetition of the first data symbol.

Figure 15:
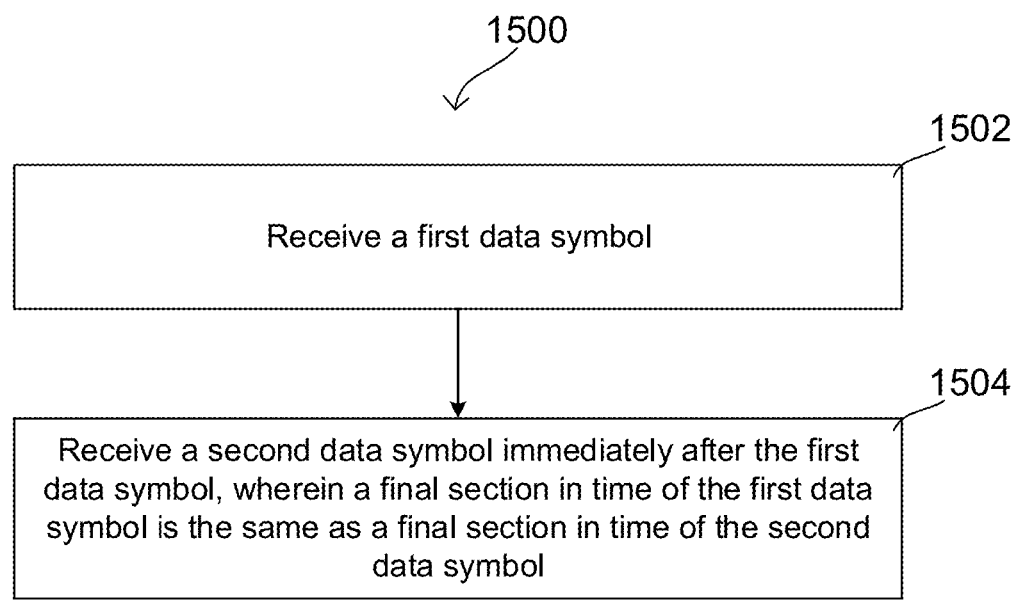

FIG. 15 shows exemplary method 1500 of wireless communication at a wireless device according to some aspects. As shown in FIG. 15, method 1500 includes receiving a first data symbol (1502), and receiving a second data symbol immediately after the first data symbol (1504), wherein a final section in time of the first data symbol forms a cyclic prefix for the second data symbol.

Figure 16:
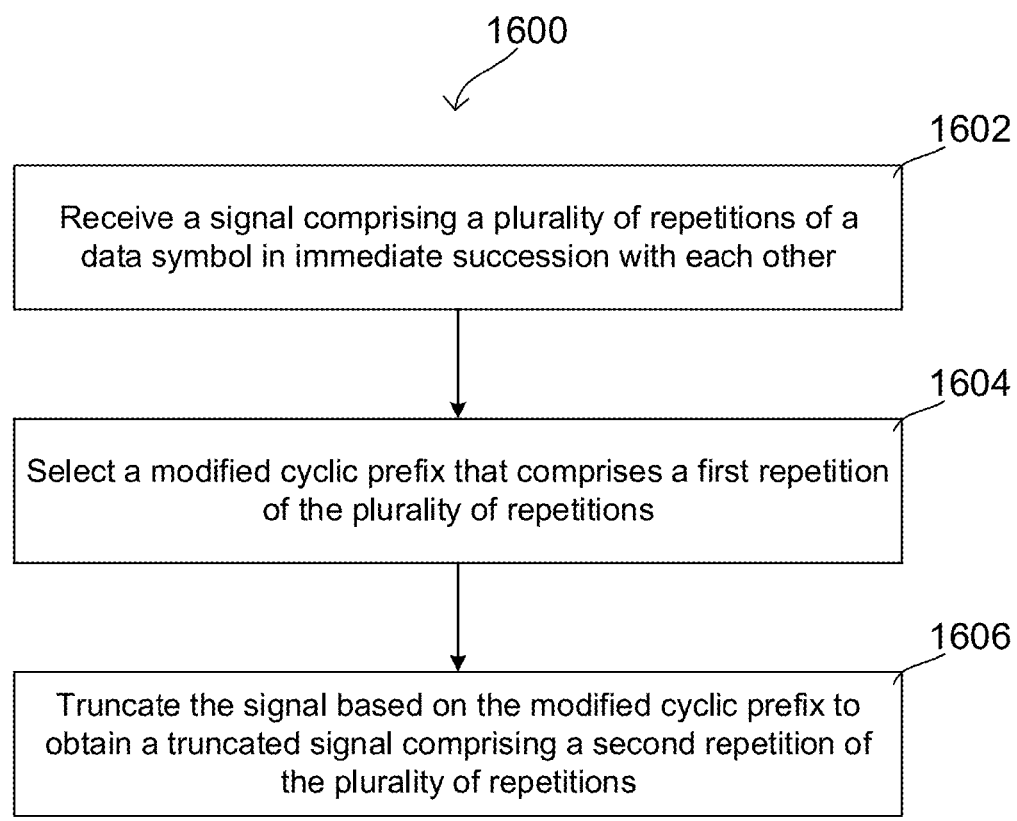

FIG. 16 shows exemplary method 1600 of wireless communication at a wireless device according to some aspects. As shown in FIG. 16, method 1600 includes receiving a signal including a plurality of repetitions of a data symbol in immediate succession with each other (1602), selecting a modified cyclic prefix that includes a first repetition of the plurality of repetitions (1604), and truncating the signal based on the modified cyclic prefix to obtain a truncated signal including a second repetition of the plurality of repetitions (1606).

Many wireless communication systems use frequency synchronization between transmitter and receiver to facilitate data communication. In cellular networks, a network access node may broadcast a synchronization signal to wireless devices in its coverage area. The wireless devices may then synchronize their own local frequency (based on the oscillation frequency of a local oscillator) with a reference frequency of this synchronization signal. For example, a wireless device may measure the synchronization signal and attempt to correct its local frequency to match the reference frequency of the synchronization signal. In some cases, the frequency measurements may have inherent measurement noise. The wireless device may therefore use an integrating control loop to correct its local frequency; in other words, the wireless device may measure a frequency error (between the reference frequency of the synchronization signal and its local frequency) and then correct the local frequency using part of the frequency error (e.g., a fraction of the frequency error). By using an integrating control loop, the wireless device may average out the measurement noise and improve the frequency synchronization accuracy.

D2D communication systems may use similar frequency synchronization concepts to keep wireless devices synchronized with each other. As described above for FIG. 3, some D2D networks may use a synchronization hierarchy, such as where some wireless devices act as synchronization masters for other wireless devices. These synchronization masters may broadcast synchronization signals (synchronized with their own local oscillators or with a satellite-based synchronization source) for other wireless devices to use for synchronization. One of these wireless devices may receive a synchronization signal from a synchronization master, measure a frequency error between its local frequency and a reference frequency of the synchronization signal, and correct its local frequency based on the frequency error. The wireless device may also apply an integrating control loop to perform the corrections, which can help to average out measurement noise.

While averaging out measurement noise can help with frequency synchronization accuracy, there may still be other factors that lead to frequency mismatch between wireless devices (in D2D as well as other radio networks). One of these factors is temperature-based frequency drift. The wireless devices may base their local frequency on a local oscillator, such as a free-running crystal oscillator. These local oscillators may be unstable, particularly in low-cost use cases, and may be susceptible to frequency drift caused by varying temperatures. In other words, temperature variations may affect the crystal, which may in turn alter the oscillation frequency and cause it to drift from its baseline oscillation frequency. This frequency drift may cause the local frequency to be inaccurate, and the wireless device may therefore not be fully synchronized with the reference device that broadcasts the synchronization signal. Some wireless devices may use oscillators that can compensate for temperature-based frequency drift. Alternatively, the wireless devices may apply temperature change-based frequency compensations, which use learned databases that detail the dependency between temperature and oscillator frequency. However, these configurations can be expensive and complex, and in many cases may not be able to fully correct for frequency drift.

Various aspects of this disclosure relate to a wireless device configured to correct its local frequency to compensate for temperature-based frequency drift. In some aspects, the wireless device may execute a control loop that corrects for both measurement noise and temperature-based frequency drift. For example, the control loop may evaluate the measured frequency offset between its local frequency and a reference frequency of the received synchronization signal and determine a correction (e.g., a frequency correction instruction) that, over time, averages out measurement noise and counters temperature-based frequency drift. In some aspects, the control loop may be tuned to deal with frequency ramps, which can occur during power-up, power-down, or other events that involve temperature swings that cause rapid fluctuations in frequency. As further described below, the control loop may be an integrating control loop that uses second-order low-pass behavior to determine the corrections.

Figure 17A:
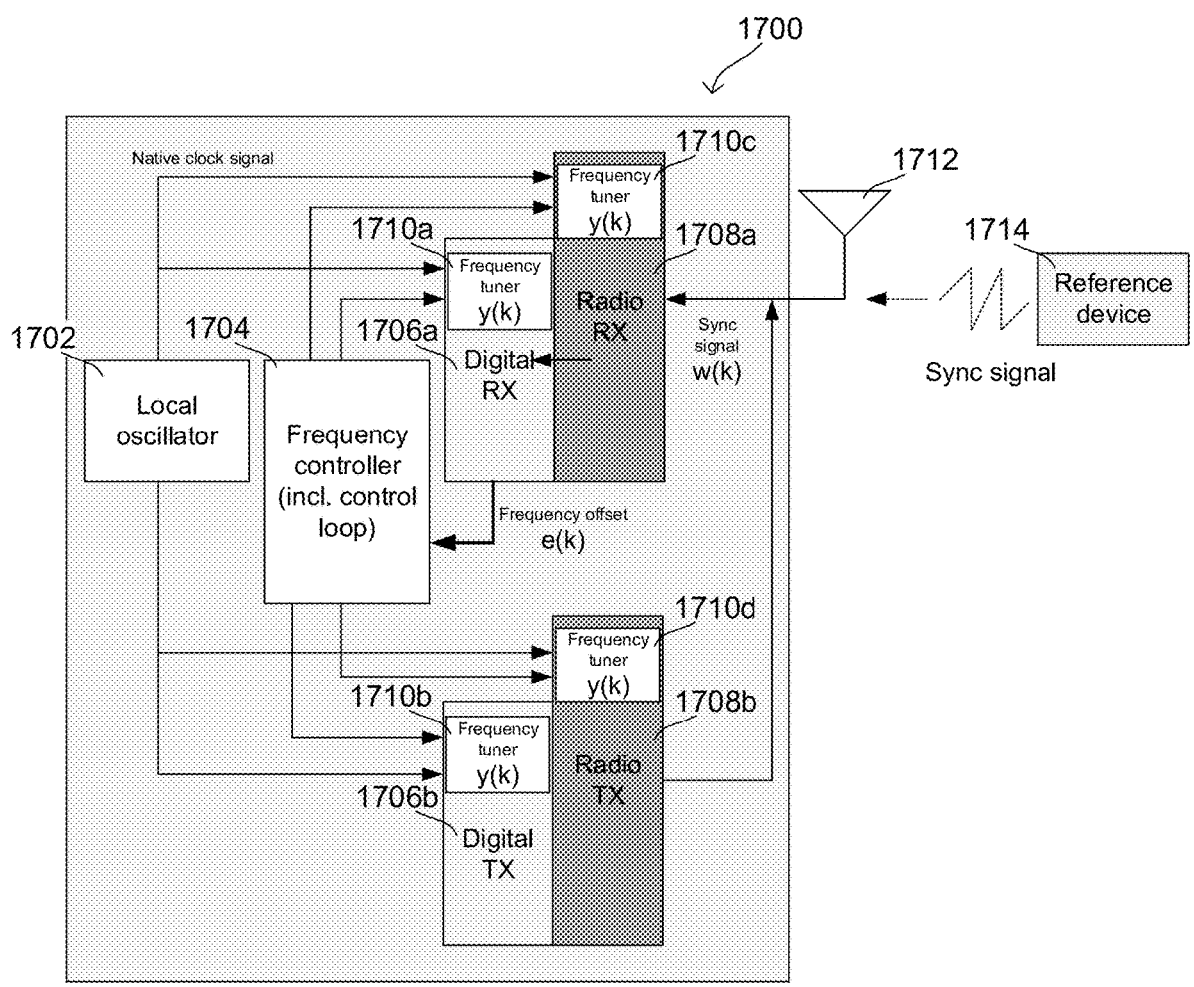
FIGS. 17A and 17B show exemplary internal configurations of a wireless device according to some aspects.

FIG. 17A shows an exemplary internal configuration of wireless device 1700 according to some aspects. Wireless device 1700 may include local oscillator 1702, frequency controller 1704, digital receiver 1706*a*, digital transmitter 1706*b*, radio receiver 1708*a*, radio transmitter 1708*b*, and antenna system 1712. This disclosure first provides a general introduction of these components, followed by a detailed procedural description in FIG. 18.

In some aspects, local oscillator 1702 may be a crystal oscillator. Wireless device 1700 may use local oscillator 1702 for timing, such as to support an internal device clock (e.g., a digital clock that uses local oscillator to keep time) and to generate frequency signals. Local oscillator 1702 may provide its native clock signal (an electrical signal having a frequency based on the resonance of the crystal oscillator; e.g., an oscillator stream) to digital receiver 1706*a*, digital transmitter 1706*b*, radio receiver 1708*a*, and radio transmitter 1708*b*.

Antenna system 1712 may include one or more antennas, and wireless device 1700 may transmit and receive wireless signals via antenna system 1712. Radio receiver 1708*a* and radio transmitter 1708*b* may be subcomponents of a radio transceiver of wireless device 1700 (e.g., a radio transceiver configured in the manner of radio transceiver 204 of wireless device 102 in FIG. 2). For example, radio receiver 1708*a* may be the radio frequency receive chain of the radio transceiver and radio transmitter 1708*b* may be the radio frequency transmit chain of the radio transceiver.

Digital receiver 1706*a* and digital transmitter 1706*b* may be baseband components of wireless device 1700. For example, digital receiver 1706*a* and digital transmitter 1706*b* may be subcomponents of a baseband modem of wireless device 1700 (e.g., configured in the manner of baseband modem 206 of terminal device 102 in FIG. 2). In one example, digital receiver 1706*a* may be the physical layer receive chain while digital transmitter 1706*b* may be the physical layer transmit chain. Digital receiver 1706*a* may include a demodulator, demapper (e.g., constellation demapper), de-interleaver, decoder, and/or descrambler. Digital receiver 1706*a* may receive wireless signals in the form of baseband samples via antenna system 1712 and radio receiver 1708*a*. Digital receiver 1706*a* may then sequentially process these baseband samples with the demodulator, demapper (e.g., constellation demapper), de-interleaver, decoder, and/or descrambler to produce a bitstream, which digital receiver 1706*a* may provide to a protocol processor of wireless deice 1700. Digital transmitter 1706*b* may include a scrambler, encoder, interleaver, mapper (e.g., constellation mapper), and/or a modulator, which may sequentially process a bitstream (e.g., provided by the protocol processor) to produce baseband samples (e.g., complex IQ symbols). Digital transmitter 1706*b* may then transmit these baseband samples as wireless signals via radio transmitter 1708*b* and antenna system 1712.

As shown in FIG. 17A, digital receiver 1706*a*, digital transmitter 1706*b*, radio receiver 1708*a*, and radio transmitter 1708*b* may respectively include frequency tuner 1710*a*, frequency tuner 1710*b*, frequency tuner 1710*c*, and frequency tuner 1710*d*. In some aspects, frequency tuners 1710*a*-1710*d* may be processors configured to execute their operations as described herein. Using frequency tuner 1710*a* as an example of this operation, frequency tuner 1710*a* may initially start with a local frequency (e.g., a corrected local frequency based on an earlier frequency correction instruction, or an initial local frequency). Frequency tuner 1710*a* may receive the native clock signal from local oscillator 1702 and may receive a frequency correction instruction from frequency controller 1704. Frequency tuner 1710*a* may then correct the local frequency based on the native clock signal and the frequency correction instruction. Frequency tuner 1710*a* may then provide this corrected local frequency to digital receiver 1706*a*, which may receive signals (via radio receiver 1710*c*) based on the corrected local frequency. The operation of frequency tuners 1710*a* is described below in further detail.

Frequency controller 1704 may be configured to determine the frequency correction instructions for frequency tuners 1710a-1710d. In some aspects, frequency controller 1704 may be a processor configured to execute instructions that define its operations as described herein. As further described below, frequency controller 1704 may execute a control loop that determines the frequency correction instructions. This control loop may compensate for measurement noise and temperature-based frequency drift.

FIG. 18 shows exemplary flow chart 1800 according to some aspects. Flow chart 1800 details operation of wireless device 1700 related to frequency synchronization. Wireless device 1700 may first receive a synchronization signal in stage 1802. For example, as shown in FIG. 17A wireless device 1700 may receive a synchronization signal from reference device 1714. In some aspects, wireless device 1700 may be configured to operate on a D2D network; wireless device 1700 may therefore be a terminal device (e.g., UE, MS, or other user-side terminal) and reference device 1714 may be another terminal device. In other aspects, wireless device 1700 may be configured to operate on a cellular or short-range network; wireless device 1700 may therefore be a terminal device and reference device 1714 may be a network access node. The frequency synchronization features described herein are therefore not limited to any particular type of network.

Reference device 1714 may broadcast a synchronization signal, such as by periodically broadcasting a synchronization signal (e.g., transmitting repetitions of a predefined synchronization signal according to a fixed broadcast period in a communication schedule). Reference device 1714 may locally generate this synchronization signal based on a reference frequency, which may be the internal frequency used by reference device 1714. Wireless device 1700 may then receive the synchronization signal in stage 1802. For example, digital receiver 1710a may receive the synchronization signal via antenna system 1712 and radio receiver 1708a. Digital receiver 1710a may then measure the frequency offset between the local frequency of wireless device 1700 and the reference frequency of the synchronization signal in stage 1804. For example, frequency tuner 1710a may be configured to supply digital receiver 1710a with a local frequency that is based on the native clock signal from local oscillator 1702. Digital receiver 1710a may thus compare this local frequency with the reference frequency of the synchronization signal to measure the frequency offset. In one example, digital receiver 1710a may generate a local reference signal based on the local frequency, where the local reference signal is a local copy of the synchronization signal. Digital receiver 1710a may then determine a cross-correlation between the local reference signal and the synchronization signal. Digital receiver 1710a may then calculate the phase rotation between the local reference signal and the synchronization signal, and may then estimate the frequency offset between the local frequency (used to generate the local reference signal) and the reference frequency (used by reference device 1714 to generate the synchronization signal) based on this phase rotation. As used herein, the term "local frequency" means the frequency used by baseband and RF components for reception, transmission, and other processing.

Digital receiver 1710a may then provide the frequency offset (a measured frequency offset) to frequency controller 1704. Frequency controller 1704 may then determine a frequency correction instruction in stage 1806. In some aspects, frequency controller 1704 may determine the frequency correction instruction with a control loop that compensates for measurement noise and temperature-based frequency drift. The frequency correction instruction may thus address measurement noise in digital receiver 1710a's measurement of the frequency offset, and may also address temperature-based frequency drift that impacts the native clock signal provided by local oscillator 1702. This control loop is described in detail below in FIGS. 19-22. These frequency correction instructions can also be considered frequency correction words.

After determining the frequency correction instruction, frequency controller 1704 may provide the frequency correction instruction to frequency tuners 1710a-1710d. In some aspects, frequency controller 1704 may provide the same frequency correction to frequency tuners 1710a-1710d. In other aspects, frequency controller 1704 may provide different frequency corrections to one or more of frequency tuners 1710a-1710d, such as where frequency controller 1704 provides a baseband correction instruction (in a specific format for baseband tuners) to frequency tuners 1710a and 1710b and an RF frequency correction (in a specific format for RF tuners) to frequency tuners 1710c and 1710d.

Frequency tuners 1710a-1710d may receive the native clock signal from local oscillator 1702 and may generate a local frequency for digital receiver 1706a, digital transmitter 1706b, radio receiver 1708a, and radio transmitter 1708b to use, respectively. Frequency tuners 1710a-1710d may then, in stage 1808, correct their local frequencies based on the frequency correction instruction. Frequency tuners 1710a-1710d may therefore obtain respective corrected local frequencies (e.g., corrected versions of the previous local frequencies).

Frequency tuners 1710a-1710d may then provide their respective corrected local frequencies to digital receiver 1706a, digital transmitter 1706b, radio receiver 1708a, and radio transmitter 1708b. Digital receiver 1706a, digital transmitter 1706b, radio receiver 1708a, and radio transmitter 1708b may then use these corrected local frequencies to transmit or receive signals as appropriate in stage 1810. For example, digital receiver 1706a may perform receive-direction physical layer processing using the corrected local frequency (from frequency tuner 1710a) to receive signals via radio transceiver 1708a. Radio receiver 1708a may perform receive-direction radio frequency processing using the corrected local frequency (from frequency tuner 1710c) to receive signals via antenna system 1712. Digital transmitter 1706b may perform transmit-direction physical layer processing using the corrected local frequency (from frequency tuner 1710b) to transmit signals via radio transceiver 1708b. Radio transmitter 1708b may perform transmit-direction radio processing using the corrected local frequency (from frequency tuner 1710d) to transmit signals via antenna system 1712. The corrected local frequencies can thus be considered locally tuned frequencies. In some aspects, frequency tuners 1710a and 1710b may provide local frequencies to digital receiver 1706a and digital transmitter 1706b that are baseband frequencies, which to digital receiver 1706a and digital transmitter 1706b may use for their baseband processing. Frequency tuners 1710c and 1710d may then provide local frequencies to radio receiver 1710c and radio transmitter 1710d that are radio frequencies, which radio receiver 1710c and radio transmitter 1710d may use for radio processing.

Figure 17B:
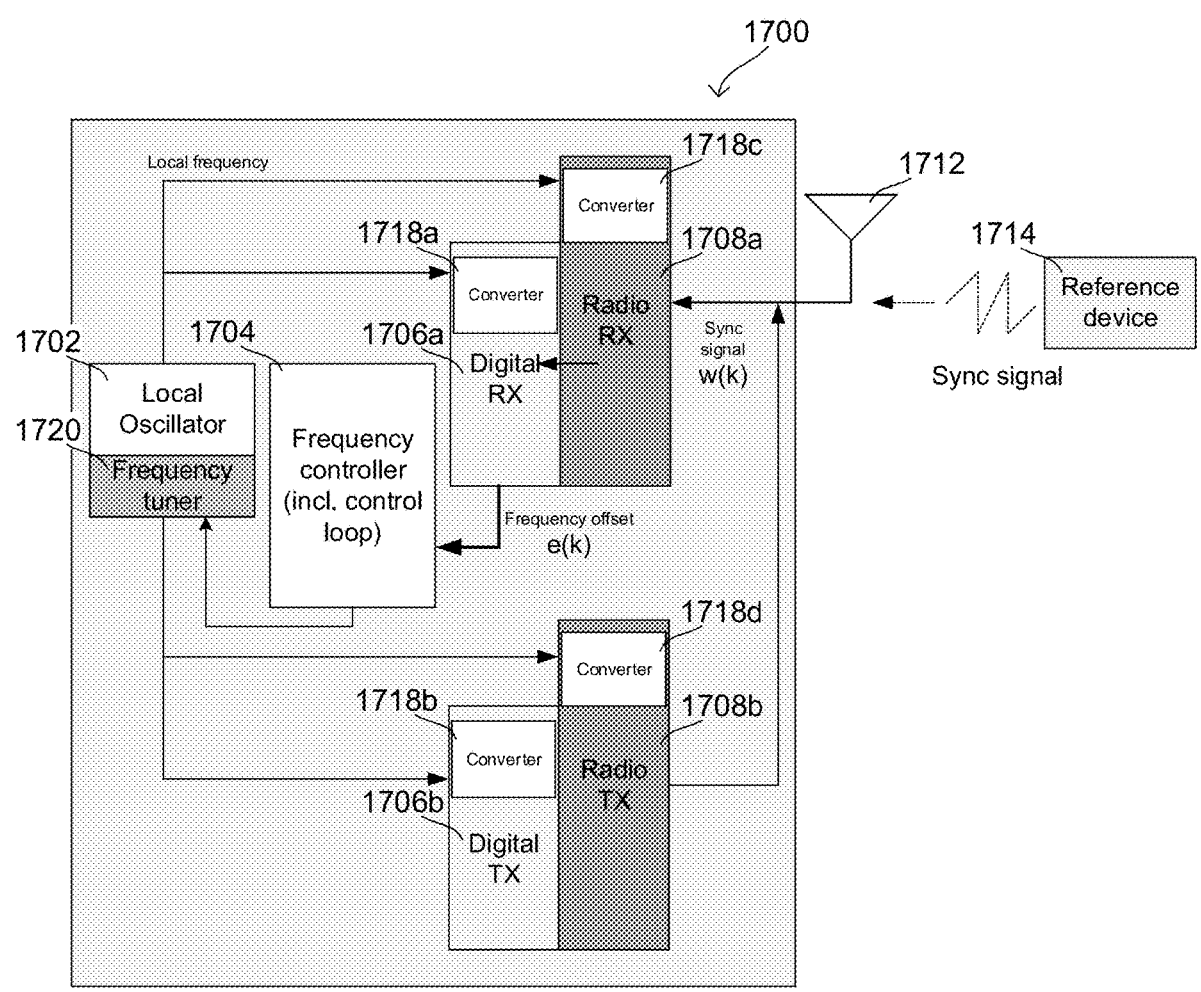

This example of FIG. 17A shows a configuration where wireless device 1700 includes frequency tuners that are positioned locally at the baseband and RF components, and where the frequency tuners receive the native clock signal and the frequency correction words and then produce the local frequencies. In some aspects, wireless device 1700 may include a frequency tuner that is integrated with local oscillator 1702. FIG. 17B shows an example of this where frequency tuner 1720 is located at local oscillator 1702, and receives frequency correction instructions from frequency controller 1704. Frequency tuner 1720 may generate the local frequency based on the native clock signal, and may provide the local frequency to converters 1718*a*-1718*d*. Frequency tuner 1720 may correct the local frequency based on the frequency correction instructions. Converters 1718*a*-1718*d* may then convert the local frequency (corrected for temperature-based frequency drift and measurement noise) to the proper baseband and RF frequencies for digital receiver 1706*a*, digital transmitter 1706*b*, radio receiver 1708*a*, and radio transmitter 1708*b* to use for baseband and radio processing. Accordingly, wireless devices of various aspects can include one or more frequency tuners that can be placed at different locations, where the frequency tuners receive the native clock signal and frequency correction instructions and correct the local frequency.

The operations of frequency controller 1704 to determine the frequency correction instructions will now be described in detail. As previously introduced, measurement noise and temperature-based frequency drift may lead to inaccuracies in the corrected local frequencies. Frequency controller 1704 may therefore determine the frequency correction instructions by executing a control loop that addresses measurement noise and temperature-based frequency drift.

Figure 19:
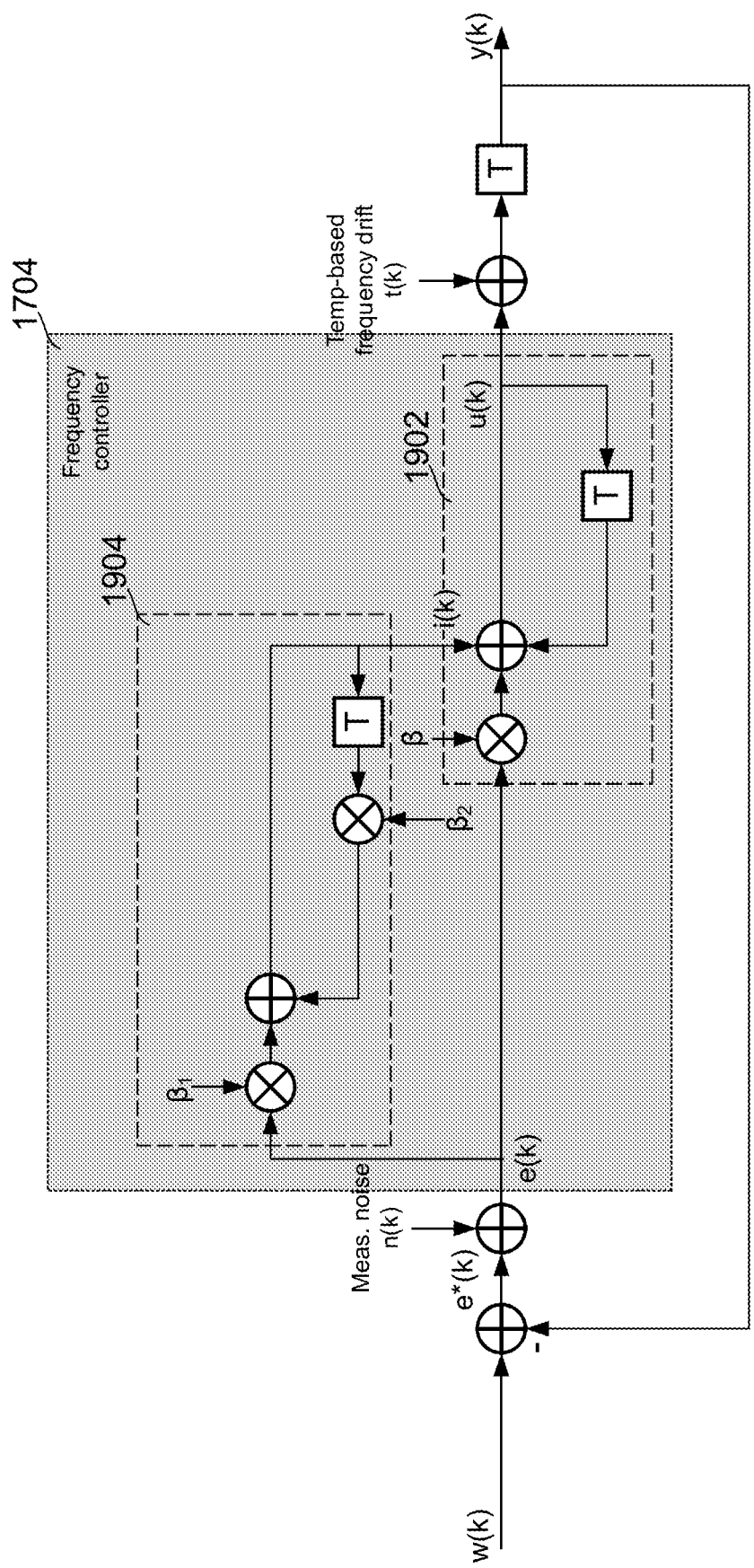
FIG. 19 shows an exemplary signal model of the inputs, outputs, and operations of a control loop for frequency synchronization according to some aspects.

FIG. 19 shows an exemplary signal model of the inputs, outputs, and operations of the control loop of frequency controller 1704. As shown in FIG. 19, reference frequency w(k) may be an external input to the system, namely where digital receiver 1706*a* receives a synchronization signal having reference frequency w(k) from reference device 1714. Digital receiver 1706*a* may then compare reference frequency w(k) to local frequency y(k) to obtain frequency offset e(k) (a measured frequency offset). In practical terms, there may be measurement noise n(k) included in frequency offset e(k); for example, SNR and other imperfections may cause the frequency offset e(k) to be different from the actual frequency offset e*(k). In other words, digital receiver 1706*a* may measure a frequency offset e(k) that has an error n(k) with respect to the actual frequency offset e*(k).

Digital receiver 1706*a* may provide frequency offset e(k) to frequency controller 1704. Frequency controller 1704 may then execute a control loop based on frequency offset e(k) to obtain corrected frequency local frequency u(k). This corrected local frequency u(k) may compensate for both measurement noise n(k) and temperature-based frequency drift t(k), where t(k) is shown as an additive drift to u(k) in FIG. 19. Frequency controller 1704 may base the frequency correction instruction (sent to frequency tuners 1710*a*-1710*d*) on corrected local frequency u(k). In some aspects, frequency controller 1704 may use corrected local frequency u(k) as the frequency correction instruction. In other aspects, frequency controller 1704 may derive the frequency correction instruction from u(k) using a mapping operation. For example, frequency controller 1704 may obtain u(k) in Hertz while frequency tuners 1710*a*-1710*d* perform correction in parts per billion (ppb). Frequency controller 1704 may therefore convert u(k) from Hertz to a frequency correction instruction in ppb according to this mapping operation. In some aspects, frequency controller 1704 may use u(k) as a frequency correction instruction (a tuning word) and may map u(k) to y(k) (a tuned frequency as a result of the tuning word); accordingly, there may be in practice an additional mapping that FIG. 19 does not explicitly show.

Frequency controller 1704 may determine the frequency correction instruction using two paths in the control loop. First path 1902 targets measurement noise while second path 1904 targets temperature-based frequency drift. Starting with first path 1902, first path 1902 may use an integrating operation to average out measurement noise n(k) (where "average out" means partially or fully eliminating a target component by averaging). For example, first path 1902 may weight the frequency offset e(k) with factor β (an averaging factor) and add this weighted frequency offset (βe(k)) to the corrected local frequency from the last sample u(k−T) (where T is the period of the control loop). This produces an averaging operation, where first path 1902 only uses a fraction (controlled by β) of the frequency offset e(k) to correct the local frequency (because u(k) is based on a weighted version of e(k) instead of the full version of e(k)). While FIG. 19 shows only one delay element T (e.g., only shows first path 1902 averaging over the immediately previous sample), in some aspects first path 1902 may, due to the recursive structure, perform the averaging of the weighted frequency offset over multiple past samples of u(k) to obtain the current sample of u(k). This integrating operation of first path 1902 may average out measurement noise n(k) over time, thus producing more accurate frequency correction instructions and improved synchronization.

As shown in FIG. 19, first path 1902 may also add the output of second path 1904, i(k), to βe(k) and u(k−T) to obtain u(k). Second path 1904 may calculate this output i(k) to correct temperature-based frequency drift t(k), such as to improve elimination of ramps in e(k) (e.g., ramps caused by temperature-based frequency drift t(k). Accordingly, instead of having a separate compensation outside the control loop (e.g., that uses a known dependency between temperature and oscillator frequency), the control loop executed by frequency controller 1704 may determine the frequency correction instructions to compensate for temperature-based frequency drift. This can reduce per-unit cost, and may completely avoid costly and time-consuming calibration procedures typical of oscillator compensators. Second path 1904 may have second-order, low pass behavior that can correct frequency ramps. As shown in FIG. 19, second path 1904 may apply weight $\beta_1$ to e(k), and add this weighted frequency offset to a weighted version of the output i(k) from the previous sample, $\beta_2$i(k−T), where weight $\beta_2$ is the weight applied by the feedback loop. $\beta_1$ controls the degree to which frequency ramps are compensated (e.g., how aggressive the compensation is) while $\beta_2$ is an averaging factor of the frequency ramp compensation. Second path 1904 may produce output i(k) (a drift correction term) from this sum, and may provide i(k) to first path 1902 for addition with βe(k) and u(k−T) to produce u(k).

Figure 20:
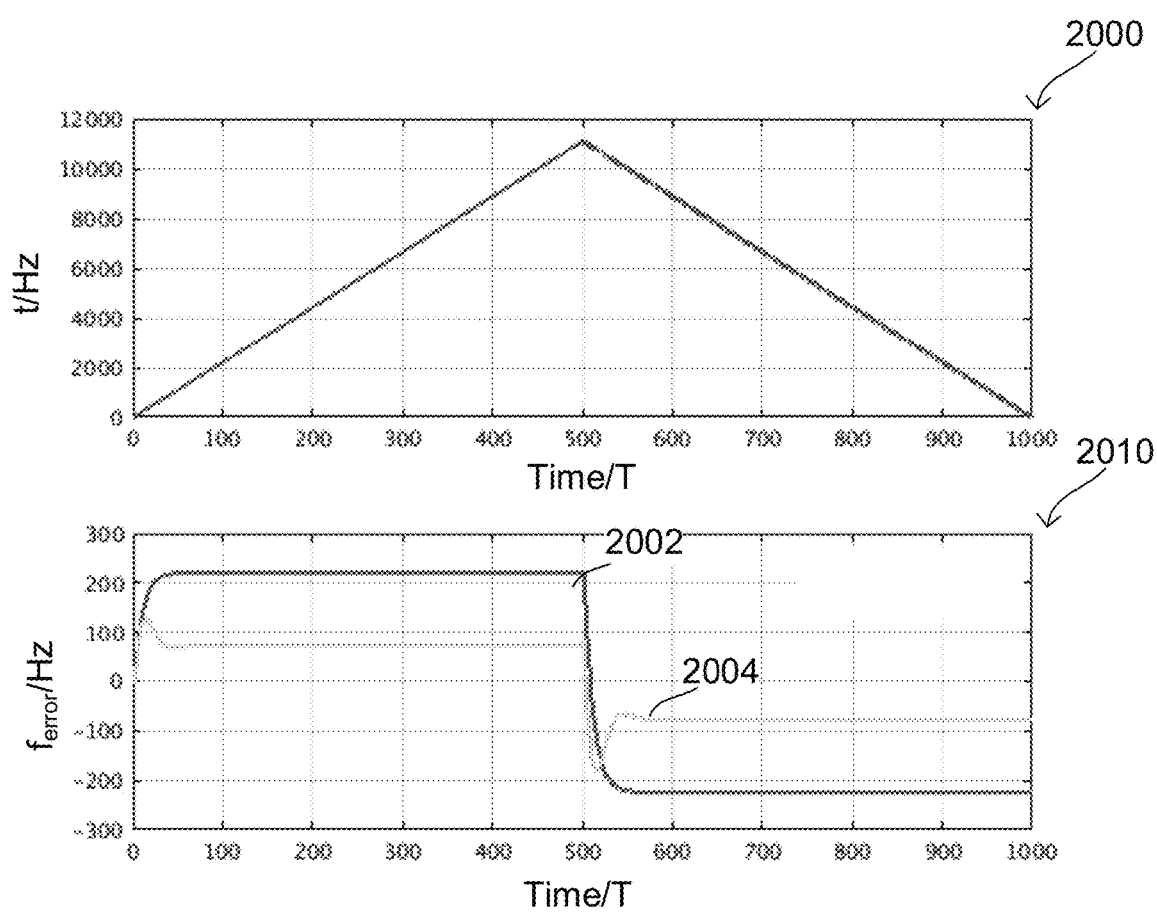
FIG. 20 shows exemplary charts of a frequency ramp and a frequency correction according to some aspects.

Frequency controller 1704 may compensate for temperature-based frequency ramps with the second-order operation of second path 1904. This can be an improvement over methods that pre-correct the local frequency outside the control loop by considering the measured (current) temperature and the learned dependency of the temperature vs the actual oscillator frequency. Learning the temperature behavior of the oscillator is a complex and time-consuming task, and the aspects of this disclosure can avoid such complexities while still maintaining accurate synchronization. These frequency ramps can be caused by switching power consumers on or off in the device, which can trigger temperature fluctuations that lead to frequency ramps in the local oscillator. FIG. 20 shows exemplary chart 2000 of a frequency ramp and exemplary chart 2010 of the frequency correction. As shown in chart 2000, there may be a constant increase in temperature around the local oscillator, followed by a constant decrease. If frequency controller 1704 determines the frequency correction instructions without using second path 1904, the local frequencies may have a large error shown by curve 2002. However, by using second path 1904 to compensate for temperature-based frequency drift, frequency controller 1704 may drastically reduce the error in curve 2004 and may keep the local frequencies close to the reference frequency of the synchronization signal.

Figure 21:
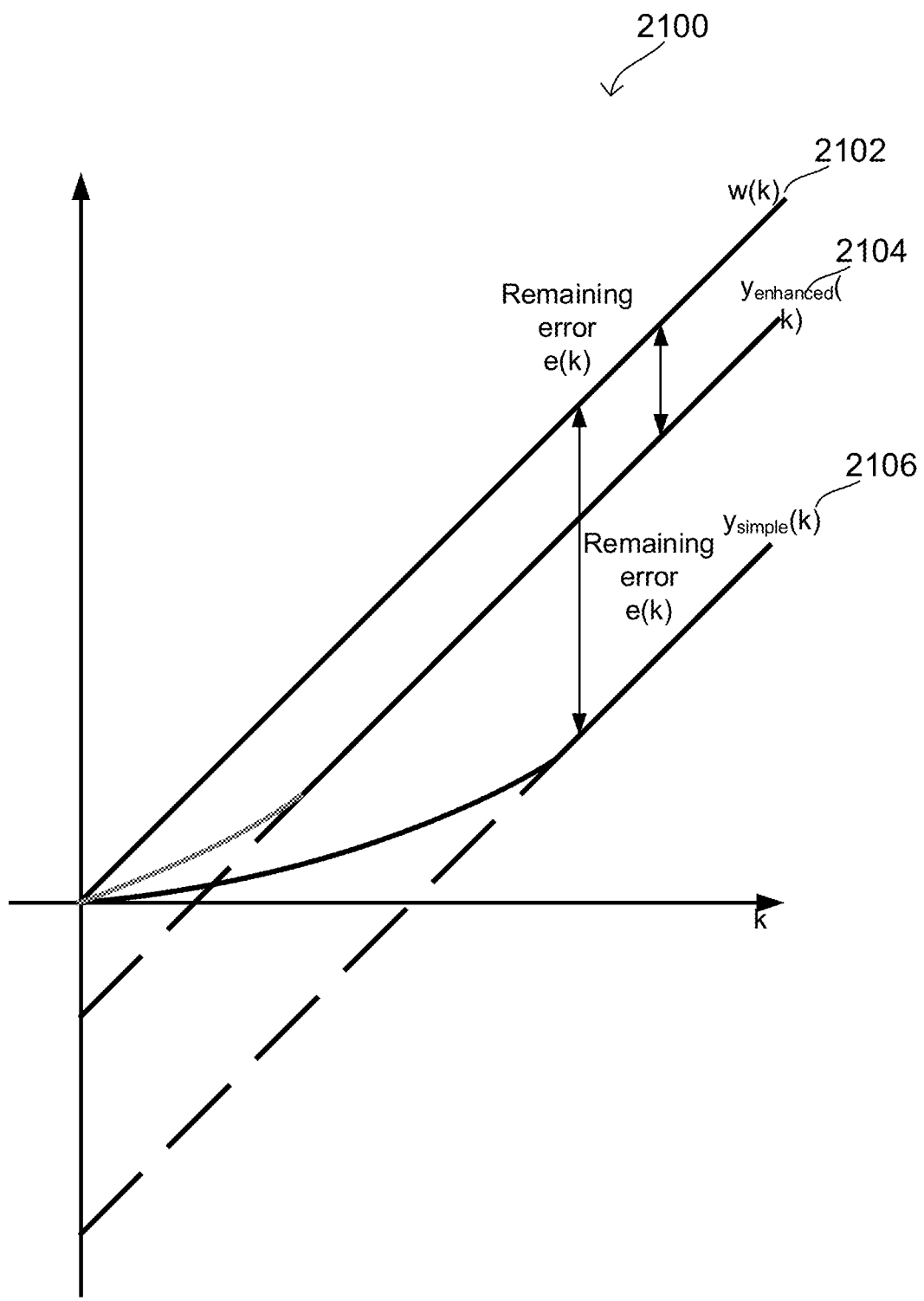
FIG. 21 shows an exemplary chart illustrating the operation of a control loop for frequency synchronization according to some aspects.

FIG. 21 shows exemplary chart 2100 further illustrating the effects of second path 1904. Curve 2102 shows reference frequency w(k). Curve 2104 shows $y_{enhanced}(k)$, the corrected local frequency (including delay T and temperature based frequency drift t(k)) with the full control loop of first path 1902 and second path 1904 (e.g., targeting measurement noise n(k) and temperature-based frequency drift t(k)). Curve 2106 shows $y_{simple}(k)$, the corrected local frequency with only a partial control loop of first path 1902 (e.g., targeting measurement noise n(k) but not temperature-based frequency drift t(k)). As shown in FIG. 21, the frequency offset e(k) between $y_{enhanced}(k)$ and w(k) may be considerably smaller than the frequency offset e(k) between $y_{simple}(k)$ and w(k). The second-order action of second path 1904 may thus be effective in correcting for temperature-based frequency drift compared to an alternate configuration that only uses first path 1902.

Second path 1904 may achieve this operation by estimating the error caused by frequency ramps and performing compensation (in the form of i(k)) without making assumptions about the frequency ramp itself. Frequency controller 1704 may therefore keep the frequency error lower under extreme frequency drift conditions (such as ramps) while avoiding significant impact on behavior in stable frequency conditions.

The parameters $\beta$, $\beta_1$, and $\beta_2$ may be set to compensate for measurement noise and temperature-based frequency drift. In particular, $\beta$ may be set as the weight for which to average samples of frequency offset e(k) in first path 1902. $\beta_1$ and $\beta_2$ may be set to achieve a second-order, low-pass filter to correct for temperature-based frequency drift, such as ramps. In one example, $\beta$ is approximately 0.1, $\beta_1$ is approximately 0.01 (e.g., 10 percent of $\beta$), and $\beta_2$ is approximately 0.95 (e.g., approximately 10×$\beta$ and 100×$\beta_1$). These values can be used, for example, when the period T of the control loop is approximately 40 milliseconds (e.g., 38 milliseconds).

Using the exemplary values of $\beta=0.1$, $\beta_1=0.01$, and $\beta_2=0.95$, the transfer function of the control loop of frequency controller 1704 is $$H(z) = \frac{Y(z)}{W(z)} = \frac{0.11 \cdot z - 0.095}{z^2 - 1.84 \cdot z + 0.855}$$

Figure 22:
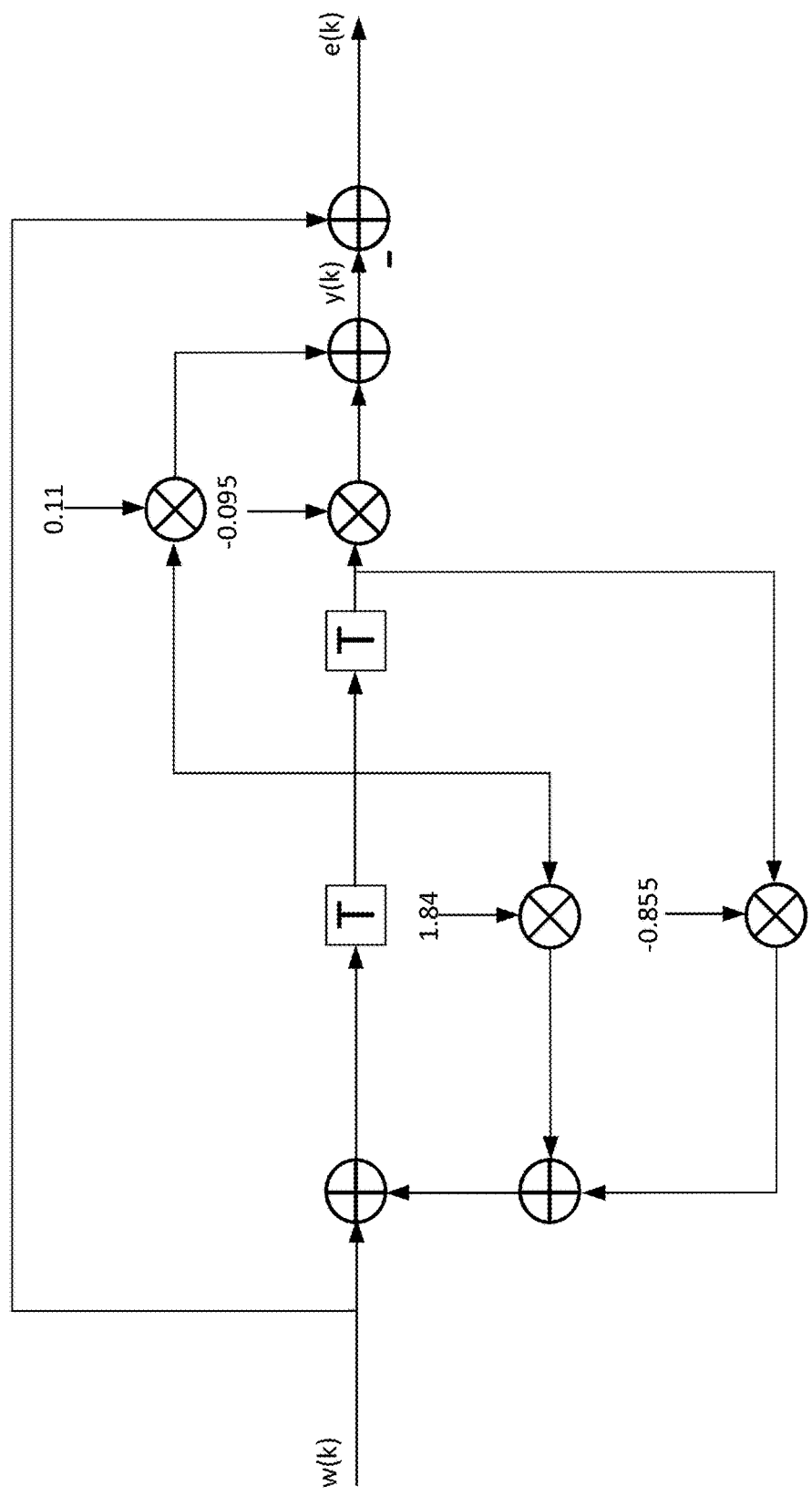
FIG. 22 shows a controllable canonical form of a control loop for frequency synchronization according to some aspects.

Continuing with this analysis, FIG. 22 shows the controllable canonical form of the control loop. This control loop provides a second-order low-pass behavior. Instead of a simple proportional factor that tunes the overall amplification to 1 (as would be seen when using first path 1902 but omitting second path 1904), the control loop provides two proportional factors: one proportional factor after the first delay element and another proportional factor after the second delay element. These two parts add to yield a combined factor that tunes the overall gain to 1 ((−1.84+0.855+0.11−0.095=1). By giving the proportional factors proper weights, the control loop gives differential behavior without destroying the general low pass behavior. In some aspects, the factors 0.11 and −0.095 may be suitable for address measurement noise and temperature-based frequency drift.

Frequency controller 1704 may therefore determine corrected local frequency u(k) by executing this control loop including first path 1902 and second path 1904. Frequency controller 1704 may then determine the frequency correction instruction based on u(k) and provide the frequency correction instruction to frequency tuners 1710a-1710d. Frequency tuners 1710a-1710d may then correct their respective local frequencies using the frequency correction instructions to obtain corrected local frequencies. In one example, frequency tuners 1710a-1710d may use the frequency correction instructions to control how often to sample the native clock signal provided by local oscillator 1702. For example, if frequency offset e(k) is positive (the synchronization signal has higher reference frequency than the local frequency), frequency tuners 1710a-1710d may sample the native clock signal (an oscillator stream) at a higher rate. Frequency tuners 1710a-1710d may therefore obtain corrected local frequencies that are higher than the pre-correction local frequencies. Conversely, if frequency offset e(k) is negative, frequency tuners 1710a-1710d may sample the native clock signal (an oscillator stream) at a lower rate. Frequency tuners 1710a-1710d may therefore obtain corrected local frequencies that are lower than the pre-correction local frequencies. The frequency correction words may specify these sampling changes to facilitate the appropriate corrections to the local frequencies.

With the frequency synchronization provided by frequency controller 1704, wireless device 1700 may maintain synchronization with reference device 1712 without using a separate temperature compensation mechanism outside the control loop. Wireless device 1700 may instead use the control loop of frequency controller 1704 to correct measurement noise and temperature-based frequency drift. This avoids the need for temperature and frequency drift calibration, which many wireless devices use to operate effectively. Wireless device 1700 may have faster manufacture times and lower per unit cost and may still be capable of coping with measurement noise and temperature-based frequency drift. Furthermore, whereas some oscillator compensators may handle strong frequency ramps poorly, the control loop of frequency controller 1704 may still have high output frequency accuracy even when strong frequency ramps occur.

Figure 23:
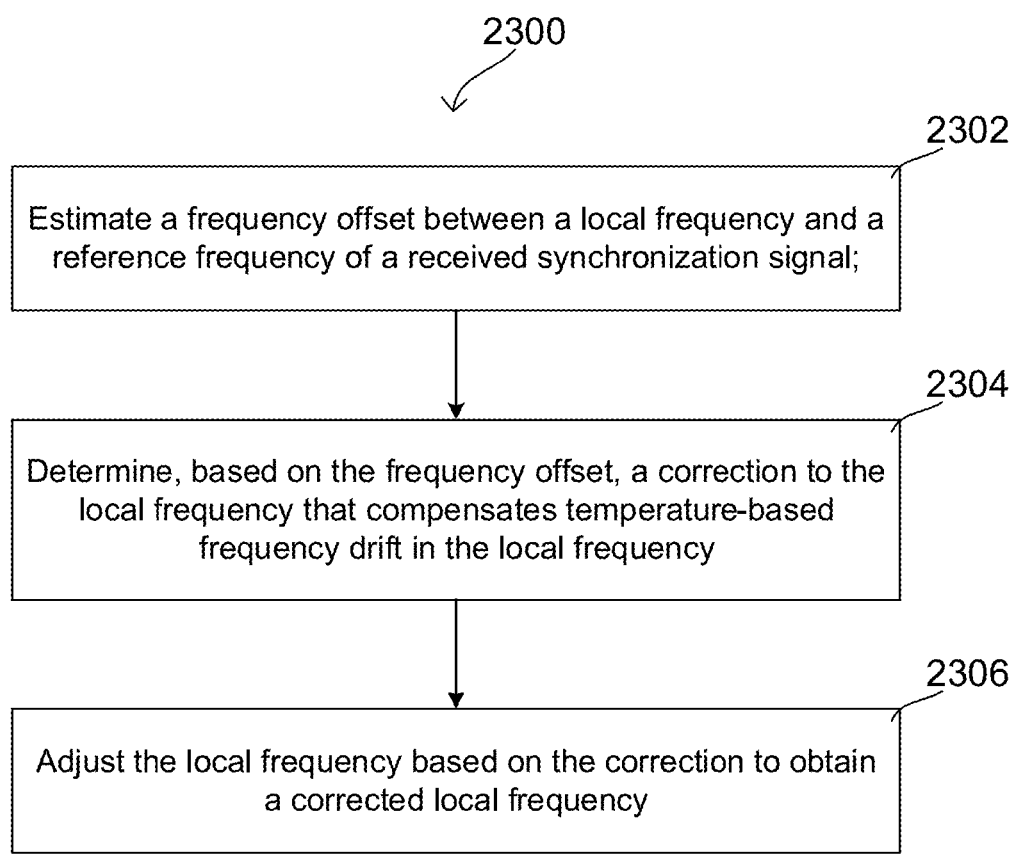
FIG. 23 shows an exemplary method of wireless communication at a wireless device according to some aspects.

FIG. 23 shows exemplary method 2300 of wireless communication at a wireless device according to some aspects. As shown in FIG. 23, method 2300 includes estimating a frequency offset between a local frequency and a reference frequency of a received synchronization signal (2302), determining, based on the frequency offset, a correction to the local frequency that compensates temperature-based frequency drift in the local frequency reference signal (2304), and adjusting the local frequency based on the correction to obtain a corrected local frequency (2306).

As previously indicated, wireless devices establish time and frequency synchronization by detecting synchronization signals that are transmitted by a reference device. In cellular networks like LTE, the reference device can be a network access node that periodically transmits synchronization signals. Wireless devices search for these synchronization signals and establish time and frequency synchronization with the network access node by detecting and processing the synchronization signals. For example, a wireless device can use the timing of a detected synchronization signal to determine frame timing and can process a detected synchronization signal to estimate a carrier frequency offset. Wireless devices may perform this synchronization in varying conditions, including in extreme scenarios when SNR is low.

In D2D use cases, the reference devices may be terminal devices that generate and transmit the synchronization signals. Because the synchronization signals are generated by terminal devices, D2D synchronization may have additional complications. Many terminal devices generate their synchronization signals with low-cost crystal oscillators, which can have inaccuracies of up to ~12.5 parts per million (ppm). This oscillator inaccuracy can lead to high frequency and timing drift, which may increase the amount of time that terminal devices spend searching for synchronization signals. In some cases, terminal devices may spend exceedingly long periods of time searching for synchronization signals. This can lead to high battery power consumption.

Various aspects of this disclosure provide wireless devices that accumulate synchronization signal detection results over time while monitoring the accumulated detection results for certain termination conditions. Once a wireless device determines that the detection results meet a termination condition, the wireless device may terminate synchronization signal detection and may use the detection results to estimate the time and frequency offsets. In some aspects, the wireless device may use accumulated cross-correlation values, SNR, time and/or frequency offset variance, or signal power as the termination condition. In some aspects, the wireless device may determine and accumulate the detection results in subsections (e.g., processing blocks) and may check for termination conditions between the processing of each subsection. In various aspects, the synchronization techniques of this disclosure may reduce the search time (thus conserving battery power) while still yielding accurate synchronization results.

Figure 24:
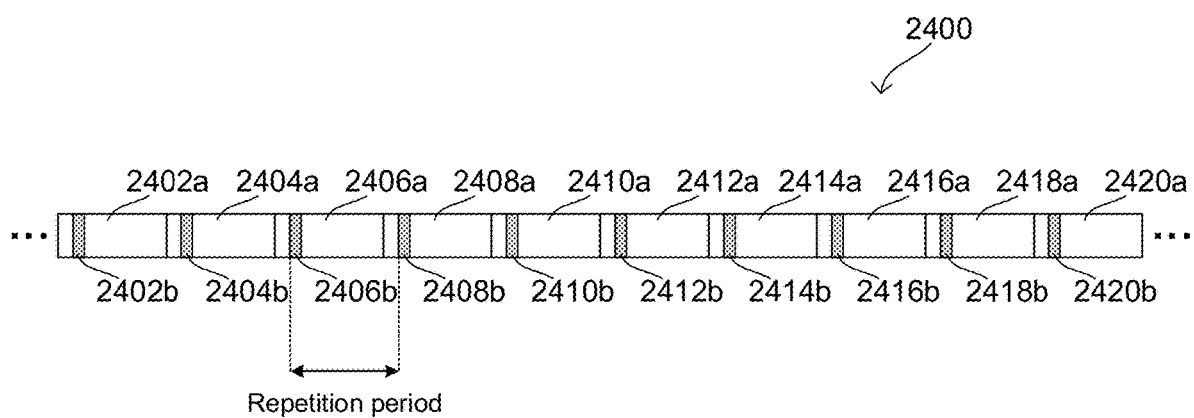
FIG. 24 shows an exemplary received signal including a periodic synchronization signal pattern according to some aspects.

In various use cases, a reference device may broadcast synchronization signals according to a periodic schedule. FIG. 24 shows exemplary received signal 2400, which depicts an exemplary periodic synchronization signal broadcast according to some aspects. A wireless device may receive received signal 2400 during synchronization signal detection and may search for synchronization signals in received signal 2400. Received signal 2400 may be divided into a plurality of slots 2402a-2420a, which respectively include synchronization signals 2402b-2420b. In some aspects, slots 2402a-2420a may be allocated into frames of a communication schedule, such as where each frame includes a predefined number of sequential slots. The slot length, frame length, and positioning of synchronization signals inside each slot can be scaled to any respective values; accordingly, the aspects described herein are applicable to any numerology. One example may use a communication schedule allocated into frames of nine slots each, where each slot is 38 ms long and includes a 1 ms synchronization signal (e.g., a synchronization signal burst).

As indicated in FIG. 24, the reference device may periodically broadcast synchronization signals 2402b-2420b with a fixed repetition period. This repetition period is referred to herein as a synchronization signal repetition period. A wireless device may therefore search through received signal 2400 for synchronization signals 2402b-2420b. Because the positioning of synchronization signals 2402b-2420b from one reference device is fixed within each respective subframe, the wireless device may establish time synchronization with the reference device by detecting the timing of synchronization signals 2402b-2420b in received signal 2400. For example, the wireless device may identify the starting sample of synchronization signals 2402b-2420b within their respective slots and use this starting sample to determine the slot boundaries. The wireless device may then establish frequency synchronization with the reference device by estimating the carrier frequency offset from the detected synchronization signals in received signal 2400. In some scenarios, there may be multiple reference devices that transmit synchronization signals which are detectable in received signal 2400. The multiple synchronization signals can occur at various different times within received signal 2400, where the synchronization signal pattern from each reference device will include a sequence of periodically-spaced synchronization signals. The wireless device may be able to select one of these detectable synchronization signals and use the selected synchronization signal to establish synchronization with the corresponding reference device.

Figure 25:
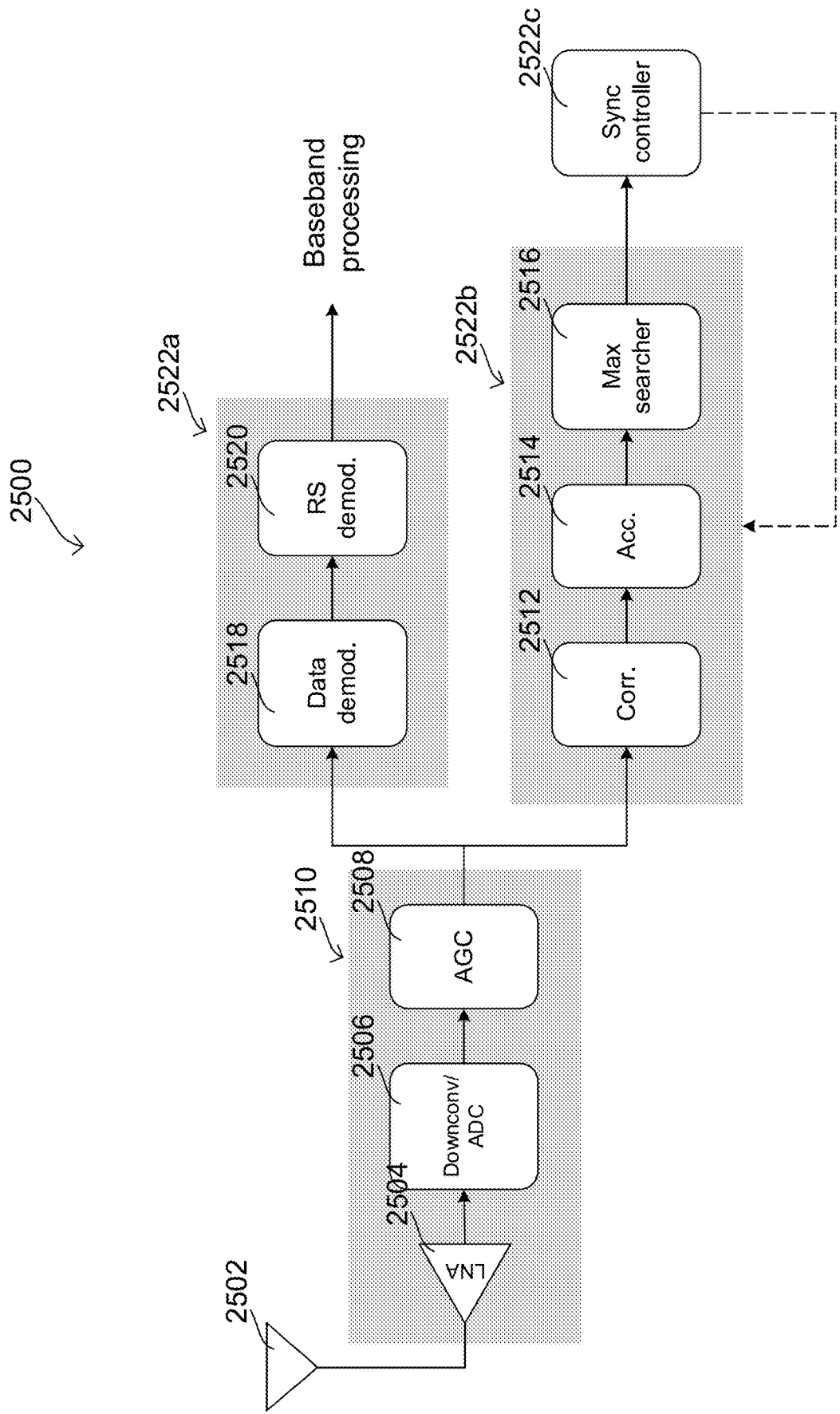
FIG. 25 shows an exemplary internal configuration of a wireless device according to some aspects.

FIG. 25 shows an exemplary internal configuration of wireless device 2500 according to some aspects. Wireless device 2500 may be configured to perform time and frequency synchronization according to various aspects of this disclosure, including determining and accumulating detection results until a termination condition is reached. In some aspects, wireless device 2500 may be a terminal device.

FIG. 25 shows various subcomponents of wireless device 2500. The operation of these subcomponents will now be described with FIG. 26, which shows exemplary flow chart 2600 according to some aspects. Wireless device 2500 may execute flow chart 2600 to perform the time and frequency synchronization techniques of this disclosure. Wireless device 2500 may first receive a wireless signal and perform radio processing on the wireless signal to obtain a received signal in stage 2602. For example, wireless device 2500 may receive the wireless signal via antenna system 2502, which may be one or more antennas configured to receive wireless signals and transduce them into analog electrical signals. Antenna system 2502 may provide these analog electrical signals to RF transceiver 2510, which may include low noise amplifier (LNA) 2504, downconverter and analog-to-digital converter (ADC) 2506 and automatic gain control (AGC) 2508. LNA 2504 may amplify the analog electrical signal and provide the amplified electrical signal to downconverter and ADC 2506. Downconverter and ADC 2506 may downconvert the amplified electrical signal from radio frequencies to baseband and perform digital conversion. This produces baseband samples (a sample stream, e.g., of IQ samples) that represents the wireless signal. AGC 2508 may then perform automatic gain control on the sample stream and provide the sample stream to baseband modem 2522 of wireless device 2500. In some aspects, AGC 2508 may be configured to adapt the gain factor according to a fixed period, such as where AGC 2508 can apply a different gain factor every X milliseconds. In one example where a slot is 1 millisecond, AGC 2508 may apply a different gain factor every ⅓ or ¼ milliseconds. In other words, AGC 2508 may change the gain factor either three or four times per slot.

Baseband modem 2522 may include receive link path 2522a, receive sync path 2522b, and sync controller 2522c. Receive link path 2522a, receive sync path 2522b, and sync controller 2522c may form part of a digital receiver (a physical layer receive chain) of baseband modem 2522. Although not shown in the synchronization-focused depiction of FIG. 22, baseband modem 2522 may include other components for baseband processing, such as other digital receiver components, a digital transmitter, and a protocol processor.

Receive link path 2522a may perform data demodulation and reference signal demodulation on the received signal (composed of a sample stream) provided by RF transceiver 2510. Specifically, data demodulator 2518 may perform data demodulation, such as by performing symbol demapping to convert the sample stream into a bitstream. Data demodulator 2518 may also perform a specific type of demodulation, such as OFDM demodulation or SC-FDMA demodulation, in addition to the symbol demapping (e.g., including serial-to-parallel conversion, an FFT and/or IFFT, and parallel-to-serial conversion). Reference signal demodulator 2520 may perform reference signal demodulation, such as by processing the received signal to identify and evaluate reference signals (e.g., any type of reference signal used for channel estimation, link adaptation, demodulation, or the like). Receive link path 2522a may provide the outputs (e.g., a bitstream and/or demodulated reference signals) to other subcomponents (e.g., a digital receiver and/or protocol processor) of baseband modem 2522, which may perform further baseband processing on the outputs.

Receive sync path 2522b may also receive the sample stream from RF transceiver 2510. Receive sync path 2522b may then process the received signal (sample stream) to obtain a time offset estimate and a frequency offset estimate for a reference device (e.g., that transmitted a synchronization signal in the received signal). Receive sync path 2522b may include correlator 2512, accumulator 2514, and max searcher 2516. With continued reference to flow chart 2600 in FIG. 26, correlator 2512 may determine a first cross-correlation between a synchronization signal replica and a first synchronization signal repetition period of the received signal in stage 2604. Correlator 2512 be a hardware circuit configured with logic to perform a cross-correlation or may be a processor configured to execute code to perform a cross-correlation. As described in FIG. 24, the reference device may periodically transmit synchronization signals 2402b-2420b with a synchronization signal repetition period. Correlator 2512 may therefore select a first synchronization signal repetition period of the received signal (a window of the sample stream equal in duration to the synchronization signal repetition period) and determine the cross-correlation between this first synchronization signal repetition period and a synchronization signal replica. As the synchronization signal is predefined (e.g., a predefined set of symbols allocated across time and/or frequency), correlator 2512 may locally store a replica of the synchronization signal or may locally generate a replica of the synchronization signal. The synchronization signal may be any type of synchronization signal; in some aspects, the synchronization signal may be a Zadoff-Chu sequence with a certain root that is distributed across multiple symbols periods and/or subcarriers. Correlator 2512 may then calculate the cross-correlation between this synchronization signal replica and the first synchronization signal repetition period, thus obtaining the first cross-correlation in stage 2604. In some aspects, correlator 2512 may calculate the first cross-correlation in the time-domain (e.g., the cross-correlation between two time-domain signals); in other aspects, correlator 2512 may calculate the first cross-correlation in the frequency-domain (e.g., converting two time-domain signals into the frequency domain with an FFT, determining the element-by-element product of the resulting frequency-domain signals, and converting the element-by-element product back to the time-domain to obtain the cross-correlation).

In some aspects, receive sync path 2522b may also include a cover code detector between correlator 2512 and accumulator 2514. This cover code detector may process the cross-correlations (from correlator 2512) based on cover codes that modify the synchronization signal and produce different cross-correlations for each cover code. This is described in detail below for FIG. 28. In some aspects, correlator 2512 may normalize the gain of first synchronization signal repetition period. For example, AGC 2508 may vary the gain factor applied to different parts of the received signal. Correlator 2512 may normalize the first synchronization signal repetition period based on these gain factors (e.g., so that parts of the first synchronization signal repetition with different gain factors are normalized to a common gain factor).

The first cross-correlation may be a vector of values, where each value corresponds to a sample of the first synchronization signal repetition period. Each value may be a cross-correlation metric indicating whether the synchronization signal is present at the respective sample of the received signal. Higher values thus indicate a higher likelihood that the corresponding sample is the starting point of the synchronization signal while lower values indicate less likelihood that the corresponding sample is the starting point of the synchronization signal. However, as there is noise and channel effects in the received signal, a cross-correlation based on a single synchronization signal repetition period may be susceptible to detection errors; for example, the maximum value of the first cross-correlation may not be the starting point of the synchronization signal in the received signal. Correlator 2512 may therefore provide the first cross-correlation to accumulator 2514, and may then determine an additional cross-correlation between the synchronization signal replica and an additional synchronization signal repetition period of the received signal in stage 2606. For example, radio transceiver 2510 may continue to receive wireless signals and continue to provide the received signal (sample stream) to receive sync path 2522b. Correlator 2512 may then select an additional synchronization signal repetition period in the received signal (e.g., the synchronization signal repetition period immediately following the first synchronization signal repetition period), and then cross-correlate the synchronization signal replica with this additional synchronization signal repetition period to obtain the additional cross-correlation.

Correlator 2512 may then provide this additional cross-correlation to accumulator 2514. Accumulator 2514 may be a hardware circuit configured with logic to accumulate sample streams or may be a processor configured to execute code to accumulate sample streams. Accumulator 2514 may then accumulate (e.g., add) the first cross-correlation with the additional cross-correlation to obtain an accumulated cross-correlation in stage 2608. Because the first cross-correlation and the additional cross-correlation were aligned in time (e.g., the first synchronization signal repetition period and the additional synchronization signal repetition period are separated by an integer number of synchronization signal repetition periods), the values for each sample in the cross-correlations will accumulate on top of each other in the accumulated cross-correlation. As the values are accumulated over multiple synchronization signal repetition periods, higher values may have a higher likelihood of giving the starting point of the synchronization signal in the synchronization signal repetition period compared to the non-accumulated cross-correlations. In some aspects, accumulator 2514 may normalize the accumulated cross-correlation based on the number of accumulations, such as by averaging the values in the accumulated cross-correlation over the number of accumulations (e.g., the number of synchronization signal repetition periods that contribute to the accumulated cross-correlation).

In some aspects, correlator 2512 may perform the cross-correlation operations described above for each of a plurality of antennas in antenna system 2502. This produces a separate cross-correlation per antenna. Accumulator 2514 may then accumulate the cross-correlations over each antenna and over multiple synchronization repetition periods to obtain the accumulated cross-correlation. This is described in further detail for FIG. 28.

Accumulator 2514 may provide the accumulated cross-correlation to max searcher 2516. Max searcher 2516 may be a hardware circuit configured with logic to identify a maxima value in a sample stream or may be a processor configured to execute code to identify a maxima value in a sample stream. After receiving the accumulated cross-correlation, max searcher 2516 may identify a maxima value in the accumulated cross-correlation in stage 2610. For example, max searcher 2516 may perform a maxima search on the accumulated cross-correlation to identify the cross-correlation metric with the highest value (a maxima value of the accumulated cross-correlation).

Max searcher 2516 may then compare this maxima value to a predefined threshold in stage 2612. This predefined threshold may be a predefined threshold that represents a termination condition; when the maxima value of the accumulated cross-correlation is above the predefined threshold, max searcher 2516 may set a termination flag that indicates to sync controller 2522c that the synchronization signal detection can be terminated. For example, max searcher 2516 may determine whether the energy content of the maxima value in the accumulated cross-correlation (which may be normalized over the number of accumulations) is above a given threshold and, if yes, set the termination flag to 1. This can be expressed as $$\text{termination flag} = \begin{cases} 1, & \text{abs}(\text{max})^2 < \text{threshold} \\ 0, & \text{otherwise} \end{cases}$$

where $\text{abs}(\text{max})^2$ is the absolute value squared of the maxima value and threshold is the predefined threshold.

If sync controller 2522c terminates the cross-correlation and accumulation in stage 2612, sync controller 2522c may estimate the time offset and the frequency offset based on the accumulated cross-correlation in stage 2614. For example, sync controller 2522c may perform peak detection on the accumulated cross-correlation, and may identify the sample in the accumulated cross-correlation that maps to a peak value. In aspects where receive sync path 2522b operates on cross-correlations over an entire synchronization signal repetition period, the peak value may be the same as the maxima value. In aspects where receive sync path 2522b operates on cross-correlations over subsections of synchronization signal repetition periods, normalization may cause the peak value to be different from the maxima value. This is discussed further regarding FIG. 28. In either case, sync controller 2522c may identify the peak value of the accumulated cross-correlation after max searcher 2516 sets the termination flag based on the maxima value in the accumulated cross-correlation.

After identifying the peak value and the position of its sample in the accumulated cross-correlation, sync controller 2522c may determine that the received signal includes a synchronization signal starting at this sample (where the sample points to a timing location in each synchronization signal repetition period). In one example, the accumulated cross-correlation may be vector $C(\tau)$. Sync controller 2522c may then perform a peak search to identify the time offset $\hat{\tau}$ as $$\hat{\tau} = \underset{\tau}{\arg\max}\{|C(\tau)|\},$$

e.g., the sample in $C(\tau)$ that has the highest absolute value. Sync controller 2522c may then align the communication schedule of wireless device 2500 with this time offset (e.g., using the sample as a time reference). This can include determining a slot boundary, frame boundary, FFT window placement, and so forth using the time offset. Sync controller 2522c may also estimate the frequency offset (e.g., the carrier frequency offset between wireless device 2500 and the reference device) based on the time offset, such as by performing an arctan operation based on the time offset. In one example, sync controller 2522 may estimate frequency offset $\hat{f}$ as $$\hat{f} = \frac{f_s}{PCL \cdot 2\pi} \arg\{C(\hat{\tau})\},$$

where $f_s$ is me sampling frequency, PCL is the size of a correlation vector used to determine cross-correlation vector $C(\tau)$ (e.g., a partial correlation vector discussed later), and $\arg\{\cdot\}$ is an operator that provides the phase of the input. Sync controller 2522c may provide the time offset and the frequency offset to receive link path 2522a, where data demodulator 2518 and reference signal demodulator 2520 may receive signals using the time offset and the frequency offset. For example, data demodulator 2518 and reference signal demodulator 2520 may use the time offset to place an FFT window and to align other receive processing in time with the timing boundaries of the received signal (e.g., symbol boundary, slot boundary, frame boundary, and the like). Sync controller 2522c may also provide the frequency offset to radio transceiver 2510, which may perform carrier frequency offset compensation based on the frequency offset (e.g., at downconverter/AGC 2506).

Figure 26:
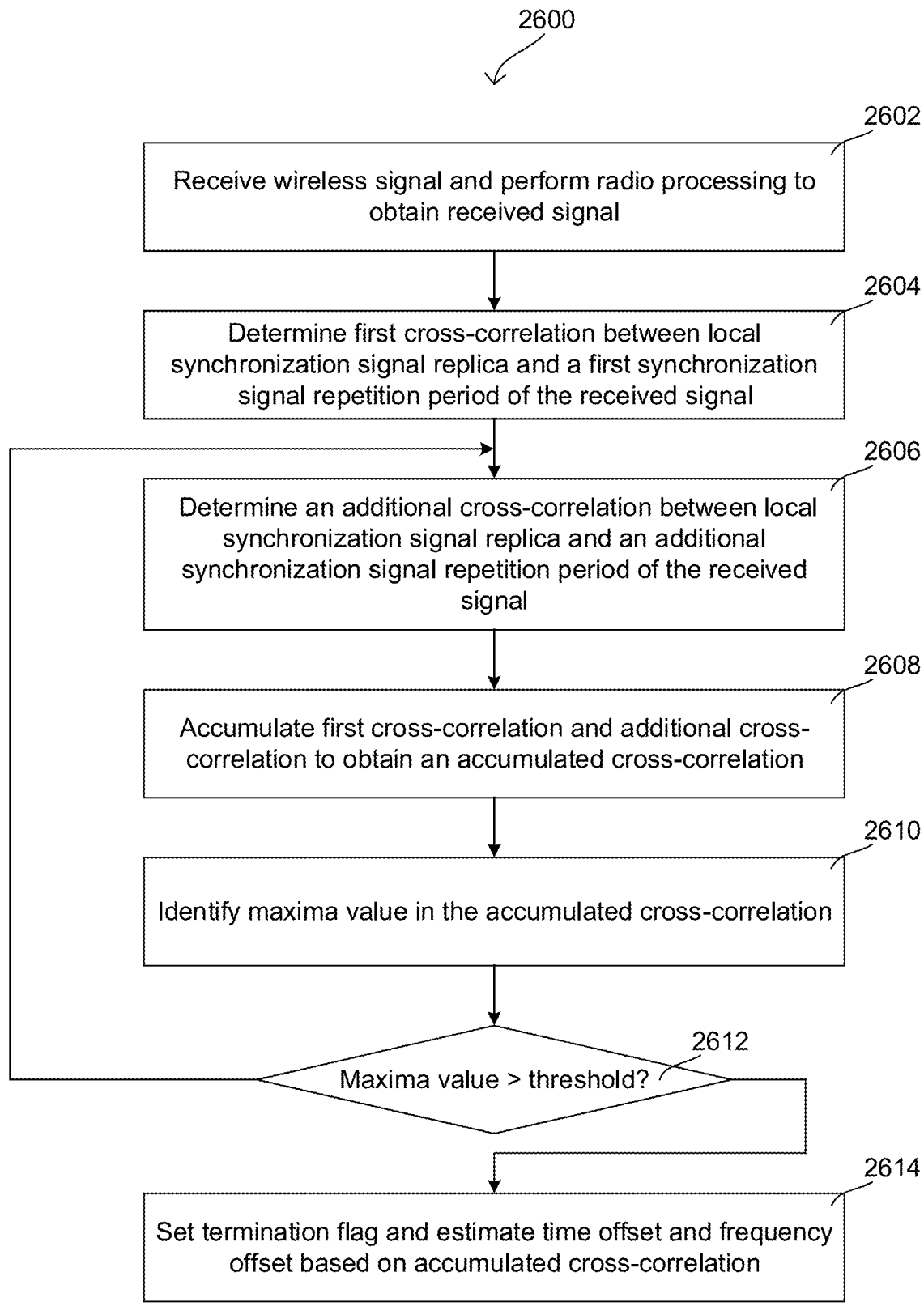
FIG. 26 shows an exemplary flow chart for time and frequency synchronization according to some aspects.

Accordingly, if sync controller 2522c determines that the termination flag is set, sync controller 2522c may stop cross-correlating and accumulating the received signal and may estimate the time and frequency offsets based on the accumulated cross-correlation. Sync controller 2522c may thus terminate the synchronization procedure and establish synchronization with the reference device. Conversely, if sync controller 2522c determines that the termination flag is not set, receive sync path 2522b may continue cross-correlating and accumulating the received signal in stages 2606-2610. As shown in FIG. 26, correlator 2512 may return to stage 2606 and may determine another additional cross-correlation between the synchronization signal replica and another additional synchronization signal repetition of the received signal. For example, radio transceiver 2510 may continue to receive wireless signals and continue to provide the received signal (sample stream) to receive sync path 2522b. Correlator 2512 may therefore select another additional synchronization signal repetition in the received signal (e.g., occurring after the additional synchronization signal repetition period from the first instance of stage 2606, such as immediately after the additional synchronization signal repetition period), and calculate another additional cross-correlation between the synchronization signal replica and the other additional synchronization signal repetition. Accumulator 2514 may then accumulate the accumulated cross-correlation (obtained in the first instance of stage 2608) with this other additional cross-correlation in stage 2608. The resulting accumulated cross-correlation will therefore be an accumulation of all previous cross-correlations (optionally normalized over the number of accumulations).

Max searcher 2516 may then identify a maxima value in the accumulated cross-correlation in stage 2610, and compare the maxima value to a predefined threshold in stage 2612. Because this maxima value is from an accumulated cross-correlation over more accumulations than the first instance of stage 2610, the maxima value may be more resilient against noise and other channel effects (and consequently less prone to detection errors). Max searcher 2516 may decide whether to set the termination flag based on the comparison, and sync controller 2522c may decide whether to keep cross-correlation and accumulating over more additional synchronization signal repetition periods (stages 2606-2610) or to terminate the synchronization procedure (stage 2614) based on whether the termination flag is set.

Receive sync path 2522b and sync controller 2522c may continue to repeat this procedure (e.g., cross-correlating and accumulating with further additional synchronization signal repetition periods in the received signal) until the termination condition is reached. This may conserve time and battery power. For example, instead of accumulating for fixed period of time (e.g., a fixed number of synchronization signal repetition periods), wireless device 2500 may terminate the accumulation once a maxima value is above the predefined threshold. Because the maxima value is above the predefined threshold, there may be a high likelihood that the maxima value identifies the timing location of a synchronization signal in the received signal. Wireless device 2500 may therefore terminate the accumulation early while still identifying a reliable maxima value with which to estimate the time and frequency offsets.

Figure 27:
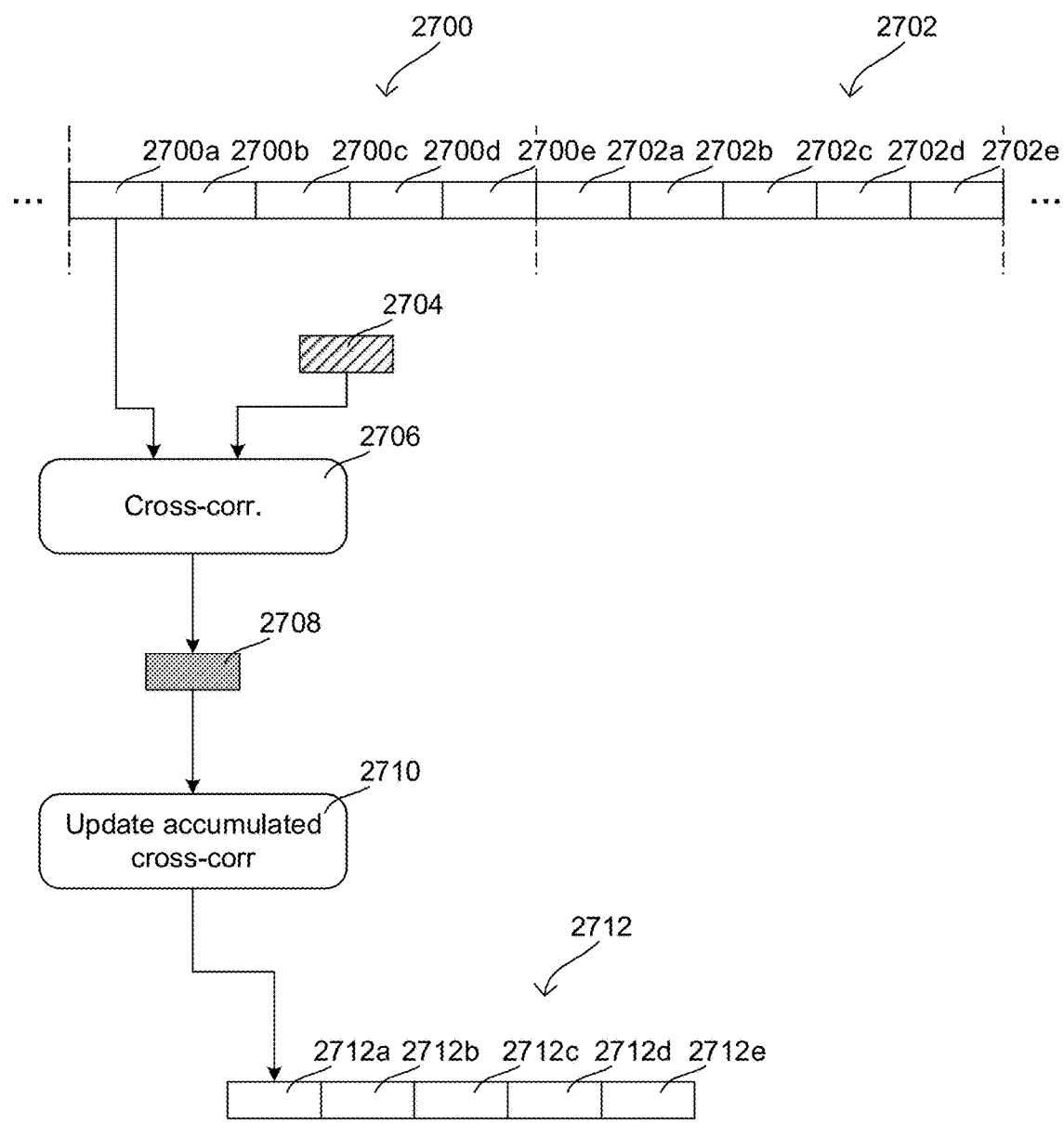
FIG. 27 shows an example of sectional processing of a received signal for synchronization signal detection according to some aspects.

In some aspects, wireless device 2500 may process synchronization signal repetition periods in subsections, such as by breaking synchronization signal repetition periods into subsections, determining the cross-correlation between the synchronization signal replica and each subsection, and updating the accumulated cross-correlation based on these cross-correlations. Max searcher 2516 may therefore determine whether to set the termination flag per subsection (e.g., based on a local maxima in each subsection). FIG. 27 shows an example of this sectional processing. As previously indicated, RF transceiver 2510 may provide the received signal (a sample stream) to receive sync path 2522b, where the received signal includes synchronization signals spaced apart by the synchronization signal repetition period (e.g., one slot, or a repetition period of another duration depending on the radio access technology). Receive sync path 2522b may then cross-correlate different synchronization signal repetition periods of the received signal with the synchronization signal replica and accumulate the resulting cross-correlations to obtain an accumulated cross-correlation over the duration of a synchronization signal repetition period. The highest values in this accumulated cross-correlation indicate potential timing locations of synchronization signals in the received signal (where a given synchronization signal is repeated at the same time location in each synchronization signal repetition period). In the example of FIG. 27, receive sync path 2522b may process the received signal in subsections. FIG. 27 shows synchronization signal repetition period 2700 separated into subsections 2700a-2700e. Instead of determining the entire cross-correlation between the synchronization signal repetition period and the synchronization signal replica all at once, receive sync path 2522b may determine the cross-correlation between synchronization signal replica 2704 and each of subsections 2700a-2700e. As shown in FIG. 27, correlator 2512 may select subsection 2700a and determine the cross-correlation between subsection 2700a and synchronization signal replica 2704 to obtain cross-correlation 2708. Because cross-correlations are a type of sliding window operation, correlator 2512 may use samples from subsection 2700b when calculating cross-correlation 2706 for subsection 2700a. In some aspects, correlator 2512 may normalize the gain across each subsection. For example, correlator 2512 may identify the gain factors applied by AGC 2508 to the different parts of a given subsection (e.g., a different gain factor every X ms, such as $$X = \frac{1}{3} \text{ or } \frac{1}{4})$$

and may normalize the subsection over these gain factors to obtain a normalized version of subsection 2700a (a normalized subsection). Correlator 2512 may then calculate cross-correlation 2508 as the cross-correlation between synchronization signal replica 2704 and this normalized version of subsection 2700a. As further described below for FIG. 28, in some aspects correlator 2512 may calculate a cross-correlation for each of a plurality of cover codes, where the plurality of cover codes are specialized codes applied to synchronization signals to identify the type of reference device. This is described below in detail.

Accumulator 2514 may include a buffer that stores the accumulated cross-correlation over a synchronization signal repetition period (e.g., a cross-correlation metric for each sample of a synchronization signal repetition period). This is shown as accumulated cross-correlation 2712 in FIG. 27. Once it receives cross-correlation 2708, accumulator 2514 may update the accumulated cross-correlation with cross-correlation 2708. Because cross-correlation 2708 is a cross-correlation subsection (e.g., the cross-correlation between subsection 2700a and synchronization signal replica 2704), accumulator 2514 may update the corresponding subsection of accumulated cross-correlation 2712. As subsection 2700a was the earliest-occurring subsection of synchronization signal repetition period 2700, accumulator 2514 may update earliest-occurring subsection 2712a of accumulated cross-correlation 2712. For example, accumulator 2514 may add cross-correlation 2708 with earliest-occurring subsection 2712a, and use the result as the new value of subsection 2712a. In general, accumulator 2514 may update the subsection of accumulated cross-correlation 2712 corresponding to the subsection of the synchronization signal repetition period from which cross-correlation 2708 was generated. In some aspects, accumulator 2514 may normalize the gain of the cross-correlation subsection and the subsection of the accumulated cross-correlation. For example, accumulator 2514 may apply a gain factor to subsection 2712a (based on the gain factors previously applied by AGC 2508 to subsection 2700a of the received signal and/or to the previous subsections of the received signal from which subsection 2712a of accumulated cross-correlation 2712 was calculated from) to normalize the gain between subsection 2712a and cross-correlation 2708. Accumulator 2514 may then add the normalized version of subsection 2712a with cross-correlation 2708 to update subsection 2712a. Accumulator 2514 may perform this normalization to update each of subsections 2712a-2712e of accumulated cross-correlation 2712. This can avoid scenarios where the gain is not uniform between the accumulated cross-correlations, which can in turn improve detection results.

After processing for subsection 2700a is done, correlator 2512 may repeat this procedure to calculate the cross-correlation between synchronization signal replica 2704 and subsection 2700b. Accumulator 2514 may then accumulate this cross-correlation result with subsection 2712b of accumulated cross-correlation 2712 to obtain an updated version of accumulated cross-correlation 2712 (e.g., optionally by normalizing the gains of subsection 2712b and the cross-correlation). Correlator 2512 and accumulator 2514 may continue this procedure, and accumulator 2514 may eventually update each of subsections 2712a-2712e of accumulated cross-correlation 2712 based on the respective cross-correlations between subsections 2700a-2700e and synchronization signal replica 2704.

RF transceiver 2510 may continue providing samples of the received signal, and thus may provide the samples for synchronization signal repetition period 2702 to correlator 2512. Correlator 2512 may then determine respective cross-correlations for subsections 2702a-2702e of synchronization signal repetition period 2702 and sequentially provide these cross-correlations to accumulator 2514. Accumulator 2514 may then update accumulated cross-correlation 2712 with these cross-correlations, namely by updating each of subsections 2712a-2712e with the cross-correlations from the corresponding subsections of synchronization signal repetition period 2702 (e.g., update subsection 2712a based on subsection 2702a, update subsection 2712b based on subsection 2702b, and so forth)

In some aspects, max searcher 2516 may decide whether to set the termination flag after each subsection update by accumulator 2514. For example, accumulator 2514 may update subsection 2712a of accumulated cross-correlation 2712 based on the cross-correlation from subsection 2700a of synchronization signal repetition period 2700. Max searcher 2516 may then identify a maxima value of subsection 2712a (e.g., a local maxima) and determine whether the maxima value is above the predefined threshold. If so, max searcher 2516 may set the termination flag. Once processing for the current subsection is over, sync controller 2522c may check whether the termination flag is set. If so, sync controller 2522c may terminate the synchronization procedure and estimate the time offset and frequency offset based on the accumulated cross-correlation. If max searcher 2516 does not set the termination flag, sync controller 2522c may allow the synchronization procedure to continue. Correlator 2512 may therefore cross-correlate subsection 2700b with synchronization signal replica 2704 and accumulator 2514 may update subsection 2712b of accumulated cross-correlation 2712 with the resulting cross-correlation. Max searcher 2516 may then determine whether to set the termination flag based on a maxima value of the updated version of subsection 2712b (e.g., a local maxima), and sync controller 2522c may determine whether to terminate cross-correlation and accumulation (whether to terminate the synchronization procedure) based on the termination flag. Wireless device 2500 may continue with this procedure, namely by sequentially updating each subsection of the accumulated cross-correlation based on newly received subsections of the received signal, determining whether to set the termination flag based on each subsection of the accumulated cross-correlation after it is updated, and checking the termination flag to determine whether to terminate accumulation. Sync controller 2522c may eventually detect that the termination flag is set and estimate the time and frequency offsets.

In some aspects where this per-subsection processing is used, sync controller 2522c may normalize the gains of the accumulated cross-correlation over the plurality of subsections. For example, correlator 2512 and accumulator 2514 may normalize the gains within each subsection (based on the gain factors applied by AGC 2508 to the different parts of each subsection); however, since this only normalizes within each subsection, the gains between different subsections may not be uniform. For example, a first subsection of the accumulated cross-correlation (that receive sync path 2522b provides to sync controller 2522c) may have a different gain factor (previously applied by AGC 2508 when receiving the received signal) than a second subsection of the accumulated cross-correlation. Sync controller 2522c may therefore normalize the gains of the plurality of subsections of the accumulated cross-correlation based on the different gain factors that AGC 2508 applied to the received signal to obtain a normalized accumulated cross-correlation.

Sync controller 2522c may then perform peak detection on the normalized accumulated cross-correlation. In these cases, the maxima value that triggered the termination flag may not be the peak value. For example, even if max searcher 2516 found a first maxima value in a first subsection of the accumulated cross-correlation that is above the predefined threshold, the normalization by sync controller 2522c may cause a second maxima value from a second subsection (e.g., occurring prior to the first subsection in the accumulated cross-correlation) to be higher than the first maxima value. Accordingly, once sync controller 2522c normalizes the gains of the accumulated cross-correlation over the plurality of subsections, sync controller 2522c may detect that the normalized second maxima value is the highest value in the normalized accumulated cross-correlation (and is therefore higher than the normalized first maxima value). Sync controller 2522c may therefore identify the normalized second maxima value as the peak value, and may determine the time offset and the frequency offset based on this peak value. Accordingly, while max searcher 2516 may set the termination flag based on a given maxima value, the normalization may cause sync controller 2522c to identify a different maxima value (from another subsection of the accumulated cross-correlation) as the peak value.

While FIG. 27 depicts five subsections per synchronization signal repetition period, this number is exemplary and the number of subsections per synchronization signal repetition period can be set to any number. In some aspects, the subsections may be of equal duration. In one example, the subsections may be equal in duration to the synchronization signal; for example, if the synchronization signals are 1 ms in duration (e.g., 1 ms bursts), the subsections may be 1 ms in duration. In an example where the synchronization signal repetition period is 38 ms, receive sync path 2522b may process the synchronization signal repetition periods in 38 subsections each of 1 ms duration.

Figure 28:
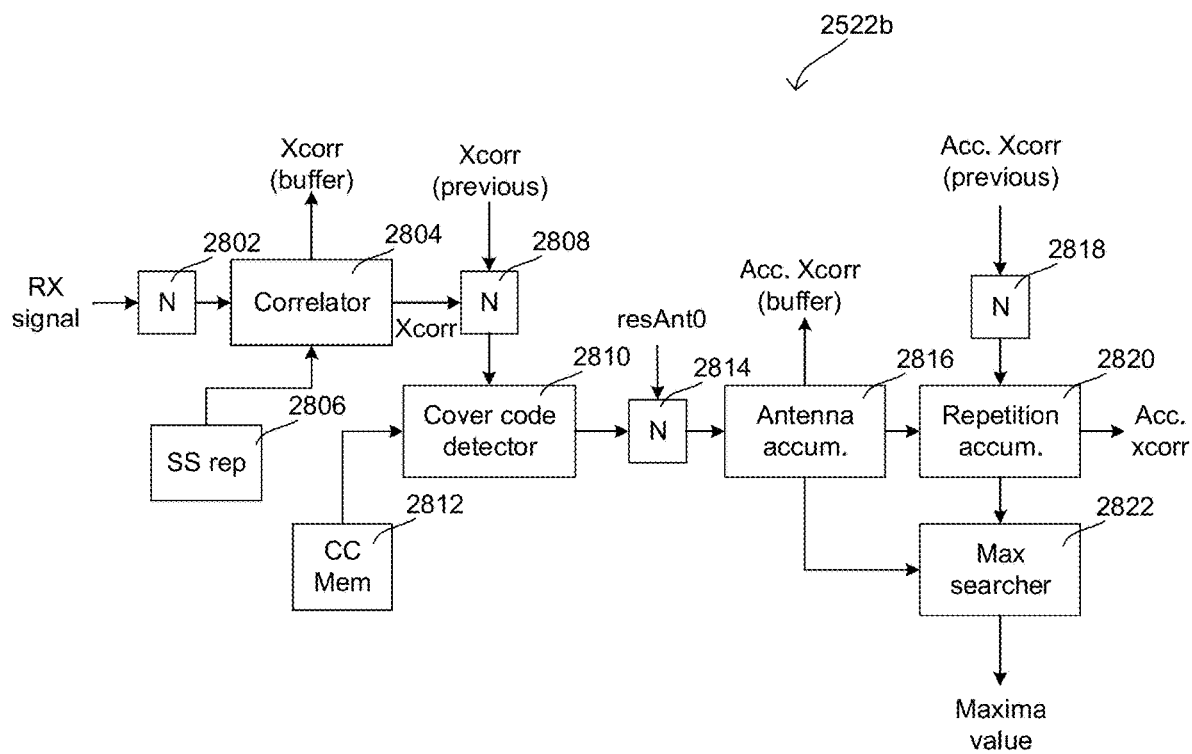
FIG. 28 shows an exemplary configuration of a receive sync path of a wireless device according to some aspects.

FIG. 28 shows an exemplary internal configuration of receive sync path 2522b according to some aspects. As shown in FIG. 28, receive sync path 2522b may receive the received signal (sample stream) from RF transceiver 2510. In some aspects, receive sync path 2522b may optionally normalize for AGC, which AGC 2508 may apply to the received signal. As AGC 2508 may apply different amplification factors over time, different parts of the received signal may have different gains. Because these varying amplification factors can impact the cross-correlations, receive sync path 2522*b* may normalize for AGC. This can keep the amplification uniform across multiple synchronization signal repetition periods and can in turn improve detection accuracy. Normalizer 2802 may therefore apply an AGC control value to the received signal. In some aspects, normalizers 2802, 2808, 2814, and 2818 may be configured to normalize the signal amplitudes based on the minimum gain applied by AGC 2508; in other words, small gains represent sections where the received signal is strong and the AGC gains are inversely proportional to the real received signal in the front-end. Correlator 2804 may then determine the cross-correlation between synchronization signal replica 2806 and the received signal. As previously indicated, correlator 2804 may determine this cross-correlation across a synchronization signal repetition period of the received signal or across a subsection of a synchronization signal repetition period.

Correlator 2804 may output the cross-correlation ("Xcorr") to normalizer 2808. Correlator 2804 may also save the cross-correlation in a buffer, where this cross-correlation will, in the next subsection, become the previous cross-correlation that normalizer 2808 receives. Normalizer 2808 may receive the cross-correlation from the previous subsection from the buffer, and may then normalize the cross-correlation and the previous cross-correlation to compensate for differing AGC gain factors between the corresponding subsections. Cover code detector 2810 may use both the cross-correlation of the current subsection and the cross-correlation from the previous subsection for its cover code detection.

In some aspects, the reference devices may apply cover codes to the synchronization signals, where different cover codes have different meanings. In an exemplary D2D use case, a reference device may apply a special cover code to its transmitted synchronization signals based on what type of reference device it is. For example, if the reference device is synchronized directly with a satellite-based synchronization source (e.g., a GNSS synchronization source), the reference device may apply a first cover code. If the reference device is synchronized indirectly with a satellite-based synchronization source (e.g., receives synchronization signals from another reference device that is synchronized directly with a satellite-based synchronization source), the reference device may apply a second cover code. If the reference device is using its own internal device clock to generate the synchronization signals, the reference device may apply a third cover code. If the reference device is synchronized with another reference device that is using its internal device clock to generate synchronization signals, the reference device may apply a fourth cover code. These cover codes may be orthogonal and may manipulate the underlying synchronization signal sequence in a unique manner. Wireless device 2500 may therefore determine the type of reference device by processing the synchronization signals and identifying the cover code. In some aspects, the cross-correlation between the different cover code should be low, which can reduce misdetections. If the cover codes exhibit high cross-correlation between each other then it may be difficult to distinguish between the detected peaks. For example, if the receive sync path 2522*b* receives two synchronization signals with different cover codes, during the detection phase based in the correlation with the local replica, receive sync path 2522*b* should be able to distinguish the corresponding synchronization signal with the correct cover code matching the receiver unit configuration.

In aspects where these cover codes are used, receive sync path 2522*b* may include cover code detector 2810 and cover code memory 2812. Cover code memory 2812 may store the different cover codes, and may provide the cover codes to cover code detector 2810. Cover code detector 2810 may then use the cross-correlation and the previous cross-correlation to determine a cover code-specific cross-correlation for each cover code. For example, cover code detector 2810 may, for each cover code, manipulate the cross-correlation based on the bits of the cover code to obtain a cover code-specific cross-correlation for this cover code. Cover code detector 2810 may therefore produce a plurality of cross-correlations, one per cover code, and may provide these cover code-specific cross-correlations to normalizer 2814.

Normalizer 2814 may then normalize for different antenna gains. For example, in some aspects, antenna system 2502 may include multiple antennas. Correlator 2804 may determine cross-correlations for each of the multiple antennas (e.g., for each subsection; e.g., a cover code-specific cross-correlation for each cover code for each antenna) and provide these cross-correlations to normalizer 2814. Normalizer 2814 may apply a scaling value to the respective cross-correlations depending on the respective antennas (e.g., the antenna gains). After normalizing a given cross-correlation based on the scaling value for the antenna on which it was received, normalizer 2814 may provide the cross-correlation to antenna accumulator 2816.

Antenna accumulator 2816 may then accumulate the cross-correlations over each of the multiple antennas (where the cross-correlations are normalized by normalizer 2814). In aspects where cover codes are used, antenna accumulator 2816 may accumulate the cover code-specific cross-correlations over the multiple antennas to obtain, for each cover code, an antenna-accumulated cover code-specific cross-correlation.

Antenna accumulator 2816 may provide the antenna-accumulated cross-correlation to repetition accumulator 2820. Antenna accumulator 2816 may also provide this antenna-accumulated cross-correlation to a buffer for temporary storage until the next repetition period, when the antenna-accumulated cross-correlation is then provided to accumulator 2818. Antenna accumulator 2816 may also provide the antenna-accumulated cross-correlation to max searcher 2822; for example, if receive sync path 2522*b* is processing the earliest synchronization signal repetition period (the first-occurring in time), there may be no other cross-correlations from other synchronization signal repetition periods to accumulate with. Max searcher 2822 may therefore search for the maxima value in this antenna-accumulated cross-correlation. If cover codes are being used, max searcher 2822 may search for the maxima value in each respective antenna-accumulated cover code-specific cross-correlation and may set the termination flag if any of the maxima values exceeds the predefined threshold.

If receive sync path 2522*b* has processed earlier synchronization signal repetition periods of the received signal, repetition accumulator 2820 may have previously stored an accumulated cross-correlation in a buffer. Normalizer 2818 may normalize this accumulated cross-correlation based on the AGC gain factors and provide the accumulated cross-correlation to repetition accumulator 2820. Repetition accumulator 2820 may update the accumulated cross-correlation with the antenna-accumulated cross-correlation from antenna accumulator 2816. If receive sync path 2522*b* is processing the received signal in subsections, the antenna-accumulated cross-correlation may be a cross-correlation for a single subsection and repetition accumulator 2820 may update the corresponding subsection of the accumulated cross-correlation (from the buffer) based on the antenna-accumulated cross-correlation.

After the update, repetition accumulator 2820 may then provide the accumulated cross-correlation to max searcher 2822. Max searcher 2822 may then identify a maxima value of the accumulated cross-correlation and compare the maxima value to the predefined threshold. If the maxima value is greater than the predefined threshold, max searcher 2822 may set the termination flag. Sync controller 2522c may then check the termination flag (e.g., after processing is done for the current subsection) and determine whether to terminate the cross-correlation and accumulation based on whether the termination flag is set.

In aspects where receive sync path 2522b operates on subsections, max searcher 2822 may set the termination flag based on a maxima value in a subsection of the accumulated cross-correlation being greater than the predefined threshold. Max searcher 2822 may then provide the accumulated cross-correlation (including all subsections of the accumulated cross-correlation) to sync controller 2522c. Sync controller 2522c may then normalize the gains over the plurality of subsections of the accumulated cross-correlation to obtain a normalized accumulated cross-correlation. Sync controller 2522c may then identify the peak value (e.g., the highest value) of the normalized accumulated cross-correlation. Depending on the normalization, this peak value may be different from the maxima value (e.g., at a different timing position) that triggered termination at max searcher 2822. In some aspects, max searcher 2822 may determine a maxima value for each subsection of the accumulated cross-correlation, and may provide these maxima values to sync controller 2522c. After normalizing the accumulated cross-correlation to obtain the normalized accumulated cross-correlation, sync controller 2522c may compare the normalized maxima values and may take the highest-valued normalized maxima value as the peak value. This can reduce processing time as sync controller 2522c may not perform a full peak search through all values of the normalized accumulated cross-correlation.

In aspects where cover codes are used, max searcher 2822 may, for each subsection of each cover code-specific accumulated cross-correlation, identify a maxima value and determine whether the maxima value is greater than the predefined threshold. If the maxima value for any subsection of any cover code-specific accumulated cross-correlation is greater than the threshold, max searcher 2822 may set the termination flag. Sync controller 2522c may then, for each cover code-specific accumulated cross-correlation, normalize the gains over the plurality of subsections. Sync controller 2522c may then identify the peak value of each normalized cover-code specific accumulated cross-correlation, and identify the highest peak value as the peak value with which to determine the time offset and the frequency offset. Sync controller 2522c may also identify which cover code was used to generate the normalized cover-code specific accumulated cross-correlation that produced the peak value. Sync controller 2522c may determine that the detected synchronization signal has this cover code, and thus that the reference device is the type of synchronization device (e.g., synchronization master or relay) paired to this cover code.

Figure 29:
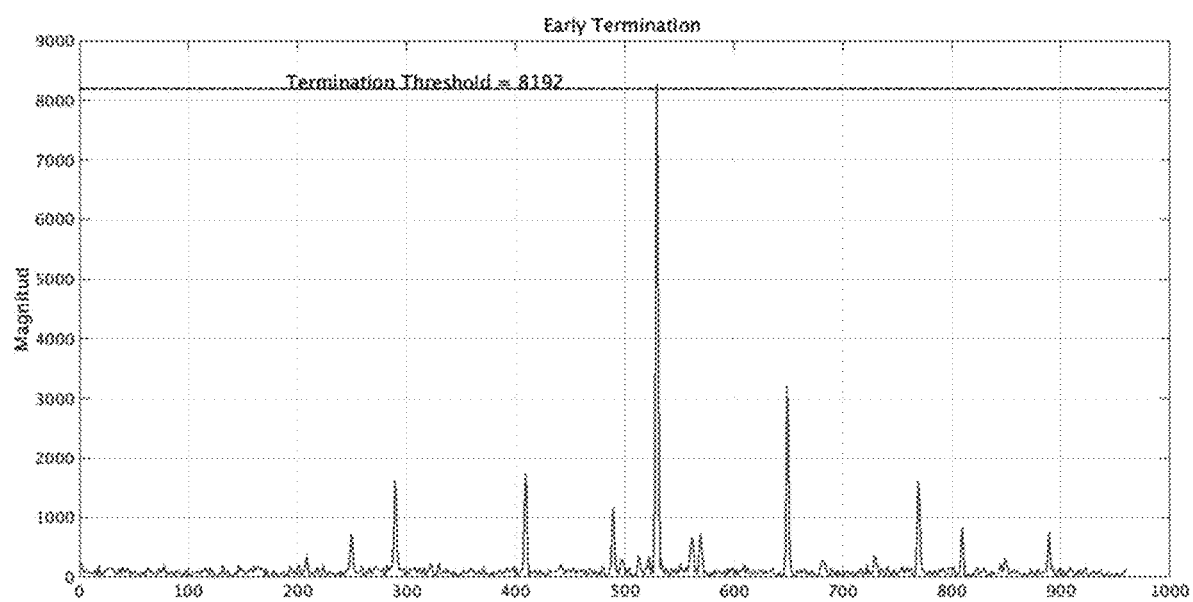
FIG. 29 shows an example of an accumulated cross-correlation for synchronization signal detection according to some aspects.

FIG. 29 shows an exemplary depiction of the accumulated cross-correlation according to some aspects. As shown in this example, there may be a maxima value at around the $500^{th}$ sample of the accumulated cross-correlation. This maxima value may exceed the predefined threshold (e.g., a magnitude of 8192 in the example FIG. 29). Max searcher 2516 may therefore detect this maxima value and set the termination flag based on it. Sync controller 2522c may thus detect that the termination flag is set and terminate the cross-correlation and accumulation. If subsection processing is used, sync controller 2522c may normalize the gains of the accumulated cross-correlation over its subsections and perform peak detection on the normalized accumulated cross-correlation.

In some aspects, receive sync path 2522b may be configured to use a partial correlation technique to determine the cross-correlations. For example, correlator 2512 (and equivalently correlator 2804) may be configured to split each subsection (e.g., each 1 ms subsection) of the received signal into partial correlation vectors and then use frequency-domain inner product operations to determine the cross-correlation metric for each sample of the cross-correlation. For instance, let $\gamma(\tau)$ denote the collection of L consecutive samples counted from the sampling instant $\tau = \mod(t,T)$, where L is the number of samples that constitute one subsection (e.g., L=480 samples for a 1 ms subsection and a sampling frequency $f_s$=480 kHz, where each synchronization signal burst is also 1 ms). The vector $\gamma(\tau)$ can then be partitioned into N=L/PCL subvectors $R_l$, l=1,2, . . . N; in other words $$\gamma(\tau)=[R_1\ R_2\ \ldots\ R_N]$$

where PCL is the length of each subvector (in samples, e.g., partial correlation length).

The synchronization signal replica, which is also L samples in length, can similarly be split into N subvectors. Denoting the synchronization signal replica as vector $\rho$, this vector $\rho$ can be split into subvectors $P_l$, l=1,2, . . . , N that each hold L consecutive samples of the synchronization signal replica; in other words $$\rho=[P_1\ P_2\ \ldots\ P_N]$$

Correlator 2512 may then calculate the cross-correlation $A(\tau)$ for each sample $\tau$. In particular, correlator 2512 may, for each pair of subvectors $R_l$ and $P_l$, calculate the inner product as $$A_{l(\tau)}=R_l P_l^H,\ l=1,2,\ldots,N$$

Correlator 2512 may then add up the l inner products for each sample $\tau$ to get the cross-correlation metric $A(\tau)$ for each sample $\tau$ as $$A(\tau) = \sum_{l=1}^{N-1} A_l(\tau) A_{l+1}^H(\tau)$$

Assume $\theta$ is the carrier frequency offset-induced phase rotation between adjacent samples of the synchronization signal and the actual time offset is $\tau_0$. When $\tau=\tau_0$, the expectation of $A(\tau)$ is a complex number whose phase is proportional to PCL·$\theta$, which is the product of the partial correlation length PCL and the sample-wise rotation, or in other words, $$E[A(\tau)] \propto e^{jPCL\cdot\theta}$$

As previously described, correlator 2512 may provide the cross-correlation $A(\tau)$ to accumulator 2514, which may accumulate the cross-correlation over multiple synchronization signal repetition periods. As this can strengthen true local maxima while averaging out false local maxima (e.g., cross-correlation maxima that are produced by random noise), this can enhance the detection rate. Accumulator 2514 may thus coherently combine the cross-correlation $A(\tau)$ over $N_{rep}$ times (for every $\tau$) to obtain an accumulated cross-correlation $C(\tau)$ as $$C(\tau) = \sum_{r=1}^{N_{rep}} A^r(\tau)$$

Max searcher 2516 may then search for the maxima in $C(\tau)$ and may set the termination flag if a maxima value exceeds the predefined threshold. Sync controller 2522c may check the termination flag and decide whether to terminate the cross-correlation and accumulation. If so, sync controller 2522c may perform peak detection (e.g., after normalizing) on the accumulated cross-correlation and may estimate the time offset $\hat{\tau}$ as the sample of $C(\tau)$ that has the maximum peak value, or in other words $$\hat{\tau} = \underset{\tau}{\operatorname{argmax}}\{|C(\tau)|\}$$

Sync controller 2522c may then estimate the frequency offset $\hat{f}$ based on $\hat{\tau}$ as $$\hat{f} = \frac{f_s}{PCL \cdot 2\pi} \arg\{C(\hat{\tau})\}$$

Various aspects described above use maxima values in an accumulated cross-correlation as the termination condition for terminating synchronization signal detection. In some aspects, wireless device 2500 may use a radio measurement as the termination condition. For example, wireless device 2500 may estimate a time offset and a frequency offset, such as with the cross-correlation and accumulation procedure described above. Wireless device 2500 may then determine a radio measurement with the time offset and the frequency offset. Wireless device 2500 may then compare the radio measurement to a predefined threshold. Depending on whether the radio measurement is greater than the predefined threshold, wireless device 2500 may a) select the time offset and the frequency offset as the final values to use for synchronization, or b) continue cross-correlating accumulating to obtain updated values of the time offset and the frequency offset. Wireless device 2500 may then determine another radio measurement and compare the radio measurement to the predefined threshold to determine whether or not to select the updated values of the time offset and the frequency offset as the final values.

Figure 30:
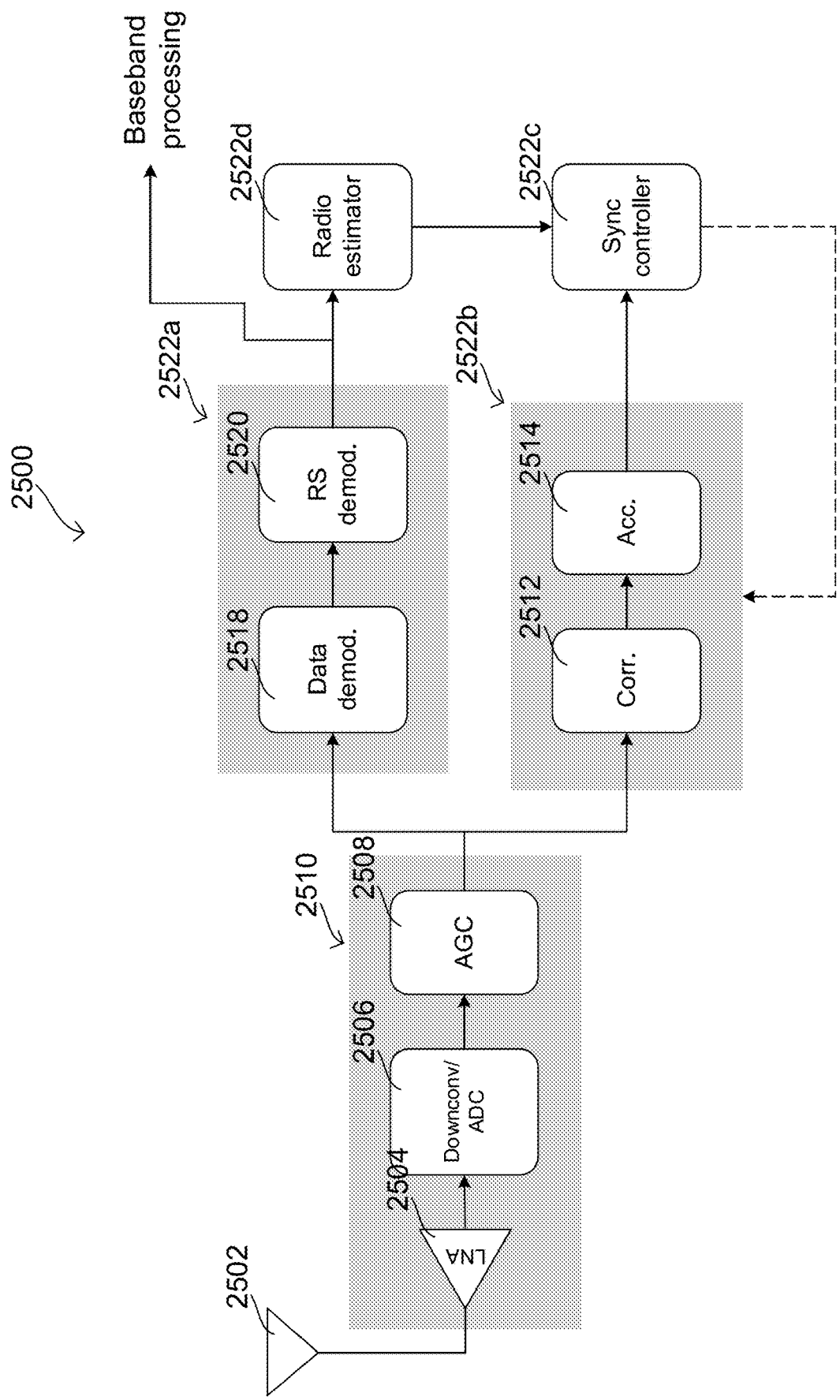
FIG. 30 shows an exemplary configuration of a wireless device according to some aspects.

FIG. 30 shows another exemplary configuration of wireless device 2500 according to some aspects. Wireless device 2500 may include the same components previously shown in FIG. 25 in addition to radio estimator 2522d. Radio estimator 2522 may be a physical layer subcomponent of baseband modem 2522. Radio estimator 2522 may be a hardware circuit configured with logic to perform radio measurements or may be a processor configured to execute code to perform radio measurements. As shown in FIG. 30, radio estimator 2522d may receive the output of receive link path 2522a and may provide a radio measurement to sync controller 2522c.

Sync controller 2522c may then evaluate the radio measurement against a predefined threshold to determine whether to conclude the synchronization procedure.

Figure 31:
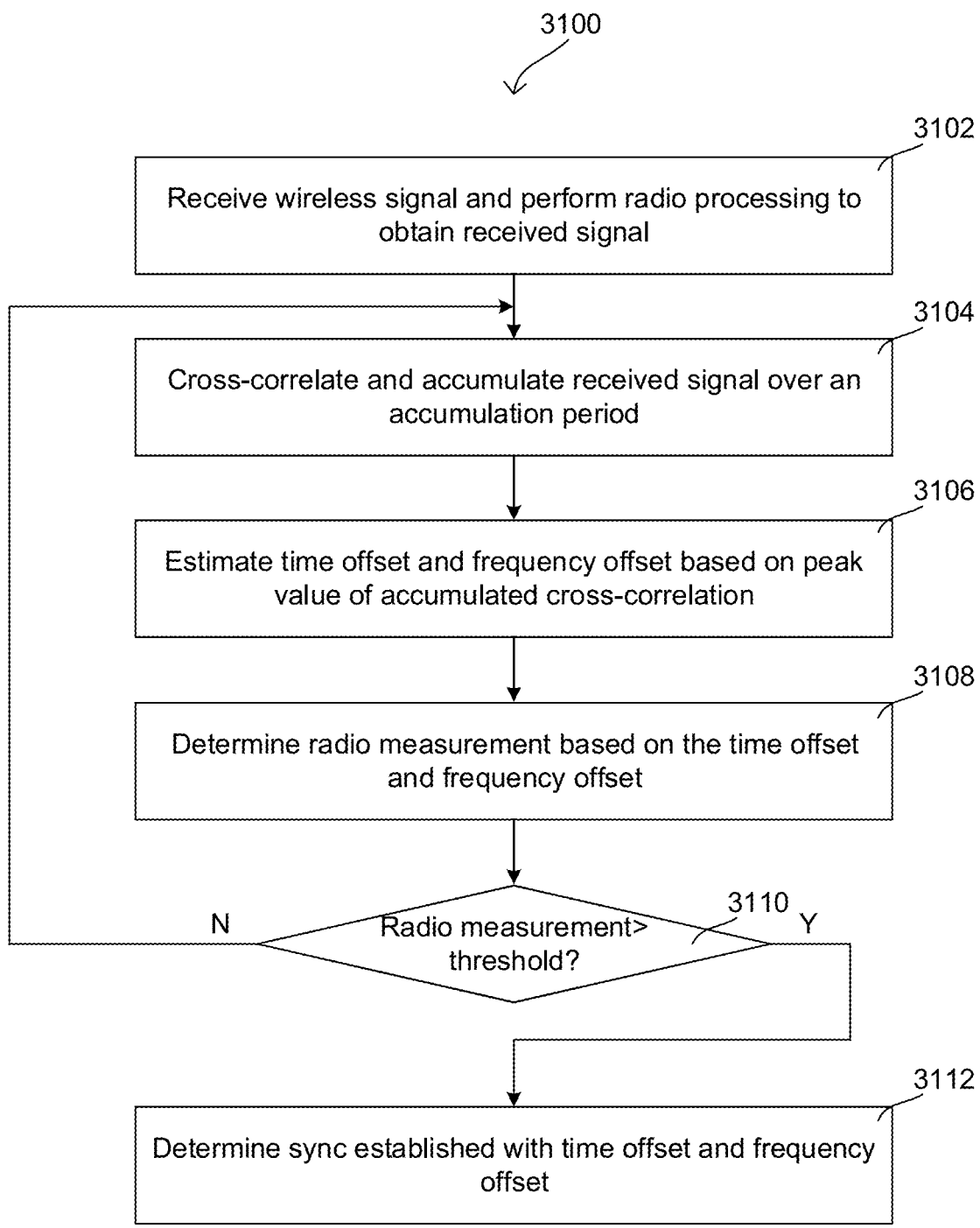
FIG. 31 shows an exemplary flow chart using radio measurements as a termination condition for time and frequency synchronization according to some aspects.

FIG. 31 shows exemplary flow chart 3100, which describes the synchronization procedure using radio measurements as termination conditions according to some aspects. As shown in FIG. 31, wireless device 2500 may first receive a wireless signal and perform radio processing on the wireless signal to obtain a received signal in stage 3102. For example, RF transceiver 2510 may receive the wireless signal via antenna system 2502 and provide the received signal (a sample stream) to baseband modem 2522. Receive sync path 2522b may then cross-correlate the received wireless signal with the synchronization signal replica and accumulate these cross-correlations over multiple accumulation periods in stage 3104. As described for flow chart 2600 in FIG. 26, correlator 2512 may cross-correlate the received signal with the synchronization signal replica to obtain a cross-correlation over a synchronization signal repetition period (where the cross-correlation has a cross-correlation metric for each sample of the synchronization signal repetition period). Correlator 2512 may determine these cross-correlations over multiple synchronization signal repetition periods, and may provide the cross-correlations to accumulator 2514. Accumulator 2514 may then accumulate the cross-correlations to obtain an accumulated cross-correlation.

Correlator 2512 and accumulator 2514 may be configured to continue this cross-correlation and accumulation over multiple accumulation periods, where each accumulation period includes the same number of synchronization signal repetition periods. For example, if a synchronization signal repetition period is a slot of a communication schedule (e.g., the synchronization signals are periodically repeated once per slot), each accumulation period may include the same plurality of slots.

After accumulator 2514 accumulates the cross-correlations over multiple accumulation periods, wireless device 2500 may estimate the time offset and the frequency offset based on a peak value of the accumulated cross-correlation in stage 3106. For example, accumulator 2514 may provide the resulting accumulated cross-correlation to sync controller 2522c. Sync controller 2522c may then identify a peak value of the accumulated cross-correlation. Sync controller 2522c may estimate the time offset as the sample position of the peak value in the accumulated cross-correlation (e.g., $\hat{\tau}$ as described above) may estimate the frequency offset based on the phase of the accumulated cross-correlation at this sample position (e.g., f as described above). As described above, in some aspects correlator 2512, accumulator 2514, and sync controller 2522c may normalize for AGC gains based on the gain factors applied by AGC 2508 to the received signal.

Sync controller 2522c may then provide the time offset and the frequency offset to radio estimator 2522d. Radio estimator 2522d may then determine a radio measurement based on the time offset and the frequency offset in stage 3108. For example, radio estimator 2522d may determine an SNR measurement as the radio measurement. In another example, radio estimator 2522d may determine a signal power measurement, such as a reference signal received power (RSRP), as the radio measurement. In another example, radio estimator 2522d may determine a time offset estimate variance and/or a frequency offset estimate variance as the radio measurement.

In some aspects, sync controller 2522c may provide the time offset and the frequency offset to receive link path 2522a. Data demodulator 2518 and/or reference signal demodulator 2520 may then demodulate symbols of the synchronization signal in the received signal (or, alternatively, another reference signal transmitted by the reference device, which can be used in place of the synchronization signal in the following description). In one example, reference signal demodulator 2520 may use the time offset to perform coherent data processing on the synchronization signal symbols, such as by placing an FFT window around the symbols using the time offset to fix the FFT windows. Sync controller 2522c may also provide the frequency offset to radio transceiver 2506, which may compensate for carrier frequency offset based on the frequency offset (e.g., using a closed-loop technique). The received signal may therefore depend on this carrier frequency offset. Reference signal demodulator 2520 may demodulate the synchronization signal symbols and may provide the demodulated synchronization signal symbols to radio estimator 2522d.

Radio estimator 2522d may then determine the radio measurement based on the demodulated synchronization signal symbols. In one example using SNR as the radio measurement, radio estimator 2522d may estimate the signal power of the demodulated synchronization signal symbols. Radio estimator 2522d may then estimate the noise power, such as by comparing the demodulated synchronization signal symbols to the original synchronization signal symbols to characterize the noise. Radio estimator 2522d may estimate the SNR as the signal power divided by the noise power.

In an example using signal power as the radio measurement, radio estimator 2522d may estimate the signal power of the demodulated synchronization signal symbols, such as with an RSRP measurement of the demodulated synchronization signal symbols.

In an example using time offset estimate variance or frequency offset estimate variance as the radio measurement, radio estimator 2522d may estimate the using time offset estimate variance or frequency offset estimate variance based on the demodulated synchronization signal reference symbols and the time offset or frequency offset provided by sync controller 2522c. For example, radio estimator 2522d may statistically evaluate the demodulated synchronization signal reference symbols based on the time offset or frequency offset to estimate the variance in the time offset or frequency offset over time. Radio estimator 2522d may then take the resulting time offset estimate variance or frequency offset estimate variance as the radio measurement. In some aspects, radio estimator 2522d may determine the variance estimates by calculating multiple time and/or frequency offset estimates from subset of reference symbols. Radio estimator 2522d may then average the estimates and calculate the variance based on the difference of the different estimates from the mean.

After determining the radio measurement based on the time offset and the frequency offset in stage 3108, radio estimator 2522d may provide the radio measurement to sync controller 2522c. Sync controller 2522c may then compare the radio measurement to a predefined threshold in stage 3110. Sync controller 2522c may then determine whether the radio measurement meets a predefined relationship with the predefined threshold. For example, if the radio measurement is an SNR or signal power measurement, the predefined relationship may be the radio measurement being greater than the predefined threshold. If the radio measurement is a time offset estimation variance or a frequency offset estimation variance, the predefined relationship may be the radio measurement being less than the predefined threshold. Sync controller 2522c may decide whether to terminate the synchronization procedure based on the comparing. If sync controller 2522c determines the radio measurement is meets the predefined relationship in stage 3110 (e.g., the SNR or signal power measurement is greater than the predefined threshold, or the time or frequency offset estimation variance is less than the predefined threshold), sync controller 2522c may determine that synchronization is established with the current values of the time offset and the frequency offset in stage 3112. Sync controller 2522c may then provide the time offset and frequency offset to receive link path 2522a, which may receive signals using the time offset and frequency offset (e.g., by performing physical layer receive processing on the received signal using the time offset and the frequency offset).

Conversely, if sync controller 2522c determines that the radio measurement does not meet the predefined relationship, sync controller 2522c may not terminate the synchronization procedure. Sync controller 2522c may instead instruct correlator 2512 and accumulator 2514 to cross-correlate and accumulate over another accumulation period. As shown in FIG. 31, wireless device 2500 may thus repeat stages 3104-3110. Correlator 2512 may cross-correlate the synchronization signal replica with another accumulation period of the received signal, and may obtain a respective cross-correlation for each synchronization signal repetition period in the accumulation period. Accumulator 2514 may then accumulate these cross-correlations with the accumulated cross-correlation (from the initial accumulation period). Accumulator 2514 may provide the resulting accumulated cross-correlation sync controller 2522c, which may then estimate the time offset and the frequency offset (e.g., updated values of the time offset and the frequency offset) based on the accumulated cross-correlation in stage 3106. Radio estimator 2522d may then determine a radio measurement (e.g., an updated value of the radio measurement) based on the updated values of the time offset and the frequency offset in stage 3108. Sync controller 2522c may then compare the updated value of the radio measurement to the predefined threshold in stage 3110, and may decide whether to terminate the synchronization procedure or to again repeat stages 3104-3110 for another accumulation period. Sync controller 2522c may continue this procedure until an updated value of the radio measurement eventually meets the predefined relationship, after which sync controller 2522c may terminate the synchronization procedure and determine that synchronization is established with the current values of the time offset and frequency offset (e.g., the most recent values from the last accumulation period).

Because accumulator 2514 continues to accumulate the cross-correlations over multiple accumulation periods, the updated values of the time offset and the frequency offset may become progressively more accurate (on average). This may increase the accuracy of the radio measurements. For example, inaccurate time offsets may lead to incorrect placement of the FFT window by data demodulator 2518 and reference signal demodulator 2520; this improper FFT window placement may hinder reception and reduce SNR (or reduce signal power, increase the offset estimate variance, and so forth for the various types of radio measurements). Similarly, inaccurate frequency offsets may cause radio transceiver 2510 to incorrectly compensate for carrier frequency offset. This can likewise hinder reception and reduce SNR (or reduce signal power, increase the offset estimate variance, and so forth for the various types of radio measurements). Accordingly, the radio measurements may characterize how accurate the time and frequency offset estimates are. Wireless device 2500 may thus continue to accumulate until the radio measurements indicate a sufficiently high level of offset estimate accuracy.

Figure 32:
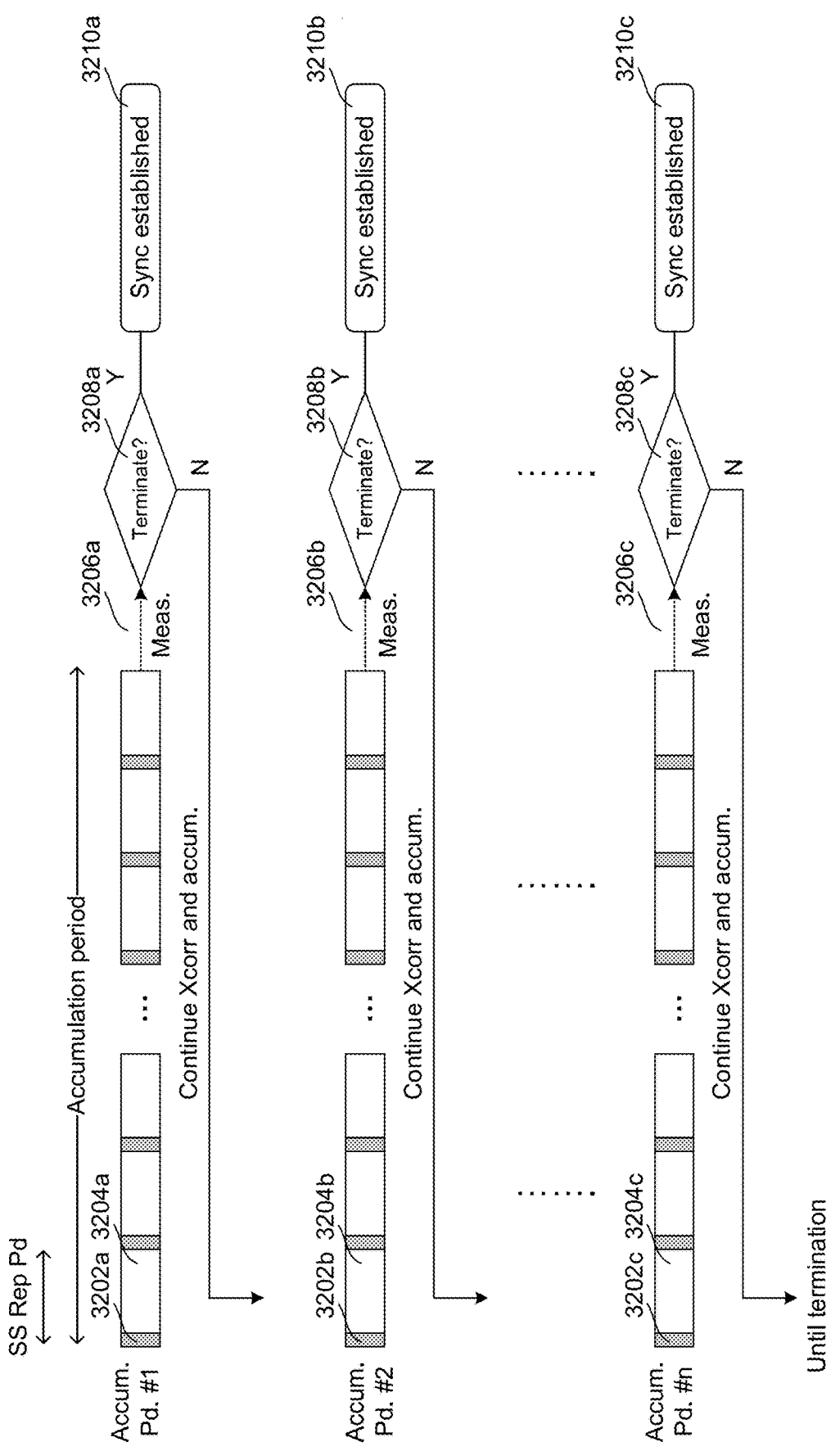
FIG. 32 shows an exemplary diagram illustrating the synchronization procedure using radio measurements as the termination condition according to some aspects.

FIG. 32 shows an exemplary diagram illustrating the synchronization procedure using radio measurements as the termination condition according to some aspects. As shown in FIG. 32, each accumulation period may be the same number of synchronization signal repetition periods in the received signal. Each synchronization signal repetition period may include a synchronization signal 3202*a* (e.g., a synchronization signal burst) and a remaining signal 3204*a* (e.g., data, control, and any other type of signal). In one example, a synchronization signal repetition period may be equal to a slot (e.g., a 38 ms slot) and an accumulation period may be equal to a frame including a fixed number of slots (e.g., nine slots to a frame). Wireless device 2500 may cross-correlate and accumulate the received signal over a first accumulation period, and may then determine a time offset and a frequency offset based on the resulting accumulated cross-correlation. Wireless device 2500 may determine a radio measurement based on the initial values of the time offset and the frequency offset at 3206*a*. Wireless device 2500 may then compare the radio measurement to a predefined threshold and determine whether to terminate the synchronization procedure based on the comparing in 3208*a*. If wireless device 2500 determines to terminate the synchronization procedure (e.g., that the radio measurement meets the termination condition), wireless device 2500 may determine that synchronization is established with the initial values of the time offset and the frequency offset. Wireless device 2500 may then transmit and receive data with the reference device (that transmitted the detected synchronization signal) using the initial values of the time offset and the frequency offset (e.g., by aligning transmit and receive operations in time based on the time offset and by correcting for carrier frequency offset based on the frequency offset).

If wireless device 2500 determines not to terminate the synchronization procedure, wireless device 2500 may continue to cross-correlate and accumulate over a second accumulation period. This second accumulation period may similarly include synchronization signal repetition periods each including a synchronization signal 3202*b* and a remaining signal 3204*b*. Wireless device 2500 may determine updated values of the time offset and the frequency offset and then determine an updated value of the radio measurement in 3206*c*. Wireless device 2500 may determine whether to terminate the synchronization procedure based on whether the updated value of the radio measurement meets the predefined relationship with the predefined threshold (e.g., whether the termination condition is satisfied) in 3208*b*. If so, wireless device 2500 may determine that sync is established with the updated values of the time offset and the frequency offset; otherwise, wireless device 2500 may proceed to additional accumulation periods (with synchronization signal 3202*c* and remaining signal 3204*c* in each synchronization signal repetition period). In each additional accumulation period wireless device 2500 may perform a radio measurement in 3206*c*, decide whether to terminate in 3208*c*, and either determine that synchronization is established in 3210*c* or proceed to a next accumulation period. Wireless device 2500 may continue until determining that the current value of the radio measurement meets the termination condition.

In some aspects, wireless device 2500 may consider both a peak value of the accumulated cross-correlation and a radio measurement when determining if the termination condition is met. For example, wireless device 2500 may cross-correlate and accumulate over an accumulation period of the received signal and obtain an accumulated cross-correlation. Wireless device 2500 may identify a peak value of the accumulated cross-correlation and determine a time offset, a frequency offset, and a radio measurement. Wireless device 2500 may then compare the peak value to a peak threshold and determine whether the peak value is greater than the peak threshold. Wireless device 2500 may also compare the radio measurement to a radio measurement threshold and determine whether the radio measurement meets a predefined relationship with the radio measurement threshold (e.g., above the radio measurement threshold for SNR and signal power or below the radio measurement threshold for time offset estimate variance and frequency offset estimate variance). Wireless device 2500 may determine that the termination condition is met if a) the peak value is above the peak threshold, and b) if the radio measurement meets the predefined relationship with the radio measurement threshold; if either prong is not true, wireless device 2500 may determine that the termination condition is not met. If the termination condition is met wireless device 2500 may then determine that synchronization is established with the current values of the time offset and the frequency offset. Otherwise wireless device 2500 may perform the cross- and accumulation over another accumulation period, obtain updated values of the peak value and radio measurement, and determine whether the termination condition is met based on these updated values of the peak value and radio measurement.

FIG. 32 showed an example where wireless device 2500 accumulates cross-correlations over an accumulation period and then determines a radio measurement based on this accumulated cross-correlation. In other aspects, wireless device 2500 may trigger radio measurement when the accumulated cross-correlation has a maxima value greater than a predefined threshold. For example, the configuration of wireless device 2500 in FIG. 30 may include max searcher 2516 between accumulator 2514 and sync controller 2522*c* (as previously described for FIG. 25). Max searcher 2516 may identify maxima values in the accumulated cross-correlations (provided by accumulator 2514) and compare the maxima values to a predefined threshold. If a maxima value is above the predefined threshold, max searcher 2516 may set the termination flag. Sync controller 2522*c* may then determine that the termination flag is set and conclude that a radio measurement should be taken. Sync controller 2522*c* may perform peak detection on the accumulated cross-correlation to identify a peak value (e.g., after normalizing the accumulated cross-correlation to compensate for differing AGC gains) and may then determine a time offset and frequency offset based on the peak value. Radio estimator 2522*d* may then determine a radio measurement based on the time offset and frequency offset. Sync controller 2522*c* may then determine whether to terminate the synchronization procedure based on the radio measurement. Accordingly, rather than accumulating the cross-correlations for a fixed accumulation period, wireless device 2500 may dynamically trigger radio measurement when max searcher 2516 detects a maxima value that exceeds the predefined threshold.

Wireless device 2500 may reduce the synchronization establishment time (and conserve power) using these synchronization techniques. Because wireless device 2500 adaptively evaluates the current values of the time offset and frequency offset, wireless device 2500 may verify the accuracy of the current values of the time offset and frequency offset before terminating synchronization. Wireless device 2500 may thus decrease the duration of synchronization procedures without excessively sacrificing accuracy.

Figure 33:
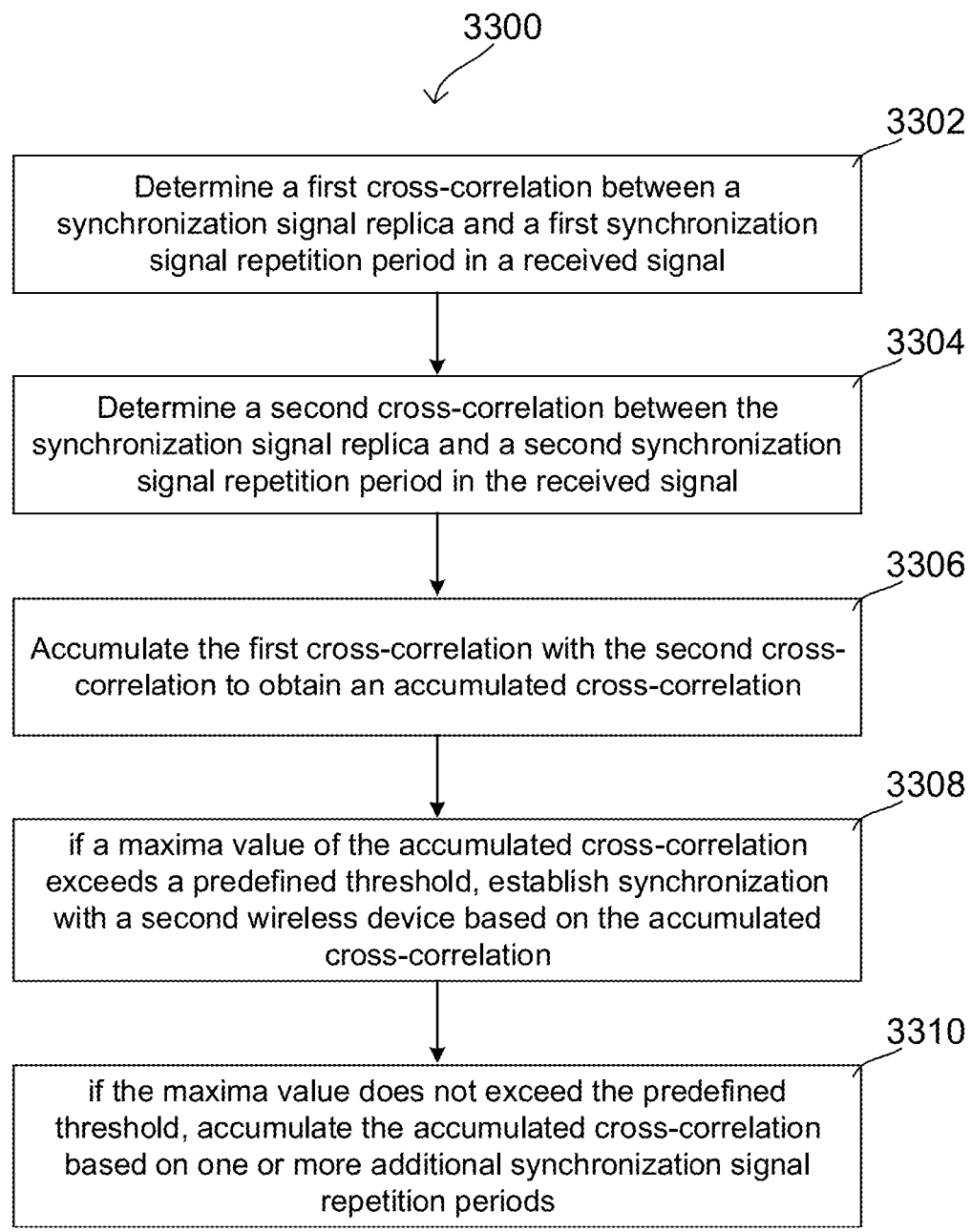
FIGS. 33-38 show exemplary methods of wireless communication at a wireless device according to some aspects.

FIG. 33 shows exemplary method 3300 of wireless communication at a wireless device according to some aspects. Method 3300 includes determining a first cross-correlation between a synchronization signal replica and a first synchronization signal repetition period in a received signal (3302), determining a second cross-correlation between the synchronization signal replica and a second synchronization signal repetition period in the received signal (3304), accumulating the first cross-correlation with the second cross-correlation to obtain an accumulated cross-correlation (3306), if a maxima value of the accumulated cross-correlation exceeds a predefined threshold, establishing synchronization with a second wireless device based on the accumulated cross-correlation (3308), and if the maxima value does not exceed the predefined threshold, accumulating the accumulated cross-correlation based on one or more additional synchronization signal repetition periods (3310).

Figure 34:
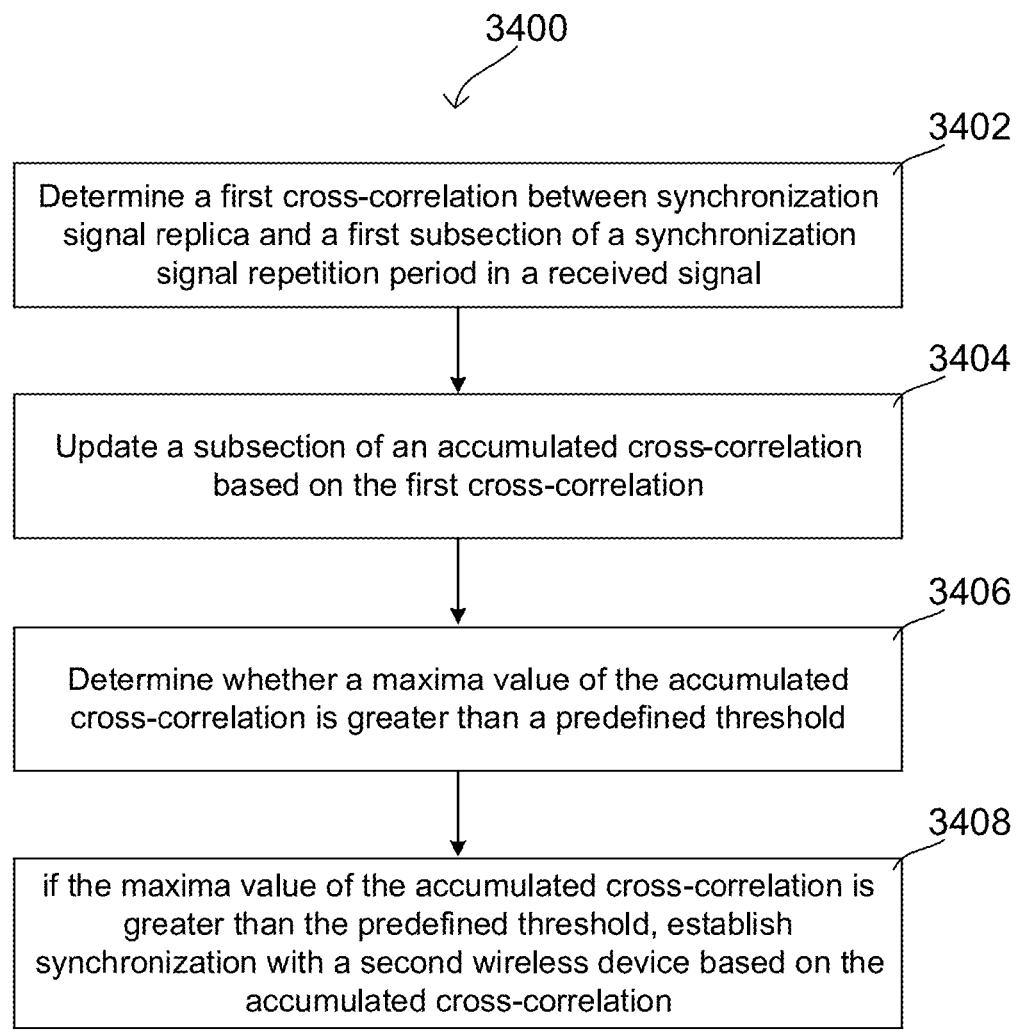

FIG. 34 shows exemplary method 3400 of wireless communication at a wireless device according to some aspects. Method 3400 includes determining a first cross-correlation between synchronization signal replica and a first subsection of a synchronization signal repetition period in a received signal (3402), updating a subsection of an accumulated cross-correlation based on the first cross-correlation (3404), determining whether a maxima value of the accumulated cross-correlation is greater than a predefined threshold (3406), and if the maxima value of the accumulated cross-correlation is greater than the predefined threshold, establishing synchronization with a second wireless device based on the accumulated cross-correlation (3408).

Figure 35:
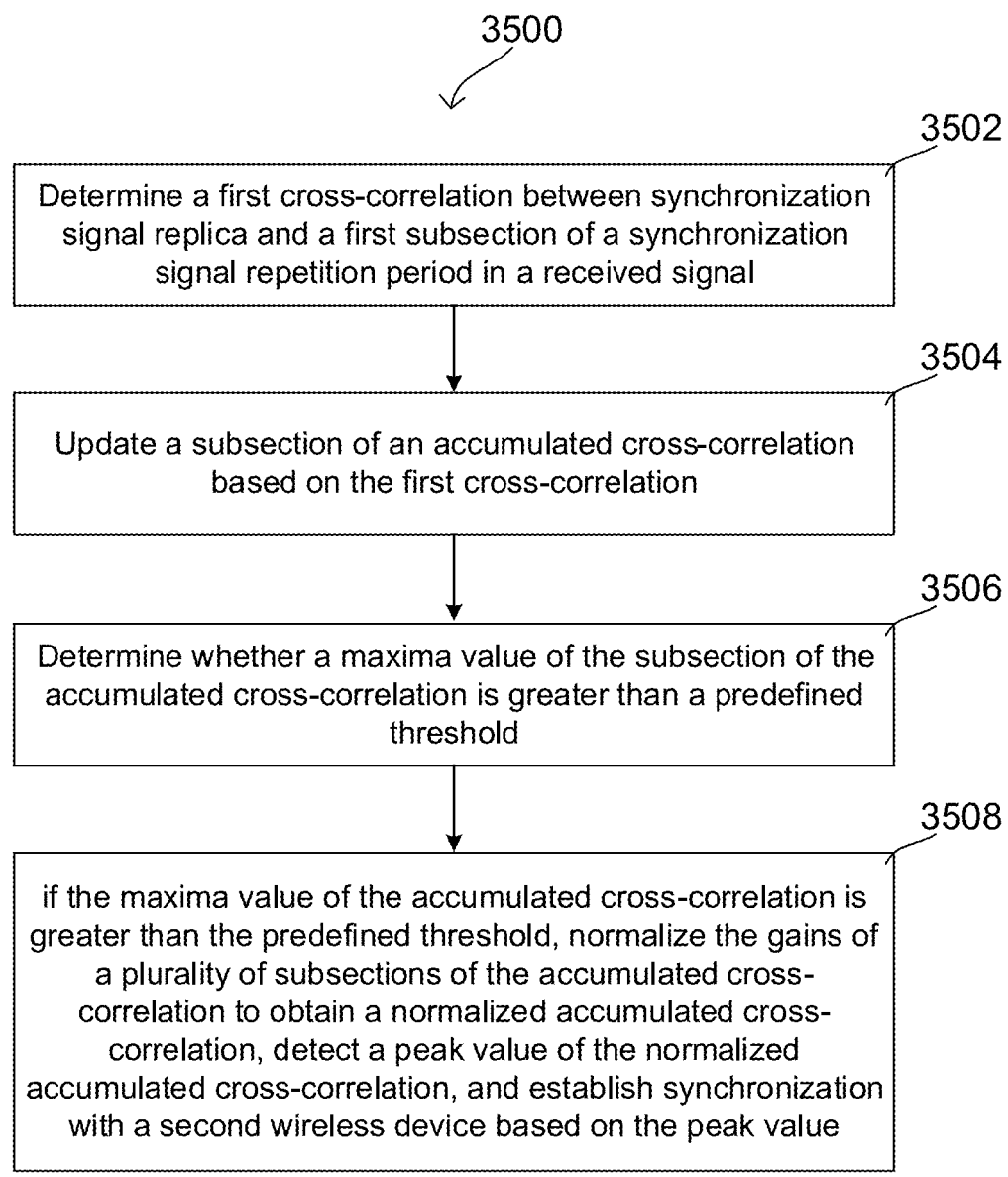

FIG. 35 shows exemplary method 3500 of wireless communication at a wireless device according to some aspects. Method 3500 includes determining a first cross-correlation between synchronization signal replica and a first subsection of a synchronization signal repetition period in a received signal (3502), updating a subsection of an accumulated cross-correlation based on the first cross-correlation (3504), determining whether a maxima value of the subsection of the accumulated cross-correlation is greater than a predefined threshold (3506), and if the maxima value of the accumulated cross-correlation is greater than the predefined threshold, normalizing the gains of a plurality of subsections of the accumulated cross-correlation to obtain a normalized accumulated cross-correlation, detecting a peak value of the normalized accumulated cross-correlation, and establishing synchronization with a second wireless device based on the peak value (3508).

Figure 36:
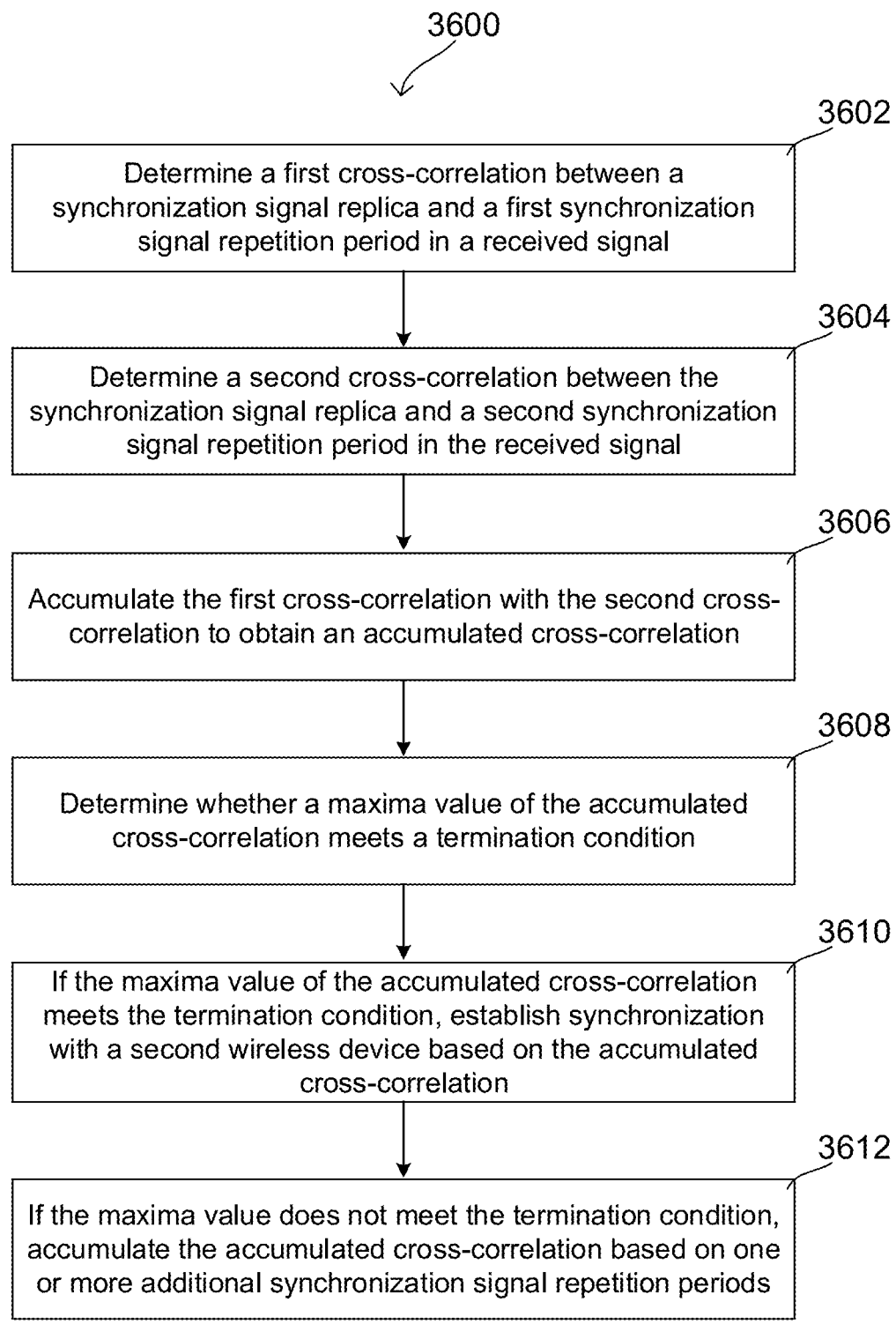

FIG. 36 shows exemplary method 3600 of wireless communication at a wireless device according to some aspects. Method 3600 includes determining a first cross-correlation between a synchronization signal replica and a first synchronization signal repetition period in a received signal (3602), determining a second cross-correlation between the synchronization signal replica and a second synchronization signal repetition period in the received signal (3604), accumulating the first cross-correlation with the second cross-correlation to obtain an accumulated cross-correlation (3606), determining whether a maxima value of the accumulated cross-correlation meets a termination condition (3608), if the maxima value of the accumulated cross-correlation meets the termination condition, establishing synchronization with a second wireless device based on the accumulated cross-correlation (3610), and if the maxima value does not meet the termination condition, accumulating the accumulated cross-correlation based on one or more additional synchronization signal repetition periods (3612).

Figure 37:
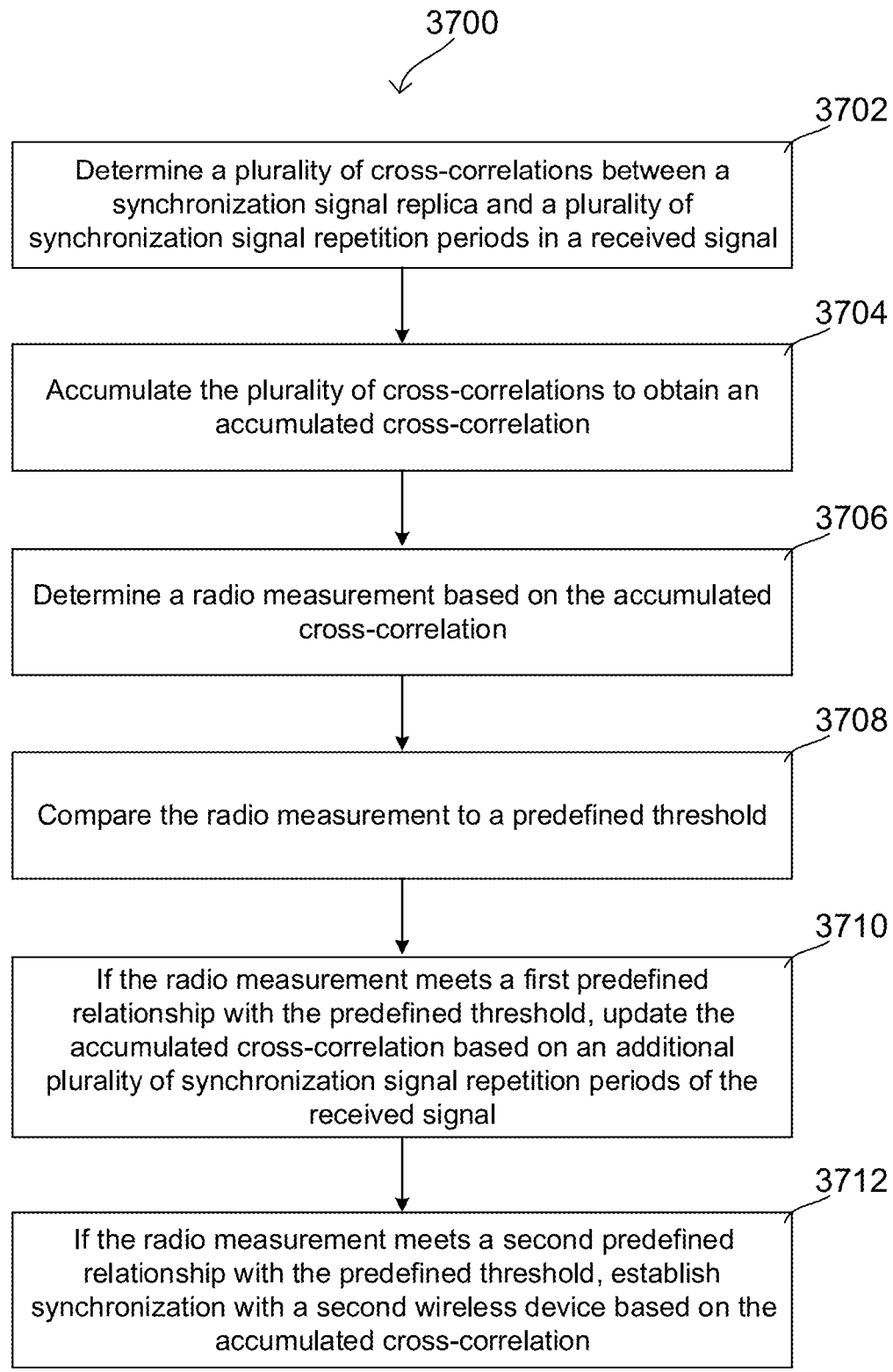

FIG. 37 shows exemplary method 3700 of wireless communication at a wireless device according to some aspects. Method 3700 includes determining a plurality of cross-correlations between a synchronization signal replica and a plurality of synchronization signal repetition periods in a received signal (3702), accumulating the plurality of cross-correlations to obtain an accumulated cross-correlation (3704), determining a radio measurement based on the accumulated cross-correlation (3706), comparing the radio measurement to a predefined threshold (3708), if the radio measurement meets a first predefined relationship with the predefined threshold, updating the accumulated cross-correlation based on an additional plurality of synchronization signal repetition periods of the received signal (3710), and if the radio measurement meets a second predefined relationship with the predefined threshold, establishing synchronization with a second wireless device based on the accumulated cross-correlation (3712).

Figure 38:
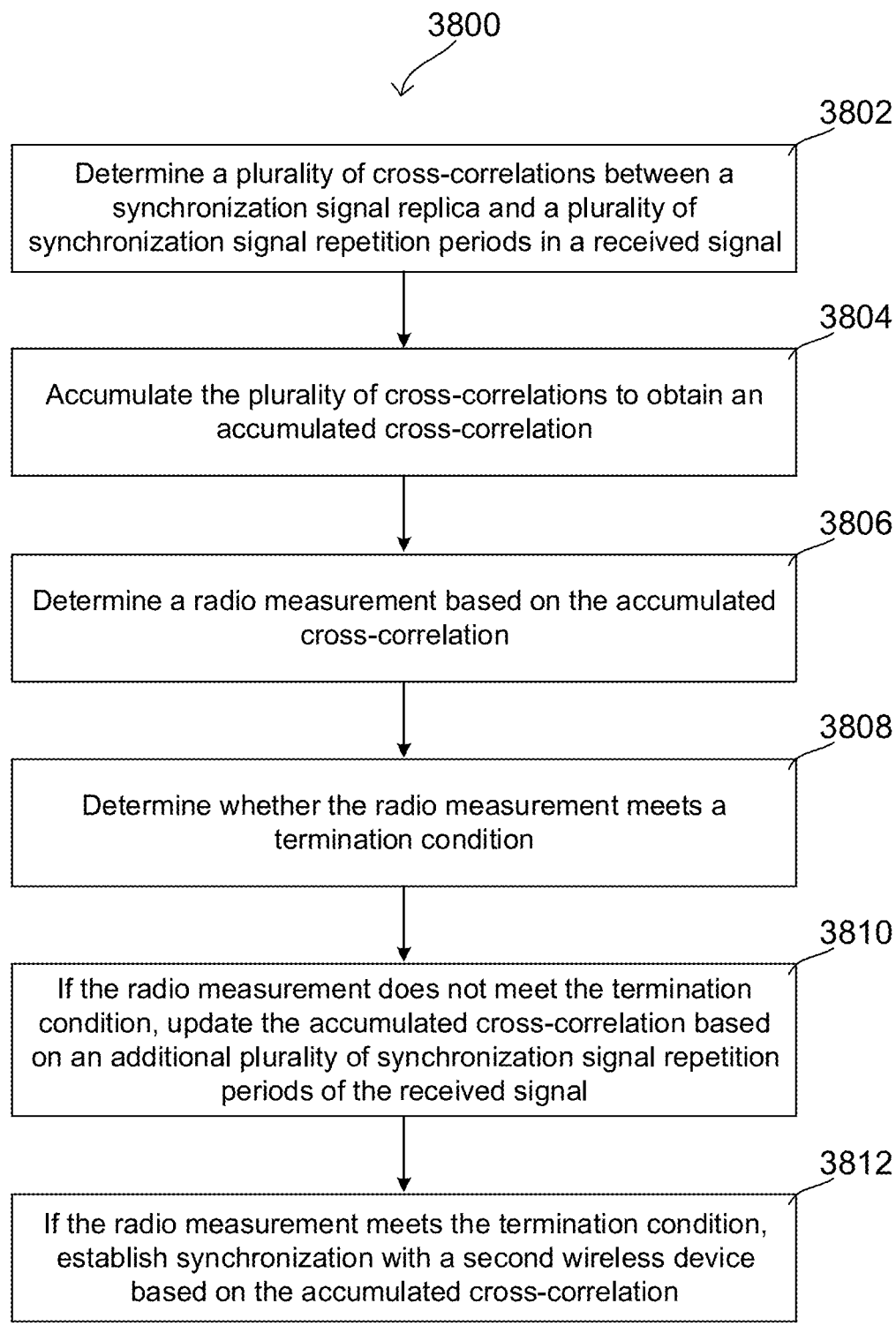

FIG. 38 shows exemplary method 3800 of wireless communication at a wireless device according to some aspects. Method 3800 includes determining a plurality of cross-correlations between a synchronization signal replica and a plurality of synchronization signal repetition periods in a received signal (3802), accumulating the plurality of cross-correlations to obtain an accumulated cross-correlation (3804), determining a radio measurement based on the accumulated cross-correlation (3806), determining whether the radio measurement meets a termination condition (3808), if the radio measurement does not meet the termination condition, updating the accumulated cross-correlation based on an additional plurality of synchronization signal repetition periods of the received signal (3810), and if the radio measurement meets the termination condition, establishing synchronization with a second wireless device based on the accumulated cross-correlation (3812).

Various aspects of this disclosure may relate to terminal or wireless devices configured for device-to-device (D2D) communications. Wireless devices may in certain aspects be configured to operate on centralized and/or decentralized networks. In some aspects, wireless devices operating in a decentralized D2D network may use a centralized network infrastructure for example including base stations for providing time and frequency synchronization and scheduling. In some aspects, wireless devices operating in a decentralized D2D network may rely on satellite-based synchronization sources (e.g., Global Navigational Satellite System (GNSS) satellites) or on other wireless devices (e.g., other wireless devices that broadcast synchronization signals synchronized with a satellite-based synchronization source or synchronized with their internal device clock) for synchronization.

Figure 39:
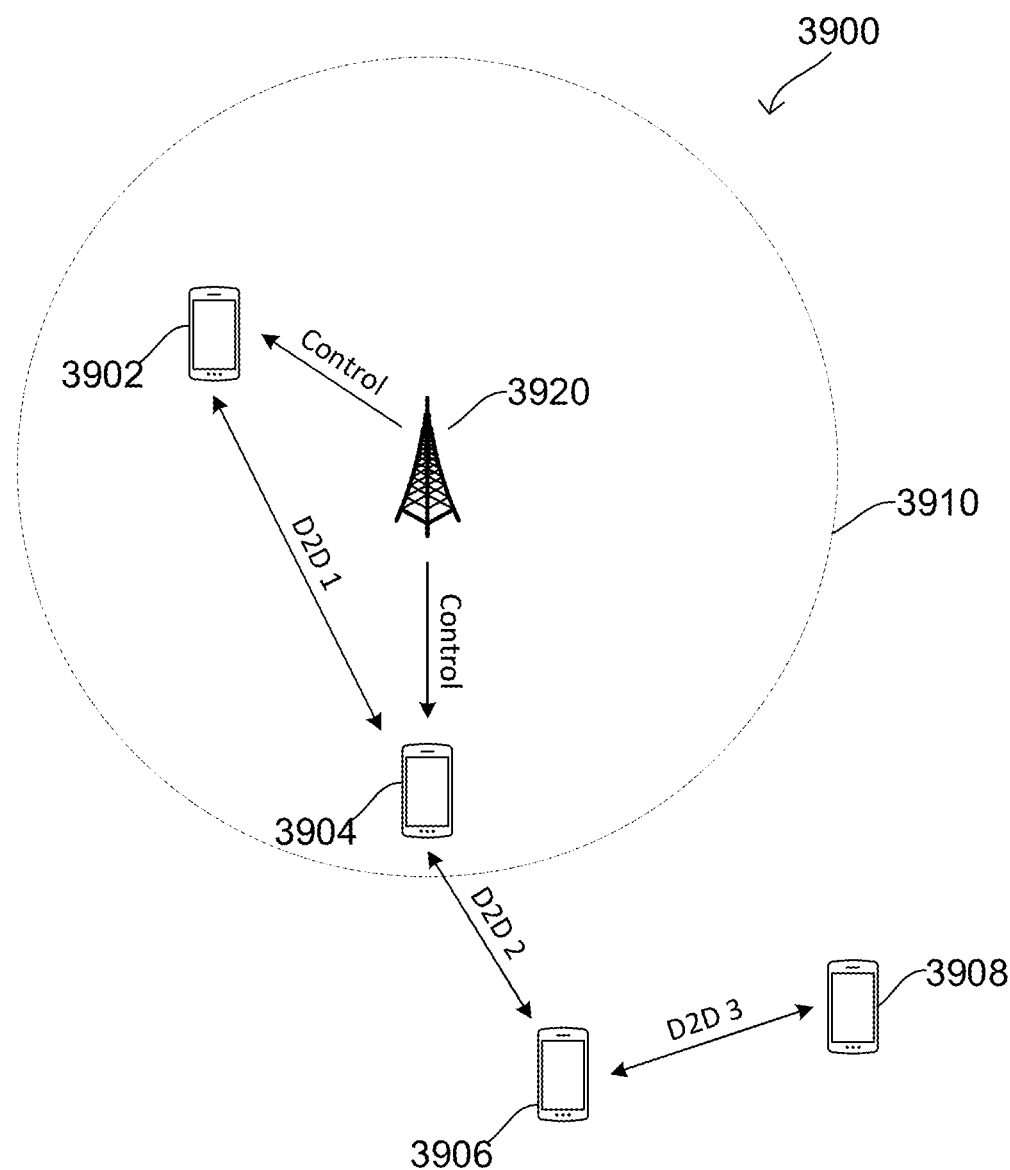
FIG. 39 shows an exemplary network where wireless devices are located within coverage of radio access node, and where wireless devices and are located out of coverage of network access node according to some aspects.

FIG. 39 shows exemplary network 3900 where wireless devices 3902 and 3904 are located within coverage 3910 of radio access node 3920 and where wireless devices 3906 and 3908 are located out of coverage 3910 of network access node 3920. As shown, wireless devices 3902 and 3904 may communicate via direct device-to-device (D2D) communication link D2D 1, whereby communications via this D2D link may fully or partially be controlled via the network access node 3920. Wireless devices 3904 and 3906 may communicate via a direct D2D communication link D2D 2, which may at least partially be controlled via the network access node 3920. Wireless devices 3906 and 3908 may form or be part of an autonomous D2D network and may communicate via D2D link D2D 3, where communications via this link may be fully controlled by any one or both of wireless devices 3906, 3908. In accordance with certain aspects, for example wireless device 3908 may communicate via relayed D2D communications e.g. with wireless device 3904, where wireless device 3906 may form a relay for such communications.

In some aspects, wireless devices 3906 and 3908 may be fully autonomous in terms of synchronization; in other words, wireless devices 3906 and 3908 may not use a cellular network for synchronization. In one example, wireless device 3906 may receive satellite-based synchronization signals, such as from one or more GNSS satellites. Wireless device 3906 may then synchronize its operations based on these satellite-based synchronization signals. Wireless device 3906 may then broadcast its own synchronization signals to other wireless devices. Wireless device 3908 may then receive these synchronization signals and synchronize its own operations with these synchronization signals. Wireless device 3908 may also act as a relay, such as by broadcasting its own synchronization signals (synchronized with those received from wireless device 3906) to other wireless devices. In another example, wireless devices 3906 and 3908 may not be in coverage of a satellite-based synchronization source such as GNSS. Wireless device 3906 may therefore use its own internal device clock (e.g., synchronized with coordinated universal time (UTC) and broadcast synchronization signals aligned with its internal device clock. Wireless device 3908 may receive these synchronization signals from wireless device 3906 and may align its operations with these synchronization signals. Wireless device 3908 may also act as a relay by broadcasting its own synchronization signals (synchronized with those received from wireless device 3906) to other wireless devices. Wireless devices in the D2D network may therefore maintain time and frequency synchronization without a centralized cellular network.

Figure 40:
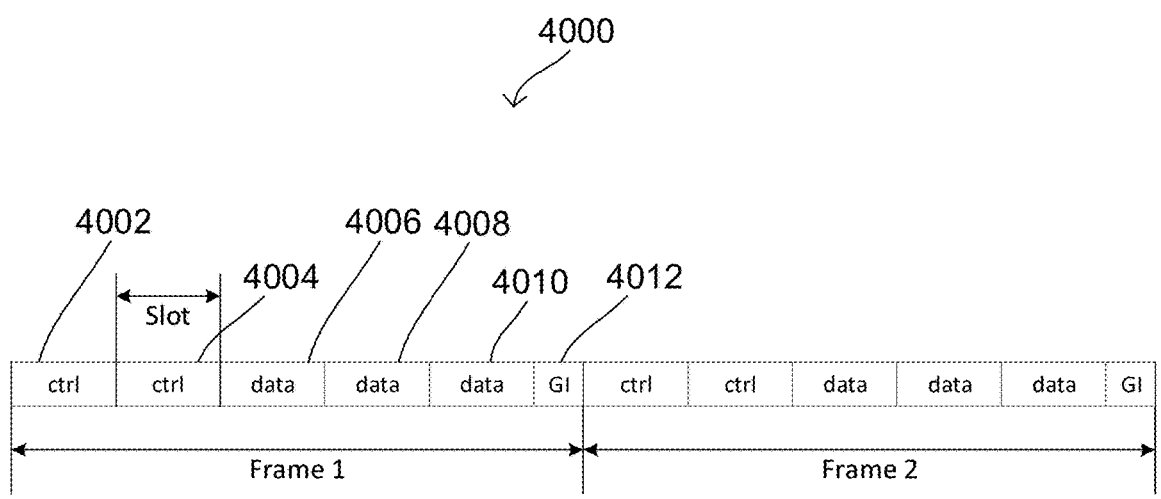
FIG. 40 shows an exemplary sequence of data transmission time slots including control data slots, data slots and a guard interval according to some aspects.

As shown in FIG. 40, in some aspects wireless devices may employ time-slotted communications, where a communication schedule is divided (e.g. on the physical layer) into frames that are each composed of multiple slots (data transmission time slots). FIG. 40 shows an exemplary sequence of data transmission time slots including control data slots 4002, 4004, data slots 4006, 4008, 4010 and a guard interval 4012. While various aspects of the present disclosure may employ control of D2D communications using a radio access node, the frame sequence of FIG. 40 may exemplarily represent a case where e.g. wireless devices 3906 and 3908 in FIG. 40 control a direct D2D communication link by exchanging control data with slots 4002, 4004.

For example, control information included in slots 4002, 4004 may be exchanged between wireless devices 3906 and 3908 to initiate communication. In such example, wireless device 3906 may first transmit control data to wireless device 3908 in slot 4002. In certain aspects, such control data may for example include a scheduling request, which may be a message to inform wireless device 3908 that wireless device 3906 is requesting to perform a data transmission in one or more upcoming slots or frames. In some aspects, such scheduling requests may identify wireless devices 3906 and 3908 (e.g. by device ID or link ID), may specify a number of upcoming frames and/or slots for the data transmission, and/or may specify an amount of data scheduled for the data transmission.

In some aspects, e.g. where the scheduling request identifies the amount of data to be scheduled for the data transmission, the number of slots and/or frames during which wireless device 3906 is granted permission to transmit data to wireless device 3908 may depend on a subsequent grant, which wireless device 3908 may determine based on estimated link conditions estimated and transmitted during slot 4004. In certain aspects, while the amount of data requested to be transmitted by wireless device 3906 may be predetermined, the data transmission may span a number of slots and/or frames depending on link conditions and any necessary retransmissions.

In some aspects, the scheduling request may include a transmit power control indication that enables wireless device 3906 to adapt its transmit power while still enabling wireless device 3908 to estimate the channel from a subsequent transmission e.g. including a reference signal that is transmitted at the same power. For example, in certain aspects, a control channel transmitted with slot 4002 may be divided in time into a scheduling part and a reference part. In such aspects, the reference part may include a reference signal, which may be a reference signal of a predefined format known to wireless devices 3906 and 3908 (e.g., a predefined signal sequence). In such aspects, wireless device 3908 may estimate the channel based on such reference signal included in the scheduling request. To this end, wireless device 3908 may perform channel estimation on the reference signal (e.g., by comparing the received signal sequence to the predefined signal sequence) to derive a channel estimate. The reference signal may in certain aspects be transmitted on a user-specific frequency such that the channel estimate may indicate radio conditions for example on said user-specific frequency, and may characterize the level of noise, interference, and/or other channel effects.

Based on the channel estimate, wireless device 3908 may then select a transport format for wireless device 3906 to use for generating the data transmission. In accordance with various aspects, a transport format may correspond to a set of parameters to be used to format data to be transmitted. Said data to be transmitted may in accordance with various aspects correspond to data received at the physical layer (layer 1 of the OSI model) from the data link layer (layer 2 of the OSI model). In other words, in accordance with various aspects, said data to be transmitted may correspond to source encoded data yet to be channel encoded based on a modulation and coding scheme as indicated by a respective transport format.

Channel coding, employing for example Turbo or Viterbi coding techniques, may in accordance with various aspects be employed for mitigating transmission errors which may be a result of channel conditions between wireless device 3906 and wireless device 3908. A code rate being a ratio between a number of information bits (e.g. layer-2 payload data) and a number of transmitted bits (physical channel or layer-1 data), the transmitted bits further including e.g. redundancy bits and padding bits may be adjusted for a transmission from wireless device 3906 to wireless device 3908 based on channel conditions estimated by wireless device 3908. For example, for high interference channel conditions, a code rate may be adjusted to be lower (higher redundancy and lower information bit rate) while a code rate may be set higher (lower redundancy and higher information bit rate) for low interference channel conditions. In accordance with various aspects, a transport format may correspond to a set of parameters including at least a 2-tuple of parameters with one parameter indicating a modulation scheme and one parameter indicating a (channel-)coding scheme for modulating and coding said data to be transmitted. Thus, a code rate may be implicitly be determined by choosing a specific modulation and coding scheme. As will be further described herein, in accordance with certain aspects, further parameters included in the parameter set of a transport format may include a transport block size, a number of data transmission slots and a number of subcarriers used for data transmission, the number of subcarriers for example being selected from 1, 3 or 12, whereby a set of all possible (or predefined) transport formats may be referred to as transport format set.

Referring back to FIG. 40. wireless device 3908 may generate a grant message (indication message) to indicate a transport format selected by wireless device 3908 based on the estimated channel to wireless device 3906 and may transmit the grant message to wireless device 3906 with a control channel transmitted using slot 4004. Having received said grant message from wireless device 3908, wireless device 3906 may generate a data transmission in accordance with the indicated transport format and may transmit the generated data transmission to wireless device 3908 with data transmission slots 4006, 4008 and 4010. While FIG. 40 only explicitly labels slots of the shown Frame 1 for conciseness, Frame 2 (and any further not shown frame) may include slots with functions corresponding to those described in the context of labelled Frame 1.

Figure 41:
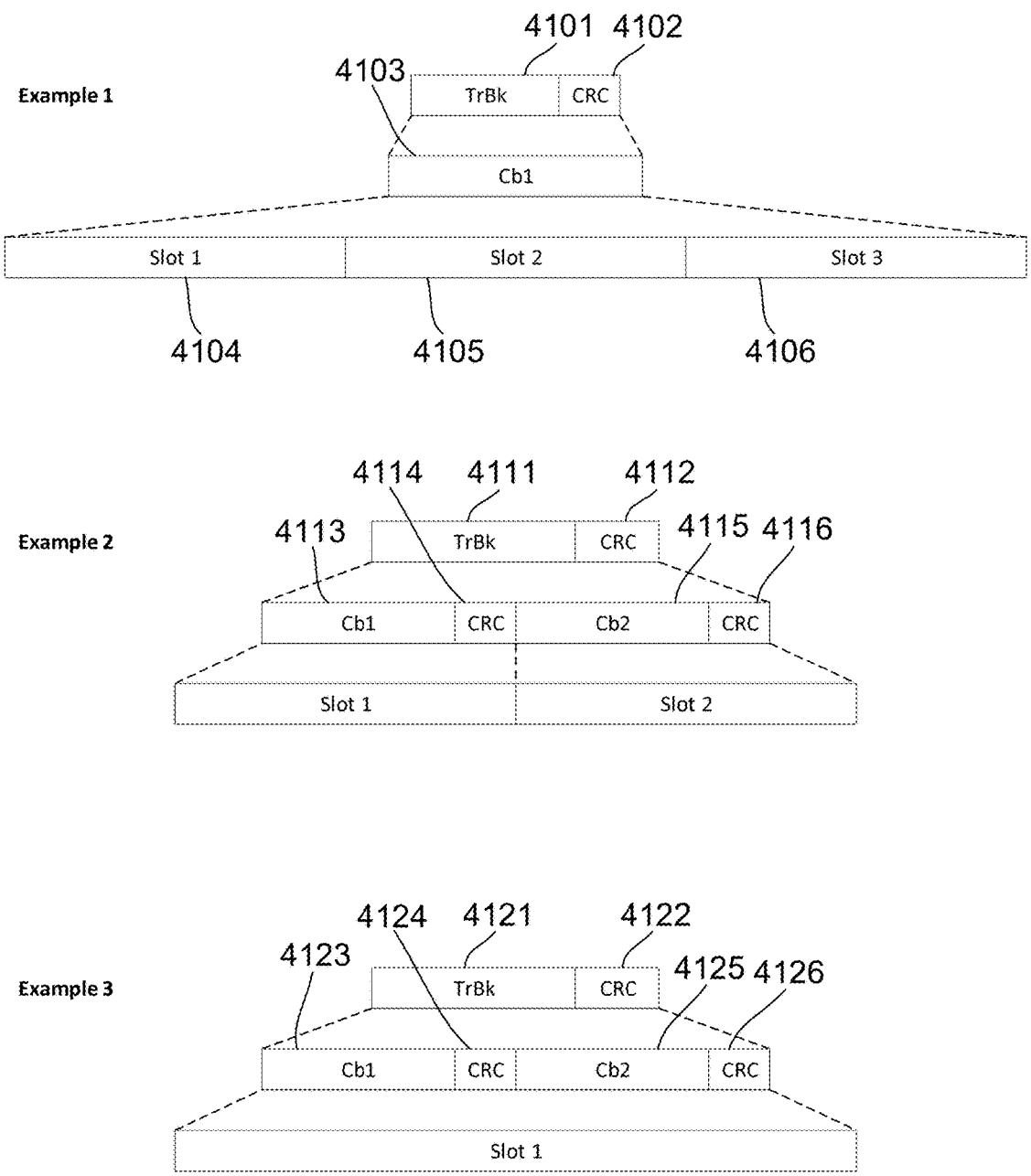
FIG. 41 shows examples of mapping of transport blocks to the physical channel according to some aspects.

FIG. 41 illustrates examples of processing of data to be transmitted. As shown in example 1 of FIG. 41, a transport block (TrBk) 4101 of payload data may correspond to data received from higher layers, e.g. source encoded data which is to be processed for physical layer data transmission. Said data is first mapped to the transport block 4101 of size N_tb. Different transport formats may have fixed transport block sizes. A transmitter may pad an initial payload so that the resulting payload is equal in size to the appropriate transport block size for the selected transport format.

After transport block mapping, redundancy bits 4102, e.g. cyclic redundancy (CRC) bits, are appended to the transport block 4101 which allow a receiver to determine whether transmission of transport block 4101 was successful. As shown in example 2 of FIG. 41, if a size of a transport block 4111 including redundancy bits 4112 exceeds a code block size which may in certain aspects be given by a channel coding technique employed, the transport block 4111 is segmented into smaller code blocks 4113, 4115, the sizes of which match a code block size supported by the employed channel coder. In example 1 of FIG. 41, no code block segmentation is employed because the size of the transport block 4101 including the redundancy bits 4102 is supported by the employed decoder and matches the size of code block 4103. In example 3, transport block 4121 with redundancy bits 4122 is segmented into code blocks 4123 and 4125. As further shown in FIG. 41, redundancy bits 4114, 4116 (example 2) and 4124, 4126 (example 3) are also attached to each respective code block, for a receiver to confirm if transmission of a corresponding code block was successful. Because transport block 4101 is mapped to only one code block 4103 (example 1), no additional redundancy bits are attached to code block 4103 (as there are already redundancy bits 4102 attached to transport block 4101 before code block encoding is performed). Conversely, because transport blocks 4111 and 4121 were mapped to multiple code blocks, redundancy bits 4114, 4116 (example 2) and 4124, 4126 (example 3) are attached to the respective multiple code blocks. In order to enable a transport block of arbitrary size to be segmented into code blocks, padding bits may in accordance with certain aspects be inserted into one or more code blocks in addition to the information bits (the payload data) such that for example code block 4103 of example 1 may in certain aspects include information bits of transport block 4101 (e.g. layer-2 payload data), redundancy bits 4102 and padding bits. At least one of code blocks 4113, 4115 of example 2 and at least one of code blocks 4123, 4125 of example 3 may similarly include padding bits (if necessary) to match the respective transport blocks 4111, 4121 and redundancy bits 4112, 4122 to the code block size employed.

After mapping transport blocks 4101 (example 1), 4111 (example 2) and 4121 (example 3) and the corresponding redundancy bits 4102 (example 1), 4112 (example 2) and 5223 (example 3) to respective code blocks 4103 (example 1), 4113, 4115 (example 2) and 4123, 4125 (example 3), channel encoding is applied to code blocks and the corresponding redundancy bits (the transport block redundancy bits 4102, 4112, and 4122). In accordance with various aspects, channel encoding may employ forward error correction techniques such as Turbo coding and/or Viterbi encoding. In some aspects, interleaving may also be applied before the channel encoding. In some aspects, the resulting coded data may be mapped to slots (e.g., including insertion of padding bits), producing the physical channel bits mapped to each slot. The resulting coded data (e.g. coded layer-2 payload data) may then be subjected to data modulation to transform the coded data to corresponding complex modulation symbols for physical channel data transmission to a receiver. In accordance with various aspects, modulation schemes to be employed may include Binary phase-shift keying (BPSK), Quadrature phase-shift keying (QPSK), pi/-QPSK, 4-Quadrature Amplitude Modulation (QAM), 16-QAM, 64-QAM, or a higher order modulation scheme.

Referring back to FIG. 41, example 1 shows an exemplary case where based on the given size of data to be transmitted (e.g. a transport block of layer-2 payload data) and a selected transport format defining parameters for formatting the data to be transmitted for the physical layer data transmission, the transport block 4101 is mapped to one code block 4103, which based on the employed (channel-) coding and modulation is mapped to three data transmission time slots 4104, 4105, 4106. Thus, mapping the single code block onto three slots, the transport format of example 1 results in a high redundancy which may lead to a robust transmission that may be applicable in strong interference scenarios. In example 2 of FIG. 41, one transport block is mapped to several (in the example, two) code blocks each of which is mapped to corresponding slots of a frame. In accordance with certain aspects, such mapping may enable adapting a number of bits to be transmitted within one frame by varying the number of slots. Example 3 corresponds to a modification of example 2 in that according to this example, several (in the example two) code blocks are mapped to a single slot. In certain aspects, example 3 may thus represent a compromise where more importance is attributed to a higher data-rate at the cost of a less robust transmission. Thus, a mapping in line with example 3 may be applicable to achieve a high data rate in a low interference scenario.

Figure 42:
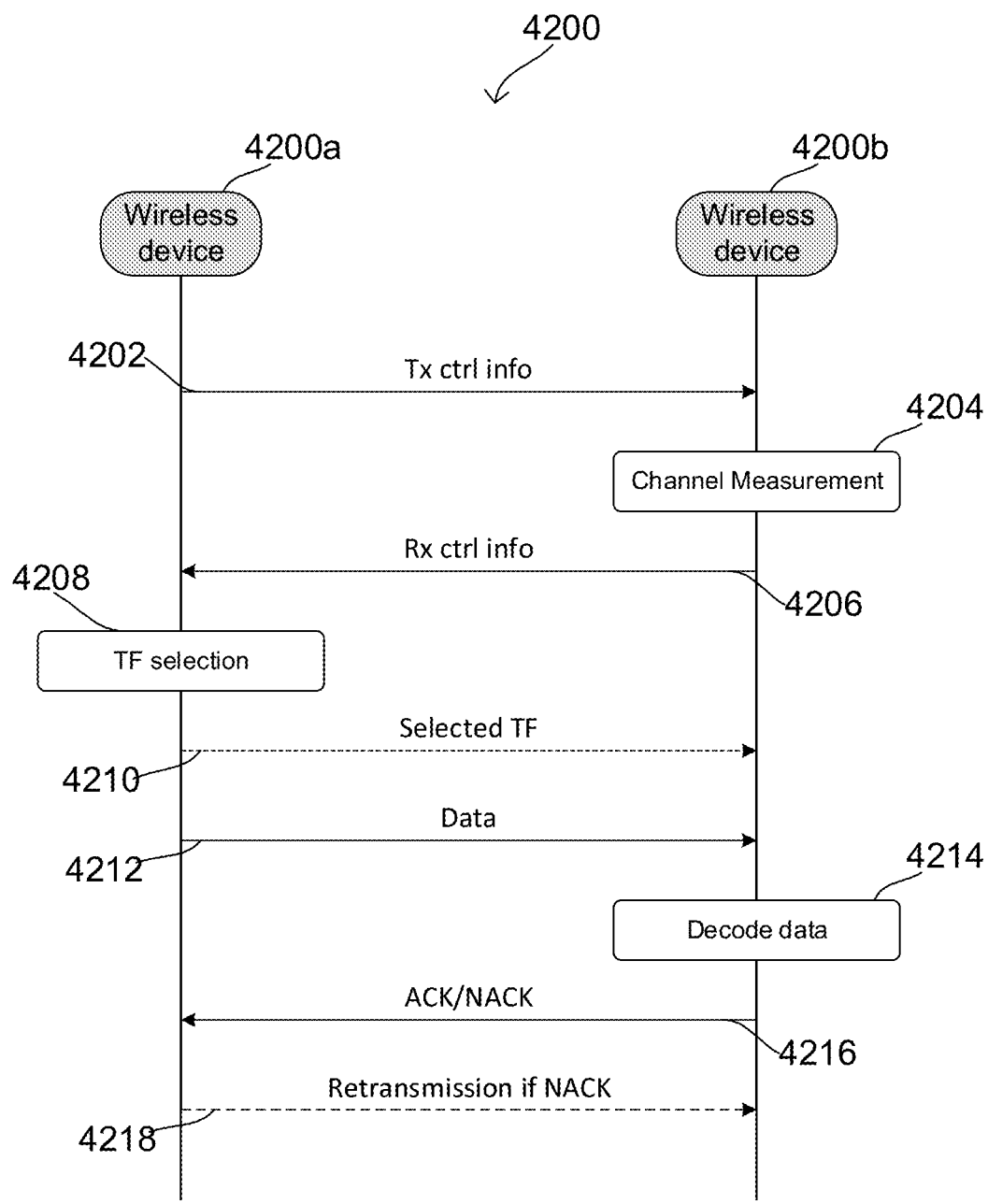
FIG. 42 illustrates an exemplary communication protocol for communication between a wireless device and a further wireless device in accordance with certain aspects.

FIG. 42 illustrates a communication protocol 4200 for communication between a wireless device 4200a and a wireless device 4200b (which may for example correspond to wireless devices 3906 and 3908 of FIG. 39) in accordance with certain aspects. At stage 4202, wireless device 4200a may transmit control information (Tx ctrl info) to wireless device 4200b for example with control data transmission time slot 4002 as illustrated in FIG. 40. By transmitting the control information at stage 4202, wireless device 4200a may inform wireless device 4200b of its intent to transmit data to wireless device 4200b. In some aspects, wireless device 4200a may not specify how much data it will transmit to wireless device 4200*b*. In accordance with certain aspects, this control information may correspond to or include a scheduling request and may be transmitted from wireless device 4200*a* to wireless device 4200*b* via a device-to-device communication link.

Having received the control information at stage 4202, wireless device 4200*b* may perform a channel estimation at stage 4204 based thereon. In certain aspects, wireless device 4200*b* may be configured to measure channel conditions between wireless device 4200*a* and wireless device 4200*b*, e.g. based on a reference signal included in the received control information. Based on the channel measurement, wireless device 4200*b* may determine a transport format, i.e. a set of parameters for formatting data requested to be transmitted by wireless device 4200*a* from wireless device 4200*a* to wireless device 4200*b*. The set of parameters may in accordance with various aspects include at least a 2-tuple of parameters with one parameter indicating a modulation scheme and one parameter indicating a coding scheme for modulating and coding of the data to be transmitted (e.g. a modulation and coding scheme, MCS). In certain aspects, wireless device 4200*b* may be configured to determine a maximum transport format, e.g. a maximum modulation and coding scheme that allows to achieve a desired quality of service (QoS). In other words, if a determined channel corresponds e.g. to high interference or is deteriorated because of different channel conditions, wireless device 4200*b* may determine a smaller transport format (e.g. indicating a lower code rate) with a higher redundancy. Contrarily, if a determined channel corresponds e.g. to low interference and high quality channel conditions, wireless device 4200*b* may determine a higher transport format (e.g. indicating a higher code rate) allowing for a higher data rate at the cost of a reduced robustness. In certain aspects, the determined transport format may determine a maximum number of information bits (e.g. layer-2 payload data) that may be transmittable per frame given a necessary redundancy to meet estimated channel conditions.

Having estimated the channel conditions at stage 4204, wireless device 4200*b* transmits control information (Rx ctrl info) to wireless device 4200*a* at stage 4206, which notifies wireless device 4200*a* of the determined transport format. For example, wireless device 4200*b* may transmit a grant message to wireless device 4200*a* including the determined transport format, the grant message being transmitted from wireless device 4200*b* to wireless device 4200*a* via a D2D communication link. In accordance with various aspects, the control message may be transmitted from wireless device 4200*b* to wireless device 4200*a* in slot 4004 as illustrated in FIG. 40.

Referring back to FIG. 42, having received the control information from wireless device 4200*b* at stage 4206, wireless device 4200*a* selects a transport format at stage 4208. Here, wireless device 4200*a* may be configured to employ the transport format notified by wireless device 4200*b* at stage 4206 irrespective of the actual amount of data N_tb that wireless device 4200*a* intends to transmit. In order to use the transport format notified by wireless device 4200*b*, wireless device 4200*a* generates padding bits to be transmitted in addition to the data to be transmitted of size N_tb. In an alternative configuration, wireless device 4200*a* may be configured to select a smaller transport format with a higher degree of redundancy. As in this case, wireless device 4200*b* is unaware of the transport format employed by wireless device 4200*a* for the data transmission, in this alternative configuration wireless device 4200*a* notifies the selected transport format to wireless device 4200*b* at stage 4210 before transmitting payload data (e.g. layer-2 payload data) coded and modulated based on the selected transport format to wireless device 4200*b* at stage 4212. The data transmission at stage 4212 may in certain aspects use slots 4006, 4008 and 4010 as illustrated in FIG. 40.

Referring back to FIG. 42, having received the data transmission at stage 4212, wireless device 4200*b* demodulates and decodes the received data and performs an error recognition test on the demodulated and decoded data. In other words, when decoding demodulated slots, wireless device 4200*b* may in accordance with certain aspects check if a decoded code block passes a cyclic redundancy test by referring to redundancy bits (e.g. CRC bits) appended to the decoded code block (e.g. to redundancy bits 4114 of example 2 in FIG. 41 after having decoded code block 4113). In case all code blocks included in transmitted data from wireless device 4200*a* are successfully decoded (e.g., in case all code block CRCs have passed), wireless device 4200*b* may check if a candidate transport block formed from the decoded code blocks is successfully received by referring to redundancy bits (e.g. CRC bits) appended to the candidate transport block (e.g. CRC 4102 appended to transport block 4101 in FIG. 41). If the candidate transport block formed from the decoded code block passes the test, wireless device 4200*b* may conclude that the candidate transport block was the actual transport block (transmitted by wireless device 4200*a*). Wireless device 4200*b* may therefore transmit a positive acknowledgement (ACK) to wireless device 4200*a* at stage 4216. If either any one of the code blocks has not been successfully received, or if the candidate transport block does not pass the error recognition test, wireless device 4200*b* may in accordance with various aspects be configured to transmit a negative acknowledgement (NACK) to wireless device 4200*a* at stage 4216. In accordance with various aspects, wireless device 4200*b* may in such case be configured to store the data received at stage 4212 (e.g., store the soft bits obtained from demodulating the received data). Further, in this case, wireless device 4200*a* may in accordance with various aspects be configured to transmit a retransmission at stage 4218, which wireless device 4200*b* may combine with the stored soft bits. Wireless device 4200*b* may then attempt another decode on the combined bits (combined from the data received at stage 4212 and stored with the data received with the retransmission at stage 4218). This process may in accordance with certain aspects be repeated until the data is correctly decoded (all error recognition tests are passed) or if the process timed-out (a correspondingly set timer is expired even if the data is not correctly decoded).

Thus, wireless device 4200*a* may either follow the suggestion of wireless device 4200*b* and may use the transport format as notified at stage 4206. With this configuration wireless device 4200*a* may employ a transport format too large for an actual amount of data to be transmitted. For example, if channel conditions are good, wireless device 4200*b* may suggest a transport format with high code rate even though wireless device 4200*a* may intend to transmit only little data such that wireless device 4200*a* may be forced to generate an undesirably large amount of padding bits which are transmitted to wireless device 4200*b* without carrying information or resulting in a more robust transmission. Such case may thus result in waste of system capacity and transmit power which for example in case of low power D2D wireless devices may not be desirable.

Alternatively, wireless device 4200*a* may select a lower transport format, which however, may need to be notified to wireless device 4200*b*. Such signaling to notify the selected transport format may consume overall system capacity and may consume power at wireless device 4200a. For example, if wireless device 4200a may intend to transmit only a small amount of data, such power consumption needed for the transmission of control information to notify the selected transport format may in certain aspects even exceed the power needed for subsequent data transmission.

Given this, various aspects of the present disclosure may reduce transmission time and power for transmitting a certain amount of payload (e.g. layer-2 payload data). Thereby, certain aspects of the present disclosure may help to reduce interference in the overall communication system such that an overall system capacity and amount of data exchangeable between wireless devices within the system can be increased. Various aspects may thus achieve an increase in reachable data rates and may lower transmission latencies.

In accordance with various aspects, a wireless device may indicate a group of transport formats to be used for a data transmission to a further wireless device. The wireless device may in certain aspects for example indicate the group of transport formats by indicating a maximum transport format to the further wireless device. As will be described further herein, the wireless device may in accordance with certain aspects further indicate a group of transport formats which all indicate a common modulation and coding scheme.

The further wireless device may be configured to select a transport format to use for the data transmission based on the indicated group of transport formats and matched to an amount of data to be transmitted. In accordance with various aspects, the further wireless device may avoid indicating the selected transport format to the wireless device and may instead start the data transmission based on the selected transport format. Power consumption by signaling the transport format may thus be avoided while signaling overhead and corresponding interference effects within the communication system can be reduced.

Receiving the data transmission from the further wireless device, the wireless device may in accordance with various aspects blindly or semi-blindly demodulate and decode the received signal based on candidate transport formats included in the group of candidate transport formats indicated to the further wireless device.

Figure 43:
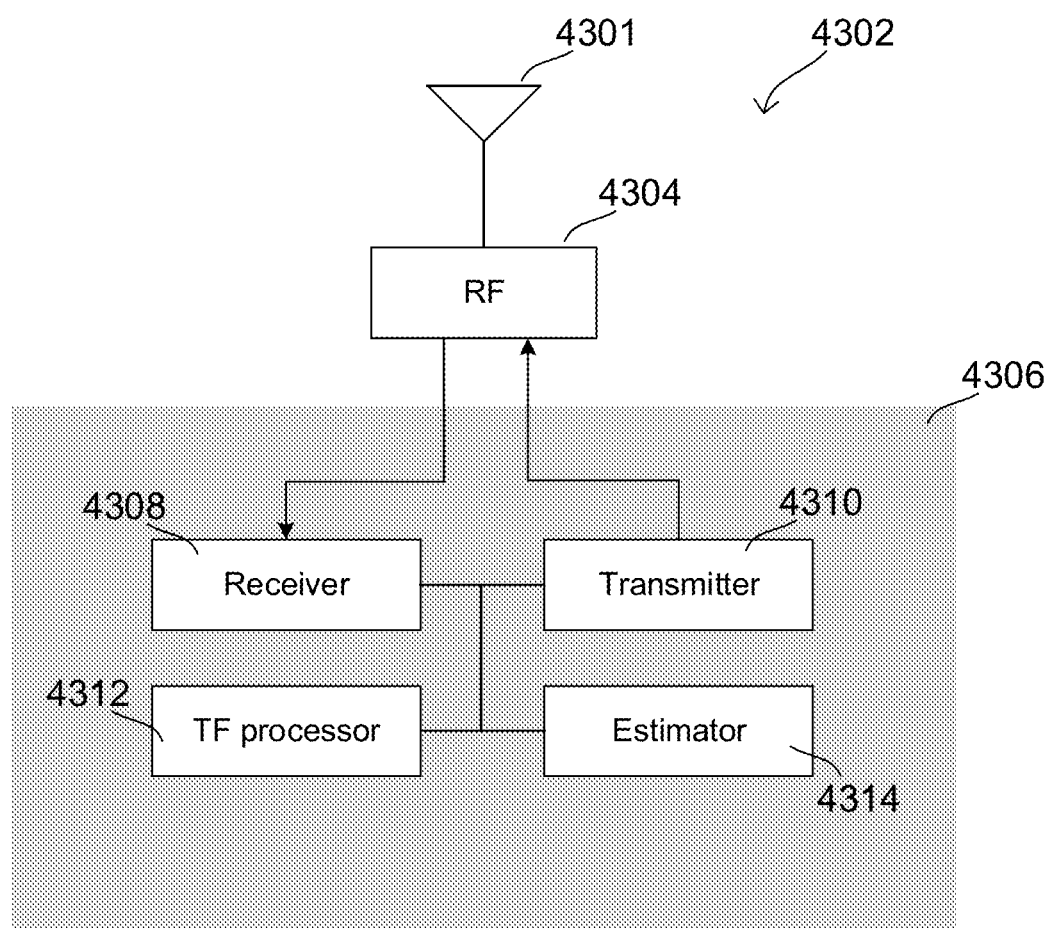
FIG. 43 shows an exemplary structural configuration of a wireless device in accordance with various aspects.

FIG. 43 shows an exemplary structural configuration of a wireless device 4302 in accordance with various aspects. The structural configuration shown in FIG. 43 is focused on link adaption features of wireless device 4302 and may therefore not expressly depict other components that are less directly related to these features. As illustrated, wireless device 4302 may include antenna system 4301, RF transceiver 4304, and baseband modem 4306. In some aspects, antenna system 4301, RF transceiver 4304, and baseband modem 4306 may be configured as described above for antenna system 202, RF transceiver 204, baseband modem 206 of terminal device 102. Accordingly, wireless device 4302 may be configured to transmit and receive wireless signals via antenna system 4301 and RF transceiver 4304. In the transmit direction, RF transceiver 4304 may therefore modulate and transmit baseband samples (provided by baseband modem 4306) via antenna system 4301. In the receive direction, RF transceiver 4304 may also receive and demodulate radio signals via antenna system 4301 and provide the resulting baseband samples to baseband modem 4306.

FIG. 43 also depicts several internal components of baseband modem 4306, including receiver 4308, transmitter 4310, transport format (TF) processor 4312 and estimator 4314. In some aspects, baseband modem 4306 may include a digital signal processor and a protocol controller. Receiver 4308, transmitter 4310, transport format processor 4312 and estimator 4314 may therefore be subcomponents of the digital signal processor (e.g., physical layer components) and/or subcomponents of the protocol controller (e.g., protocol stack components). In some aspects, receiver 4308 may be the physical layer receive chain, transmitter 4310 may be the physical layer transmit chain, while transport format processor 4312 and estimator 4314 may be part of the protocol stack layers of wireless device 4302. For example, receiver 4308 may include a demodulator, demapper (e.g., constellation demapper), de-interleaver, decoder, and/or descrambler. Receiver 4308 may receive wireless signals in the form of baseband samples via antenna system 4301 and RF transceiver 4304. Receiver 4308 may then sequentially process these baseband samples with the demodulator, demapper (e.g., constellation demapper), de-interleaver, decoder, and/or descrambler to produce a bitstream, which receiver 4308 may provide to transport format processor 4312, to estimator 4314, and/or to further processors controllers not expressly depicted. Transmitter 4310 may include a scrambler, encoder, interleaver, mapper (e.g., constellation mapper), and/or a modulator, which may sequentially process a bitstream (e.g., provided by protocol stack layers) to produce baseband samples (e.g., complex IQ symbols). Transmitter 4310 may then transmit these baseband samples as wireless signals via RF transceiver 4304 and antenna system 4301.

For example, in accordance with certain aspects, when receiving data to be transmitted (e.g. source encoded data) from the data link layer (layer-2 of the Open Systems Interconnection model, OSI, model), i.e. layer-2 payload data, the encoder of transmitter 4310 may encode (channel encode) the data to be transmitted (e.g. the layer-2 payload data), for example by employing a forward error correction (FEC) algorithm such as a Turbo code or a Viterbi code thus enabling control of errors occurring in the subsequent data transmission over a communication channel established between wireless device 4302 and a wireless device receiving the data transmission. Further, in accordance with certain aspects, subsequent to the channel encoding, the modulator of transmitter 4310 may modulate the channel encoded data (e.g. the coded layer-2 payload data, or the coded data to be transmitted) in accordance with a modulation scheme such as BPSK, QPSK, 4-QAM, 16-QAM, 64QAM, or a higher order modulation scheme to generate complex modulation symbols for data transmission.

In accordance with various aspects, modulator and encoder of transmitter 4310 may encode and modulate the data to be transmitted based on a transport format. In accordance with various aspects, a transport format set may include transport formats, where each transport format may correspond to a set of parameters for formatting data to be transmitted. In accordance with various aspects, said set of parameters may include at least a 2-tuple of parameters with one parameter indicating a modulation scheme and one parameter indicating a coding scheme for modulating and coding the data to be transmitted (e.g. the layer-2 payload data). In certain aspects, the set of transport formats may be predefined and may be stored at a memory of wireless device 4302. In accordance with various aspects, a set of parameters corresponding to a transport format may include further to the 2-tuple of parameters indicating a modulation scheme and a coding scheme further parameters indicating for example a transport block size, a number of subcarriers for data transmission (e.g. selected from 1, 3, 12 subcarriers) and a number of data transmission time slots used for the data transmission.

In accordance with certain aspects, demodulator and decoder of receiver 4308 may process a received data signal by demodulating and decoding the received data signal based on a transport format. For example, the demodulator may refer to the transport format and may demodulate the received data based on a modulation scheme (e.g. BPSK, QPSK, 4-QAM, 16-QAM, 64-QAM, or a higher order modulation scheme) indicated by a parameter of a set of parameters corresponding to the transport format. Likewise, the decoder may refer to the transport format and may decode the received data based on a decoding algorithm (e.g. a forward error coding algorithm such as a Turbo or Viterbi code) indicated by a parameter of a set of parameters corresponding to the transport format. In accordance with various aspects, the demodulator and decoder of receiver 4308 may jointly be referred to or may be implemented as one or more decoders. In accordance with various aspects, said one or more decoders may be configured to demodulate and decode a received data signal based on a transport format and may thus determine transmitted data (such as e.g. channel encoded and modulated transmit data, e.g. channel encoded and modulated layer-2 payload data) transmitted from a further wireless device to wireless device 4302.

In accordance with various aspects, the one or more decoders (e.g. the decoder and the demodulator of receiver 4308) may be configured to blindly or tentatively decode a received data signal by, for example, sequentially attempting demodulating and decoding the received data signal based on candidate transport formats included in a set of transport formats until determined transmitted data determined based on a candidate transport format passes an error recognition test, e.g. a cyclic redundancy check. In other words, in accordance with various aspects, the one or more decoders may be configured to determine transmitted data from a received data signal (e.g. to demodulate and decode data such as source encoded data, channel encoded and modulated layer-2 payload data, transmitted from a further wireless device to wireless device 4302) based on a first candidate transport format of a group of candidate transport formats. In accordance with various aspects, the group may correspond to a group indicated by an indication message which wireless device 4302 may in accordance with certain aspects transmit to the further wireless device. In other words, in certain aspects, wireless device 4302 may include a message generator which in certain aspects may correspond to or may be implemented as part of the transport format processor 4312 configured to generate an indication message to indicate a group of candidate transport formats of the transport format set. In accordance with certain aspects, transmitter 4310 of wireless device 4302 may be configured to transmit the generated indication message (e.g. included in or as a grant message in response to a scheduling request received from the further wireless device) to the further wireless device, e.g. via RF transceiver 4304 and antenna system 4301.

In accordance with various aspects, the one or more decoders may further be configured to determine whether or not the transmitted data determined based on the first transport format of the group of transport formats passes an error recognition test. In case that the transmitted data determined based on the first candidate transport format does not pass the error recognition test, the one or more decoders may be configured to determine transmitted data from the received data signal based on at least one further candidate transport format of the group of candidate transport formats (e.g., using a candidate transport format that maps a transport block to one more further slot than the initial candidate transport format). In certain aspects, this processing may continue by subjecting the transmitted data determined based on the at least one further transport format to the error recognition test, and by determining the transmitted data based on yet a further transport format of the group of transport formats if said data does not pass the error recognition test. As the transport formats in the group of transport formats use different numbers of slots (e.g., map the transport block to different numbers of slots), the one or more decoders may, for each additional transport format, attempt to decode the transport block from one additional slot. The one or more decoders may attempt to decode the transport block from progressively more slots until either the transport block is successfully decoded or until decodes have been attempted for all transport formats in the group of transport formats. If none of the transport formats yields a transport block that passes the error recognition test, the one or more decoders may send a NACK to the further wireless device. As further described below, the one or more decoders may then receive a retransmission of the initially received data signal, demodulate the retransmission and combine these demodulated bits with those of the initially received data signal, and then attempt to decode these combined bits according to the transport formats in the group of transport formats. The one or more decoders may continue until a transport format yields a successful error recognition test or until timeout occurs (e.g., until a maximum number of repetitions or a time-out is reached).

In accordance with various aspects, estimator 4314 may be configured to estimate a channel quality between wireless device 4302 and the further wireless device based on a received control data signal. Such control data signal may e.g. correspond to a scheduling request received from the further wireless device, e.g. via a device-to-device communication link. The estimator 4314 may in certain aspects be configured to perform the channel estimation based on the received control data itself or based on a reference signal known to wireless device 4302 and the further wireless device included in the received control information. Based on the received control data signal, the estimator 4314 may determine e.g. a signal-to-noise ratio (SNR), a signal-to-interference-plus-noise ratio (SINR), or a different metric representative of channel conditions between wireless device 4302 and the further wireless device.

While receiver 4308, transmitter 4310, transport format processor 4312 and estimator 4314 are shown separately in FIG. 43, in some aspects receiver 4308, transmitter 4310, transport format processor 4312 and estimator 4314 may structurally be a single processor configured to perform the respective operations of receiver 4308, transmitter 4310, transport format processor 4312 and estimator 4314.

Figure 44:
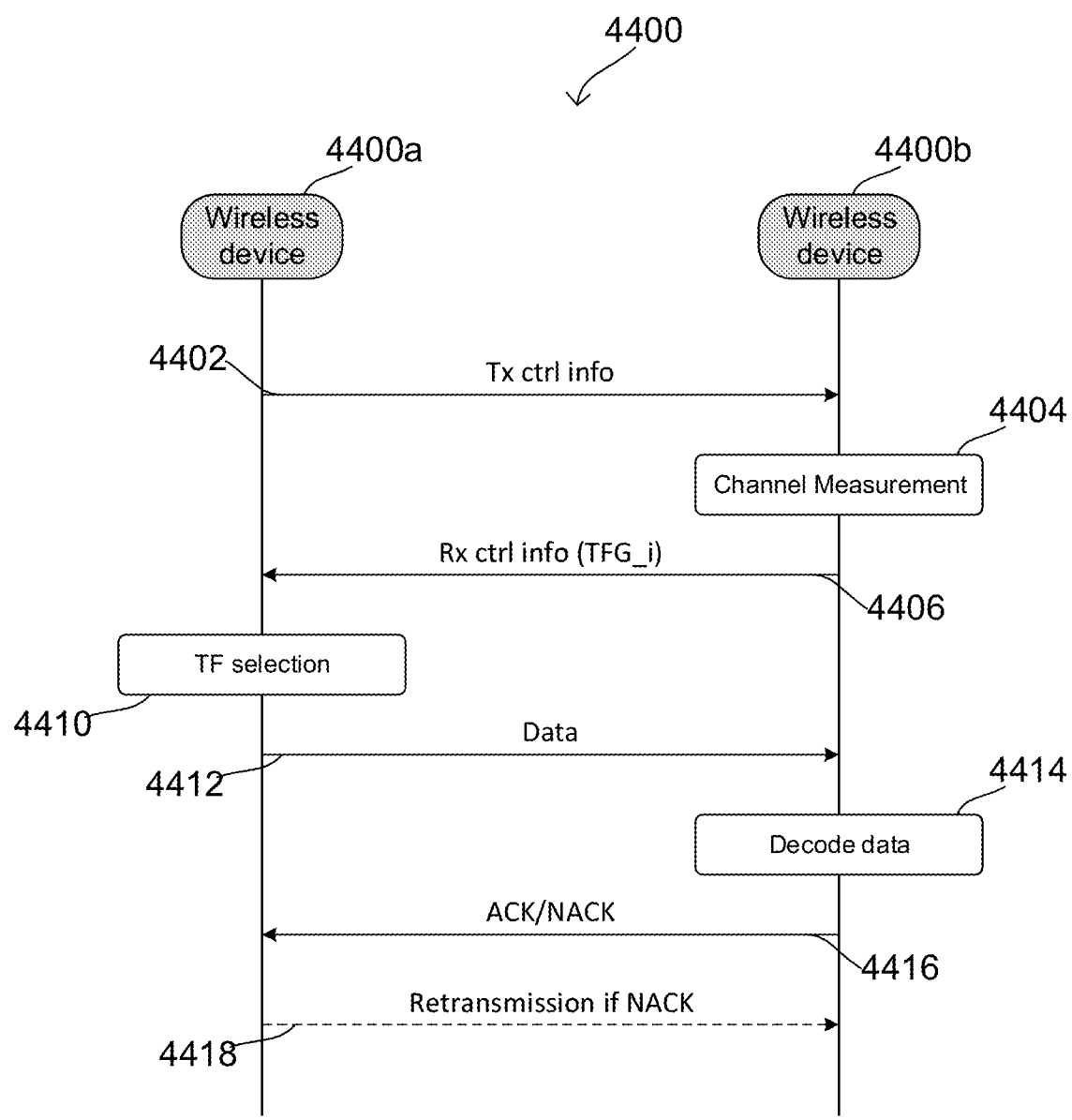
FIG. 44 illustrates an exemplary communication protocol that may be executed between wireless device and wireless device.

FIG. 44 illustrates exemplary communication protocol 4400 that may be executed between wireless device 4400a and wireless device 4400b, where wireless device 4400b may correspond to wireless device 4302 of FIG. 43 and wireless device 4400a may correspond to the further wireless device. As shown in FIG. 44, as in case of FIG. 42 above, at stage 4402, wireless device 4400a may transmit control information (Tx ctrl info) to wireless device 4400b for example with control data transmission time slot 4002 as illustrated in FIG. 40. By transmitting the control information at stage 4402, wireless device 4400a may inform wireless device 4400b of its intent to transmit data to wireless device 4400b. In accordance with certain aspects, the control information transmitted at stage 4402 may correspond to or include a scheduling request and may be transmitted from wireless device 4400*a* to wireless device 4400*b* via a device-to-device communication link. In other words, while link adaption as described herein may in accordance with various aspects be employable in various communication systems operating in accordance with various communication technologies, in accordance with various aspects, wireless device 4400*b* (corresponding to wireless device 4302) may include receiver 4308 configured to receive data (e.g. the control information at stage 4402) via a device-to-device communication link.

Having received the control information at stage 4402, wireless device 4400*b* may perform a channel estimation at stage 4404 with estimator 4314. In other words, in certain aspects, estimator 4314 may be configured to estimate a channel quality (e.g. SNR, SINR, or a different metric representative of channel conditions) based on the received control data signal (the control information received at stage 4402). Based on the estimated channel quality, a transport format processor 4312 of wireless device 4404 may be configured to determine a transport format, i.e. a set of parameters for formatting data to be transmitted from wireless device 4400*a* to wireless device 4400*b* (e.g. the data requested to be transmitted with control information transmitted from wireless device 4400*a* to wireless device 4400*b* at stage 4402) or a group of transport formats. In accordance with various aspects, the set of parameters corresponding to the determined transport format may include at least one parameter indicating a modulation scheme and one parameter indicating a coding scheme for modulating and coding of the data to be transmitted (e.g. a modulation and coding scheme, MCS).

For example, wireless device 4400*b* (e.g. the transport format processor 4312) may be configured to determine a maximum transport format, e.g. a maximum modulation and coding scheme (corresponding to a smallest redundancy) that allows to achieve a desired quality of service (QoS) for the transmission of data from wireless device 4400*a* to wireless device 4400*b*. In such example, if channel conditions estimated at stage 4404 correspond e.g. to high interference and/or noise, wireless device 4400*b* may determine a smaller transport format (e.g. indicating a lower code rate) with a higher redundancy. Contrarily, if channel conditions determined at stage 4404 correspond e.g. to low interference and/or noise, i.e. to good channel conditions, wireless device 4400*b* may determine a higher transport format (e.g. indicating a higher code rate) allowing for a higher data rate at the cost of a reduced robustness. In certain aspects, the determined maximum transport format may determine a maximum number of information bits (e.g. layer-2 payload data) that may be transmittable per frame given a necessary redundancy to meet estimated channel conditions. Further, in accordance with various aspects, the transport format generator may be configured to determine a group of transport formats, e.g. a group of transport formats which all indicate a same modulation and coding scheme and differ e.g. in a number of indicated data transmission slots.

With the determined transport format or the determined group of transport formats, in accordance with various aspects, a message generator of wireless device 4400*b* (e.g. corresponding to or implemented in transport format processor 4312) may be configured to generate an indication message to indicate a group of candidate transport formats of a transport format set. Transmitter 4310 of wireless device 4400*b* may then in certain aspects be configured to transmit the indication message (e.g. a grant message) to wireless device 4400*a* for example via a device-to-device communication link. Referring back to FIG. 44, thus, having estimated the channel conditions at stage 4404, wireless device 4400*b* transmits control information (Rx ctrl info) to wireless device 4400*a* at stage 4406 to indicate a group of candidate transport formats of a transport format set by means of said indication message. The indication message may for example identify the determined maximum transport format (e.g. by means of a signaled index) which may be indicative of a group of transport formats such as all transport formats included in the set of transport formats smaller (e.g. indicating a higher redundancy) or equal to the indicated maximum transport format. Further, in accordance with certain aspects, the indication message may indicate a group of candidate transport formats including the maximum transport format (e.g. by means of a transport format group index), all of the transport formats included in the group indicating a same parameter, e.g. a same common modulation scheme and indicating differing further parameters such as differing numbers of data transmission slots. In accordance with various aspects, the indication message may be transmitted from wireless device 4400*b* to wireless device 4400*a* in slot 4004 as illustrated in FIG. 40.

In accordance with various aspects, the indication message indicates a group of candidate transport formats out of which wireless device 4400*a* (the receiver of the indication message and transmitter of the scheduling request) may select a transport format based on which wireless device 4400*a* may format the data to be transmitted to wireless device 4400*b* (e.g. using slots 4006, 4008, 4010 in FIG. 40). For example, the indication message may indicate a maximum transport format within the set of transport format (e.g. indicating a minimum redundancy to be used for the data transmission) and wireless device 4400*a* may be configured to select any equal or smaller transport format (e.g. indicating the minimum redundancy or a redundancy higher than the minimum redundancy) than the transport format indicated by the indication message.

Further, in accordance with various aspects, the indication message may indicate the group as a group of transport formats based on a common parameter commonly included in the sets of parameters to which the transport formats included in the indicated group of transport formats correspond. For example, in certain aspects, all transport formats included in the indicated group of transport formats may correspond to sets of parameters which all include a common parameter indicating a same common modulation scheme. Further, for example, in certain aspects, all transport formats included in the indicated group of transport formats may correspond to sets of parameters which all include a common parameter indicating a same common modulation scheme and which all include a common parameter indicating a same common (channel) coding scheme. For example, in accordance with certain aspects, an indicated group of transport formats may consist of transport formats wherein each transport format corresponds to a set of parameters each of which include a parameter indicating a common modulation scheme which is the same for all transport formats included in the indicated group. Further, for example, in accordance with certain aspects, an indicated group of transport formats may consist of transport formats wherein each transport format corresponds to a set of parameters each of which include a parameter indicating a common modulation scheme which is the same for all transport formats included in the indicated group and each of which include a parameter indicating a common (channel) coding scheme which is the same for all transport formats included in the indicated group. In certain aspects, the indication message may indicate the group as a group of transport formats based on a common parameter commonly included in the sets of parameters to which the transport formats included in the indicated group of transport formats correspond, while transport formats included in the indicated group of transport formats may at least partially correspond to different numbers of data transmission time slots which include at least part of one coded block of data to be transmitted. In some aspects, all transport formats included in the indicated group of transport formats may use the same number of subcarriers.

In some aspects, transport formats in the indicated group of transport formats may differ in terms of the number of slots to which a single transport block is mapped. For example, the transport format group may include transport formats configured in the manner of example 1 in FIG. 41. The transport formats in this transport format group may each be a single transport block (with transport block redundancy bits) that is mapped to a single code block. The single code block may then be mapped to one or more slots, such as between 1 and $N_{max}$ slots where $N_{max}$ is a predefined parameter that controls the maximum number of slots to which a single transport block can be mapped. The transport formats in the transport format group may differ according to the number of slots; for example, a first transport format of the transport format group may map the transport block to one slot, a second transport format may map the transport block to two slots, and so forth up to an $N_{max}$-th transport format that maps the transport block to $N_{max}$ slots. Other transport format groups may have similar transport formats (each having a different number of slots) but may use different MCSs from the first transport format group. Another exemplary transport format group may include transport formats that each have a fixed number of slots (e.g., three slots) and the same modulation scheme but have different transport block sizes (TrBk). This means in practice that each transport format has a different code rate.

Another transport format group may be configured, for example, using the configuration of example 2 in FIG. 41. The transport formats in this transport format group may have a transport block that is mapped to multiple code blocks and each code block is mapped to its own slot. The number of code blocks (and number of slots each containing one code block) may vary between the various transport formats in this transport format group. For example, a first transport format may map the transport block to one code block and one slot, a second transport format may map the transport block to two code blocks and two slots, and so forth up to an $N_{max}$-th transport format that maps the transport block to $N_{max}$ code blocks and $N_{max}$ slots. Other transport format groups may have similar transport formats (each having a different number of slots) but may use different MCSs from the first transport format group.

Yet another transport format group may be configured using the configuration of example 3 in FIG. 41. The transport formats in this transport format group may have a transport block that is mapped to multiple code blocks (e.g., two) and multiple of these code blocks are mapped to each slot. The number of slots (each including, for example, the same number of multiple code blocks) may vary between the various transport formats in this transport format group. For example, a first transport format may map the transport block to two code blocks and one slot of two code blocks, a second transport format may map the transport block to four code blocks and two slots of two code blocks each, and so forth up to an $N_{max}$-th transport format that maps the transport block to $N_{max}$ slots with two code blocks each. While two code blocks per slot is used as an example, other transport format groups may have transport formats that use a different number of code blocks in each slot. Other transport format groups may have similar transport formats (each having a different number of slots) but may use different MCSs from the first transport format group.

Referring back to FIG. 44, having received the control information from wireless device 4400b at stage 4406, wireless device 4400a (e.g. a transport format processor of wireless device 4400a) may select a transport format at stage 4408. In accordance with various aspects, wireless device 4400a may be configured to select a transport format from the group of transport formats, which may be suitable for an amount of data that wireless device 4400a intends to transmit to wireless device 4400b. For example, when selecting a transport format from the indicated group of transport formats, e.g. a transport format processor of wireless device 4400a may be configured to select the transport format in order to minimize a number of padding bits that may need to be added to the data transmission when mapping a transport block of payload data (e.g. layer-2 payload data such as transport block 4101 in FIG. 41) to respective transmission time slots for data transmission. In other words, in certain aspects, wireless device 4400a may be configured to select a smallest possible transport format of the group of transport formats which allows transmission of the data that wireless device 4400a intends to transmit. In accordance with various aspects, wireless device 4400a may be configured to transmit only the number of data transmission time slots necessary for transmission of the data wireless device 4400a intends to transmit and may avoid to transmit a full frame (e.g. filled with padding bits in addition to the data wireless device 4400a intends to transmit).

Having selected the transport format at stage 4410, in accordance with various aspects, wireless device 4400a may not indicate the selected transport format to wireless device 4400b but may instead start data transmission (e.g. using slots 4006, 4008, 4010 in FIG. 40) at stage 4412 without specifying the employed transport format to wireless device 4400b. The data transmission at stage 4412 may in certain aspects use slots 4006, 4008 and 4010 as illustrated in FIG. 40. By avoiding a notification of the transport format from wireless device 4400a to wireless device 4400b, signaling overhead which may be caused by transmitting the notification as shown at stage 4210 of FIG. 42 may be avoided and power necessary for such notification at wireless device 4400a may be saved thus potentially increasing battery lifetime of wireless device 4400a. In addition, power necessary for processing and transmission of padding bits may also be saved which may further contribute to an overall reduction of power consumption both at wireless device 4400a and at wireless device 4400b. By reducing an amount of transmitted data by reducing an amount of padding bits to be transmitted, overall interference between wireless devices within a corresponding communication system may also be reduced.

Referring back to FIG. 44, having received the data transmission at stage 4412, receiver 4308 of wireless device 4400b (e.g. the one or more decoders corresponding to the demodulator and the decoder of receiver 4308) may be configured to demodulate and decode the received data signal to determine transmitted data (e.g., the transport block) therefrom. Receiver 4308 may further be configured to perform an error recognition test on the demodulated and decoded data (e.g. layer-2 payload data transmitted from wireless device 4400a to wireless device 4400b being determined from the received data transmission signal received at stage 4412).

While wireless device 4400b may know the transport format group, wireless device 4400b may not know which transport format was used by wireless device 4400a; in other words, wireless device 4400b may not know how many slots to which the transport block was mapped. In accordance with certain aspects, receiver 4308 may be configured to tentatively demodulate and decode the received signal using transport formats included in the set of transport formats until the determined data (e.g., a candidate transport block corresponding to one of the transport formats, such as a transport format that maps the transport block to one slot) passes the error recognition test. In other words, if transmitted data determined from the data signal received at stage 4412 does not pass the error recognition test when determined based on a first candidate transport format of the indicated group of transport formats, receiver 4308 may determine transmitted data from the data signal received at stage 4412 based on at least one further candidate transport format of the group of candidate transport formats indicated with the indication message (e.g., determine a candidate transport block based on a second candidate transport format, such as a transport format that maps the transport block to two slots). Because the transport formats in the group of candidate transport formats differ in the number of slots to which the transport block is mapped, this means that receiver 4308 may, for example, first attempt to decode the transport block using a candidate transport format that maps the transport block to one slot. If this is not successful, receiver 4308 may then attempt to decode the transport block using a candidate transport format that maps the transport block to two slots. Receiver 4308 may continue to attempt to decode the transport block using further candidate transport formats (each mapping the transport block to progressively more slots) until the transport block is successfully decoded or until decodes are attempted for all candidate transport formats in the group of candidate transport formats. Because wireless device 4400a used a transport format that mapped the transport block to between 1 and $N_{max}$ slots, wireless device 4400b may eventually attempt a decode with the correct transport format and may recover the originally transmitted transport block.

In accordance with certain aspects of the present disclosure, transport formats of the set of transport formats may be organized such that signal processing and memory necessary for the tentative demodulation and decoding may be reduced. In accordance with such aspects, the transport format set of possible transport formats may be sub-divided into N_tfg transport format groups (TFGs). Further, in such aspects, each transport format group (TFG_i) may include N_tf_i different transport formats. In accordance with various aspects of the present disclosure, each transport format within a transport format group may indicate one or more same common parameters. In accordance with various aspects, each transport format within a transport format group may correspond to a set of parameters with the one parameter indicating the modulation scheme indicating a common modulation scheme which is the same for all transport formats included in the indicated group. In certain aspects, each transport format within a transport format group may further correspond to a set of parameters with the one parameter indicating the coding scheme indicating a common coding scheme which is the same for all transport formats included in the indicated group, the group of transport formats thus corresponding to a same modulation and coding scheme. In such aspects, it may become possible that the program code (e.g., firmware on a DSP) is executed once, which lowers the instruction requirements (e.g., the number of executed instructions by the DSP) and saves power.

In accordance with various aspects, a modulation and coding scheme in accordance with examples 2 and 3 of FIG. 41 may be employed if channel conditions allow for a high (e.g. a highest) modulation and coding scheme corresponding to little redundancy. In these cases, entire (one or more) code blocks are mapped to one data transmission time slot. In this configuration, a data transmission time slot may be decoded self-contained as an error recognition test can be performed for each code block of the data transmission time slot without having to decode data from a subsequent slot. Further, in accordance with various aspects, a number of code blocks per slot is kept constant for a transport format such that transmission robustness is same for slots modulated and coded based on the transport format. In accordance with certain aspects, a total sum of physical channel bits of transport formats within a transport format group is selected to be smaller than a number of physical channel bits determined by a largest transport format of the set of transport formats. It may thus be possible that memory and decoding requirements correspond to a maximal data-rate and that only little overhead is required for tentative decoding.

Referring back to FIG. 44, in certain aspects wireless device 4400b may demodulate the received data signal at stage 4414 based on transport formats included in the group of transport formats indicated to wireless device 4400a at stage 4406. In accordance with various aspects of the present disclosure, the set of transport formats may be organized into groups of transport formats corresponding to respective sets of parameters with at least one common parameter which is same for all transport formats within the group. In certain aspects, this common parameter indicates a same modulation scheme for all transport formats within the group such that in these aspects, wireless device 4400b may demodulate the data signal received at stage 4412 based on the common modulation scheme of the group of transport formats indicated to wireless device 4400a at stage 4406.

After demodulating the received data signal, in accordance with various aspects, wireless device 4400b (e.g. receiver 4308 of wireless device 4400b) may be configured to decode individual data transmission slots of the demodulated data signal. For example, when a transport format indicated at stage 4406 indicates use of self-decodable slots (such as exemplified with examples 2 and 3 in FIG. 41), wireless device 4400b may be configured to individually decode individual code blocks of each slots. Thus, wireless device 4400b may for example be configured to decode a first code block of a first data transmission time slot and may be configured to determine whether or not the so determined transmitted data of the decoded code block passes a code-block error recognition test (e.g. a cyclic redundancy check using CRC bits such as CRC bits 4114, 4116, 4124 or 4126 of FIG. 41). In case the decoded data passes the error recognition test, wireless device may continue with the next code block and may in this way decode all code blocks of a data transmission time slot.

As mentioned further herein, when the transport formats of the set of transport formats are grouped as described further herein, a group of transport formats may correspond to a same modulation scheme while further parameters of respective transport formats may differ. For example, as previously indicated each transport format included in a group of transport formats may indicate a different number of data transmission time slots (also referred to herein as slots; for example, as in case of FIG. 41 each example indicates a different number of slots). Wireless device 4400*b* may therefore not know how many slots to which the transport block was mapped (but may, per the transport format group, know how many code blocks are mapped to each slot). Thus, wireless device 4400*b* may process received data based on a first candidate transport format using one slot (e.g., a first candidate transport format that maps the transport block to one slot) and may decode all code blocks included in said first data transmission time slot. Having decoded all code blocks of this first data transmission time slot, wireless device 4400*b* may treat the decoded data of the first transmission time slot as a candidate transport block (e.g., a candidate transport block according to the first candidate transport format). Wireless device 4400*b* may then determine whether this candidate transport block passes a transport block error recognition test (e.g. a cyclic redundancy check referring to CRC bits such as e.g. CRC bits 4102, 4112 or 4122 in FIG. 41). If the combined data of the first slot (the candidate transport block) passes the transport block error recognition test, wireless device 4400*b* may conclude that the first candidate transport format was correct, and that the transport block was mapped to only one slot and that the candidate transport block was the actual transport block. As the transport block is decoded, no further decoding is necessary.

However, if the candidate transport block fails the transport block error recognition test, this means that the transport format used by wireless device 4400*a* was different from the first candidate transport format. In other words, the transport format used by wireless device 4400*a* mapped the transport block to more than one slot. Wireless device 4400*b* may therefore store the decoded data of the first data transmission slot and may then process the received data signal based on at least one further candidate transport format (e.g. corresponding to two slots). Accordingly, wireless device 4400*b* may decode a second data transmission time slot (e.g., occurring immediately after the first data transmission time slot), which may include decoding the code block(s) in the second data transmission time slot (and performing code block error recognition tests on these code blocks, as applicable). Wireless device 4400*b* may then treat the decoded first and second data transmission time slots as a candidate transport block (according to the second candidate transport format, such as by concatenating the decoded bits of the first and second data transmission time slots) and may determine if the candidate transport block (the combined decoded data of the first and second data transmission time slots) passes the transport block error recognition test. If this candidate transport block passes the transport block error recognition test, wireless device 4400*b* may conclude that the second candidate transport format was correct, and that the candidate transport block was the actual transport block (and was mapped to two slots per the second candidate transport format). If the candidate transport block fails the transport block error recognition test, wireless device 4400*b* may attempt to decode the transport block using a third candidate transport format (that maps the transport block to three slots). Wireless device 4400*b* may continue in this manner until it identifies a candidate transport block (including decoded data from a number of data transmission time slots) that passes the transport block error recognition test or until wireless device 4400*b* has attempted to decode the transport block with all of the candidate transport formats in the group of candidate transport formats. If none of the group of candidate transport formats produced a candidate transport block that passed the transport block error recognition test, wireless device 4400*b* may transmit a NACK to wireless device 4400*a*. Wireless device 4400*a* may retransmit the transport block, and wireless device 4400*b* may demodulate the retransmission, combine the demodulated bits (e.g., soft bits) with the demodulated bits of the original transmission, and again try to decode combined bits according to each candidate transport format of the group of candidate transport formats. Wireless device 4400*b* may continue to send NACKs and retrieve retransmissions until the transport block is decoded successfully or until a timeout is reached (e.g., a maximum number of retransmissions or a timer expiry).

In some aspects, wireless device 4400*b* may be configured to transmit NACKs to wireless device 4400*a* depending on whether individual code blocks are decoded successfully. For example, FIG. 41 depicted several examples of how a transport block can be mapped to code blocks and slots. Examples 2 and 3 mapped the transport block to multiple code blocks (each mapped to an individual slot or sharing a slot with other code blocks) that each had respective redundancy bits. When wireless device 4400*b* attempts to decode the transport block according to a given candidate transport format, wireless device 4400*b* may attempt to decode the code blocks in each slot of the candidate transport format. Wireless device 4400*b* may check whether each code block was decoded successfully by evaluating its redundancy bits according to a code block error recognition test. If wireless device 4400*b* determines that decode failed for a given code block, wireless device 4400*b* may store the demodulated bits from the initial decode and transmit a NACK to wireless device 4400*a* in stage 4216. In some aspects, wireless device 4400*b* may indicate which code blocks failed in the NACK, and wireless device 4400*a* may only retransmit these code blocks. Wireless device 4400*b* may store the demodulated bits of these code blocks from the initial decode attempt, combine the retransmitted demodulated bits with the demodulated bits from the initial decode, and then attempt another decode of the code block with the combined bits. Wireless device 4400*b* may transmit another NACK if this second decode attempt is unsuccessful; otherwise wireless device 4400*b* may proceed with the decode attempt on the transport block (e.g., using the other code blocks and slots per the candidate transport format). Because wireless device 4400*a* retransmits only the failed code blocks, only the affected slots are transmitted. This can save power during retransmissions as well as reduce data transmissions, which may be a cause of interference for data transmissions of different wireless devices. In other aspects, wireless device 4400*b* may not indicate which code blocks failed in the NACK, and wireless device 4400*a* may retransmit the entire transport block. Wireless device 4400*b* may then combine the demodulated bits (e.g., soft bits) from the initial transmission with the demodulated bits from the retransmission (e.g., combine all of the demodulated bits, or only combine the demodulated bits from the failed code blocks) and attempt another decode using these combined bits.

As described, in accordance with various aspects, a group of transport formats may be chosen to have at least one parameter such as a modulation scheme and/or a coding scheme in common which is same for all transport formats of the group (where the transport formats in each group of transport formats differ in how many slots each transport block is mapped to). In accordance with various aspects, such organization of a set of transport formats may be pre-configured and may be known to wireless devices 4400*a* and 4400*b* in advance such that an indication message transmitted at stage 4406 may for example include an index to indicate the group of transport formats. In accordance with various aspects, a group of transport formats may further include a predefined default candidate transport format. In accordance with certain aspects, the predefined default candidate transport format may be the same for all groups, while in accordance with further aspect, default candidate transport formats may be predefined for each groups and may be differ among groups. In accordance with various aspects, the default candidate transport format indicates a size of a transport block meeting a predefined size criterion. For example, in accordance with various aspects, the size of the transport bock indicated by the default candidate transport format may be chosen so that the smallest message defined in a communication system can still be transmitted. In accordance with various aspects, the default candidate transport format may indicate use of only one slot. Thus, in such aspects, decoding received data based on the default candidate transport format may use a code-rate lower than a code-rate of further transport formats included in the group of transport formats. According to various aspects, wireless device 4400b may be configured to process received data based on the predefined default candidate transport format in addition to further transport formats included in the group of transport formats described further herein. In this way, it may in various aspects become possible to reduce e.g. transmission power required for transmission of small data packets from wireless device 4400a to wireless device 4400b such that battery power may further be saved.

Figure 45:
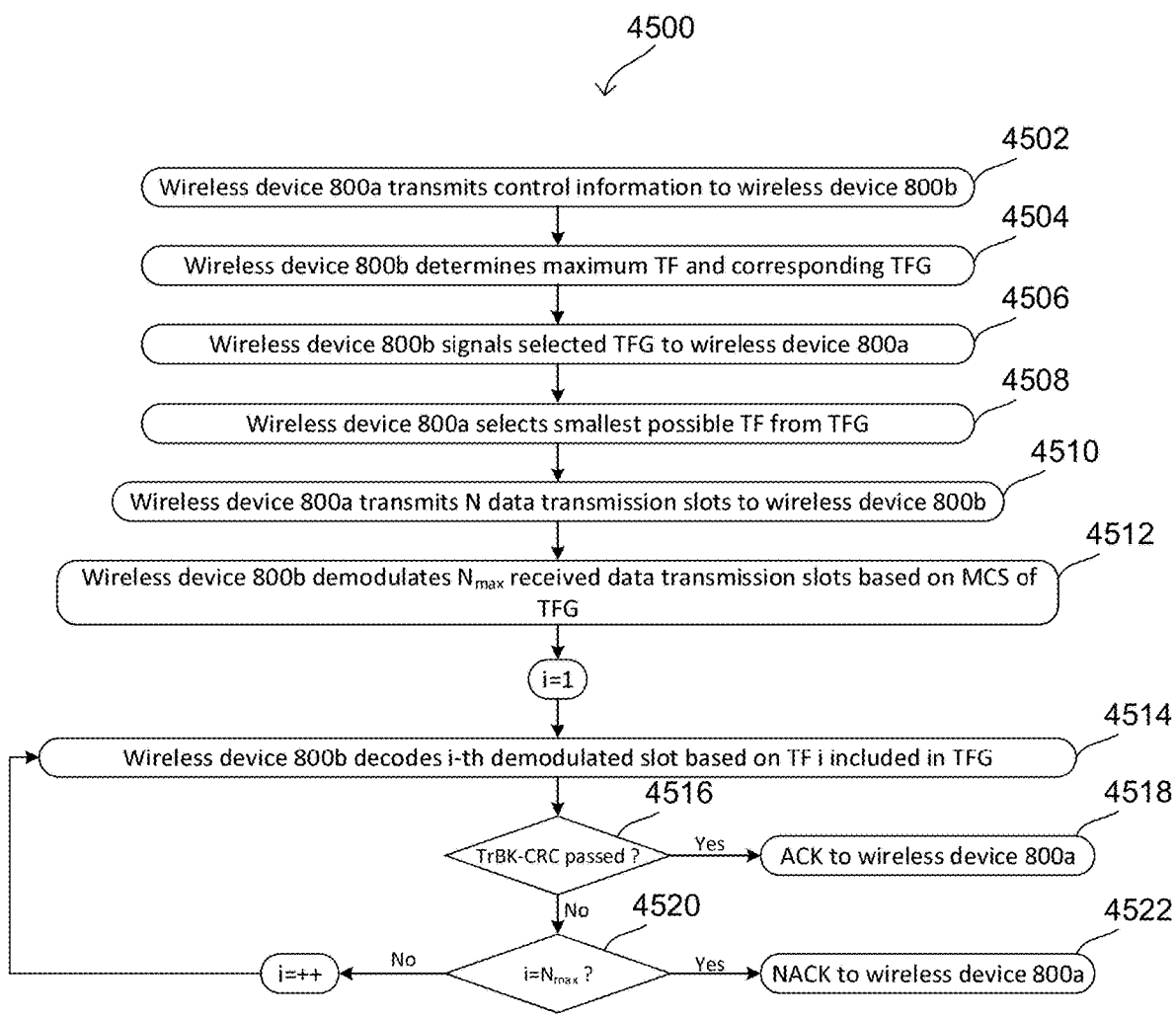
FIG. 45 shows an exemplary method according to which wireless devices may communicate in accordance with various aspects.

FIG. 45 shows exemplary method 4500 according to which wireless devices 4400a and 4400b may communicate in accordance with various aspects. Wireless device 4400a may at stage 4502 transmit control information, e.g. a scheduling request, to wireless device 4400b to inform wireless device 4400b of its intent to transmit data to wireless device 4400b. Wireless device 4400b may perform a channel estimation based on the received control information at stage 4504 and may determine a maximum transport format and a corresponding transport format group. In accordance with various aspects, transport formats included in the group may all share a common parameter which indicates a same modulation scheme for all transport formats included in the group of transport formats, but may differ in terms of how many slots each transport block is mapped to. In addition, the group of transport formats may further include the predefined default candidate transport format. Wireless device 4400b may transmit an indication message to wireless device 4400a to indicate the determined group of transport formats at stage 4506. Wireless device 4400a may then select at stage 4508 a transport format suited for the size of data to be transmitted from wireless device 4400a to wireless device 4400b. In case that wireless device 4400a intends to transmit only little data of a size corresponding e.g. to the smallest size of data that may be transmitted within the communication system, wireless device 4400a may select the predefined default candidate transport format. Otherwise, wireless device 4400a may select a transport format for example to minimize an amount of padding bits required to be used for transmission of payload data (e.g. layer-2 payload data) wireless device 4400a intends to transmit. While avoiding to inform wireless device 4400b of which transport format is selected, e.g. by means of a respective message, wireless device 4400a transmits the transport block with a transport format that maps the transport block to N data transmission time slots (e.g. modulated and coded layer-2 payload data) to wireless device 4400b at stage 4510.

Wireless device 4400b will not know the transport format and will therefore not initially know how many data transmission time slots were transmitted by wireless device 4400a. Having received the data signal from wireless device 4400a, wireless device 4400b may demodulate at stage 4512 $N_{max}$ slots based on the modulation scheme (or the modulation and coding scheme, MCS) of the transport format group signaled to wireless device 4400a at stage 4506, where $N_{max}$ is the maximum number of slots available for wireless device 4400a to transmit (e.g., a predefined value). Wireless device 4400b may then attempt to decode the transport block from these demodulated slots (where wireless device 4400b is initially unaware of the transport format and thus unaware of how many of the slots the transport block was mapped to). Wireless device 4400b may first attempt to decode the transport block using a first candidate transport format that maps the transport block to a single slot. Accordingly, at stage 4514, wireless device 4400b may attempt to decode a first slot of the demodulated data. Depending on the specific transport format group, the first slot may contain one code block (e.g., example 2 in FIG. 41), multiple code blocks (e.g., example 3 in FIG. 41), or part of a code block (e.g., example 1 in FIG. 41). In cases such as examples 2 and 3 where each slot includes individually-decodable code blocks, wireless device 4400b may check whether each code block in the slot was successfully deduced based on a code block error recognition test. If decoding of one or more code blocks of the first slot does not succeed (error recognition test not passed), wireless device 4400b may transmit a NACK to wireless device 4400a requesting retransmission of the transport block (e.g., part or all of the transport block). Wireless device 4400b may store the demodulated bits of the failed code blocks. In some aspects, the NACK may request that wireless device 4400a retransmit the entire transport block, while in other aspects the NACK may request that wireless device 4400a exclusively retransmit the failed code blocks. After receiving the retransmission, wireless device 4400b may demodulate the retransmission and combine the stored demodulated bits of the failed code blocks from the original transmission with the corresponding demodulated bits of the retransmission. Wireless device 4400b may then check whether the combined bits of this code block pass the error recognition test. If not, wireless device 4400b may request another retransmission. Conversely, if the error recognition test was successful, wireless device 4400b may conclude that the code block was successfully decoded. Wireless device 4400b may continue until all code blocks of the i-th slot are successfully decoded.

At stage 4516, wireless device 4400b determines if the decoded first slot (where the code blocks of first slot have been successfully decoded) passes a transport block (TrBK) error recognition test. Because the first candidate transport format maps the transport block to one slot, wireless device 4400b may therefore treat the decoded first slot as a candidate transport block (e.g., a candidate transport block from the first candidate transport format) and check whether this candidate transport block passes the transport block error recognition test (e.g., using the redundancy bits of the candidate transport block). If the candidate transport block passes the error recognition test, wireless device 4400b transmits an acknowledgement (ACK) to wireless device 4400a at stage 4518. If the candidate transport block (the determined transmitted data) does not pass the error recognition test, wireless device 4400b may check whether all $N_{max}$ slots have been considered for decoding the transport block. If not, wireless device 4400b may return to stage 4514 and attempt to decode the transport block using another candidate transport format in the group of candidate transport formats (e.g., a second candidate transport format that maps the transport block to two slots). If all $N_{max}$ slots have been considered for decoding the transport block, wireless device 4400b may conclude that there was an error, and may transmit a NACK to wireless device 4400a in stage 4522. This may request for wireless device 4400a to retransmit the transport block. Wireless device 4400b may then use the stored demodulated bits from the original transmission along with the demodulated bits from the retransmission (e.g., by combining the soft bits) to attempt to decode the transport block using each of the candidate transport formats in the group of candidate transport formats.

As described immediately above, if at stage 4520 it is determined that less than $N_{max}$ slots have been considered as forming the transport block (i<$N_{max}$), wireless device 4400b may return to stage 4514 and may attempt to decode the transport block according to another candidate transport format. As this candidate transport format may map the transport block to one additional slot, wireless device 4400b may then repeat the above-described procedure using the first and second slots, namely by demodulating this next slot and attempting to decode the code blocks in this next slot (e.g., individually). Wireless device 4400b may transmit NACKs to wireless device 4400a if any of the decoded code blocks fail the error recognition test, and may combine stored demodulated bits for the corrupted code blocks with demodulated bits from the retransmission. Once wireless device 4400b has successfully decoded all code blocks in this next i-th slot, wireless device 4400b may check whether all i decoded slots form a candidate transport block that passes the transport block error recognition test. For example, wireless device 4400b may combine the decoded code blocks (e.g., by concatenating) of all i decoded slots to form a candidate transport block and determine whether this candidate transport block passes the transport block error recognition test in stage 4516. If so, wireless device 4400b may transmit an ACK to wireless device 4400a in stage 4518. If not, wireless device 4400b may check whether the current number i of decoded slots is equal to the maximum number $N_{max}$ of slots in a transport block in stage 4520. If so, wireless device 4400b may transmit a NACK to wireless device 4400a in stage 4522. If not, wireless device 4400b may return to stage 4514 and attempt to decode the next i-th slot, combine this next slot with the decoded (i-1)-th slots to form a candidate transport block, and check whether this candidate transport block passes the transport block error recognition test. As explained in detail herein, by avoiding signaling a selected transport format from wireless device 4400a to wireless device 4400b, and by adjusting a selected transport format size to an amount of payload to be transmitted to reduce an amount of transmitted padding bits, transmission time and power may be reduced. By reducing the overall amount of data to be transmitted by reducing an amount of padding bits to be transmitted and by avoiding control signaling to inform 4400b of the selected transport format interference in the overall communication system may be reduced. Thus, it may therefore become possible to improve an overall system capacity or amount of transmitted data of all users in the system. In addition, it may become possible to reduce battery power necessary at wireless device 4400a for transmission of data and at wireless device 4400b for demodulation and decoding processing of the data. This again may result in increased battery life time. As compared to a fully blind decoding at wireless device 4400b, use of grouping of transport formats of the transport format set as described herein may help to reduce required signal processing such that it may become possible to reduce size of corresponding processing units and required memory. It may thus become possible to achieve a smaller chip area which may help to reduce production costs.

According to some aspects, methods and devices are provided for enhancing the timing of the synchronization process between two or more devices when there is no external timing source available, e.g. not connected to any network access nodes. The timing between a master wireless device (i.e. master device or source device) and one or more slave wireless devices (i.e. one or more slave devices) can be important to the synchronization procedure. Not being able to achieve the proper timing accuracy when there is no external timing source (e.g. a network access node, GNSS timing source, etc.) available can be detrimental to achieving the desired standards in order to effectively exploit the D2D communications over wider coverage areas, e.g. up to 2 km. Accordingly, in cases where there is no external timing source available to provide the necessary timing, such as for devices are located in a "decentralized" network, the required detection of synchronization sequences over longer distances and/or at higher SNRs may not be attainable without additional measures.

For D2D communications in unlicensed frequency bands such as the low industrial, scientific, and medical (ISM) band at 902 MHz or at the 2.4 GHz ISM band, frequency hopping may be implemented in order to minimize the disturbance to other users and technologies in the same bands. If a transmitting D2D device is configured to apply frequency hopping in its transmissions, the receiving D2D device can tune its radio frequency (RF) receiver to the frequency to coincide with that of the transmitting D2D device at the appropriate times. The time unit during which the transmitter and/or receiver must be tuned to each frequency, i.e. the time period at which the communications are sent at each frequency before a "hop" to the next frequency of the frequency hopping pattern, may be referred to as $T_{frame}$. Accordingly, it can be important for devices in D2D communications to change their respective transmission/reception frequencies in a synchronized manner. In order to achieve a synchronous switch of the RF frequency, the devices that want to communicate can execute a synchronization procedure. This synchronization can be achieved by an external synchronization source that is available to both devices such as a network access node and/or GNSS in centralized network scenarios. However, those external synchronization sources may not be available all the time; for example, a GNSS signal may only be available in an outdoor scenario while it may not be available in an indoor environment. Therefore, a manual synchronization between the devices without the use of external synchronization sources may be required for effective communications.

Figure 46:
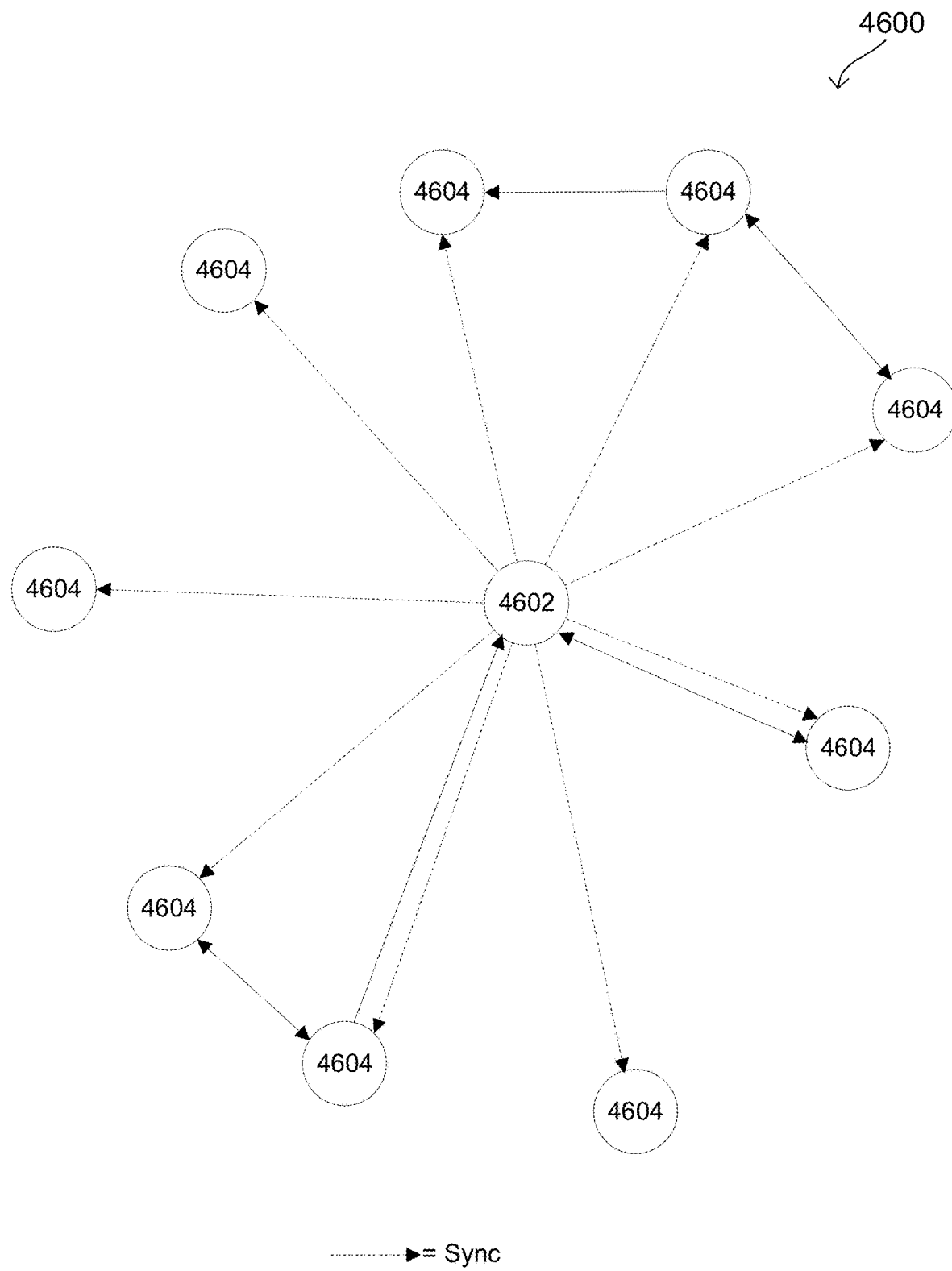
FIG. 46 shows an exemplary diagram illustrating a communication scenario in a decentralized D2D communication network according to some aspects.

FIG. 46 shows a diagram 4600 illustrating an exemplary communication scenario in a decentralized D2D communication network where the master device (i.e. source device) 4602 broadcasts synchronization signals to one or more other devices 4604 within its proximity. Some of these devices may then engage in D2D communication with one or more other devices 4604 and/or master device 4602. While there are nine other devices 4604 are shown in diagram 4600, there may be any number of devices (i.e. 1, 2, 3, etc.) within coverage of master device 4602 and therefore capable of performing D2D communications in the decentralized network. It is appreciated that diagram 4600 is exemplary in nature and may therefore be simplified for purposes of this explanation.

The timing synchronization between two devices in existing D2D standards, for example in Bluetooth, works as follows. A first device (i.e. a slave device) 4604 attempting to synchronize its timing to the timing of another device (i.e. a master device) 4602 performs a scan for a synchronization sequence that is transmitted from the master device 4602. The master device 4602 transmits $N_{sync\_frame}$ number of synchronization sequences on the same hopping frequency, i.e. a first frequency of the plurality of frequencies used in the hopping pattern. Afterwards, the master device 4602 changes to the next hopping frequency from a predefined pseudo random pattern and transmits $N_{sync\_frame}$ number of synchronization sequences again. This predefined hopping pattern is known at each of the devices and includes the duration of the synchronization sequences transmitted on each frequency and the order of the frequency hopping pattern. The transmission of each single synchronization sequence will be done at a fixed timing interval compared to the timing of the master device 4602. The time interval and the time instant at which the synchronization sequences are sent by the master device 4602 are known to the slave device (s) 4604 a-priori as well as is the sequence of hopping frequencies that is used by the master device 4602.

Figure 47:
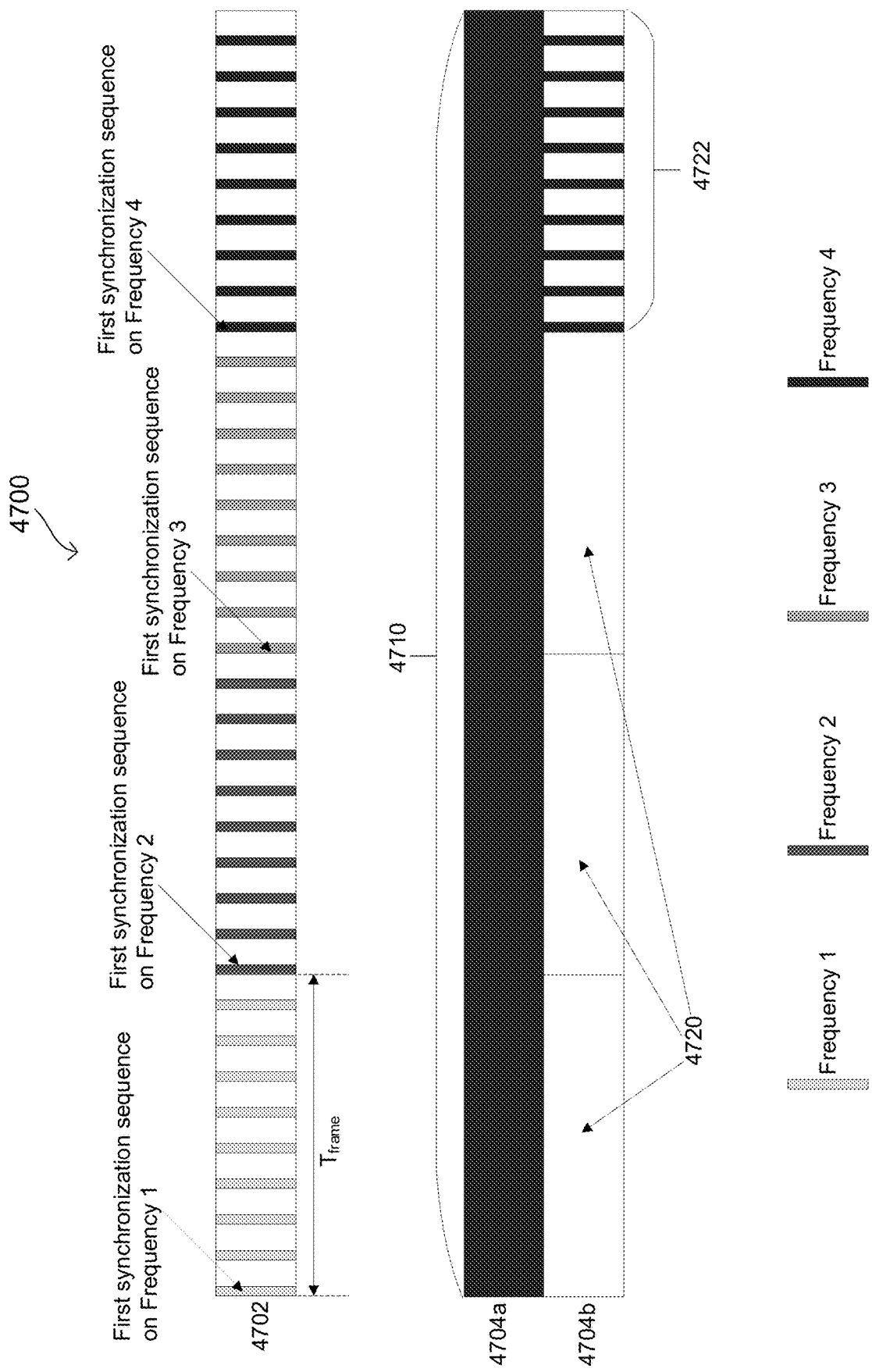
FIG. 47 shows an exemplary diagram illustrating the transmission of synchronization sequences by a source device (i.e. master device) and RF receiver behavior at a wireless device (i.e. slave device) and received synchronization sequences according to some aspects.

In order to synchronize to the master device 4602, the slave device (s) 4604 may scan for the synchronization sequence for a certain period of time, i.e. a scan window. For the duration of the scan window, the slave device 4604 will stay on a single hopping frequency. The duration of the scan window spans at least the time period that is needed by the master device 4602 to transmit the synchronization sequence on all hopping frequencies of the pre-defined hopping sequence that are used for the synchronization procedure. This guarantees that the slave device 4604 receives the synchronization sequence from the master device 4602 up to $N_{sync\_frame}$ times during the scan window. Once a slave device 4604 detects the synchronization sequence, it is able to derive the timing of the master device 4602 from the known time instances at which the master device 4602 performs the transmission of the synchronization sequences and the hopping frequency used during the scan window. Such a procedure is shown in FIG. 47.

The top sequence 4702 in diagram 4700 shows a transmission of synchronization sequences transmitted by a master device. The first synchronization sequence of the first frame is indicated. Each color for each series of synchronization sequences per $T_{frame}$ is indicative of a frequency of the frequency hopping pattern (i.e. four frequencies shown).

The bottom sequence consists of two parts, a first part 4704a showing the frequency at which the RF receiver of the slave device is tuned to, and a second part 4704b showing the effectively received synchronization sequences by the slave device. It is appreciated that diagram 4700 is exemplary in nature and may therefore be simplified for purposes of this explanation.

As described, each color shown per frame with duration $T_{frame}$ represents a different frequency of the frequency hopping pattern for transmitting the synchronization sequences from the master device. For example, as shown in 4702, there are four different frequencies, each with nine different synchronization sequences per frame (i.e. in this example $N_{sync\_frame}=9$) transmitted from the master device.

As shown in 4704a, the slave device tunes the frequency of its receiver to a single frequency for the duration of the scan window 4710. In diagram 4700, the scan window is shown as having a duration of four frames (i.e. scan window=$4*T_{frame}$), but it is appreciated that the scan window may span other durations as well. Since the receiving device is only configured to tune to one frequency, it will not receive the synchronization sequences in the frames indicated by 4720 since the hopping frequency used by the master device is not transmitting on that the frequency the RF receiver is tuned to. The slave device will only receive the $N_{sync\_frame}$ synchronization sequences shown by 4722.

Typically, there are RF regulations that have to be fulfilled by a device in order to be allowed to use any shared frequency bands, e.g. one of the ISM bands. These bands restrict the duration during which devices are allowed to use the same hopping frequency for multiple transmissions. Therefore, the number of synchronization sequences that are transmitted on the same hopping frequency are limited by the regulations governing the frequency band. The limited number of synchronization sequences also limits the maximum distance between the any two devices (e.g. a master device and one or more slave devices) that are involved in the synchronization procedure. If the above described synchronization procedure is used, the slave device only scans a single frequency of the hopping frequency pattern and consequently will only receive at maximum $N_{sync\_frame}$ number of synchronization sequences. Accordingly, the above described synchronization procedure, while being feasible to use at short distances between the involved devices, may severely limit, or render useless altogether, communicating at greater distances. In Bluetooth, for example, $N_{sync\_frame}$ is equal to 1 and consequently can only cover a distance between two devices of up to 300 meters.

In other words, the disadvantage of the above solution is it is able to be implemented over only short distances between a master and a slave device since only a limited number of synchronization sequences can be received by the slave device. If large distances between the devices (e.g. up to 2 km) are desired, there must be a greater number of $N_{sync\_frame}$ received on the slave side, and as a result, the slave (i.e. receiving) device cannot simply scan on a single hopping frequency.

In some aspects, methods and devices allow a timing synchronization between a master device and one or more slave devices for D2D communications in unlicensed frequency bands in cases where there may be a low SNR (e.g. greater distances) between the devices and if no external synchronization of the devices (e.g. via a network access node, GNSS, etc.) available at the time. As a result, D2D communication over greater distances may be enabled even in areas where there are no network access nodes (e.g., base stations) available, i.e. in a decentralized network outside of the coverage area of a network access node.

As shown in FIG. 46, the master device will change the hopping frequency on which it transmits the synchronization sequences every time unit $T_{frame}$. During this time, $N_{sync\_frame}$ number of synchronization sequences are transmitted (as illustrated in FIG. 46, $N_{sync\_frame}=9$).

A slave device having the knowledge of the exact timing of the master device (i.e. master timing) is able to switch the frequency to which its RF receiver is tuned to at exactly the same time that the master device switches its transmissions to the next frequency of the hopping frequency pattern. The slave device needs to correlate and/or average the plurality of transmitted synchronization sequences in order to determine a certain number of successfully received synchronization sequences over an extended period of time in order to detect the presence of a master device dependent on the distance with the slave device. The number of correlations of synchronization sequence increases as the distance between the master and slave device increases. The distance between transmitter and receiver is inversely related to the SNR of the received synchronization sequence signal at the slave device. For example, the SNR will become smaller as the distance between the devices increases.

Figure 48:
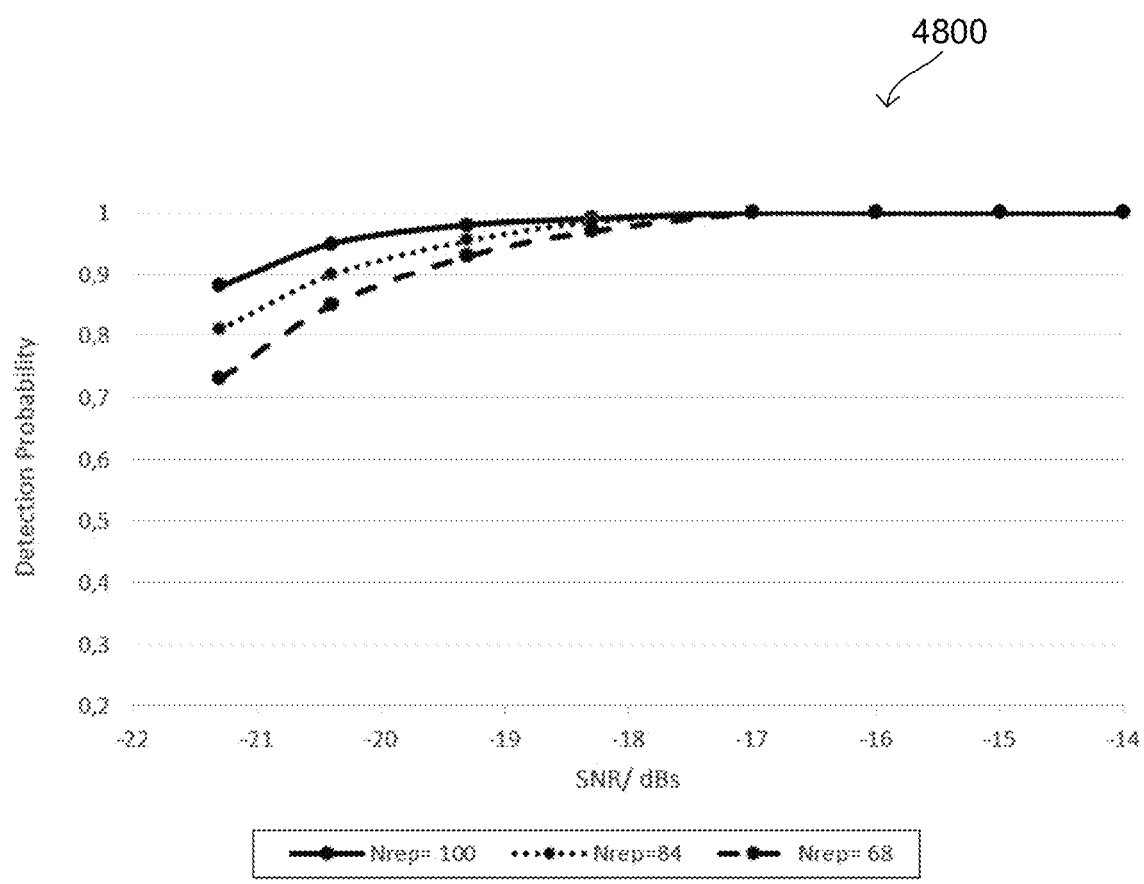
FIG. 48 shows an exemplary graph illustrating the detection probability of the synchronization sequences transmitted from a master device in an additive white Gaussian noise (AWGN) channel according to some aspects.

FIG. 48 shows an exemplary graph 4800 illustrating the detection probability of the synchronization sequences transmitted from a master device in an additive white Gaussian noise (AWGN) channel according to some aspects. In graph 4800, each of the three marked lines illustrate different numbers of received synchronization sequences (Nrep) from a master device transmitting nine synchronization sequences on a single hopping frequency ($N_{sync\_frame}$) with a timing drift of 0.4 ppm between a master and slave device.

From graph 4800, it can be seen that a detection probability of 90% at an SNR of approximately −21 dB can be reached if the number of received synchronization sequences (Nrep) is equal to 100, while the same detection probability at Nrep=84 may be achieved at a reduced SNR of −20.3 dB. If Nrep further is reduced to 64, a 90% detection probability may be achieved at an SNR of −19.8 dB.

The distance for performing D2D communication is directly correlated with the SNR. For example, a distance of 2 km corresponds with an SNR of about −21 to −20 dBs. Therefore, in order to effectively communicate over longer distances up to 2 km, devices may need to effectively correlate a higher number of synchronization sequences.

Figure 49:
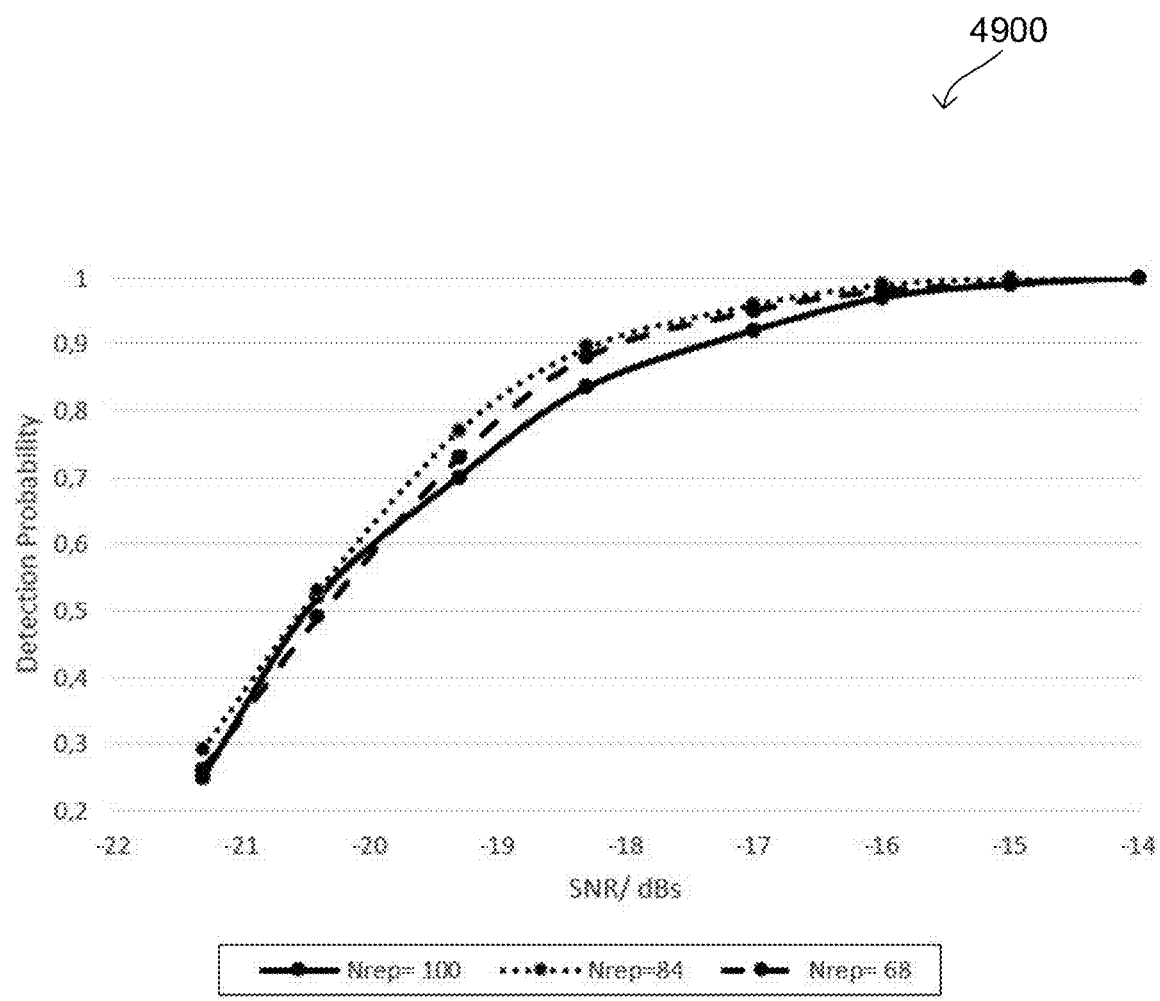
FIG. 49 shows an exemplary graph illustrating the detection probability of the synchronization sequences transmitted from a master device wherein a timing drift of 2 ppm between a master device and a slave device is assumed according to some aspects.

However, Nrep cannot be increased arbitrarily in order to increase the reachable distance between a master device and a slave device. Nrep is limited by the timing drift between the master device and the slave device as the amount of coherent accumulation of the synchronization sequences at the slave device is reduced the higher the timing drift becomes. FIG. 49 shows a graph 4900 illustrating this effect for a given configuration where a timing drift of 2 ppm between the master device and slave device is assumed. Here, the best performance is reached with Nrep equal to 84 while the worst performance is now shown with Nrep equal to 100, which reached the best detection probability for the 0.4 ppm timing drift shown in FIG. 48.

The simulations described in both FIGS. 48 and 49 assume that the master device and the slave device switch the RF frequency at the same time. However, this will only be possible if the timing of the master device and the slave device are already roughly known. In many cases, however, this will not be the case. If the timing of the slave device does not match that of the master device exactly, the slave device will switch to the next frequency of the hopping pattern at different times than when the master device transmits the synchronization sequences. Depending on the timing difference between master device and the slave device, only a portion of the transmitted synchronization sequences from the master device at each frequency of the plurality of frequencies will be received by the slave device. This reduces the effective number of correlations that can be performed within a certain time period.

Figure 50:
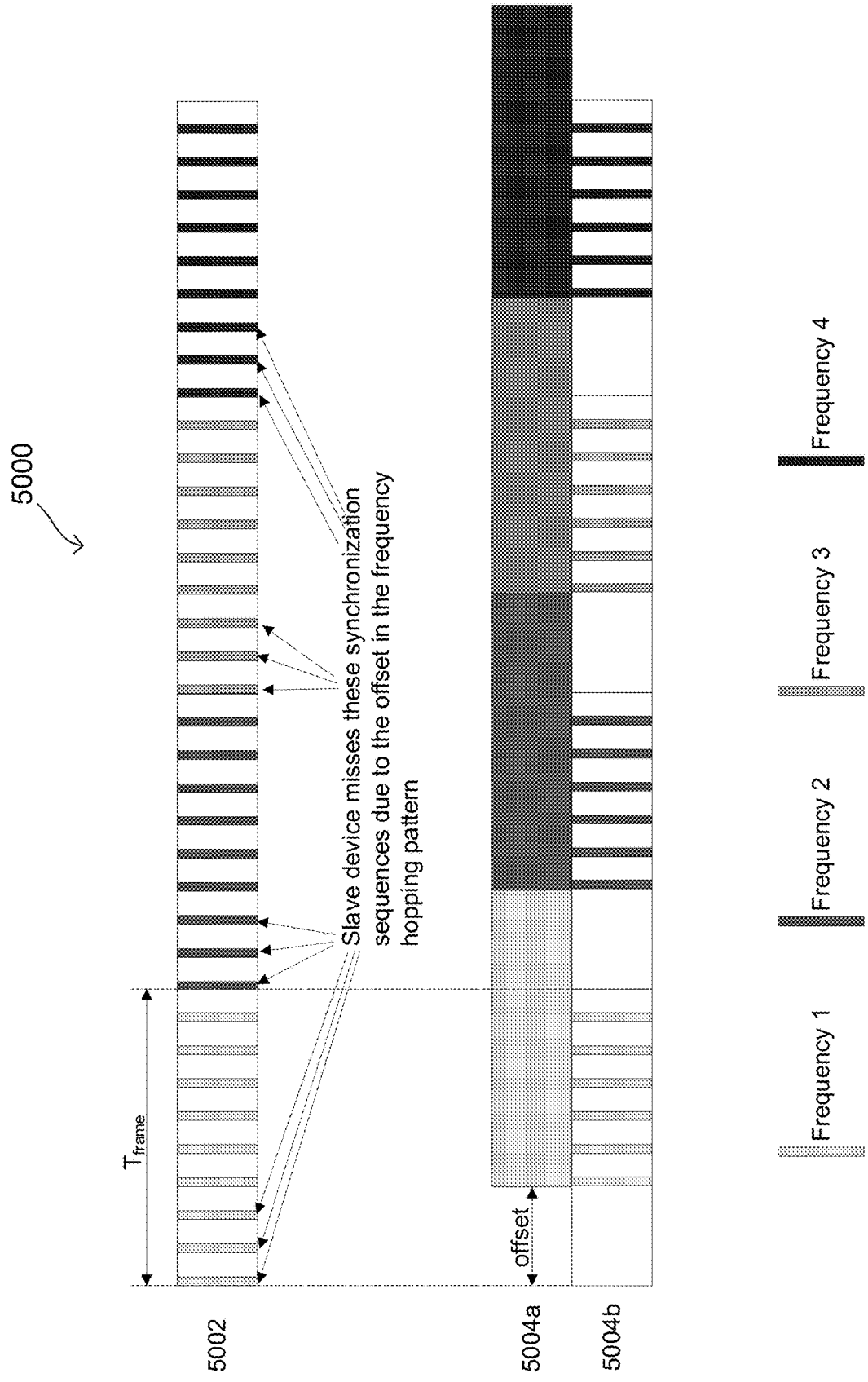
FIG. 50 shows an exemplary diagram illustrating the transmission of synchronization sequences by a source device (i.e. master device) and RF receiver behavior at a wireless device (i.e. slave device) and received synchronization sequences with a timing difference between the devices according to some aspects according to some aspects.

FIG. 50 shows an exemplary diagram 5000 illustrating a timing difference between the master device and a slave device according to some aspects. Each shading represents a frequency of the plurality of frequencies of the frequency hopping pattern (four frequencies shown).

5002 shows the synchronization sequences transmitted by the master device on each frequency on the hopping frequency pattern. In this example, nine synchronization sequences per frequency are shown, but it is appreciated that other amounts of synchronization sequences per frequency may be transmitted.

5004a shows the frequencies at which the slave device RF receiver is tuned to, while 5004b shows the synchronization sequences received by the slave device. In this example, only 6 out of the 9 synchronization sequences transmitted at each hopping frequency are received by the slave device due to the timing difference, i.e. offset.

Since the maximum possible number of synchronization sequences that can be used for correlation is limited by the timing drift between master device and slave device, the wrong time instants used by the slave device to adjust to the next hopping frequency reduces the number of synchronization sequences that can be used by the slave device during this time. Consequently, the wrong timing at the slave device will reduce the detection probability for any given SNR and/or distance.

Figure 51:
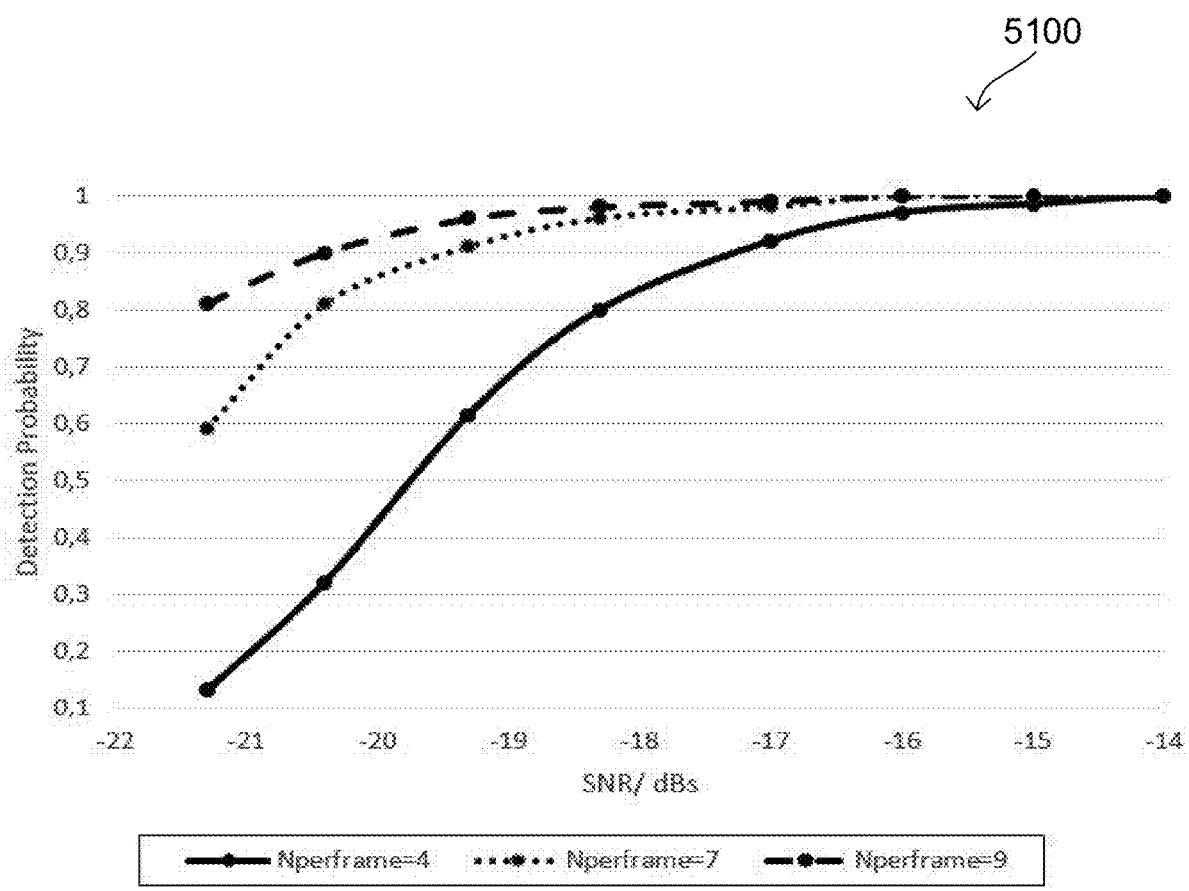
FIG. 51 shows an exemplary graph illustrating the effects of asynchronous timing at the slave device with respect to the master device according to some aspects.

FIG. 51 shows an exemplary graph 5100 illustrating the effects of asynchronous timing at the slave device with respect to the master device according to some aspects. It is assumed that nine synchronization sequences are transmitted per frequency of the hopping frequency pattern.

In graph 5100, a detection probability of 90% is reached at an SNR of about −20.2 dB if all 9 synchronization sequences are received per hopping frequency, while the same detection probability is reached at an SNR of about −19.3 dB if 7 out of the 9 synchronization sequences per hopping frequency are received, and a detection probability of 90% is reached at an SNR of about −17.4 dB if only 4 out of the 9 synchronizations sequences per hopping frequency are received.

As shown in graph 5100, it is evident that if a certain detection probability for a given SNR has to be reached, e.g. 90%, there is a minimum number of synchronization sequences per hopping frequency that need to be received by the slave device. For example, if a detection probability of 90% at an SNR of −19.3 dB is desired, the slave device must receive at least 7 synchronization sequences per hopping frequency. This can only be reached if the slave timing has a certain knowledge and tuning accuracy compared to the master timing. In cases where this required accuracy is not available (e.g. because of no timing from a centralized network infrastructure such as a network access node or GNSS), the required detection probability at a given SNR, and therefore distance, cannot be reached without additional measures.

In some aspects, methods and device provide additional internal measures to correct for a timing offset between two devices in D2D communications when there is no external timing source readily available to provide the required timing synchronization. The required timing accuracy between the master and slave device is reached by repeating the same synchronization procedure as described above multiple times at the slave device, wherein at every repetition (i.e. each iteration), the timing of the RF receiver at the slave device is adjusted by a time offset correction, denoted as $T_{time\_correction}$. The time offset correction may be applied in the positive direction and/or in the negative direction of the time domain, i.e. the correction may either shift the start time of RF receiver on the frequency hopping pattern forward or backward with respect to the previous time start with respect to the master timing.

The slave device will start the first synchronization procedure with its current timing. If this run does not result in a successful synchronization with a master device, the slave device will adjust the current timing by $+T_{time\_correction}$ and restart the synchronization procedure with the adjusted timing. If this synchronization procedure also does not result in a success, the slave will start a new synchronization attempt with an adjusted timing of $-2*T_{time\_correction}$ and the next with $+3*T_{time\_correction}$ and so on. Therefore, the timing offset for the nth subsequent synchronization attempt (i.e. $Timing\_offset_{nth\_Sync\_Proc}$), wherein the initial attempt is n=0, may be defined by the following:

$$Timing\_offset_{nth\_Sync\_Proc} = n*T_{time\_correction} \text{ for } n=1, 3, 5, 7, \ldots$$

$$Timing\_offset_{nth\_Sync\_Proc} = n*T_{time\_correction} \text{ for } n=2, 4, 6, 8, \ldots$$

It is appreciated that the order may be reversed, i.e. the timing offset is shifted in the negative direction for the odd number of n attempts and in the positive direction for the even number of n attempts. The negative direction indicates that the timing at the slave may be lagging behind than that of the master timing, while the positive direction indicates that the timing at the slave is ahead of that of the master timing.

The value of $T_{time\_correction}$ is dependent on the maximum number of synchronization sequences that need to be received per frequency of the hopping frequency pattern and the detection probability that needs to be fulfilled for a given SNR. Table 1 shows a maximum value for $T_{time\_correction}$ dependent on a minimum required synchronization sequence repetitions for a set-up in which 9 synchronization sequences per hopping frequency are transmitted by a master.

TABLE 1

| Number of synchronization sequences received by slave device per hopping frequency | $T_{time\_correction}$ |
|---|---|
| 9 | $1 * T_{sync\_seq}$ |
| 8 | $2 * T_{sync\_seq}$ |
|  | $3 * T_{sync\_seq}$ |
| 7 | $4 * T_{sync\_seq}$ |
|  | $5 * T_{sync\_seq}$ |
| 6 | $6 * T_{sync\_seq}$ |
|  | $7 * T_{sync\_seq}$ |
| 5 | $9 * T_{sync\_seq}$ |

If a detection probability of 90% at an SNR of −19.3 dB has to be reached, using FIG. 51, seven synchronization sequences must be received by the slave device, i.e. Nperframe=7. Therefore, the value of $T_{time\_correction}$ is equal to $5*T_{sync\_seq}$, where $T_{sync\_seq}$ represents the time between two consecutive synchronization sequence transmissions. If the detection probability of 90% at a higher SNR has to be reached, a fewer number of synchronization sequences per hopping frequency have to be received by the slave. Consequently, $T_{time\_correction}$ can be set to a larger value. The corresponding values for $T_{time\_correction}$ is dependent on the number of minimum received synchronization sequences per hopping frequency as listed in Table 1. While Table 1 is exemplary in nature when nine synchronization sequences are transmitted per frequency of the hopping pattern, it is appreciated that $T_{time\_correction}$ may be calculated for other cases (e.g. different number of synchronization sequences per frequency) in a similar manner.

Figure 52:
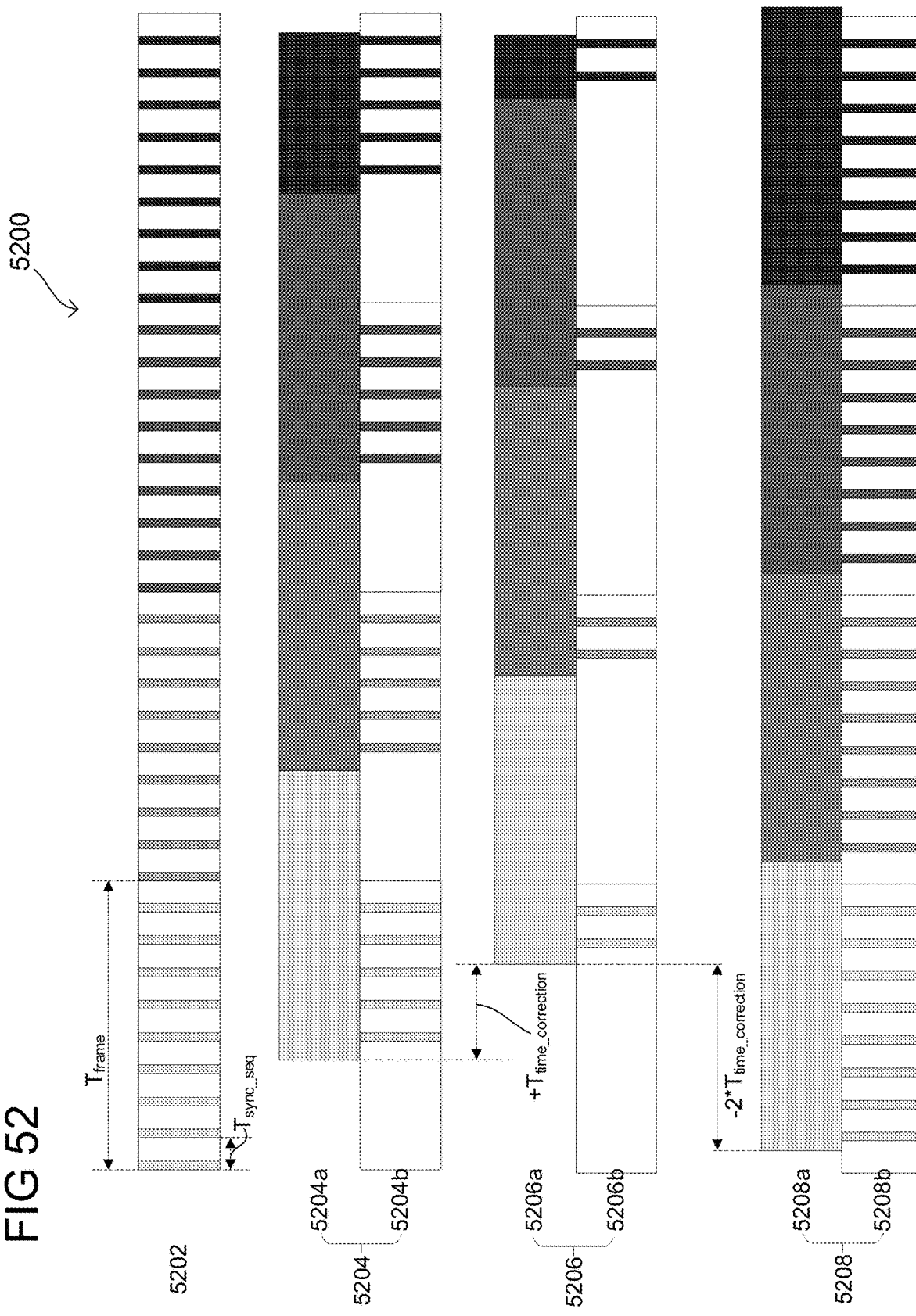
FIG. 52 shows an exemplary diagram detailing a synchronization procedure where a certain number of synchronization sequences per hopping frequency to effectively implement D2D communications according to some aspects.

FIG. 52 shows a diagram 5200 detailing a synchronization procedure according to some aspects where at least 7 out of 9 synchronization sequences per hopping frequency need to be received by the slave device. It is appreciated that diagram 5200 is exemplary in nature and may therefore be simplified for purposes of this explanation. It is also appreciated that the numbers (e.g. for the number of frequencies for the frequency hopping pattern and synchronization sequences for each frequency of the frequency hopping pattern) selected for the figures herein, including FIG. 52, are exemplary in nature and for purposes facilitating the explanation.

In this example, the slave device starts off with a timing offset of about $4*T_{sync\_seq}$ compared to the master timing and the $T_{time\_correction}$ is set to $3*T_{sync\_seq}$.

5202 shows the synchronization sequences transmitted by a master device with each color representing a different frequency (similar to those shown in FIGS. 47 and 50). The synchronization sequences shown in 5202 are transmitted during each of the times shown for each of 5204-5208, which show respective iterations at the receiving slave device with two components, an "a" component illustrating the frequency at which the RF receiver is tuned to, and a "b" component illustrating the effectively received synchronization sequences at the slave device, i.e. 5206 occurs after 5204, and 5208 occurs after 5206, while 5202 is transmitted during each of 5204-5208. It is appreciated that the entire duration for which the RF receiver is tuned to Frequency 4 (i.e. the darkest shade) in 5204a-5208 may not be shown for purposes of fitting on the page.

In an initial attempt 5204, the slave device tunes its RF receiver to change frequencies as shown in 5204a. The slave device is then able to determine that it effectively received five synchronization sequences per frequency as shown in 5204b. This determination may be performed based on a correlation of the synchronization sequences at the slave device.

In a subsequent attempt 5206, the slave device adjusts its start time for the RF receiver to start receiving sequences on the frequency hopping pattern by time offset correction $+1*T_{time\_correction}$ (i.e. $T_{time\_correction}$) relative to the attempt in 5204 and performs the synchronization procedure of the synchronization sequences transmitted in 5202 again (i.e. the master device transmits 5202 multiple times). In this attempt, the slave device only receives two synchronization sequences.

In the next attempt 5208, the slave device adjusts its start time for the RF receiver to start receiving sequences on the frequency hopping pattern by time offset correction $-2*T_{time\_correction}$ relative to the attempt in 5206 and performs the synchronization procedure again. In this attempt, the slave device receives eight synchronization sequences per frequency of the frequency hopping pattern, thereby satisfying the required number of synchronization sequences per frequency which need to be received. It is appreciated that while only four frequencies of the frequency hopping pattern are shown in FIG. 52, there may be other numbers of frequencies of the frequency hopping pattern. Similarly, while nine synchronization sequences are shown per frequency, other number of synchronization sequences may be transmitted per frequency.

The duration until a synchronization procedure is successful (i.e. until the right number of synchronization sequences per hopping frequency are received by the slave device) is dependent on the value that has been chosen for $T_{time\_correction}$. The bigger $T_{time\_correction}$ becomes, the faster the Slave will approach the timing that is used by the master device. However, a bigger $T_{time\_correction}$ may not guarantee that the minimum number of synchronization sequences per hopping frequency is reached by the slave device and consequently will not meet the detection probability requirement for a given SNR. Generally, $T_{time\_correction}$ should be set to the highest value that fulfills the detection probability requirement for the given SNR.

The worst case for time drift between a master and the one or more slave device for D2D communications may depend on the periodicity of the last time synchronization between the devices, e.g. last GPS fix. Also, in the case that there is no master device transmitting synchronization sequences in a decentralized network scenario, a device searching for the synchronization sequences (i.e. the slave device) needs to be configured with an upper boundary for how long it will search for potential master devices so as not to run an endless loop. In some aspects, the devices disclosed herein may be configured to account for this, for example, by running a predetermined amount of synchronization procedures prior to turning off this feature for a predetermined amount of time, or until the synchronization procedure feature is triggered again, e.g. manually by a user or by an emergency service/event.

In some aspects, a dynamic adaptation of $T_{time\_correction}$ may be implemented. In such an implementation, the slave device may start with a large value of $T_{time\_correction}$ and be configured to monitor the amount of accumulated correlation results of each synchronization procedure run, i.e. count the number of effectively received synchronization sequences per iteration. The device may be configured to start to decrease the value of $T_{time\_correction}$ as soon as the amount of the accumulated correlation results reaches a certain threshold. By doing this, the slave device would initially try to adjust to a master timing with coarse adjustments before it starts with the finer timing adjustment steps. The overall synchronization time with such an approach may be less than if the finer timing adjustment steps would have been used right from the beginning. At the same time, this coarse to fine tuning of $T_{time\_correction}$ should still result in the same detection probability for a given result.

In some aspects, devices may be configured to speed up the identification of the absence of a master device. A device may start with a first value of $T_{time\_correction}$. If a certain timing difference between the master device and the slave device is covered without a successful synchronization, the $T_{time\_correction}$ may be increased to a bigger value, i.e. a fine to coarse tuning of $T_{time\_correction}$. This will lead to the fact that slave devices that have a high timing offset are not able to find potential master device transmitting synchronization sequences within the maximum possible distance. This drawback may be tolerable as the bigger timing offset between the devices only occur under worst case conditions or if no successful procedure between a master device and a slave device has happened for a long time. If both use cases are considered to be unlikely, this procedure would help to identify that no master device is currently present in a quicker manner, thereby saving resources.

In some aspects, devices may be configured to reduce the number of timing hypotheses (i.e. synchronization attempts) that have to be attempted until the slave device detects that no master is available. The slave device may bind the timing to a master device to an external timing source which is generally available to all devices, e.g. the coordinated universal time (UTC) or a GNSS time, e.g. GPS time. This time can regularly be determined by the slave device autonomously. Even if no current update of this time is available, the slave device is still able to follow this timing with its local oscillator. Since the local oscillator has a limited accuracy, the timing reference will drift away from the last updated time depending on the accuracy of the local oscillator. The local oscillator may experience drift, i.e. due to operating frequency, changes in operating temperature that alter the piezoelectric effect in the oscillator, changes in a voltage regulator which controls the bias voltage to the oscillator and/other parameters. As the worst case drift of its own local oscillator is known to the device, it is able to determine the maximum possible timing offset based on the worst case inaccuracy of the local oscillator and the last time instant at which an update of the external reference time was performed. The worst case drift of the local oscillator may be known to the device, for example, by determining what type model of oscillator is installed in the device and storing the worst case drift associated with the oscillator during testing of the oscillator in a local memory of the wireless device.

This maximum possible timing offset, Max_timing_offset, is set as the upper limit for which the synchronization procedure needs to be repeated for the different timing hypotheses. The maximum number of synchronization procedures to be performed by the slave device can be determined by NSync_proc=2*(Max_timing_offset/$T_{time\_correction}$). The maximum duration $T_{duration}$ of the synchronization procedure for all timing hypotheses will then be $T_{duration}$=NSync_proc*$T_{time\_correction}$.

Figure 53:
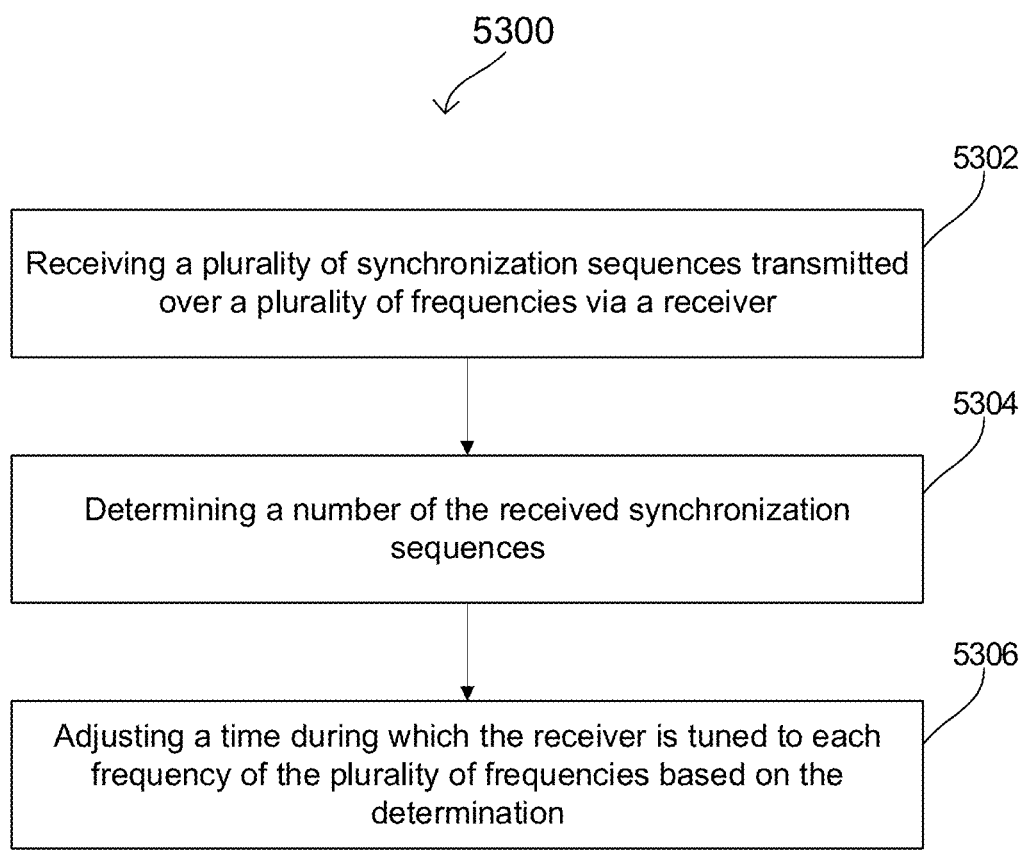
FIG. 53 shows an exemplary flowchart describing a synchronization strategy method for fast frequency hopping D2D communications according to some aspects.

FIG. 53 shows a flowchart 5300 describing a synchronization strategy method for fast frequency hopping D2D communications according to some aspects. It is appreciated that flowchart 5300 is exemplary in nature and may therefore be simplified for purposes of this explanation.

In 5302, the communication device receives a plurality of synchronization sequences transmitted over a plurality of frequencies via a receiver.

In 5304, the communication device determines a number of the received synchronization sequences. This may include correlating and/or averaging the plurality of synchronization sequences over an extended period of time to determine the number of the received synchronization sequences and making the determination based on the correlated sequences, e.g. comparing the number of correlated sequences to a threshold.

In 5306, the communication device adjusts a time for which the receiver is tuned to each frequency of the plurality of frequencies based on the determination. This may include shifting a time frame for which the receiver is tuned to each frequency relative to a previous time frame the receiver was tuned to each frequency from a previous synchronization attempt to a source device.

Figure 54:
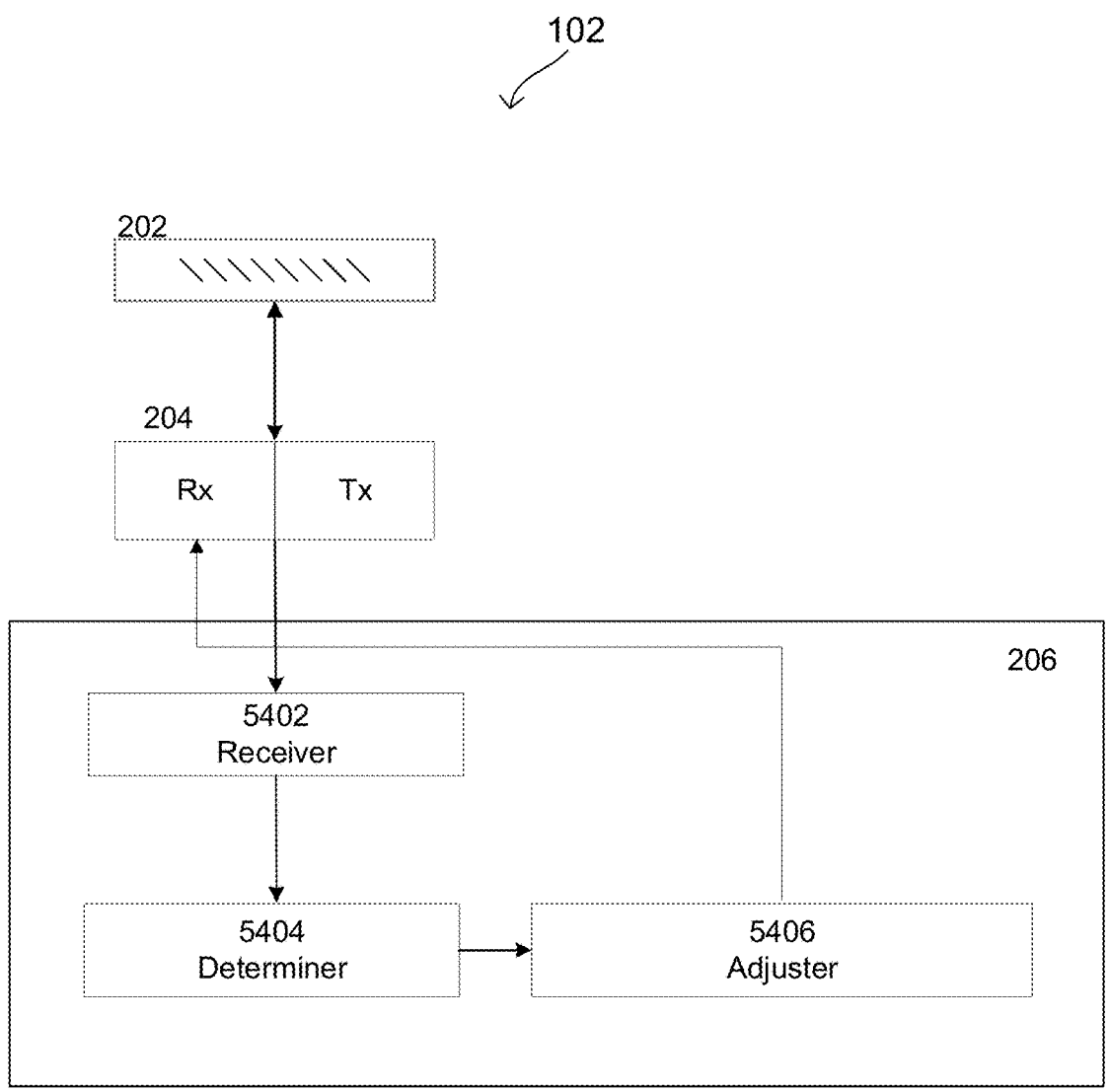
FIG. 54 shows an exemplary internal diagram for a wireless device depicting components according to some aspects according to some aspects.

FIG. 54 shows an internal diagram for a wireless device 102 depicting components according to some aspects. Accordingly, the illustrated depiction of FIG. 54 may omit certain components of wireless device 102 that are not directly related to one or more of the methods described herein. Additionally, components depicted as being separate in FIG. 54 may be incorporated into a single, hybrid component that performs the same functions as the separate components, and, similarly, single components may be split into two or more separate components that perform the same function as the single component. Each of the below described components in FIG. 54 may be realized as hardware, software, or a combination of hardware and software.

As shown in FIG. 54, the baseband modem 206 may include a receiver 5402 configured to receive a plurality of synchronization sequences transmitted over a plurality of frequencies; a determiner 5404 to determine a number of the received synchronization sequences; and an adjuster 5406 configured to adjust a time for which the receiver is tuned to each frequency of the plurality of frequencies based on the determination.

Receiver 5402, determiner 5404, and adjuster 5406 may be configured to perform the above described synchronization procedures in one or more iterations, wherein in each iteration of the one or more iterations, the adjuster tunes an RF receiver of the communication device to commence tuning in to frequencies according to a known frequency hopping pattern (e.g. a frequency hopping pattern previously communicated to the communication device during a last synchronization to another wireless device or connection to a network access node).

If implemented as software, receiver 5402, determiner 5404, and adjuster 5406 may each be subroutines stored on a memory of baseband modem 206, which when retrieved by one or more processors of baseband modem 206, cause the one or more processors to execute the functions described herein.

In order to achieve timing synchronization between two wireless devices in D2D communication over long distances, the correlation of a high number, e.g. up to 100, synchronization sequences may be used. In some aspects, the correlation of this high number of synchronization sequences may be achieved in decentralized networks by implementing the timing correction described herein. The number of synchronization sequences that needs to be received by the slave device is denoted as NRep. Without further measures, the RF receiver needs to be switched on for the duration of NRep*$T_{sync\_sequence}$, where $T_{sync\_sequence}$ is the distance between two consecutive synchronization sequences transmitted by a master device.

In a decentralized network, for example, NRep may be about 80 and the $T_{sync\_sequence}$ for D2D communications may be about 40 ms. This would mean that a slave device trying to synchronize to a master device would have to switch on the RF receiver for about 80*40 ms=3200 ms. This will result in a significant power consumption in scenarios, e.g. in decentralized network scenarios outside of the coverage of a base station, where the synchronization procedure is executed. The drain on power consumption is even more noticeable in scenarios where no master device is present and the synchronization procedure is executed periodically. In these cases, the contribution of the synchronization procedure to the overall power consumption may be very significant.

FIG. 55 shows a diagram 5500 depicting RF receiver power activity for a synchronization procedure according to some aspects. It is appreciated that diagram 5500 is exemplary in nature and may therefore be simplified for purposes of this explanation.

The synchronization sequences transmitted by the master device are shown in 5502, while the RF receiver power activity at the slave device (s) is shown in 5504.

To perform a successful timing synchronization with a master wireless device, a slave wireless device has to receive NRep number of synchronization sequences, which in long distance cases, may be quite numerous. The synchronization sequences are transmitted at a periodicity of $T_{sync\_sequence}$ by the master device. Since the exact timing of the transmission of the synchronization sequences by the master device is not known to the slave device in general, the slave device has to switch on the RF receiver during the whole time of NRepSlots *$T_{sync\_sequence}$.

In some aspects, wireless devices (e.g. operating as slave devices) are configured to make use of a maximum timing offset of its own local timing relative to the timing of a master device to control the RF receiver on-time during the synchronization procedure. Since the maximum timing offset may be used to determine the worst case time instant at which the slave may receive a single synchronization sequence compared to the expected time instant, this maximum timing offset may also be used to determine the time instant at which the RF receiver has to be switched on prior to the expected time instant and the time instant at which it can be switched off after the expected time instant.

The adjustment of the RF receiver with respect to the maximum possible timing offset will reduce the power consumption needed to perform the synchronization procedure in cases where the maximum timing offset is smaller than half of the distance between two synchronization sequences. This will improve the user experience in decentralized networks (e.g. outside coverage of a network access node) due a lower power consumption.

In cases where wireless devices are not synchronized with a master device, the slave device may only be able to follow a master timing with the accuracy of its own local oscillator. Since the local oscillator has a limited accuracy, the timing reference with respect to the master timing will gradually drift away from the master timing. And, since the worst case drift of the oscillator is known to the wireless device, it is able to determine the maximum possible timing offset, Max_timing_offset, based on the worst case inaccuracy of the local oscillator and the last time instant at which it was synchronized to a master timing, i.e. the time instant at which the slave device last knew that its timing was correct. The local oscillator may experience drift, i.e. due to operating frequency, changes in operating temperature that alter the piezoelectric effect in the oscillator, changes in a voltage regulator which controls the bias voltage to the oscillator and/other parameters. As the worst case drift of its own local oscillator is known to the device, it is able to determine the maximum possible timing offset based on the worst case inaccuracy of the local oscillator and the last time instant at which an update of the external reference time was performed. The worst case drift of the local oscillator may be known to the device, for example, by determining what type model of oscillator is installed in the device and storing the worst case drift associated with the oscillator during testing of the oscillator in a local memory of the wireless device.

Max_timing_offset determines the worst case point in time at which the slave may receive a single synchronization sequence compared to the expected point in time. Therefore, this maximum timing offset may also determine the earliest time instant at which the RF receiver has to be switched on prior to the expected point in time and the latest the RF receiver has to be switched off after the expected point in time in order to receive the synchronization sequence from the master device. Since the synchronization sequences are transmitted by a master device periodically, the slave device can switch off its RF receiver Max_timing_offset after the expected time instant of a first synchronization sequence, n, until Max_timing_offset before the expected time instant of a next synchronization sequence, n+1.

Figure 56:
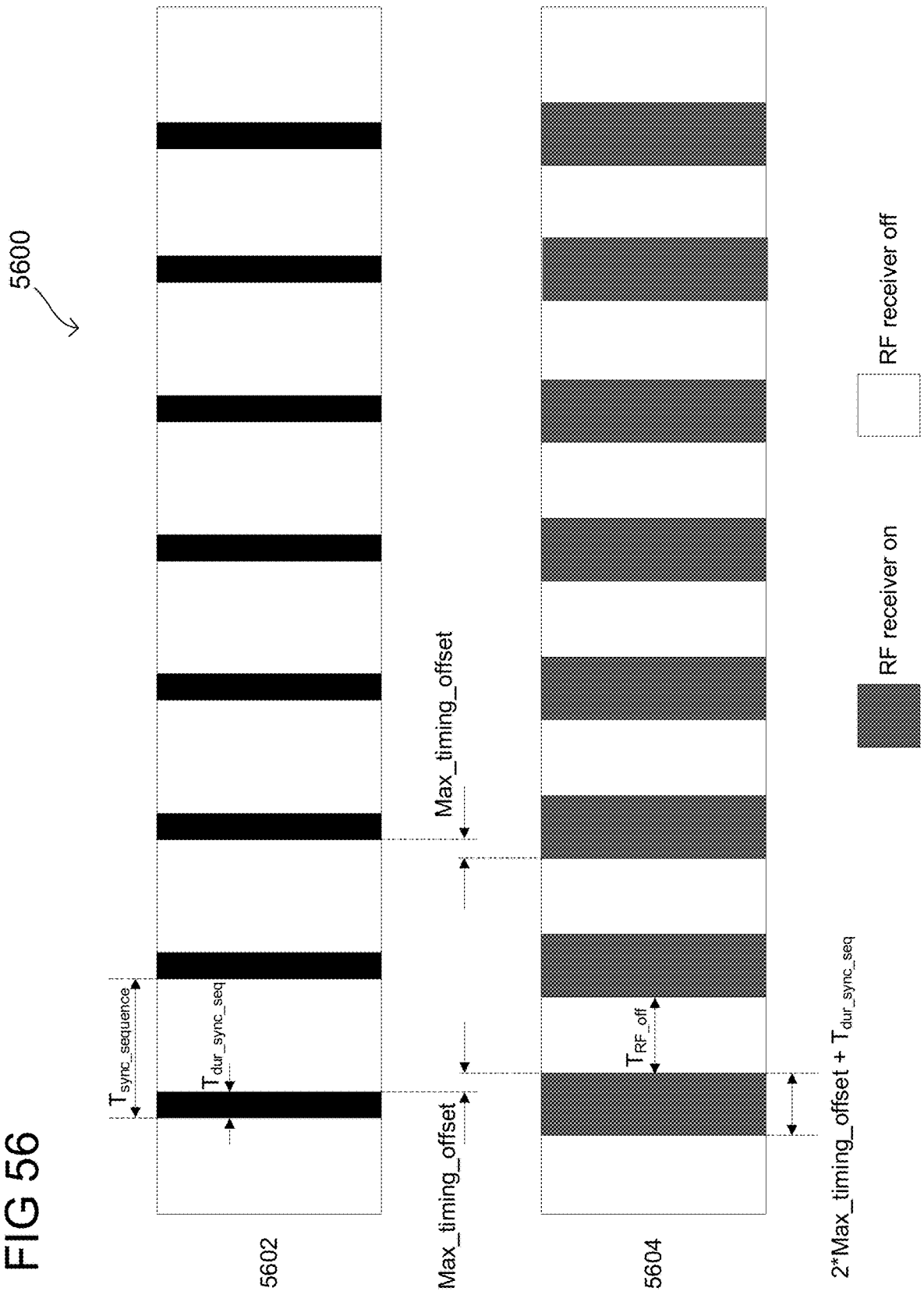
FIG. 56 shows an exemplary diagram a synchronization procedure applying a time offset to manipulate RF receiver power activity according to some aspects.

FIG. 56 shows a diagram 5600 depicting RF receiver power activity for a synchronization procedure according to some aspects. It is appreciated that diagram 5600 is exemplary in nature and may therefore be simplified for purposes of this explanation.

The synchronization sequences transmitted by a master device are shown in 5602, while the RF receiver power activity at the slave device (s) is shown in 5604. The synchronization sequence may be transmitted according to a frequency hopping pattern known at both the transmitting master device (i.e. source device) and the receiving slave device.

The RF receiver off-time, $T_{RF\_off}$, between two consecutive synchronization sequences can be determined by the following formula:

$$T_{RF\_off} = T_{sync\_sequence} - (2 \times \text{Max\_timing\_offset} + T_{dur\_sync\_seq})$$

where $T_{dur\_sync\_seq}$ is the length of a single synchronization sequence.

The relation of $T_{RF\_off}$ and $T_{sync\_sequence}$ is directly proportional to the power saving potential between FIG. 56 and FIG. 55.

$$\frac{T_{RF\_off}}{T_{sync\_sequence}} = 1 - \frac{(2 \times \text{Max\_timing\_offset} + T_{dur\_sync\_seq})}{T_{sync\_sequence}}$$

$T_{dur\_sync\_seq}$ is a design constant of the device to device standard and cannot be influenced by the slave device. Therefore, the power saving potential of the method described in herein and shown in FIG. 56 is indirectly proportional to Max_timing_offset, i.e. as Max_timing_offset decreases, the power saving potential of the methods and devices described herein increases. As the term $2 \times \text{Max\_timing\_offset} + T_{duration\_sync\_seq}$ approaches $T_{sync\_sequence}$, the power saving improvement decreases and once these two terms equal each other, there is no power saving improvement anymore, i.e. the end of the correlation window from the previous synchronization sequence will be equal to the start of the correlation window of the current synchronization sequence.

To determine the Max_timing_offset, a slave device may set its internal timing relative to a master timing after a successful synchronization procedure to a master device or via an external synchronization source, e.g. a GPS time fix. In addition to setting its internal timing, the slave device may also store the time instant at which this internal timing setting to a master timing was performed. By performing these steps, the slave device will be capable to follow the master timing with its local oscillator even if no further timing corrections are performed. Since the local oscillator has only a limited accuracy, the current timing reference will start to drift away depending on the accuracy of the local oscillator from the time instant of the last synchronization to the master timing, $T_{last\_sync}$. Since the worst case inaccuracy of the oscillator, $N_{Drift}$ (e.g. in ppm), is known to the device, the device is able to determine Max_timing_offset using the following formula:

$$\text{Max\_timing\_offset} = (T_{current} - T_{last\_sync}) \times N_{Drift}$$

In some aspects, in order to reduce Max_timing_offset and with it reduce the power consumption during the synchronization procedure, a slave device should attempt to ensure that the value between $T_{current}$ and $T_{last\_sync}$ remains small. Therefore, regular timing synchronizations to the master timing may have to be done. However, this is only possible if a master device is present. In case no master device is available, a synchronization of the slave device to a master timing is only possible via external timing sources. Several options are possible.

In a first option, the slave device may be configured to use a GNSS source, e.g. GPS, to synchronize to a master timing. By performing a GPS time fix, for example, the current GPS time can be retrieved by the slave device directly without performing a synchronization to a master device. Since the master timing may be derived from the GPS time, the slave device is able to reconstruct the master timing from the GPS time and correct its own internal timing.

In a second option, the slave device may be configured to use the current Coordinated Universal Time (UTC). The current UTC can be retrieved by the slave device as soon as a connection to a 3GPP RAT or to the Internet is available. The GPS time can be directly derived from the UTC time and with it the master timing can be determined by the slave device. Since a wireless device will regularly correct its internal clock based on the UTC time retrieved via time servers in the internet or via 3GPP RATs, a regular timing correction via the UTC timing should be possible without any significant power increase.

To demonstrate the significant power saving improvements, an exemplary scenario where the $T_{sync\_sequence}$ is equal to 40 ms and $T_{duration\_sync\_seq}$ is equal to 1 ms is provided, although it is appreciated that these exemplary values are chosen for purposes of this explanation and other values may be used depending on the D2D communication system and structure.

In order to benefit from the provide power saving effects of the methods described herein (compared to the conventional method of keeping the RF receiver turned on for the entire duration of the transmission of the synchronization sequences), the upper limit of the Max_timing_offset may be determined as follows:

$$1 > \frac{(2 \times \text{Max\_timing\_offset} + T_{duration\_sync\_seq})}{T_{sync\_sequence}}$$

$$\text{Max\_timing\_offset} < \frac{(T_{sync\_sequence} - T_{duration\_sync\_seq})}{2}$$

$$\text{Max\_timing\_offset} < 19.5 \text{ ms}$$

When considering a high drift of the local oscillator of the slave wireless device of $N_{Drift}=2$ ppm, the Max_timing_offset of 19.5 ms is reached roughly after 2.7 hours if there is no further synchronization to the master timing at the slave wireless device. Therefore, the methods and devices described herein provide power saving improvements if a timing correction at the slave device is performed via a synchronization with a master device or via an external synchronization source, such as UTC or GPS time, relatively rarely, i.e. at least once every 2.7 hours in this example.

Figure 57:
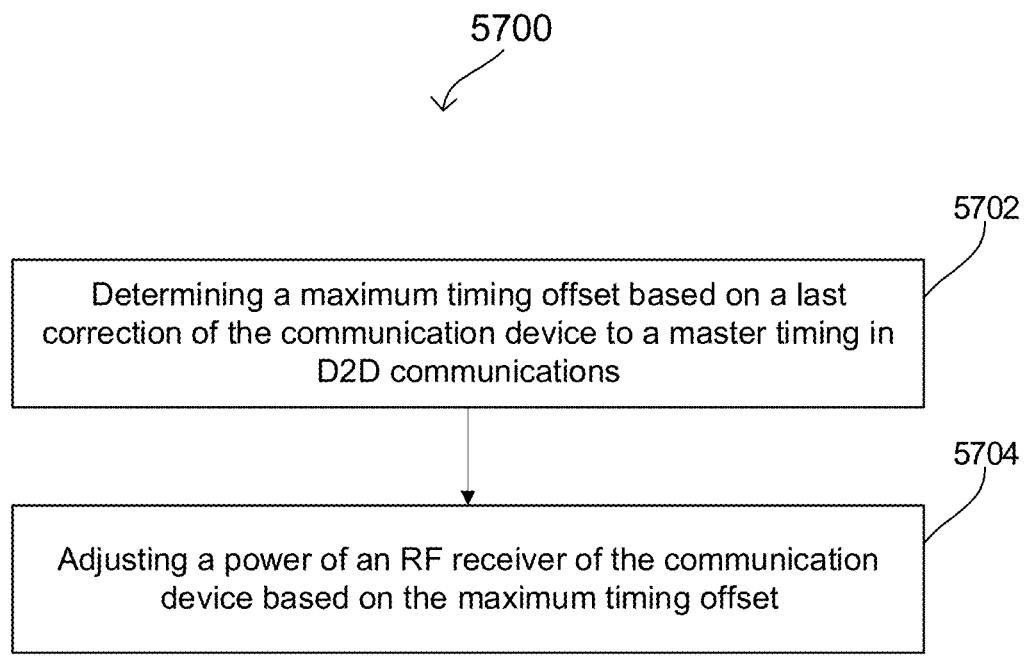
FIG. 57 shows an exemplary flowchart describing a process for adjusting RF receiver power activity according to some aspects.

FIG. 57 shows a flowchart 5700 describing a method for controlling power at the RF receiver of a communication device in D2D communications according to some aspects. It is appreciated that flowchart 5700 is exemplary in nature and may therefore be simplified for purposes of this explanation.

In 5702, the communication device determines a maximum timing offset based on a last correction of the communication device to a master timing in D2D communications. In some aspects, the maximum timing offset is also based on an inaccuracy of a local oscillator of the communication device.

In 5704, the communication device adjusts a power of an RF receiver of the communication device based on the maximum timing offset.

Figure 58:
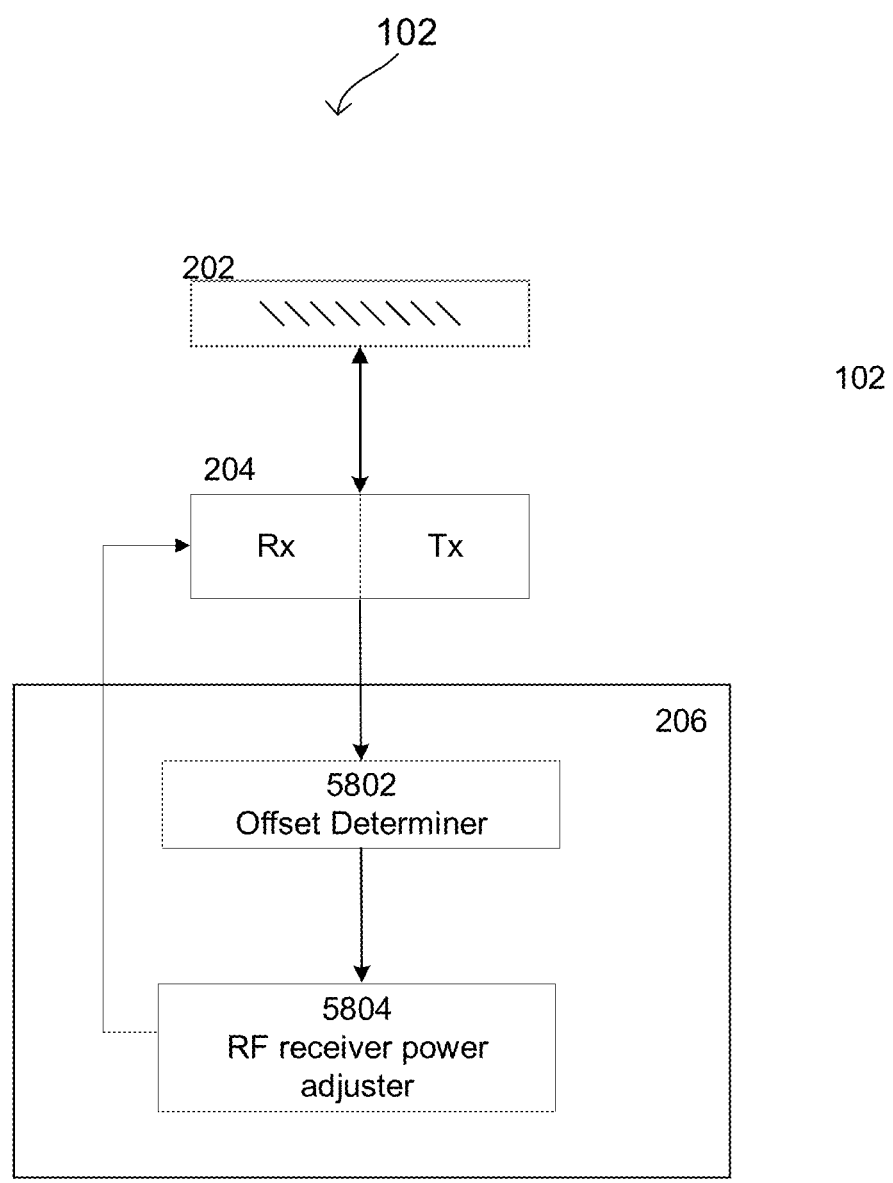
FIG. 58 shows an exemplary internal diagram for a wireless device depicting components according to some aspects according to some aspects.

FIG. 58 shows an internal diagram for a wireless device 102 depicting components according to some aspects. Accordingly, the illustrated depiction of FIG. 58 may omit certain components of wireless device 102 that are not directly related to one or more of the methods described herein. Additionally, components depicted as being separate in FIG. 58 may be incorporated into a single, hybrid component that performs the same functions as the separate components, and, similarly, single components may be split into two or more separate components that perform the same function as the single component.

As shown in FIG. 58, the baseband modem 206 may include offset determiner 5802 configured to determine a maximum timing offset as disclosed herein, and an RF receiver power adjuster 5804 configured to adjust a power of an RF receiver of the communication device based on the maximum timing offset.

If implemented as software, offset determiner 5802 and RF receiver power adjuster 5804 may each be subroutines stored on a memory of baseband modem 206, which when retrieved by one or more processors of baseband modem 206, cause the one or more processors to execute the functions described herein, for example, in FIGS. 56 and 57.

As previously noted, D2D networks may lack a centralized network infrastructure. Thus, terminal devices in a D2D network may, in some aspects, not have the benefit of assistance (relay assistance, transport format (TF) selection, among other things) from a vast array of network access nodes. For at least this reason, terminal devices in D2D networks may be configured in a manner that optimizes communication range. The optimization of communication range in a terminal device may, however, come at the expense of one or more other key performance indicators (KPIs), such as, data throughput. Further to this technical problem, TF selection schemes in cellular networks employed at a network access node may present challenges when applied to D2D networks.

Figure 59:
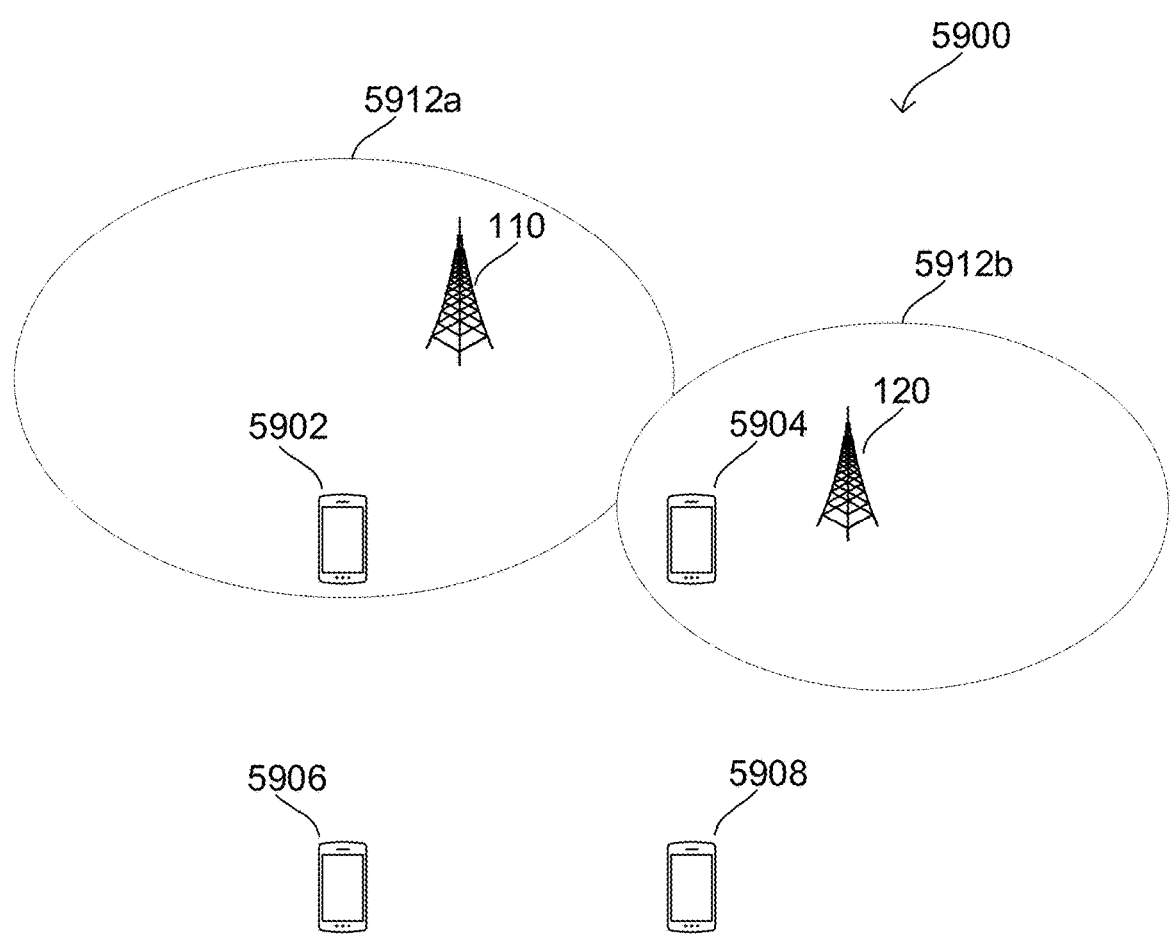
FIG. 59 shows an exemplary general network architecture for wireless communications according to some aspects.

FIG. 59 depicts a general network architecture for wireless communications. As shown in FIG. 59, radio communication network 5900 may include network access node 110, network access node 120, terminal device 5902, terminal device 5904, terminal device 5906, and terminal device 5908. In some aspects, one or more of terminal device 5902, terminal device 5904, terminal device 5906, and terminal device 5908 may be implemented as terminal device 102 or any wireless device described herein. Although radio communication network 5900 may include network access node 110, network access node 120, terminal device 5902, terminal device 5904, terminal device 5906, and terminal device 5908 as illustrated in FIG. 59, some aspects may employ additional or fewer terminal devices, network access nodes and/or other elements.

As depicted in FIG. 59, terminal device 5902 is located within the communication range 5912a of network access node 110, whereas terminal device 5904 is located within the communication range 5912b of network access node 120. Terminal devices 5906-5908 are, however, located outside of the respective communication ranges 5912a and 5912b of network access nodes 110 and 120. Consequently, radio communication network 5900 may not be able to receive and/or process communications that are transmitted from terminal devices 5906-5908.

In a cellular operation mode, a terminal device (e.g., terminal device 5902) from among terminal devices 5902-5904 may, in some aspects, be configured to initiate link establishment with a network access node (e.g., network access node 110) from among network access nodes 110-120. For instance, terminal device 5902 may be configured to transmit a plurality of reference symbols over a single physical channel to a network access node 110. Upon receipt, the network access node 110 may, in some aspects, be configured determine one or more KPIs (e.g., frequency offset, signal-to-noise ratio (SNR), reference signal received power (RSRP)) of the single physical channel, based one or more measurements associated with the reception of the plurality of reference symbols. According to at least one aspect, network access node 110 may be configured to estimate the SNR based on a comparison of the reference symbols to a predefined set of reference symbols for each physical channel.

The network access node 110 may, in some aspects, be configured to transmit a feedback indicator (FBI) to instruct terminal device 5902, which TF(s) may be used for subsequent data communication. Utilization of the requested TF is mandatory for 4G, whereas the requested TF refers to the maximum TF for 3G. According to at least one aspect, the selection of a TF from among plurality of TFs may be based on a dedicated algorithm having the one or more KPIs as inputs. The FBI may, in some aspects, be implemented as a single-shot FBI. In at least one aspect, a single-shot FBI may be used to instruct terminal device 5902, which TF(s) may be used for all subsequent data communication within a specific frame.

In some aspects, network access node 110 may be configured to adjust the selection of a TF in an incremental fashion. However, any selection of a TF may have limited accuracy when this selection is based on one or more KPIs of a single physical channel.

When relying on one or more KPIs of a single physical channel, the plurality of TFs considered for inclusion in the FBI may, for instance, constitute only a subset of all TFs available to network access node 110. As a result, network access node 110 may not be able to instruct terminal device 5902, to use the most optimal TF at its disposal for a given frame. Therefore, the time and resources saved by analyzing the KPI(s) of a single physical channel may come at the expense of other KPI(s), such as throughput and/or power consumption.

Figure 60:
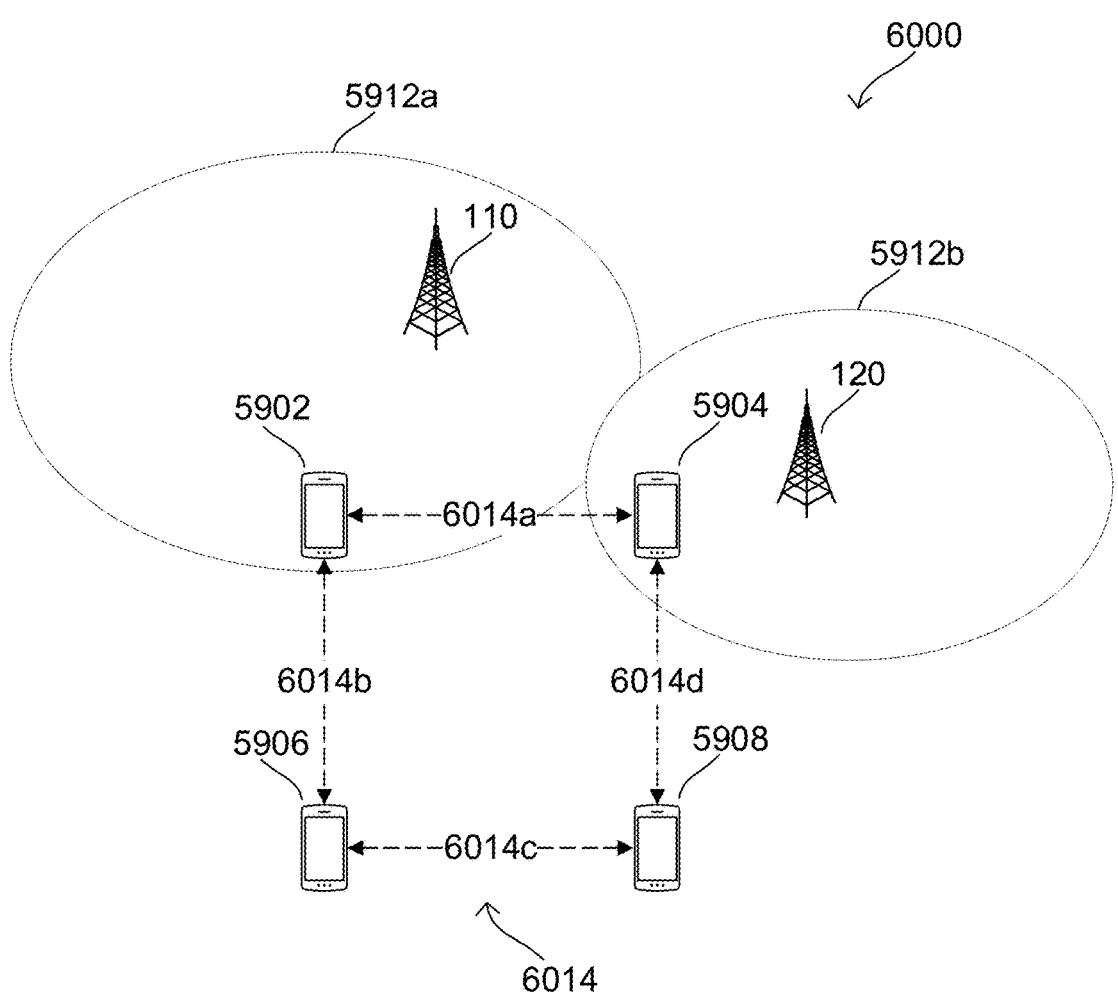
FIG. 60 shows an exemplary general network architecture for wireless communications including a decentralized network according to some aspects.

FIG. 60 depicts a general network architecture for wireless communications. As shown in FIG. 60, terminal devices 5902-5908 may form a decentralized network 6014 and use D2D signaling (e.g., on D2D resources) to communicate with each other. As specified above, the term D2D refers to any type of direct signaling between terminal devices and is not limited to any particular radio communication technology. Although decentralized network 6014 may include terminal devices 5902-5908 as illustrated in FIG. 60, some aspects may employ additional or fewer terminal devices, and/or other elements.

Decentralized network 6014 may include one or more communication links 6014a-6014d between terminal devices 5902-5908. In some aspects, one or more of the communication links 6014a-6014d may be unidirectional. Additionally or alternatively, one or more of the communication links 6014a-6014d may be bidirectional. One or more of the communication links 6014a-6014d may, for example, be implemented as a unicast communication link, a narrowcast communication link (e.g., a broadcast communication link with a limited set of receptors), a multicast communication link, a broadcast communication link, or any combination thereof. Although decentralized network 6014 may include communication links 6014a-6014d as illustrated in FIG. 60, some aspects may employ additional or fewer communication links. For example, each of the communication links 6014a-6014d illustrated in FIG. 60, may represent one or more of the aforementioned communication links and/or other communication link types not explicitly referenced herein. Moreover, one or more communication links may be present (although undepicted) between terminal device 5902 and terminal device 5908, and one or more communication links (although undepicted) may be present between terminal device 5904 and terminal device 5906.

Decentralized network 6014 may include one or more types of communication links 6014a-6014d in terms of radio communication technology. In some aspects, communication links 6014a-6014d may be similar in terms of radio communication technology. For example, two or more of the communication links 6014a-6014d may conform to the same radio communication technology. According to at least one aspect, two or more of the communication links 6014a-6014d may be different in terms of radio communication technology. For example, two or more of the communication links 6014a-6014d may conform to different radio communication technologies.

Communication links 6014a-6014d may be established in a variety of manners. In some aspects, two or more of the communication links 6014a-6014d may be established according to a similar establishment protocol. For example, two or more of the communication links 6014a-6014d may be established according to the same protocol (e.g., the protocol described with respect to FIG. 4). According to at least one aspect, two or more of the communication links 6014a-6014d may be established according to different establishment protocols. For example, two or more of the communication links 6014a-6014d may be established according to different establishment protocols.

In some aspects, one or more of terminal devices 5902-5908 in decentralized network 6014 may be configured to utilize narrowband operation in the unlicensed, sub-gigahertz (sub-GHz) spectrum of the industrial, scientific and medical (ISM) radio bands. According to at least one aspect, this configuration may compliment the aforementioned optimization of communication range. For instance, the use of the sub-GHz spectrum of the ISM bands may account for an increased communication range compared to that of higher bands, which are more susceptible to attenuation over the air interface. Although the sub-GHz spectrum of the ISM bands is explicitly referenced for use in some aspects, other aspects may include the use of higher ISM bands (e.g., 2.4 GHz) as potential candidates for decentralized network 6014.

Various configurations within one or more of terminal devices 5902-5908 may be implemented in which one or more transmission parameters are adapted for use in decentralized network 6014. In some aspects, one or more of terminal devices 5902-5908 may be configured to set their respective time transmission interval (TTI) to an order of magnitude higher compared to cellular operation to achieve a reasonable size of data payloads. As used herein, a TTI may refer to the temporal duration of a transmission as opposed to transport block size. Longer TTIs may, however, increase turnaround times. To cope with increased turnaround times due to longer TTs or even situations with relaxed delay requirements, a TF may, in some aspects, be selected in an aggressive manner as opposed to other TF selection schemes, such as incremental adjustments.

Decentralized network 6014 may be configured to utilize one or more types of transmissions over communication links 6014a-6014d. In some aspects, a single tone (ST) transmission and/or a multi-tone (MT) transmission may be implemented over one or more communication links (e.g., communication link 6014c) from among communication links 6014a-6014d. According to at least one aspect, an MT transmission may allow for the modulation of a number of tones (e.g., $n_{MT}$=3, 6, or 12 tones in the 3GPP NB-IoT) for transmission over, for example, communication link 6014c. The subcarrier spacing for an ST transmission (e.g., $f_{c,ST}$=3.75 kHz) may, in some aspects, be different from the subcarrier spacing for an MT transmission (e.g., $f_{c,MT}$=15 kHz).

In some aspects, one or more of terminal devices 5902-5908 of decentralized network 6014 may have a fixed maximum transmission power associated therewith. In particular, the fixed maximum power refers to the overall power contained within a transmitted signal. When an ST transmission is implemented over, for example, communication link 6014c, the fixed maximum transmission power may be applied to the ST transmission. By way of contrast, the fixed maximum transmission power may divided by the number of tones ($n_{MT}$) when an MT transmission is used. Therefore, the peak power of an ST transmission deviates, as per definition, from the peak power of an MT transmission as provided below. Given a fixed maximum transmission power, the peak transmission power of an ST transmission may, in some aspects, be expressed as follows:

$$\hat{p}_{ST} = \frac{\hat{p}_{MT} * f_{c,MT}}{f_{c,ST}} * n_{MT} \qquad \text{Equation (1)}$$

where $\hat{p}_{ST}$ represents the peak transmission power for an ST transmission, $\hat{p}_{MT}$ represents the peak transmission power for an MT transmission, $f_{c,MT}$ represents the subcarrier spacing for an MT transmission, $f_{c,ST}$ represents the subcarrier spacing for the ST transmission, and $n_{MT}$ represents the number of tones in the MT transmission. According to at least one aspect, the peak power of an ST transmission ($\hat{p}_{MT}$) having a subcarrier spacing of 3.75 kHz ($f_{c,ST}$=3.75 kHz) is ~16.7 dB higher than the peak power of MT transmission ($\hat{p}_{MT}$) having a subcarrier spacing of 15 kHz ($f_{c,MT}$=3.75 kHz) and 12 tones ($n_{MT}$=12).

An ST transmission may, in some aspects, have different operational characteristics than an MT transmission based on differences in their respective peak powers in terms of SNR while taking into account the same bandwidth is used as a noise floor (e.g., MT with $n_{MT}$=12 tones and $f_{c,MT}$=15 kHz). This is of particular relevance for a time domain description of the signals using the same filter bandwidth. In a frequency domain description, however, a subcarrier SNR may be used. According to at least one aspect, the higher peak power for an ST transmission ($\hat{p}_{ST}$) directly implies utilization for low SNR/coupling regions (e.g., subrange A 6204, as further described below). In some aspects, the lower peak power for an MT transmission ($\hat{p}_{MT}$) may be beneficial in high SNR/coupling regions (e.g., subrange B 6206, as further described below).

Figure 61:
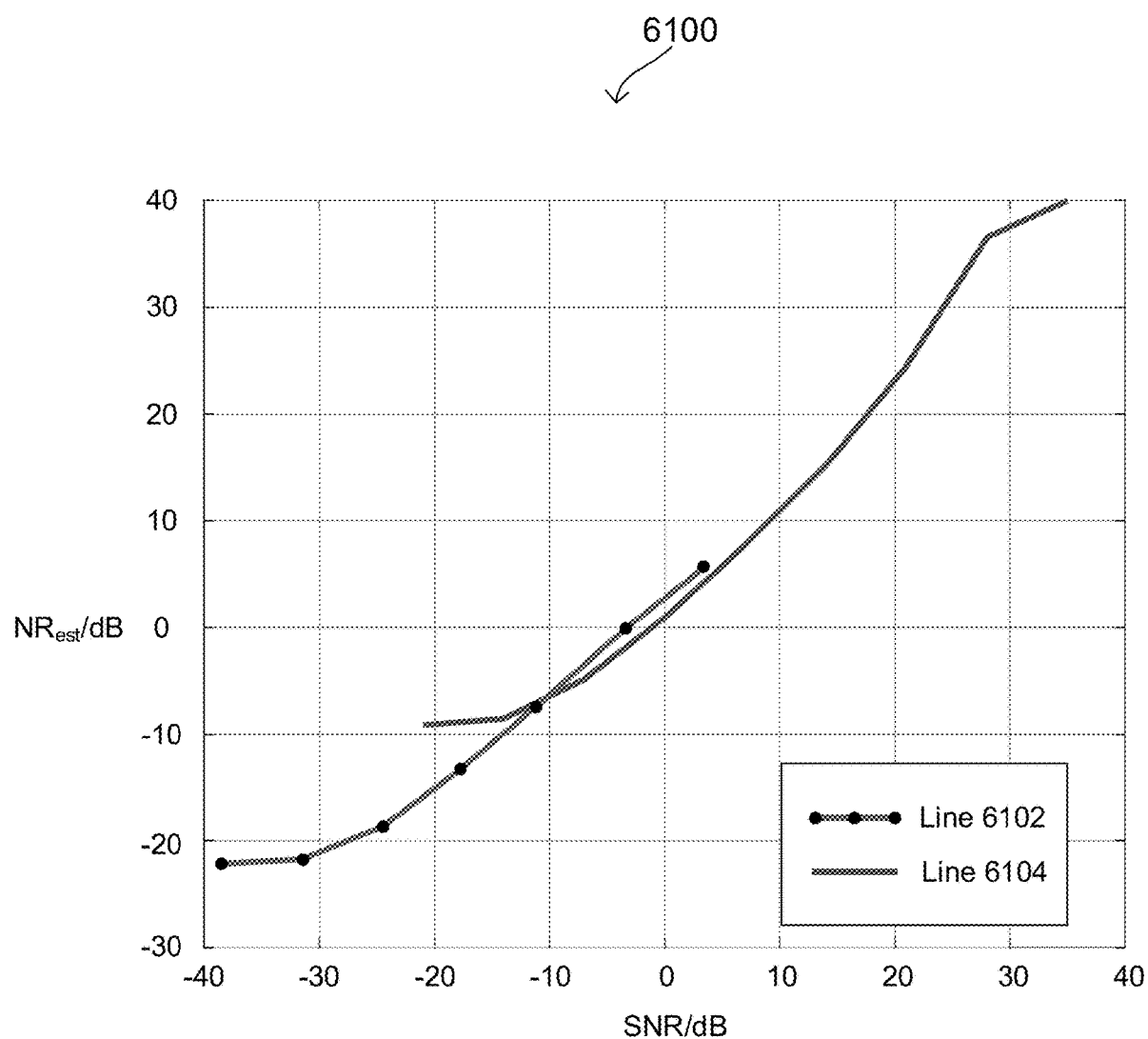
FIGS. 61-65 shows exemplary line graph comparisons of various SNR estimations according to some aspects.

FIG. 61 shows line graph comparison 6100 of an SNR estimation algorithm based on an ST transmission and an SNR estimation algorithm based on an MT transmission having 12 tones ($n_{MT}$=12). Line graph comparison 6100 includes line 6102 and line 6104. Line 6102 graphically represents the SNR estimation algorithm based on the ST transmission. Line 6104 graphically represents the SNR estimation algorithm based the MT transmission having 12 tones ($n_{MT}$=12).

As shown in FIG. 61, line 6102 appears linear in a lower SNR range, whereas line 6104 appears linear in an upper SNR range. Line 6102 appears to saturate at a higher SNR/dB value than that of line 6104. Line 6104, however, appears to saturate at a lower SNR/dB value than that of line 6102. In view of these considerations, the ST-based SNR estimation algorithm may, in some aspects, perform better than the MT-based SNR estimation algorithm at lower SNR values. Likewise, the MT-based SNR estimation algorithm may, in some aspects, perform better than the ST-based SNR estimation algorithm at higher SNR values.

As further described below, the determination of which SNR estimation algorithm(s) are utilized in TF selection may, in some aspects, be based on a variety of factors. According to at least one aspect, these factors may include one or more channel quality indications of a communication link. The one or more channel quality indications may, in some aspects, be implemented as one or more RSRP estimate values. In at least one aspect, the one or more channel quality indications may be implemented as one or more computations based on the RSRP estimate value (s). Although the one or more channel quality indications have been described as being one or more RSRP estimate values (or computation(s) thereof), one or more channel quality indications (such as one or more SNR estimate values, one or more computations based on SNR estimate value (s), or other channel quality criteria) may be utilized in addition to or alternatively from the one or more RSRP estimate values (or computation(s) thereof). In at least one aspect, the communication link may be implemented as an uplink control channel (e.g., PUCCH) of a current frame (e.g., Frame N). Although the communication link has been described as being an uplink control channel of a current frame, other communication links (such as an uplink channel of a previous frame (e.g., Frame N), an uplink channel of a forthcoming frame (e.g., Frame N+1), among others) may be utilized in addition to or alternatively from the uplink control channel of the current frame.

In some aspects, the overall SNR range may be divided into a plurality of subranges for use in determining which SNR estimation algorithm(s) are utilized in TF selection. According to at least one aspect, the ST-based SNR estimation algorithm may be utilized in TF selection for at least one subrange among the plurality of subranges. For example, the ST-based estimation algorithm may be utilized in TF selection when the one or more channel quality indications satisfy a criteria for inclusion in at least one subrange among the plurality of subranges. The MT-based SNR estimation algorithm may, in some aspects, be utilized in TF selection for at least one subrange among the plurality of subranges. For example, the MT-based estimation algorithm may be utilized in TF selection when the one or more channel quality indications satisfy a criteria for inclusion in at least one subrange among the plurality of subranges.

The criteria for inclusion in a subrange of among the plurality of subranges may, in some aspects, be based on a single point in the overall SNR range or a plurality of points in the SNR range. Therefore, the selection of the ST-based SNR estimation algorithm and/or the MT-based SNR estimation algorithm may be based on a single point in the overall SNR range or a plurality of points in the overall SNR range. According to at least one aspect, the demarcation(s) of subranges may be based on a single point in the overall SNR range or a plurality of points in the overall SNR range. Although the selection of the ST-based SNR estimation algorithm and/or the MT-based SNR estimation algorithm is described as being based on one or more points in the overall SNR range, this selection may be, additionally or alternatively, based on one or more other factors, such as one or more prior RSRP values, one or more further (e.g., simultaneous, concurrent, future) RSRP values, one or more prior SNR estimates, one or more further (e.g., simultaneous, concurrent, future) SNR estimates, one or more previously selected SNR estimation algorithms (e.g., ST-based or MT-based), one or more default SNR estimation algorithms (e.g., ST-based or MT-based), one or more other methodologies (e.g., hysteresis), among others.

Figure 62:
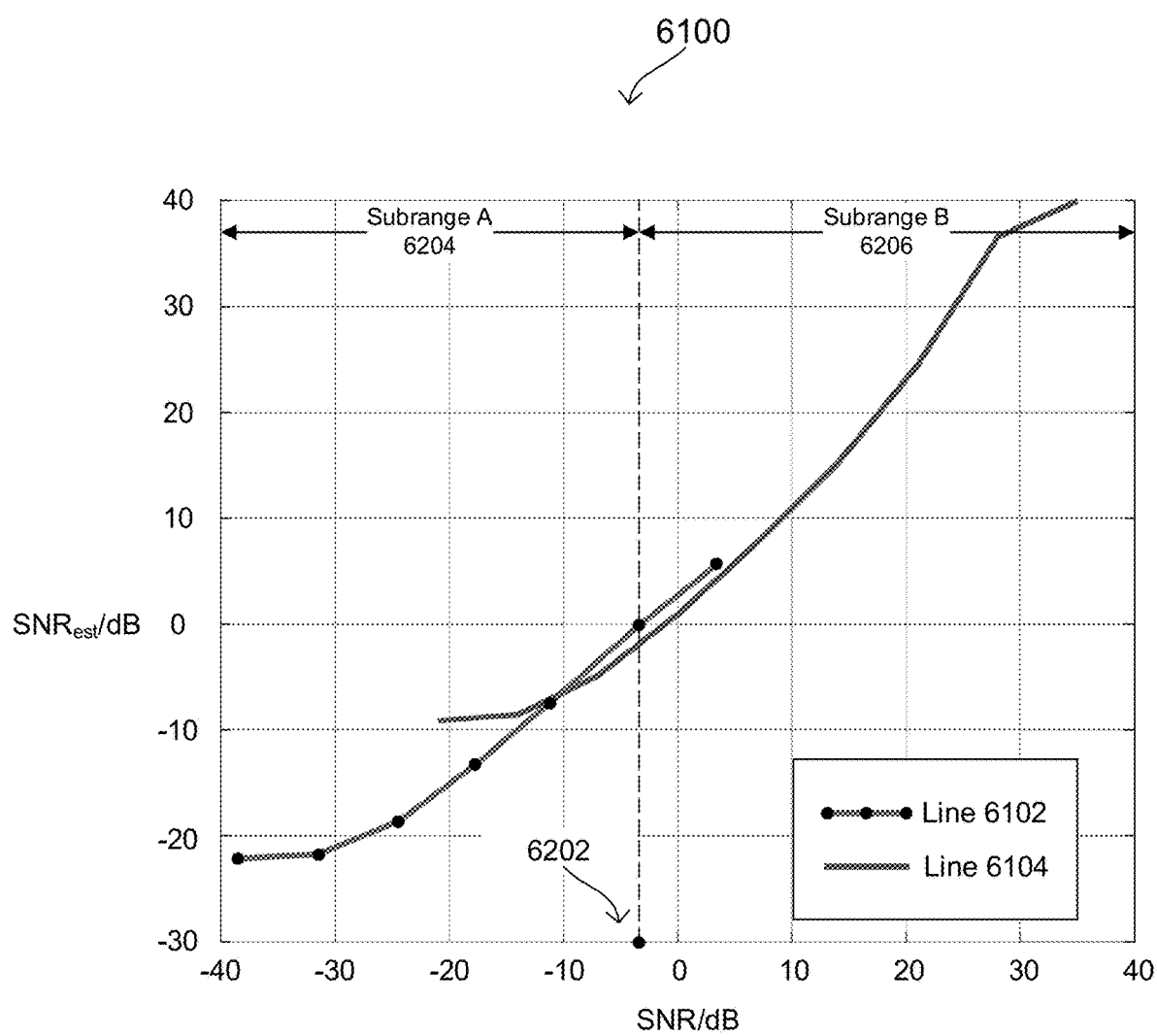
Figure 63:
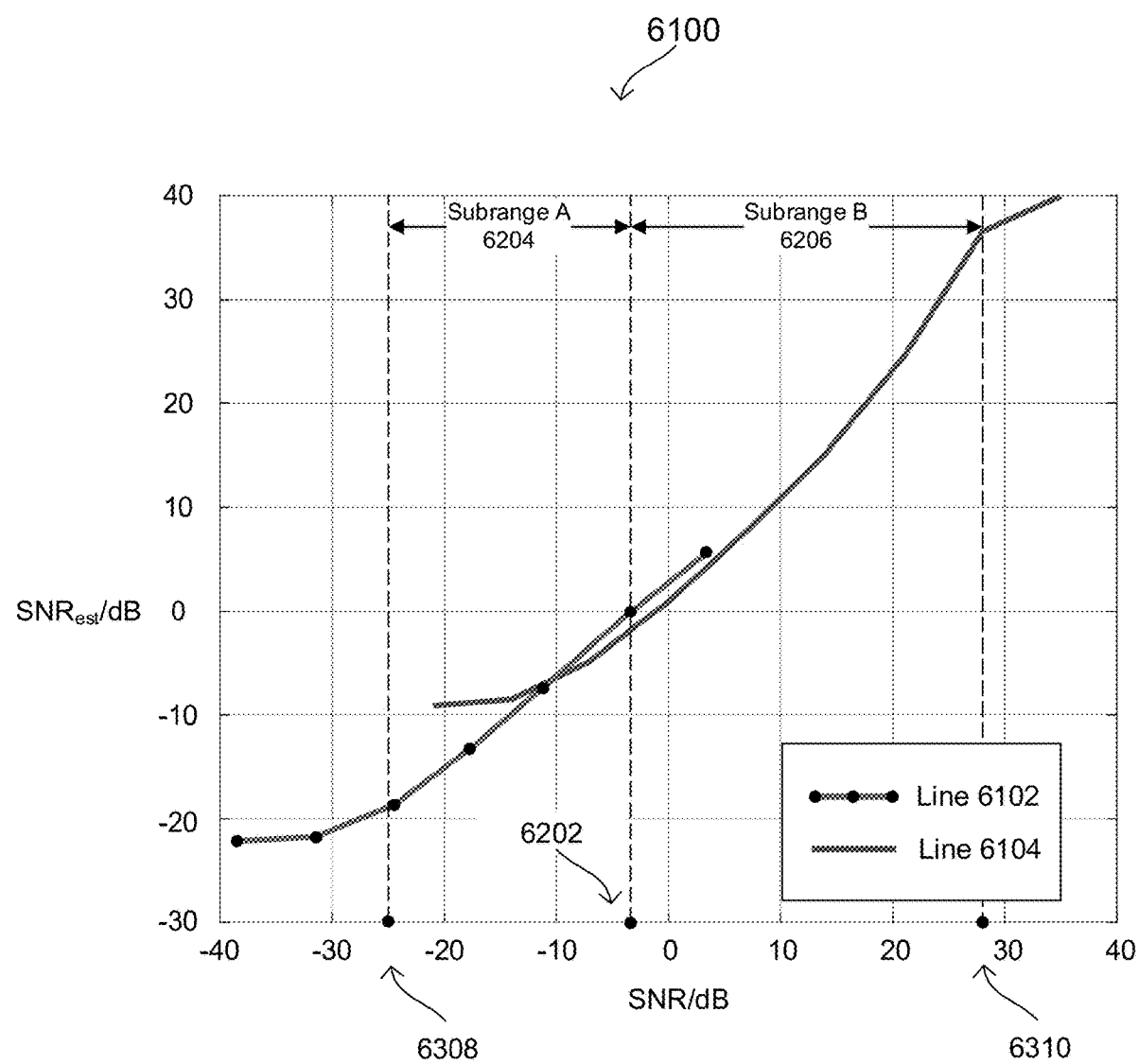

FIG. 62 shows line graph comparison 6100 of the SNR estimation algorithm based on the ST transmission and the SNR estimation algorithm based on the MT transmission having 12 tones ($n_{MT}$=12) with a single point of demarcation 6202 defining subrange A 6204 and subrange B 6206. In a single point approach, it may, in some aspects, be determined whether the signal quality associated with the one or more channel quality indications satisfies a criteria for inclusion in subrange A 6204 and/or subrange B 6206. According to at least one aspect, the signal quality associated with the one or more channel quality indications may be compared to point of demarcation 6202 (e.g., −3 dB) to determine whether the ST-based SNR estimation algorithm and/or the MT-based SNR estimation algorithm is utilization in TF selection.

Figure 64:
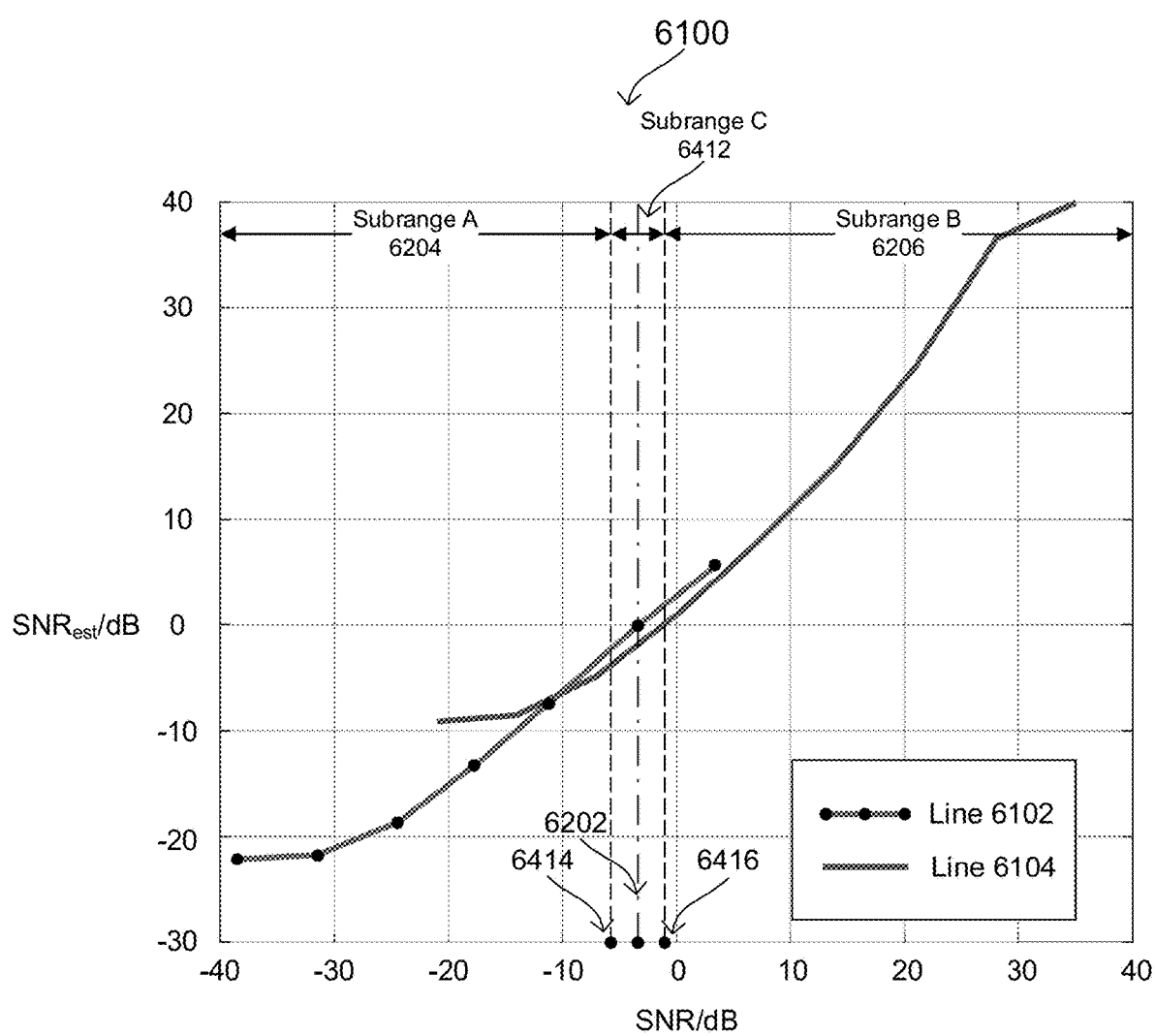

FIG. 64 shows line graph comparison 6100 of the SNR estimation algorithm based on the ST transmission and the SNR estimation algorithm based on the MT transmission having 12 tones ($n_{MT}$=12) with a plurality of points of demarcation (6202, 6414 and/or 6416) defining subrange A 6204, subrange B 6206, and subrange C 6412. In this multi-point approach, it may, in some aspects, be determined whether the signal quality associated with the one or more channel quality indications satisfies a criteria for inclusion in subrange A 6204, subrange B 6206, and/or subrange C 6412. According to at least one aspect, the signal quality associated with the one or more channel quality indications may be compared to one or more points of demarcation, including 6414 (e.g., −4.5 dB), 6202 (e.g., −3 dB) and 6416 (e.g., −1 dB) to determine whether the ST-based SNR estimation algorithm and/or the MT-based SNR estimation algorithm is utilized in TF selection. According to at least one aspect, points of demarcation 6414 (e.g., −4.5 dB) and 6416 (e.g., −1 dB) may be determined by the same or different offset value from point of demarcation 6202 (e.g., −3 dB). For example, if the one or more channel quality indications suggest an SNR value that is less than or equal to point of demarcation 6414 (e.g. −4.5 dB), the ST-based SNR estimation algorithm may be utilized in TF selection. If, however, the one or more channel quality indications suggest an SNR value that is greater than point of demarcation 6416 (e.g., −1 dB), then the MT-based SNR estimation algorithm may, in some aspects, be utilized in TF selection. When the one or more channel quality indications suggest an SNR value that is greater than point of demarcation 6414 (e.g., −4.5 dB) and less than or equal to point of demarcation 6416 (e.g., −1 dB), then the determination as to whether the ST-based SNR estimation algorithm and/or the MT-based SNR estimation algorithm is utilized in TF selection may be based one or more of the above-referenced additional or alternative factors. For example, the previously selected SNR estimation algorithm(s) (e.g., ST-based and/or MT-based) may be utilized when the signal quality associated with the one or more channel quality indications satisfies the criteria for inclusion in subrange C 6412.

In some aspects, however, the MT-based SNR estimation algorithm may be utilized in TF selection even though the one or more channel quality indications suggest an SNR value that is less than or equal to point of demarcation 6414 (e.g., −4.5 dB) based on, e.g., one or more of the above-referenced additional or alternative factors. According to at least one aspect, the ST-based SNR estimation algorithm may be utilized in TF selection even though the one or more channel quality indications suggest an SNR value that is greater than point of demarcation 6416 (e.g., −1 dB) based on, e.g., one or more of the above-referenced additional or alternative factors. A default SNR estimation algorithm (e.g., ST-based and/or MT-based) may, in some aspects, be utilized in TF selection even though the one or more channel quality indications suggest an SNR value that is greater than point of demarcation 6414 (e.g., −4.5 dB) and less than or equal to point of demarcation 6416 (e.g., −1 dB) based on, e.g., one or more of the above-referenced additional or alternative factors.

Figure 65:
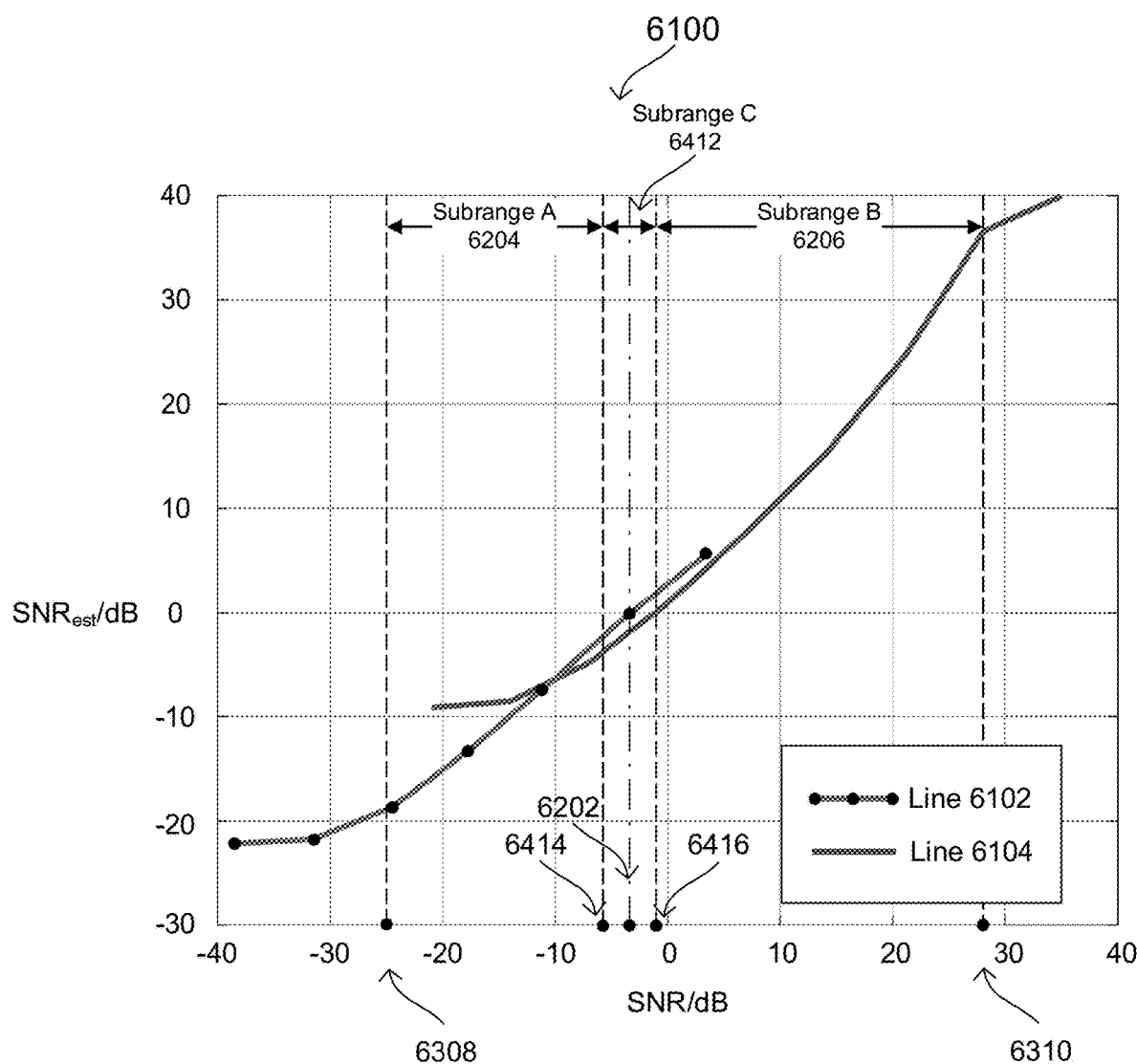

FIG. 65 shows line graph comparison 6100 of the SNR estimation algorithm based on the ST transmission and the SNR estimation algorithm based on the MT transmission having 12 tones ($n_{MT}$=12) with a plurality of points of demarcation (6202, 6308, 6310, 6414 and/or 6416) defining subrange A 6204, subrange B 6206, and subrange C 6412. In this multi-point approach, it may, in some aspects, be determined whether the signal quality associated with the one or more channel quality indications satisfies a criteria for inclusion in subrange A 6204, subrange B 6206, and/or subrange C 6412. According to at least one aspect, the signal quality associated with the one or more channel quality indications may be compared to one or more points of demarcation, including 6308 (e.g., −27 dB), 6414 (e.g., −4.5 dB), 6202 (e.g., −3 dB), 6416 (e.g., −1 dB) and 6310 (e.g., 27 dB) to determine whether the ST-based SNR estimation algorithm and/or the MT-based SNR estimation algorithm is utilized in TF selection. According to at least one aspect, points of demarcation 6414 (e.g., −4.5 dB) and 6416 (e.g., −1 dB) may be determined by the same or different offset value from point of demarcation 6202 (e.g., −3 dB). For example, if the one or more channel quality indications suggest an SNR value that is greater than or equal to point of demarcation 6308 (e.g., −27 dB) and less than or equal to point of demarcation 6414 (e.g. −4.5 dB), the ST-based SNR estimation algorithm may be utilized in TF selection. If, however, the one or more channel quality indications suggest an SNR value that is greater than point of demarcation 6416 (e.g., −1 dB) and less than or equal to point of demarcation 6310 (e.g., 27 dB), then the MT-based SNR estimation may, in some aspects, be utilized in TF selection. When the one or more channel quality indications suggest an SNR value that is greater than point of demarcation 6414 (e.g., −4.5 dB) and less than or equal to point of demarcation 6416 (e.g., −1 dB), then the determination as to whether the ST-based SNR algorithm and/or the MT-based SNR estimation algorithm is utilized in TF selection may be based one or more of the above-referenced additional or alternative factors. For example, the previously selected SNR estimation algorithm(s) (e.g., ST-based and/or MT-based) may be utilized when the signal quality associated with the one or more channel quality indications satisfies the criteria for inclusion in subrange C 6412.

In some aspects, however, the MT-based SNR estimation algorithm may be utilized in TF selection even though the signal quality associated with the one or more channel quality indications is greater than or equal to point of demarcation 6308 (e.g., −27 dB) and less than or equal to point of demarcation 6414 (e.g. −4.5 dB) based on, e.g., one or more of the above-referenced additional or alternative factors. According to at least one aspect, the ST-based SNR estimation algorithm may be utilized in TF selection even though the signal quality associated with the one or more channel quality indications is greater than point of demarcation 6416 (e.g., −1 dB) and less than or equal to point of demarcation 6310 (e.g., 27 dB) based on, e.g., one or more of the above-referenced additional or alternative factors. A default SNR estimation algorithm (e.g., ST-based and/or MT-based) may, in some aspects, be utilized in TF selection even though the signal quality associated with the one or more channel quality indications is greater than point of demarcation 6414 (e.g., −4.5 dB) and less than or equal to point of demarcation 6416 (e.g., −1 dB) based on, e.g., one or more of the above-referenced additional or alternative factors.

In FIGS. 62-65, a subsequent channel quality indication may, in some aspects, be determined when the signal quality associated with the one or more channel quality indications does not satisfy a criteria to be included in subrange A 6204, subrange B 6206, and/or subrange C 6412. For instance, determination of the subsequent channel quality conditions may be triggered by the transmission of a false negative acknowledgment (NACK) and thus redo the determination of the channel quality indications, which fell outside of subrange A 6204, subrange B 6206, and/or subrange C 6412.

With continued reference to FIGS. 62-65, the ST SNR estimation algorithm and/or the MT-based SNR estimation algorithm may be utilized in TF selection when the signal quality associated with the one or more channel quality indications does not satisfy a criteria to be included in subrange A 6204, subrange B 6206, and/or subrange C 6412. According to at least one aspect, the determination of whether the ST-based SNR estimation algorithm and/or the MT-based SNR estimation algorithm for utilization in TF selection may be further based on one or more additional KPIs stored in memory 214 for the communication link. For instance, the ST-based SNR estimation algorithm may be utilized in TF selection if the one or more additional KPIs indicate data resilience would be beneficial, whereas the MT-based estimation algorithm may be utilized in TF selection if the one or more additional KPI indicate data throughput would be beneficial.

Figure 66:
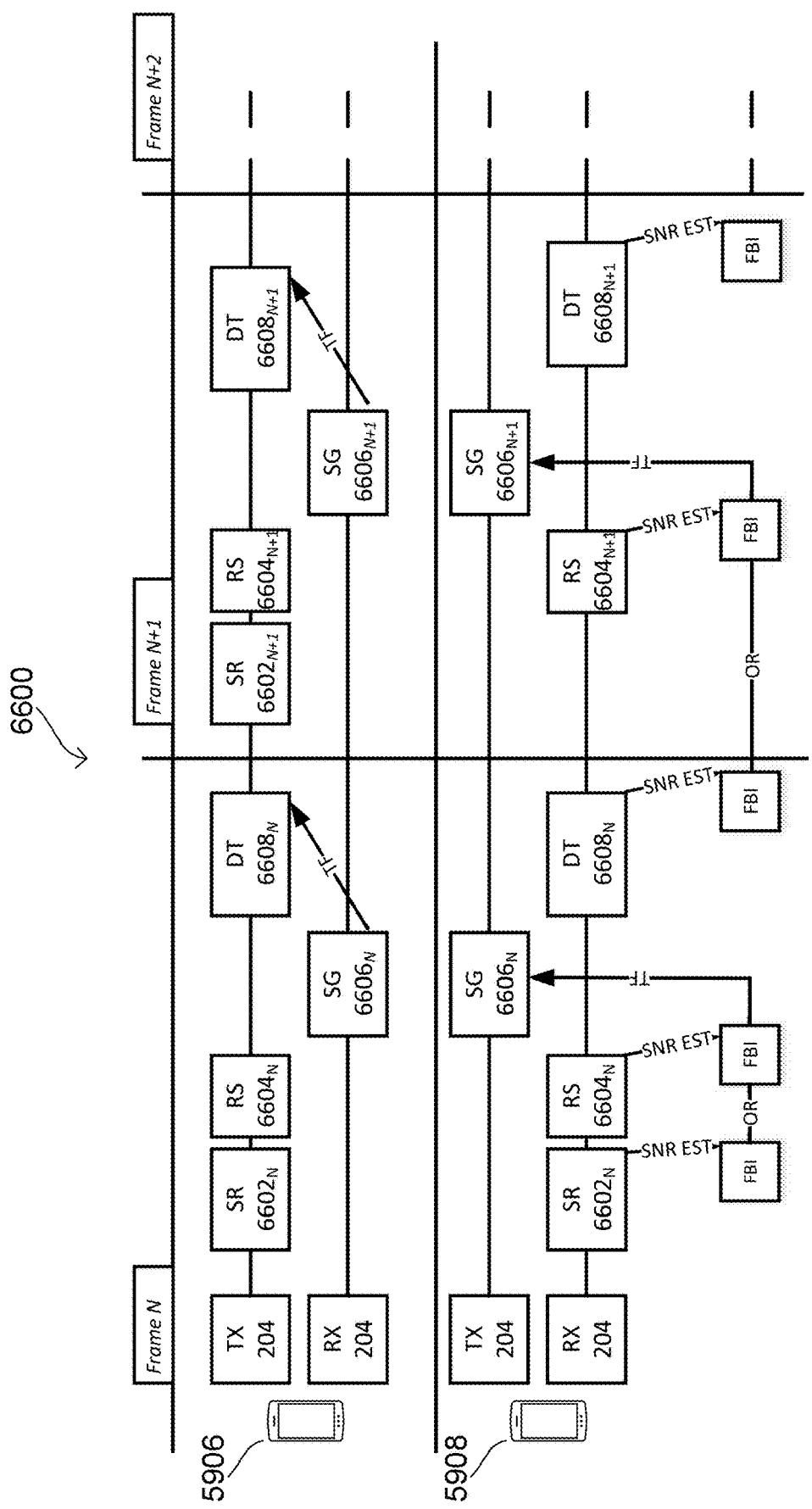
FIG. 66 shows an exemplary message sequence chart for transmission and reception of physical channels between two terminal devices according to some aspects.

FIG. 66 shows a message sequence 6600 for the transmission and reception of physical channels between two terminal devices during link establishment and subsequent data transmission over a decentralized network.

In D2D operation mode, a terminal device (e.g., terminal device 5906) from among terminal devices 5902-5908 may, in some aspects, be configured to initiate link establishment with a further terminal device (e.g., terminal device 5908) from among terminal devices 5902-5908 via decentralized network 6014. For example, terminal device 5906 may be configured to transmit a scheduling request 6602 to terminal device 5908 over communication link 6014c. According to at least one aspect, scheduling request 6602 includes an indication that terminal device 5906 would like to transmit data (e.g., a request to transmit data) to terminal device 5908. Scheduling request 6602 may, in some aspects, include an indication that terminal device 5906 would like to transmit data (e.g., a request to transmit data) and an indication of the amount of data terminal device 5906 would like to transmit.

Scheduling request 6602 may be provided to terminal device 5908 in various forms. In some aspects, scheduling request 6602 may be provided over a physical uplink control channel (PUCCH). According to at least one aspect, terminal device 5906 is configured to transmit scheduling request 6602 as an ST transmission. For example, terminal device 5908 may, in some aspects, be configured to transmit scheduling request 6602 as an ST transmission in accordance with a common frequency hopping scheme of the decentralized network 6014. For a given frame, the common frequency hopping scheme may be implemented as a single subcarrier having a predetermined bandwidth (e.g., 3.5 kHz) of the ST in accordance with at least one aspect.

Terminal device 5908 may be configured to receive scheduling request 6602 from terminal device 5906 over communication link 6014c. After receiving scheduling request 6602, terminal device 5908 may, in some aspects, be configured to evaluate the reception of scheduling request 6602. According to at least one aspect, terminal device 5908 may include a channel quality estimator that is configured to determine the one or more channel quality indications based on scheduling request 6602 received over communication link 6014c. To this end, channel quality estimator of terminal device 5908 may, in some aspects, be configured to estimate one or more RSRP values based on scheduling request 6602 received over communication link 6014c.

Terminal device 5908 may, in some aspects, include a SNR source selector configured to select one or more SNR estimation algorithms from among a plurality of SNR estimation algorithms. According to at least one aspect, SNR source selector may be configured to select one or more SNR estimation algorithms from among a plurality of SNR estimation algorithms based on any of the criteria described with respect to FIGS. 61-65. For example, SNR source selector may be configured to select one or more SNR estimation algorithms when the signal quality associated with the one or more channel quality indications satisfies a criteria for inclusion in subrange A 6204, subrange B 6206, and/or subrange C 6412. In absence of a selection, SNR source selector may, in some aspects, be configured to trigger the transmission of a NACK to terminal device 5906 over communication link 6014c. For example, SNR source selector may be configured to trigger the transmission of a NACK to terminal device 5906 over communication link 6014c when the signal quality associated with the one or more channel quality indications does not satisfy a criteria to be included in subrange A 6204, subrange B 6206, and/or subrange C 6412.

In some aspects, the selected one or more SNR estimation algorithms may remain constant and in use by terminal device 5908 for one or more frames (e.g., Frame N and Frame N+1) of the data transmission between terminal device 5906 and terminal device 5908. According to at least one aspect, the selected one or more SNR estimation algorithms may remain constant and use by terminal device 5908 for the entire the data transmission (e.g., Frame N-Frame M) between terminal device 5906 and terminal device 5908. The selected one or more SNR estimation algorithms may, in some aspects, remain constant and in use by terminal device 5908 for the data transmission between terminal device 5906 and terminal device 5908 until a further scheduling request 6602 is received from terminal device 5906.

In some aspects, channel quality estimator of terminal device 5908 may be configured to estimate an SNR associated with reception of scheduling request 6602 based on the ST-based SNR estimation algorithm. To this end, channel quality estimator of terminal device 5908 may be configured to estimate a noise of communication link 6014c based on noise samples (e.g., taken post channel equalization) from the scheduling request 6602. Normalized noise estimates (N) may be used (SNR=1/SUM(N)), e.g., in which diversity gain is subtracted from the result. According to at least one aspect, channel quality estimator of terminal device 5908 may be configured to transform a plurality of the noise samples, by building a mean value over a particular duration (e.g., the last 32 ms) for reference symbols in scheduling request 6602, to set as a noise floor. Channel quality estimator of terminal device 5908 may, in some aspects, be configured to build a logarithmic value from the noise floor. In at least one aspect, channel quality estimator of terminal device 5908 may be configured to estimate an SNR based on the estimated noise associated with the reception of scheduling request 6602 over communication link 6014c.

Terminal device 5908 may, in some aspects, be configured to select a TF from among a plurality of TFs available to terminal device 5908 based on one or more SNR estimates. According to at least one aspect, the one or more SNR estimates may include the SNR estimate associated with the reception of scheduling request 6602 over communication link 6014c for the present frame (e.g., Frame N). According to at least one aspect, each TF from among the plurality of TFs available to terminal device 5908 includes a number of tones (e.g., 1, 3, 6, or 12) selected for subsequent data communication. In some aspects, each TF from among the plurality of TFs available to terminal device 5908 may include a number of tones selected for subsequent data communication in addition to a number of bits to be transmitted, a modulation scheme and code rate (MCS), a bandwidth and/or a duration.

In some aspects, terminal device 5908 may include a TF selector configured to select a TF from among the plurality of TFs available to terminal device 5908, based on whether the SNR estimate associated with the reception of scheduling request 6602 satisfies a TF selection criteria. According to at least one aspect, TF selector of terminal device 5908 may, in some aspects, be configured to select a TF from among the plurality of TFs available to terminal device 5908 based on the TF selection criteria having the SNR estimate associated with the reception of the scheduling request 6602 as an input. Although TF selection criteria is described having the SNR estimate associated with the reception of the scheduling request 6602 as an input, this selection criteria may have, additionally or alternatively, one or more other inputs, such as one or more prior RSRP values, one or more further (e.g., simultaneous, concurrent, future) RSRP values, one or more prior SNR estimates, one or more further (e.g., simultaneous, concurrent, future) SNR estimates, one or more previously selected TFs (e.g., ST or MT), one or more default TFs (e.g., ST or MT), one or more other methodologies, among others.

TF selector of terminal device 5908 may, in some aspects, be configured to delay the selection of a TF from among the plurality of TFs available to terminal device 5908. According to at least one aspect, TF selector of terminal device 5908 may be configured to delay the selection of a TF until a subsequent SNR estimation is performed by the channel quality estimator of terminal device 5908. In some aspects, TF selector of terminal device 5908 may be configured to delay the selection of a TF from among the plurality of TFs available to the terminal device when the SNR estimate associated with the reception of scheduling request 6602 does not satisfy TF selection criteria.

With continued reference to FIG. 66, terminal device 5906 may, in some aspects, be configured to transmit a plurality of reference symbols 6604 to terminal device 5908 over communication link 6014c. According to at least one aspect, terminal device 5906 may be configured to transmit the plurality of reference symbols 6604 to terminal device 5908 to facilitate terminal device's 5908 ability to measure channel state information (CSI) for communication link 6014c. In some aspects, the plurality of reference symbols 6604 may be implemented as CSI reference symbols (CSI-RS).

The plurality of reference symbols 6604 may be provided to terminal device 5908 in various forms. In some aspects, terminal device 5908 may be configured to transmit the plurality of reference symbols 6604 as an MT transmission. According to at least one aspect, the MT transmission may cover the entire bandwidth (e.g., 180 kHz) of communication link 6014c with the maximum number of subcarriers (e.g., $n_{MT}=12$ tones). Terminal device 5908 may, in some aspects, be configured to transmit the plurality of reference symbols 6604 as an MT transmission in accordance with a device-specific frequency hopping scheme of the decentralized network 6014. For a given frame, the common frequency hopping scheme may be implemented as a plurality of subcarriers (e.g., $n_{MT}=12$ tones) having a cumulative predetermined bandwidth (e.g., 180 kHz) in accordance with at least one aspect.

Terminal device 5908 may be configured to receive the plurality of reference symbols 6604 from terminal device 5906 over communication link 6014c. After receiving the plurality of reference symbols 6604, terminal device 5908 may, in some aspects, be configured to evaluate the reception of the plurality of reference symbols 6604.

In some aspects, channel quality estimator of terminal device 5908 may be configured to estimate an SNR associated with reception of the plurality of reference symbols 6604 based on the MT-based SNR estimation algorithm. To this end, channel quality estimator of terminal device 5908 may be configured to estimate an SNR based one or more measurements associated with the reception of the plurality of reference symbols 6604. The channel quality estimator of terminal device 5908 may, in some aspects, be configured to estimate the SNR based on a comparison of the reference symbols 6604 received over communication link 6014c to a predefined set of reference symbols for each physical channel. Alternatively, the channel quality estimator of terminal device 5908 may be configured to estimate the SNR associated with the reception of the reference symbols 6604 using the same method described with respect to scheduling request 6604 (but not as post-equalizer noise estimation to provide better performance).

As previously noted, terminal device 5908 may, in some aspects, be configured to select a TF from among a plurality of TFs available to terminal device 5908 based on one or more SNR estimates. According to at least one aspect, the one or more SNR estimates may include the SNR estimate associated with the reception of scheduling request 6602 over communication link 6014c and/or the SNR estimate associated with the reception of the plurality of reference symbols 6604 for the present frame (e.g., Frame N).

With continued reference to FIG. 66, terminal device 5908 may, in some aspects, be configured to select a TF from among a plurality of TFs available to terminal device 5908 based on the SNR estimate associated with the reception of the plurality of reference symbols 6604 over communication link 6014c. According to at least one aspect, the TF selector of terminal device 5908 may be configured to select a TF from among the plurality of TFs available to terminal device 5908, based on whether the SNR estimate associated with the reception of the plurality of reference symbols 6604 satisfies the TF selection criteria. According to at least one aspect, TF selector of terminal device 5908 may, in some aspects, be configured to select a TF from among the plurality of TFs available to terminal device 5908 based on the TF selection criteria having the SNR estimate associated with the reception of the scheduling request 6602 as an input and/or the SNR estimate associated with the reception of the scheduling request 6602 as an input. Although TF selection criteria is described having the SNR estimate associated with the reception of the scheduling request 6602 as an input and/or the SNR estimate associated with the reception of the scheduling request 6602 as an input, this selection criteria may have, additionally or alternatively, one or more other inputs, such as one or more prior RSRP values, one or more further (e.g., simultaneous, concurrent, future) RSRP values, one or more prior SNR estimates, one or more further (e.g., simultaneous, concurrent, future) SNR estimates, one or more previously selected TFs (e.g., ST or MT), one or more default TFs (e.g., ST or MT), one or more other methodologies, among others.

TF selector of terminal device 5908 may be configured to select a TF, from among the plurality of TFs available to terminal device 5908, for subsequent data communication by terminal device 5906 within the present frame (e.g., Frame N).

With continued reference to FIG. 66, terminal device 5908 may, in some aspects, be configured to transmit a scheduling grant 6606 to terminal device 5906 over communication link 6014c. According to at least one aspect, terminal device 5908 may be configured to transmit scheduling grant 6606 to instruct terminal device 5906 that the selected TF shall be used for subsequent data communication by terminal device 5906 within the present frame (e.g., Frame N). In some aspects, the selected TF includes a number of tones (e.g., 1, 3, 6, or 12) selected for subsequent data communication. In at least one aspect, the selected TF may include a number of tones selected for subsequent data communication in addition to a number of bits to be transmitted, a modulation scheme and code rate (MCS), a bandwidth and/or a duration.

Scheduling grant 6606 may be provided to terminal device 5906 in various forms. In some aspects, scheduling grant 6606 may be provided over a physical downlink control channel (PDCCH). In some aspects, terminal device 5908 may be configured to transmit scheduling grant 6606 as an ST transmission. For example, terminal device 5908 may be configured to transmit scheduling grant 6606 as an ST transmission in accordance with a common frequency hopping scheme of decentralized network 6014. For the first scheduling grant 6606 (e.g., $6606_N$), the common frequency hopping scheme may be implemented as a single subcarrier having a predetermined bandwidth (e.g., 3.5 kHz) of the ST in accordance with at least one aspect. For subsequent scheduling grants 6606 (e.g., $6606_{N+1}$), the device-specific frequency hopping scheme may be implemented.

The scheduling grant 6606 may, in some aspects, include an indication of the selected TF as part of its payload. According to at least one aspect, the scheduling grant 6606 may be used to instruct terminal device 5902, which TF shall be used for all subsequent data communication within the present frame (e.g., Frame N).

With continued reference to FIG. 66, terminal device 5906 may be configured to receive scheduling grant 6606 from terminal device 5908 over communication link 6014c. After receiving the scheduling grant 6606, terminal device 5908 may, in some aspects, be configured to transmit a data transmission 6608 to terminal device 5908 over communication link 6014c in accordance with the scheduling grant 6606 from terminal device 5908. According to at least one aspect, terminal device 5906 may be configured to strictly follow the selected TF indicated within the scheduling grant 6606 in transmitting data transmission 6608 to terminal device 5908.

Terminal device 5908 may, in some aspects, be configured to receive data transmission 6608 from terminal device 5906 over communication link 6014c. After receiving data transmission 6608, terminal device 5908 may, in some aspects, be configured to evaluate the reception of data transmission 6608.

In some aspects, channel quality estimator of terminal device 5908 may be configured to estimate an SNR based on data transmission 6608 received over communication link 6014c. According to at least one aspect, channel quality estimator of terminal device 5908 may be configured to estimate an SNR associated with reception of the data communication 6608 based on the ST-based SNR estimation algorithm or the MT-based SNR estimation algorithm. To this end, channel quality estimator of terminal device 5908 may be configured to estimate a noise of communication link 6014c based on noise samples (e.g., taken post channel equalization) from data transmission 6608. Normalized noise estimates (N) may be used (SNR=1/SUM(N)), e.g., in which diversity gain is subtracted from the result. According to at least one aspect, channel quality estimator of terminal device 5908 may be configured to transform a plurality of the noise samples, by building a mean value over a particular duration (e.g., the last 32 ms), for reference symbols in data transmission 6608, to set as a noise floor. Channel quality estimator of terminal device 5908 may, in some aspects, be configured to build a logarithmic value from the noise floor. In at least one aspect, channel quality estimator of terminal device 5908 may be configured to estimate an SNR based the estimated noise associated with the reception of data transmission 6608 over communication link 6014c.

As previously noted, terminal device 5908 may, in some aspects, be configured to select a TF from among a plurality of TFs available to terminal device 5908 based on one or more SNR estimates. According to at least one aspect, the one or more SNR estimates may include the SNR estimate associated with the reception of data transmission 6608 over communication link 6014c in the present frame (e.g., Frame N) for use in the following frame (e.g., Frame N+1). In some aspects, the one or more SNR estimates may include the SNR estimate associated with the reception of data transmission 6608 over communication link 6014c in the present frame (e.g., Frame N) and/or an SNR estimate associated with the reception of the plurality of reference symbols 6604 in the following frame (e.g., Frame N+1), for use in the following frame (e.g., Frame N+1).

In some aspect, TF selector of terminal device 5908 may be configured to select a TF from among the plurality of TFs available to terminal device 5908, based on whether the SNR estimate associated with the reception of data transmission 6608 satisfies a TF selection criteria. According to at least one aspect, TF selector of terminal device 5908 may, in some aspects, be configured to select a TF from among the plurality of TFs available to terminal device 5908 based on the TF selection criteria having the SNR estimate associated with the reception of the data transmission 6608 as an input. Although TF selection criteria is described having the SNR estimate associated with the reception of the data transmission 6608 as an input, this selection criteria may have, additionally or alternatively, one or more other inputs, such as one or more prior RSRP values, one or more further (e.g., simultaneous, concurrent, future) RSRP values, one or more prior SNR estimates, one or more further (e.g., simultaneous, concurrent, future) SNR estimates, one or more previously selected TFs (e.g., ST or MT), one or more default TFs (e.g., ST or MT), one or more other methodologies, among others.

In some aspects, TF selector of terminal device 5908 may be configured to delay the selection of a TF from among the plurality of TFs available to terminal device 5908. According to at least one aspect, TF selector of terminal device 5908 may be configured to delay the selection of a TF until a subsequent SNR estimation is performed by the channel quality estimator of terminal device 5908 in the following frame (e.g., Frame N+1). In some aspects, TF selector of terminal device 5908 may be configured to delay the selection of a TF from among the plurality of TFs available to the terminal device when the SNR estimate associated with the reception of data communication 6608 does not satisfy TF selection criteria.

Figure 67:
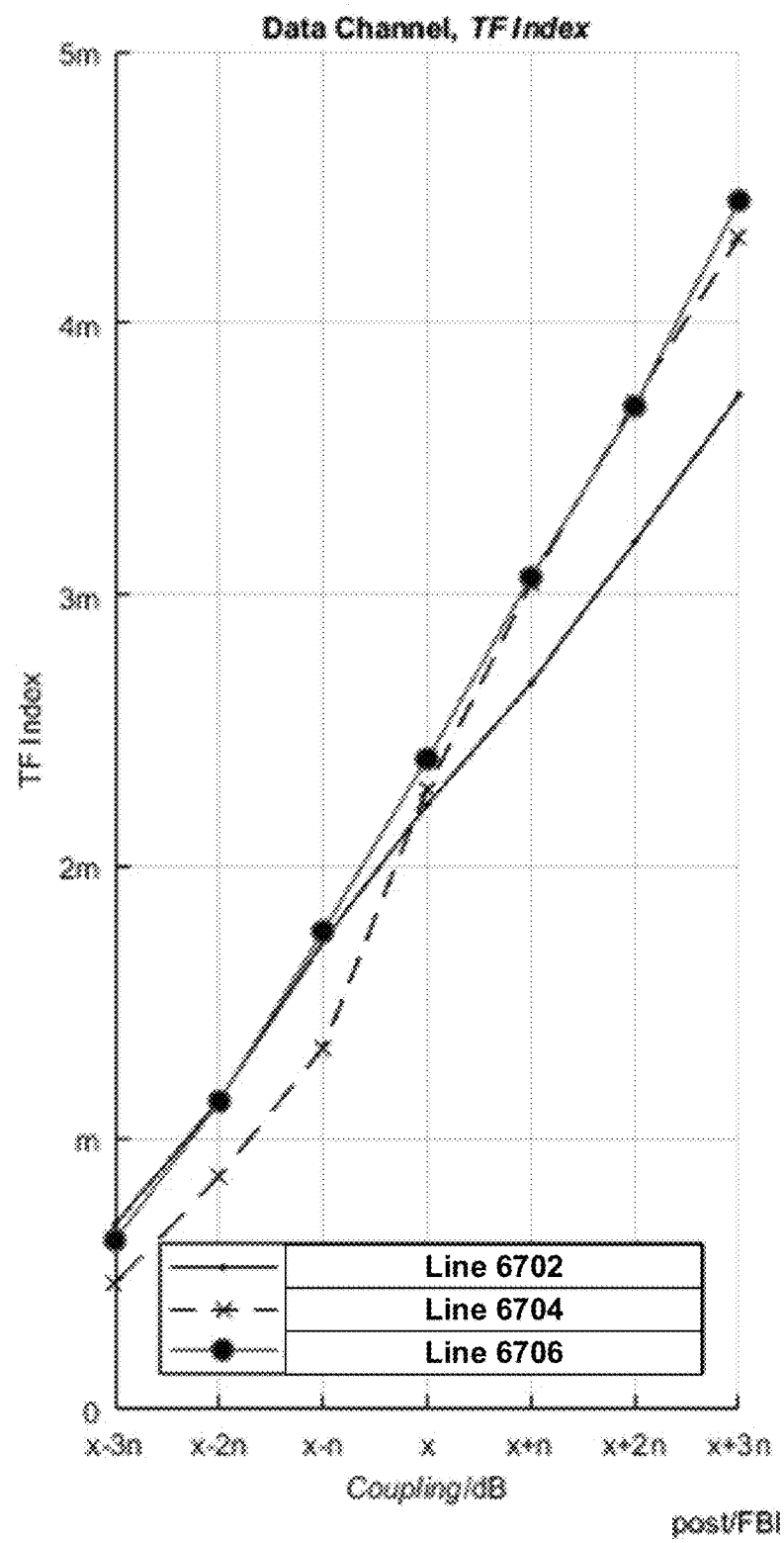
FIGS. 67 and 68 show an exemplary transport format index selection comparison and an exemplary throughput comparison to single algorithms on dedicated channels according to some aspects.
Figure 68:
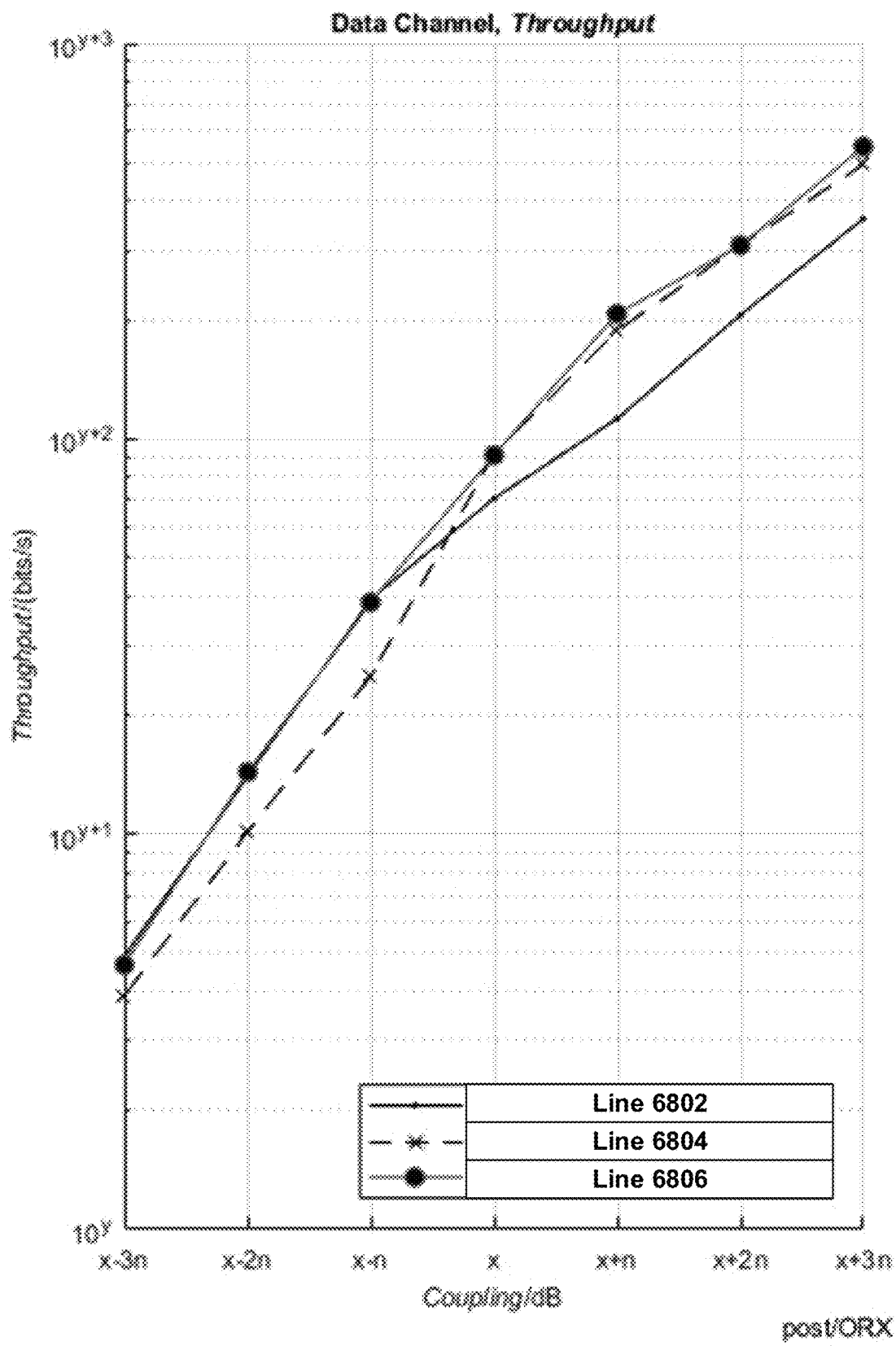

FIGS. 67 and 68 show a TF index selection comparison and a throughput comparison to single algorithms on dedicated channels. As shown in FIG. 67, line 6702 represents an algorithm for TF selection based on one or more SNR estimates associated with the reception of scheduling request 6602 and data transmission 6608 as a function of coupling/dB. Line 6704 represents an algorithm for TF selection based on one or more SNR estimates associated with the reception of the plurality of reference symbols 6604 as a function of coupling/dB. Line 6706 represents an algorithm for TF selection based on one or more SNR estimates associated with the reception of scheduling request 6602, the plurality of reference symbols 6604 and data transmission 6608 as a function of coupling/dB. In some aspects, line 6706 represents a combined algorithm for TF selection based on the TF selection algorithms represented by lines 6702 and 6704.

As shown in FIG. 67, the TF selection of line 6706 tracks the TF selection of line 6702, which is based on one or more SNR estimates associated with the reception of scheduling request 6602 and data transmission 6608 for a lower coupling region (e.g., x−3n to x−n dB). This behavior is based on both channels in this coupling region being modulated as ST. In an upper coupling region (e.g., x+n to x+3n dB), the TF selection of line 6706 tracks the TF selection of line 6904, which is based on one or more SNR estimates associated with the reception of the plurality of reference symbols 6604. This behavior is based on channel in this coupling region being modulated as MT.

FIG. 68 shows the throughput of data transmission 6608 achieved in the frame directly after TF selection (e.g., Frame N) for each of the TF selection algorithms outlined in FIG. 67. Line 6802 represents data throughput achieved in the frame directly after the TF selection algorithm of 6702 is employed. Line 6804 represents data throughput achieved in the frame directly after the TF selection algorithm of 6704 is employed. Line 6806 represents data throughput achieved in the frame directly after the TF selection algorithm of 6706 is employed. Of particular note, line 6806 exhibits a throughput increase by about 0.1 exponents on the log scale compared to that of lines 6802 and 6804 for both the lower coupling region (e.g., x−3n to x−n dB) and the upper coupling region (e.g., x+n to x+3n dB). Moreover, line 6806 also exhibits a smooth transition between the individual TF selection algorithms represented by lines 7002 and 7004.

As previously noted, increased TTI durations may result in high latency in D2D networks. Accordingly, additional delays associated with incremental TF selection may not always be practical over extended durations. In view of the foregoing, the dynamic range of an SNR estimator may be increased, which may, in some aspects, enable the FBI to use the entire set of TFs for fast and/or aggressive selection. By combining dynamic SNR estimations based on ST and MT transmissions, a plurality of KPI may be improved for narrowband D2D communication in unlicensed frequency bands. For example, a high TF may be selected in a single-shot. As a result, the average data throughput may be increased whereas the active time of the RF subsystem is decreased, which also results in lower power consumption.

Figure 69:
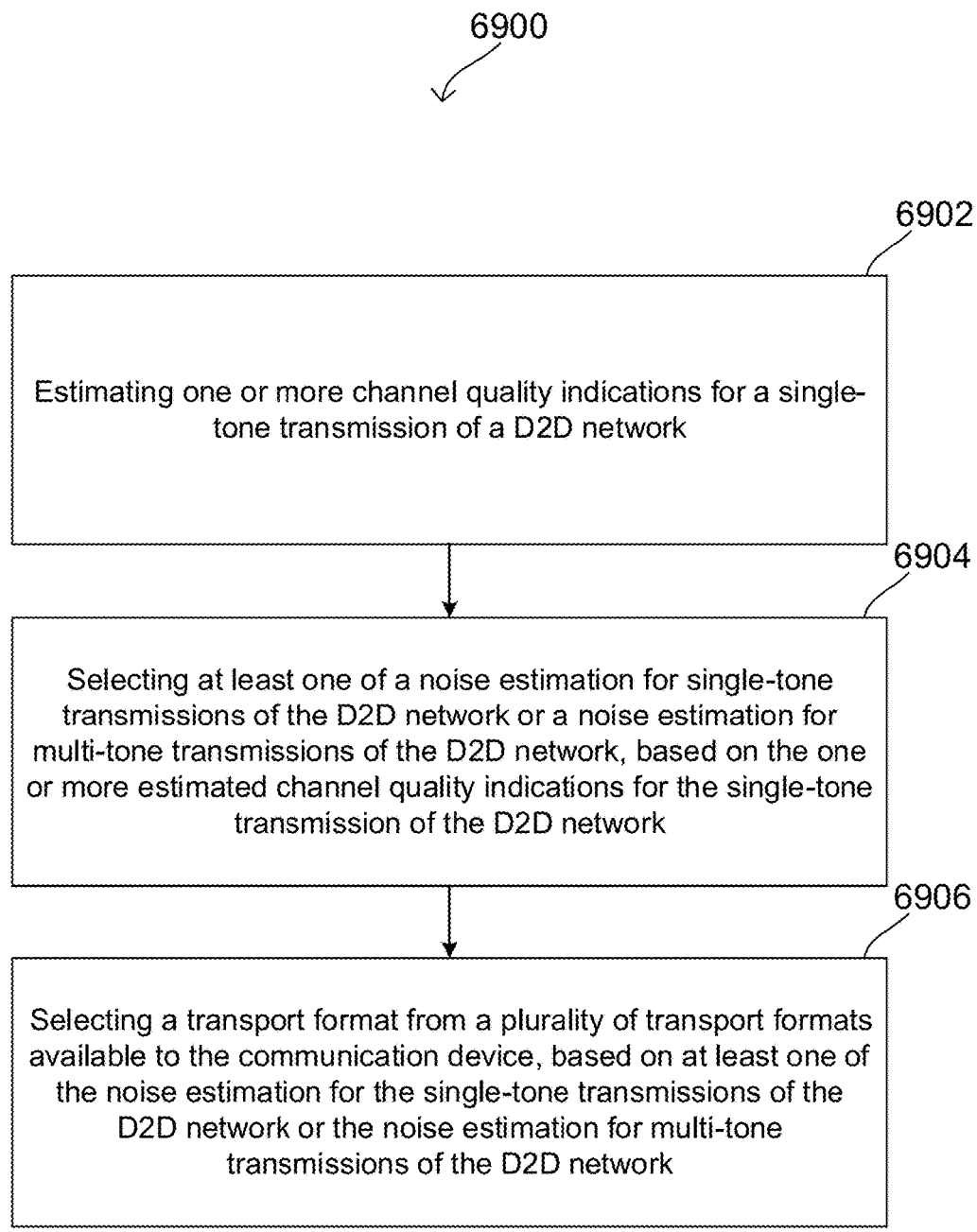
FIGS. 69 and 70 show exemplary methods for a communication device according to some aspects.

FIG. 69 shows an exemplary method 6900 for a communication device configured to operate on a radio communication network and a device-to-device (D2D) network in accordance with some aspects. Method 6900 includes estimating one or more channel quality indications for a single-tone transmission of a D2D network in stage 6902, selecting at least one of a noise estimation for single-tone transmissions of the D2D network or a noise estimation for multi-tone transmissions of the D2D network, based on the one or more estimated channel quality indications for the single-tone transmission of the D2D network in stage 6904, and selecting a transport format from a plurality of transport formats available to the communication device, based on at least one of the noise estimation for the single-tone transmissions of the D2D network or the noise estimation for multi-tone transmissions of the D2D network in stage 6906.

Figure 70:
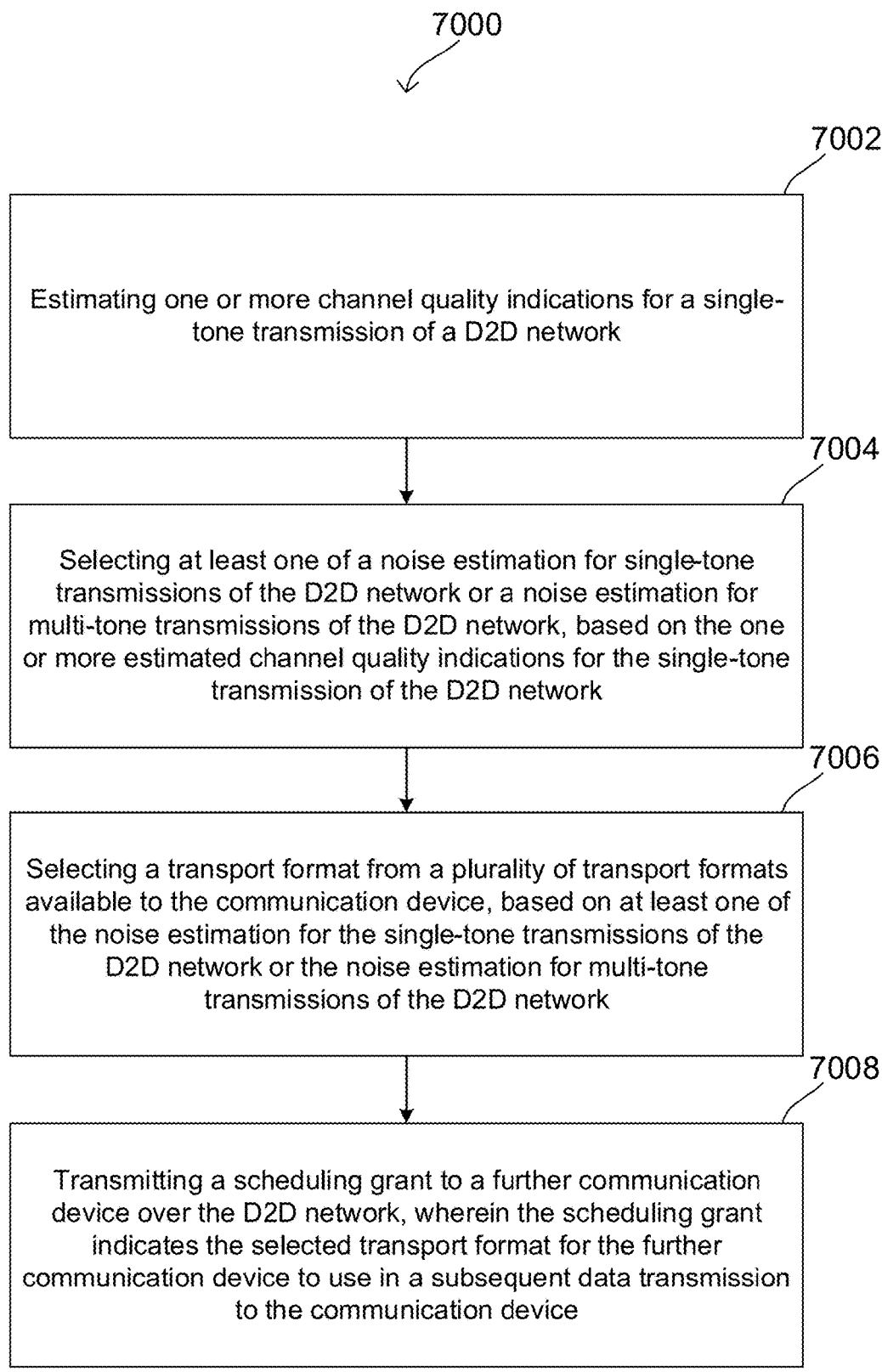

FIG. 70 shows an exemplary method 7000 for a communication device configured to operate on a radio communication network and a device-to-device network in accordance with some aspects. Method 7000 includes estimating one or more channel quality indications for a single-tone transmission of a D2D network in stage 7002, selecting at least one of a noise estimation for single-tone transmissions of the D2D network or a noise estimation for multi-tone transmissions of the D2D network, based on the one or more estimated channel quality indications for the single-tone transmission of the D2D network in stage 7004, selecting a transport format from a plurality of transport formats available to the communication device, based on at least one of the noise estimation for the single-tone transmissions of the D2D network or the noise estimation for multi-tone transmissions of the D2D network in stage 7006, and transmitting a scheduling grant to a further communication device over the D2D network, wherein the scheduling grant indicates the selected transport format for the further communication device to use in a subsequent data transmission to the communication device.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of wireless communication at a wireless device, the method including transmitting a first data symbol, and transmitting a repetition of the first data symbol immediately after the first data symbol, where the first data symbol forms a cyclic prefix for the repetition of the first data symbol.

In Example 2, the subject matter of Example 1 can optionally further include transmitting a separate cyclic prefix immediately before the first data symbol.

In Example 3, the subject matter of Example 1 or 2 can optionally include wherein there is no guard period or other signaling between the first data symbol and the second data symbol.

In Example 4, the subject matter of any one of Examples 1 to 3 can optionally further include transmitting, immediately after the repetition, one or more additional repetitions of the first data symbol in immediate succession with each other.

In Example 5, the subject matter of Example 4 can optionally include wherein the repetition forms a cyclic prefix for the earliest-occurring repetition of the one or more additional repetitions.

In Example 6, the subject matter of Example 4 can optionally include wherein each given repetition of the one or more additional repetitions forms a cyclic prefix for the data symbol immediately after the given data symbol.

In Example 7, the subject matter of Example 4 can optionally further include applying a half-subcarrier shift phase to the first data symbol, the repetition, and the one or more repetitions, wherein the half-subcarrier shift phase has linear and continuous phase across the first data symbol, the repetition, and the one or more repetitions.

In Example 8, the subject matter of any one of Examples 1 to 3 can optionally further include applying a half-subcarrier shift phase to the first data symbol and the repetition that has linear and continuous phase across the first data symbol and the repetition.

Example 9 is a method of wireless communication at a wireless device, the method including transmitting a cyclic prefix for a data symbol, transmitting a plurality of repetitions of the data symbol in immediate succession with each other, wherein one or more of the plurality of repetitions respectively form a cyclic prefix for the repetition immediately after them.

In Example 10, the subject matter of Example 9 can optionally further include the features of any one of Examples 1 to 8.

Example 11 is a method of wireless communication at a wireless device, the method including transmitting a first data symbol, and transmitting a second data symbol immediately after the first data symbol, wherein a final section in time of the first data symbol is the same as a final section in time of the second data symbol.

In Example 12, the subject matter of Example 11 can optionally further include transmitting a separate cyclic prefix immediately before the first data symbol.

In Example 13, the subject matter of Example 11 or 12 can optionally include wherein there is no guard period or other signaling between the first data symbol and the second data symbol.

In Example 14, the subject matter of any one of Examples 11 to 13 can optionally further include transmitting, immediately after the second data symbol, one or more data symbols in immediate succession with each other.

In Example 15, the subject matter of Example 14 can optionally include wherein a final section in time of the second data symbol forms a cyclic prefix for the earliest-occurring data symbol of the one or more data symbols.

In Example 16, the subject matter of Example 14 can optionally include wherein each given data symbol of the one or more data symbol forms a cyclic prefix for the data symbol immediately after the given data symbol.

In Example 17, the subject matter of Example 14 can optionally further include applying a half-subcarrier shift phase to the first data symbol, the second data symbol, and the one or more data symbols, wherein the half-subcarrier shift phase has linear and continuous phase across the first data symbol, the second data symbol, and the one or more data symbols.

In Example 18, the subject matter of any one of Examples 14 to 17 can optionally include wherein the first data symbol, the second data symbol, and the one or more additional data symbols are repetitions of same data symbol.

In Example 19, the subject matter of any one of Examples 11 to 17 can optionally include wherein the first data symbol and the second data symbol are the same data symbol.

In Example 20, the subject matter of any one of Examples 11 to 18 can optionally include wherein the second data symbol is a repetition of the first data symbol.

In Example 21, the subject matter of any one of Examples 11 to 19 can optionally include wherein the first data symbol and the second data symbol are repetitions of a same reference symbol.

In Example 22, the subject matter of any one of Examples 11 to 21 can optionally further include applying a half-subcarrier shift phase to the first and second data symbols that has linear and continuous phase across the first and second data symbols.

Example 23 is a wireless device including a radio transceiver, and a digital transmitter configured to transmit, via the radio transceiver, a first data symbol, and to transmit, via the radio transceiver, a repetition of the first data symbol immediately after the first data symbol, where the first data symbol forms a cyclic prefix for the repetition of the first data symbol.

In Example 24, the subject matter of Example 23 can optionally include wherein the digital transmitter is a baseband digital transmitter configured to perform physical layer transmit processing.

In Example 25, the subject matter of Example 23 or 24 can optionally include wherein the digital transmitter is further configured to transmit a separate cyclic prefix immediately before the first data symbol.

In Example 26, the subject matter of any one of Examples 23 to 25 can optionally include wherein there is no guard period or other signaling between the first data symbol and the second data symbol.

In Example 27, the subject matter of any one of Examples 23 to 26 can optionally include wherein the digital transmitter is further configured to transmit, immediately after the repetition, one or more additional repetitions of the first data symbol in immediate succession with each other.

In Example 28, the subject matter of Example 27 can optionally include wherein the repetition forms a cyclic prefix for the earliest-occurring repetition of the one or more additional repetitions.

In Example 29, the subject matter of Example 27 can optionally include wherein each given repetition of the one or more additional repetitions forms a cyclic prefix for the data symbol immediately after the given repetition.

In Example 30, the subject matter of Example 27 can optionally include wherein the digital transmitter is further configured to apply a half-subcarrier shift phase to the first data symbol, the repetition, and the one or more repetitions, wherein the half-subcarrier shift phase has linear and continuous phase across the first data symbol, the repetition, and the one or more repetitions.

In Example 31, the subject matter of any one of Examples 23 to 26 can optionally include wherein the digital transmitter is further configured to apply a half-subcarrier shift phase to the first data symbol and the repetition that has linear and continuous phase across the first data symbol and the repetition.

Example 32 is a wireless device including a radio transceiver, and a digital transmitter configured to transmit, via the radio transceiver, a cyclic prefix for a data symbol, and to transmit, via the radio transceiver, a plurality of repetitions of the data symbol in immediate succession with each other, wherein one or more of the plurality of repetitions respectively form a cyclic prefix for the repetition immediately after them.

In Example 33, the subject matter of Example 32 can optionally be further configured according to the features of any one of Examples 23 to 31.

Example 34 is a wireless device including a radio transceiver, and a digital transmitter configured to transmit, via the radio transceiver, a first data symbol, and to transmit, via the radio transceiver, a second data symbol immediately after the first data symbol, wherein a final section in time of the first data symbol is the same as a final section of the second data symbol.

In Example 35, the subject matter of Example 34 can optionally include wherein the digital transmitter is a baseband digital transmitter configured to perform physical layer transmit processing.

In Example 36, the subject matter of Example 34 or 35 can optionally include wherein the digital transmitter is further configured to transmit, via the radio transceiver, a separate cyclic prefix immediately before the first data symbol.

In Example 37, the subject matter of any one of Examples 34 to 36 can optionally include wherein there is no guard period or other signaling between the first data symbol and the second data symbol.

In Example 38, the subject matter of any one of Examples 34 to 37 can optionally include wherein the digital transmitter is further configured to transmit, immediately after the second data symbol, one or more data symbols in immediate succession with each other.

In Example 39, the subject matter of Example 38 can optionally include wherein a final section in time of the second data symbol forms a cyclic prefix for the earliest-occurring data symbol of the one or more data symbols.

In Example 40, the subject matter of Example 38 can optionally include wherein each given data symbol of the one or more data symbol forms a cyclic prefix for the data symbol immediately after the given data symbol.

In Example 41, the subject matter of Example 38 can optionally include wherein the digital transmitter is configured to apply a half-subcarrier shift phase to the first data symbol, the second data symbol, and the one or more data symbols, wherein the half-subcarrier shift phase has linear and continuous phase across the first data symbol, the second data symbol, and the one or more data symbols.

In Example 42, the subject matter of any one of Examples 38 to 41 can optionally include wherein the first data symbol, the second data symbol, and the one or more additional data symbols are repetitions of same data symbol.

In Example 43, the subject matter of any one of Examples 34 to 41 can optionally include wherein the first data symbol and the second data symbol are the same data symbol.

In Example 44, the subject matter of any one of Examples 34 to 42 can optionally include wherein the second data symbol is a repetition of the first data symbol.

In Example 45, the subject matter of any one of Examples 34 to 43 can optionally include wherein the first data symbol and the second data symbol are repetitions of a same reference symbol.

In Example 46, the subject matter of any one of Examples 34 to 45 can optionally include wherein the digital transmitter is further configured to apply a half-subcarrier shift phase to the first and second data symbols that has linear and continuous phase across the first and second data symbols.

Example 47 is a method of wireless communication at a wireless device, the method including receiving a first data symbol, and receiving a second data symbol immediately after the first data symbol, wherein a final section in time of the first data symbol is the same as a final section in time of the second data symbol.

In Example 48, the subject matter of Example 47 can optionally further include receiving a separate cyclic prefix immediately before the first data symbol.

In Example 49, the subject matter of Example 47 or 48 can optionally include wherein there is no guard period or other signaling between the first data symbol and the second data symbol.

In Example 50, the subject matter of any one of Examples 47 to 49 can optionally further include receiving, immediately after the second data symbol, one or more one or more data symbols in immediate succession with each other.

In Example 51, the subject matter of Example 50 can optionally include wherein a final section in time of the second data symbol forms a cyclic prefix for the earliest-occurring of the one or more data symbols.

In Example 52, the subject matter of Example 50 can optionally include wherein each given data symbol of the one or more data symbol forms a cyclic prefix for the data symbol immediately after the given data symbol.

In Example 53, the subject matter of Example 50 can optionally further include reverting a half-subcarrier shift phase to the first data symbol, the second data symbol, and the one or more data symbols, wherein the half-subcarrier shift phase has linear and continuous phase across the first data symbol, the second data symbol, and the one or more data symbols.

In Example 54, the subject matter of Example 50 can optionally include wherein the first data symbol, the second data symbol, and the one or more data symbols are repetitions of a same data symbol.

In Example 55, the subject matter of any one of Examples 47 to 54 can optionally include wherein the first data symbol and the second data symbol are the same data symbol.

In Example 56, the subject matter of any one of Examples 47 to 54 can optionally include wherein the second data symbol is a repetition of the first data symbol.

In Example 57, the subject matter of any one of Examples 47 to 56 can optionally include wherein the first data symbol and the second data symbol are repetitions of a same reference symbol.

Example 58 is a method of wireless communication at a wireless device, the method including receiving a signal including a plurality of repetitions of a data symbol in immediate succession with each other, selecting a modified cyclic prefix that includes a first repetition of the plurality of repetitions, and truncating the signal based on the modified cyclic prefix to obtain a truncated signal including a second repetition of the plurality of repetitions.

In Example 59, the subject matter of Example 58 can optionally include wherein selecting the modified cyclic prefix includes selecting the modified cyclic prefix based on an expected propagation delay.

In Example 60, the subject matter of Example 58 can optionally include wherein selecting the modified cyclic prefix includes selecting more of the plurality of repetitions for the modified cyclic prefix for a first expected propagation delay than for a second expected propagation delay, wherein the second expected propagation delay is less than the first expected propagation delay.

In Example 61, the subject matter of any one of Examples 58 to 60 can optionally include wherein the first repetition of the plurality of repetitions is the earliest-occurring repetition in time of the plurality of repetitions.

In Example 62, the subject matter of any one of Examples 58 to 60 can optionally include wherein the modified cyclic prefix includes one or more repetitions of the plurality of repetitions, and wherein a last-occurring repetition of the one or more repetitions in time forms a cyclic prefix for the second repetition.

In Example 63, the subject matter of Example 62 can optionally include wherein the second repetition that occurs immediately after the last-occurring repetition.

In Example 64, the subject matter of Example 63 can optionally include wherein the truncated signal includes an immediate succession of repetitions from the second repetition to a last-occurring repetition in the plurality of repetitions.

In Example 65, the subject matter of Example 62 can optionally include wherein the one or more repetitions are an immediate succession of repetitions from the first repetition to the last-occurring repetition of the one or more repetitions.

In Example 66, the subject matter of any one of Examples 58 to 65 can optionally include wherein there is no guard period or other signaling between the plurality of repetitions of the data symbol.

In Example 67, the subject matter of any one of Examples 58 to 66 can optionally include wherein the signal includes a separate cyclic prefix immediately before the first repetition of the plurality of the repetitions.

In Example 68, the subject matter of Example 67 can optionally include wherein the modified cyclic prefix further includes the separate cyclic prefix.

In Example 69, the subject matter of any one of Examples 58 to 68 can optionally include wherein the data symbol is a reference symbol.

In Example 70, the subject matter of any one of Examples 58 to 69 can optionally further include performing demodulation or channel estimation based on the truncated signal.

In Example 71, the subject matter of any one of Examples 58 to 69 can optionally further include identifying a beacon signal based on the truncated signal, where the beacon signal indicates a predefined beacon event.

Example 72 is a method of wireless communication at a wireless device, the method including receiving a cyclic prefix for a data symbol, and receiving a plurality of repetitions of the data symbol in immediate succession with each other, wherein one or more of the plurality of repetitions respectively form a cyclic prefix for the repetition immediately after them.

In Example 73, the subject matter of Example 72 can optionally further include selecting a modified cyclic prefix including the cyclic prefix and a first repetition of the plurality of repetitions, and truncating the signal based on the modified cyclic prefix to obtain a truncated signal including a second repetition of the plurality of repetitions.

In Example 74, the subject matter of Example 72 or 73 can optionally further include the features of any one of Examples 48 to 71.

Example 75 is a wireless device including a radio transceiver, and a digital receiver configured to receive, via the radio transceiver, a first data symbol, and to receive, via the radio transceiver, a second data symbol immediately after the first data symbol, wherein a final section in time of the first data symbol is the same as a final section in time of the second data symbol.

In Example 76, the subject matter of Example 75 can optionally include wherein the digital receiver is a baseband digital receiver configured to receive signals via the radio transceiver and to perform physical layer processing on the signals to obtain baseband data.

In Example 77, the subject matter of Example 75 or 76 can optionally include wherein the digital receiver is further configured to receive a separate cyclic prefix immediately before the first data symbol.

In Example 78, the subject matter of any one of Examples 75 to 77 can optionally include wherein there is no guard period or other signaling between the first data symbol and the second data symbol.

In Example 79, the subject matter of any one of Examples 75 to 78 can optionally include wherein the digital receiver is further configured to receive, immediately after the second data symbol, one or more one or more data symbols in immediate succession with each other.

In Example 80, the subject matter of Example 79 can optionally include wherein a final section in time of the second data symbol forms a cyclic prefix for the earliest-occurring of the one or more data symbols.

In Example 81, the subject matter of Example 79 can optionally include wherein each given data symbol of the one or more data symbol forms a cyclic prefix for the data symbol immediately after the given data symbol.

In Example 82, the subject matter of Example 79 can optionally include wherein the digital receiver is further configured to revert a half-subcarrier shift phase to the first data symbol, the second data symbol, and the one or more data symbols, wherein the half-subcarrier shift phase has linear and continuous phase across the first data symbol, the second data symbol, and the one or more data symbols.

In Example 83, the subject matter of Example 79 can optionally include wherein the first data symbol, the second data symbol, and the one or more data symbols are repetitions of a same data symbol.

In Example 84, the subject matter of any one of Examples 75 to 83 can optionally include wherein the first data symbol and the second data symbol are the same data symbol.

In Example 85, the subject matter of any one of Examples 75 to 84 can optionally include wherein the second data symbol is a repetition of the first data symbol.

In Example 86, the subject matter of any one of Examples 75 to 85 can optionally include wherein the first data symbol and the second data symbol are repetitions of a same reference symbol.

Example 87 is a wireless device including a radio transceiver, and a digital receiver configured to receive, via the radio transceiver, a signal including a plurality of repetitions of a data symbol in immediate succession with each other, select a modified cyclic prefix that includes a first repetition of the plurality of repetitions, and truncate the signal based on the modified cyclic prefix to obtain a truncated signal including a second repetition of the plurality of repetitions.

In Example 88, the subject matter of Example 87 can optionally include wherein the digital receiver is a baseband digital receiver configured to receive signals via the radio transceiver and to perform physical layer processing on the signals to obtain baseband data.

In Example 89, the subject matter of Example 87 or 88 can optionally include wherein the digital receiver is configured to select the modified cyclic prefix by selecting the modified cyclic prefix based on an expected propagation delay.

In Example 90, the subject matter of Example 87 or 88 can optionally include wherein the digital receiver is configured to select more of the plurality of repetitions for the modified cyclic prefix for a first expected propagation delay than for a second expected propagation delay, wherein the second expected propagation delay is less than the first expected propagation delay.

In Example 91, the subject matter of any one of Examples 87 to 90 can optionally include wherein the first repetition of the plurality of repetitions is the earliest-occurring repetition in time of the plurality of repetitions.

In Example 92, the subject matter of any one of Examples 87 to 90 can optionally include wherein the modified cyclic prefix includes one or more repetitions of the plurality of repetitions, and wherein a last-occurring repetition of the one or more repetitions in time forms a cyclic prefix for the second repetition.

In Example 93, the subject matter of Example 92 can optionally include wherein the second repetition that occurs immediately after the last-occurring repetition.

In Example 94, the subject matter of Example 93 can optionally include wherein the truncated signal includes an immediate succession of repetitions from the second repetition to a last-occurring repetition in the plurality of repetitions.

In Example 95, the subject matter of Example 92 can optionally include wherein the one or more repetitions are an immediate succession of repetitions from the first repetition to the last-occurring repetition of the one or more repetitions.

In Example 96, the subject matter of any one of Examples 87 to 95 can optionally include wherein there is no guard period or other signaling between the plurality of repetitions of the data symbol.

In Example 97, the subject matter of any one of Examples 87 to 96 can optionally include wherein the signal includes a separate cyclic prefix immediately before the first repetition of the plurality of the repetitions.

In Example 98, the subject matter of Example 97 can optionally include wherein the modified cyclic prefix further includes the separate cyclic prefix.

In Example 99, the subject matter of any one of Examples 87 to 98 can optionally include wherein the data symbol is a reference symbol.

In Example 100, the subject matter of any one of Examples 87 to 99 can optionally include wherein the digital receiver is further configured to perform demodulation or channel estimation based on the truncated signal.

In Example 101, the subject matter of any one of Examples 87 to 99 can optionally include wherein the digital receive is further configured to identify a beacon signal based on the truncated signal, where the beacon signal indicates a predefined beacon event.

Example 102 is a wireless device including a radio transceiver, and a digital receiver configured to receive, via the radio transceiver, a cyclic prefix for a data symbol, and to receive, via the radio transceiver, a plurality of repetitions of the data symbol in immediate succession with each other, wherein one or more of the plurality of repetitions respectively form a cyclic prefix for the repetition immediately after them.

In Example 103, the subject matter of Example 102 can optionally include wherein the digital receiver is further configured to select a modified cyclic prefix including the cyclic prefix and a first repetition of the plurality of repetitions, and truncate the signal based on the modified cyclic prefix to obtain a truncated signal including a second repetition of the plurality of repetitions.

In Example 104, the subject matter of Example 102 or 103 can optionally be further configured with the features of any one of Examples 87 to 101.

Example 105 is a wireless device including a radio transceiver, and processing circuitry configured to transmit and receive via the radio transceiver, and further configured to perform the method of any one of Examples 1 to 22 or 47 to 71.

Example 106 is a non-transitory computer readable medium storing instructions that, when executed by one or more processors of a wireless device, cause the wireless device to perform the method of any one of Examples 1 to 22 or 47 to 71.

Example 107 is a wireless device including means for transmitting a first data symbol, means for transmitting a second data symbol immediately after the first data symbol, wherein a final section in time of the first data symbol is the same as a final section in time of the second data symbol.

Example 108 is a wireless device including means for transmitting a first data symbol, means for transmitting a repetition of the first data symbol immediately after the first data symbol, where the first data symbol forms a cyclic prefix for the repetition of the first data symbol.

Example 109 is a wireless device including means for receiving a first data symbol, and means for receiving a second data symbol immediately after the first data symbol, wherein a final section in time of the first data symbol is the same as a final section in time of the second data symbol.

Example 110 is a wireless device including means for receiving a signal including a plurality of repetitions of a data symbol in immediate succession with each other, means for selecting a modified cyclic prefix that includes a first repetition of the plurality of repetitions, and means for truncating the signal based on the modified cyclic prefix to obtain a truncated signal including a second repetition of the plurality of repetitions.

Example 111 is a method of wireless communication at a wireless device, the method including estimating a frequency offset between a local frequency and a reference frequency of a received synchronization signal, determining, based on the frequency offset, a correction to the local frequency that compensates temperature-based frequency drift in the local frequency, and adjusting the local frequency based on the correction to obtain a corrected local frequency.

In Example 112, the subject matter of Example 111 can optionally further include transmitting or receiving signals based on the corrected local frequency.

In Example 113, the subject matter of Example 112 can optionally include wherein transmitting or receiving signals based on the corrected local frequency includes performing baseband or radio transmission using the corrected local frequency.

In Example 114, the subject matter of Example 112 can optionally include wherein transmitting or receiving signals based on the corrected local frequency includes performing baseband or radio reception using the corrected local frequency.

In Example 115, the subject matter of any one of Examples 111 to 114 can optionally further include, before estimating the frequency offset, receiving the received synchronization signal from a reference device.

In Example 116, the subject matter of Example 115 can optionally include wherein the reference device is a terminal device and wherein the received synchronization signal is a device-to-device synchronization signal.

In Example 117, the subject matter of any one of Examples 111 to 116 can optionally include wherein the local frequency is based on an oscillation frequency of a local oscillator of the wireless device.

In Example 118, the subject matter of Example 117 can optionally include wherein the temperature-based frequency drift is frequency drift of the oscillation frequency caused by temperature variations in an environment of the local oscillator.

In Example 119, the subject matter of any one of Examples 111 to 118 can optionally include wherein estimating the frequency offset between the local frequency and the reference frequency of the received synchronization signal includes generating a local reference signal based on the local frequency, determining a cross-correlation between the local reference signal and the received synchronization signal, determining a phase offset between the local reference signal and the received synchronization signal based on the cross-correlation, and estimating the frequency offset based on the phase offset.

In Example 120, the subject matter of any one of Examples 111 to 119 can optionally include wherein adjusting the local frequency based on the correction to obtain the corrected local frequency includes receiving a native clock signal from a local oscillator of the wireless device, and generating the corrected local frequency from the native clock signal based on the correction to obtain the corrected local frequency.

In Example 121, the subject matter of Example 120 can optionally include wherein generating the corrected local frequency from the native clock signal based on the correction includes sampling the native clock signal with a sampling rate that is based on the correction to obtain the corrected local frequency.

In Example 122, the subject matter of any one of Examples 111 to 121 can optionally include wherein the correction is a frequency correction instruction, and wherein adjusting the local frequency based on the correction to obtain a corrected local frequency includes providing the frequency correction instruction to a frequency tuner, and sampling, at the frequency tuner, a native clock signal of the wireless device based on the frequency correction instruction to obtain the corrected local frequency.

In Example 123, the subject matter of any one of Examples 111 to 122 can optionally further include determining the local frequency based on an earlier correction that is different from the correction.

In Example 124, the subject matter of any one of Examples 111 to 123 can optionally include wherein determining the correction includes applying a second-order low-pass control loop to the frequent offset to obtain the correction.

In Example 125, the subject matter of any one of Examples 111 to 123 can optionally include wherein determining the correction includes determining the correction based on a control loop including a delay element that delays an output of the control loop to obtain a delayed output, a first proportional factor before the delay element that weights the frequency offset, and a second proportional factor after the delay element that weights the delayed output.

In Example 126, the subject matter of Example 125 can optionally include wherein the first proportional factor and the second proportional factor produce a combined factor that tunes a gain of the control loop to 1.

In Example 127, the subject matter of Example 125 or 126 can optionally include wherein the first proportional factor and the second proportional factor are tuned to correct for frequency ramps in the local frequency.

In Example 128, the subject matter of any one of Examples 125 to 127 can optionally include wherein an output of the control loop based on a sum of the weighted delayed output and the weighed frequency offset.

In Example 129, the subject matter of any one of Examples 111 to 128 can optionally further include repeatedly determining updated corrections over time based on varying frequency offsets and repeatedly adjusting the local frequency over time based on the updated corrections, wherein the updated corrections compensate for temperature-based frequency drift in the local frequency.

In Example 130, the subject matter of Example 129 can optionally include wherein the updated corrections average out a measurement noise over time that is present in the estimating of the frequency offset.

In Example 130, the subject matter of Example 129 or 130 can optionally include wherein repeatedly determining the updated corrections includes determining the updated corrections based on a control loop that weights a current sample of the frequency offset to obtain a weighted sample and adds the weighted sample to a past sample of the correction.

In Example 132, the subject matter of any one of Examples 111 to 123 can optionally include wherein determining the correction includes determining the correction based on a first-order low pass that compensates for measurement noise in the estimating of the frequency offset and based on a second-order low pass that compensates the temperature-based frequency drift.

Example 133 is a wireless device including a digital receiver configured to estimate a frequency offset between a local frequency and a reference frequency of a received synchronization signal, a frequency controller configured to determine, based on the frequency offset, a correction to the local frequency that compensates temperature-based frequency drift in the local frequency, and a frequency tuner configured to adjust the local frequency based on the correction to obtain a corrected local frequency.

In Example 134, the subject matter of Example 133 can optionally include wherein the digital receiver is a baseband physical layer receiver.

In Example 135, the subject matter of Example 133 or 134 can optionally include wherein the frequency tuner is further configured to provide the local frequency to the digital receiver, to a digital transmitter of the wireless device, to a radio transmitter of the wireless device, or to a radio receiver of the wireless device.

In Example 136, the subject matter of Example 133 or 134 can optionally include wherein the digital receiver is configured perform digital reception processing on received signals based on the corrected local frequency.

In Example 137, the subject matter of Example 133 or 134 can optionally further include a digital transmitter configured to perform digital transmission processing on transmit signals based on the corrected local frequency.

In Example 138, the subject matter of Example 133 or 134 can optionally further include a radio receiver configured to perform radio reception processing on received signals based on the corrected local frequency.

In Example 139, the subject matter of Example 133 or 134 can optionally further include a radio transmitter configured to perform radio transmission on transmit signals based on the corrected local frequency.

In Example 140, the subject matter of any one of Examples 133 to 139 can optionally include wherein the digital receiver is further configured to, before estimating the frequency offset, receive the received synchronization signal from a reference device.

In Example 141, the subject matter of Example 140 can optionally include wherein the digital receiver is configured to receive the received synchronization signal via a radio receiver and one or more antennas.

In Example 142, the subject matter of Example 141 can optionally include wherein the reference device is a terminal device and wherein the received synchronization signal is a device-to-device synchronization signal.

In Example 143, the subject matter of any one of Examples 133 to 142 can optionally further include a local oscillator configured to generate an oscillation frequency, wherein the local frequency is based on the oscillation frequency.

In Example 144, the subject matter of Example 143 can optionally include wherein the temperature-based frequency drift is frequency drift of the oscillation frequency caused by temperature variations in an environment of the local oscillator.

In Example 145, the subject matter of any one of Examples 133 to 144 can optionally include wherein the digital receiver is configured to estimate the frequency offset between the local frequency and the reference frequency of the received synchronization signal by generating a local reference signal based on the local frequency, determining a cross-correlation between the local reference signal and the received synchronization signal, determining a phase offset between the local reference signal and the received synchronization signal based on the cross-correlation, and estimating the frequency offset based on the phase.

In Example 146, the subject matter of any one of Examples 133 to 145 can optionally include wherein the frequency tuner is configured to adjust the local frequency based on the correction to obtain the corrected local frequency by receiving a native clock signal from a local oscillator of the wireless device, and generating the corrected local frequency from the native clock signal based on the correction to obtain the corrected local frequency.

In Example 147, the subject matter of Example 146 can optionally include wherein the frequency tuner is configured to generate the corrected local frequency from the native clock signal based on the correction by sampling the native clock signal with a sampling rate that is based on the correction to obtain the corrected local frequency.

In Example 148, the subject matter of any one of Examples 133 to 147 can optionally include wherein the correction is a frequency correction instruction and the frequency controller is configured to send the frequency correction instruction to the frequency tuner, and wherein the frequency tuner is configured to adjust the local frequency based on the correction to obtain a corrected local frequency by sampling a native clock signal of the wireless device based on the frequency correction instruction to obtain the corrected local frequency In Example 149, the subject matter of any one of Examples 133 to 148 can optionally include wherein the frequency tuner is configured to determine the local frequency based on an earlier correction that is different from the correction.

In Example 150, the subject matter of any one of Examples 133 to 149 can optionally include wherein the frequency controller is configured to determine the correction by applying a second-order low-pass control loop to the frequent offset to obtain the correction.

In Example 151, the subject matter of any one of Examples 133 to 150 can optionally include wherein the frequency controller is configured to determine the correction based on a control loop including a delay element that delays an output of the control loop to obtain a delayed output, a first proportional factor before the delay element that weights the frequency offset, and a second proportional factor after the delay element that weights the delayed output.

In Example 152, the subject matter of Example 151 can optionally include wherein the first proportional factor and the second proportional factor produce a combined factor that tunes a gain of the control loop to 1.

In Example 153, the subject matter of Example 151 or 152 can optionally include wherein the first proportional factor and the second proportional factor are tuned to correct for frequency ramps in the local frequency.

In Example 154, the subject matter of any one of Examples 151 to 153 can optionally include wherein an output of the control loop based on a sum of the weighted delayed output and the weighed frequency offset.

In Example 155, the subject matter of any one of Examples 133 to 154 can optionally include wherein the frequency controller is configured to repeatedly determined updated corrections over time based on varying frequency offsets and the frequency tuner is configured to repeatedly adjust the local frequency over time based on the updated corrections, wherein the updated corrections compensate for temperature-based frequency drift in the local frequency.

In Example 156, the subject matter of Example 155 can optionally include wherein the updated corrections average out a measurement noise over time that is present in the estimating of the frequency offset.

In Example 157, the subject matter of Example 155 or 156 can optionally include wherein the frequency controller is configured to repeatedly determine the updated corrections based on a control loop that weights a current sample of the frequency offset to obtain a weighted sample and adds the weighted sample to a past sample of the correction.

In Example 158, the subject matter of any one of Examples 133 to 149 can optionally include wherein the frequency controller is configured to determine the correction based on a first-order low pass that compensates for measurement noise in the estimating of the frequency offset and based on a second-order low pass that compensates the temperature-based frequency drift.

Example 159 is a wireless device including one or more antennas, a radio receiver configured to wirelessly receive a synchronization signal via the one or more antennas, and one or more processors configured to estimate a frequency offset between a local frequency and a reference frequency of the synchronization signal, determine, based on the frequency offset, a correction to the local frequency that compensates temperature-based frequency drift in the local frequency, and adjust the local frequency based on the correction to obtain a corrected local frequency.

In Example 160, the subject matter of Example 159 can optionally be further configured with the features of any one of Examples 133 to 148.

Example 161 is a wireless device including one or more processors, and a memory storing instructions that, when executed by the one or more processors, cause the one or more processors to perform the method of any one of Examples 111 to 1122.

Example 162 is a non-transitory computer readable medium storing instructions that, when executed by one or more processors of a wireless device, cause the wireless device to perform the method of any one of Examples 111 to 132.

Example 163 is a wireless device including means for estimating a frequency offset between a local frequency and a reference frequency of a received synchronization signal, means for determining, based on the frequency offset, a correction to the local frequency that compensates temperature-based frequency drift in the local frequency, and means for adjusting the local frequency based on the correction to obtain a corrected local frequency.

Example 164 is a method of wireless communication at a wireless device, the method including determining a first cross-correlation between a synchronization signal replica and a first synchronization signal repetition period in a received signal, determining a second cross-correlation between the synchronization signal replica and a second synchronization signal repetition period in the received signal, accumulating the first cross-correlation with the second cross-correlation to obtain an accumulated cross-correlation, if a maxima value of the accumulated cross-correlation exceeds a predefined threshold, establishing synchronization with a second wireless device based on the accumulated cross-correlation, and if the maxima value does not exceed the predefined threshold, accumulating the accumulated cross-correlation based on one or more additional synchronization signal repetition periods.

In Example 165, the subject matter of Example 164 can optionally include wherein establishing synchronization with the second wireless device based on the accumulated cross-correlation includes determining a time offset based on a peak value of the accumulated cross-correlation, and aligning transmission or reception in time based on the time offset.

In Example 166, the subject matter of Example 165 can optionally include wherein establishing synchronization with the second wireless device based on the accumulated cross-correlation further includes determining a frequency offset based on the peak value, and compensating for carrier frequency offset based on the frequency offset.

In Example 167, the subject matter of Example 165 or 166 can optionally include wherein determining the time offset based on the peak value includes identifying a sample of the accumulated cross-correlation at which the peak value occurs and determining the time offset based on the sample.

In Example 168, the subject matter of Example 167 can optionally include wherein the sample indicates an approximate time location in the received signal of a synchronization signal transmitted by the second wireless device.

In Example 169, the subject matter of any one of Examples 165 to 168 can optionally include wherein the peak value is the same as the maxima value.

In Example 170, the subject matter of any one of Examples 165 to 168 can optionally further include, if the maxima value of the accumulated cross-correlation exceeds a predefined threshold normalizing the gains of the accumulated cross-correlation to obtain a normalized cross-correlation, and identifying the peak value from the normalized cross-correlation.

In Example 171, the subject matter of any one of Examples 164 to 168 can optionally include wherein the synchronization signal replica is a replica of a synchronization signal with repetition period equal in duration to the first synchronization signal repetition period.

In Example 172, the subject matter of any one of Examples 164 to 171 can optionally include wherein the accumulated cross-correlation has the same duration as the first synchronization signal repetition period.

In Example 173, the subject matter of any one of Examples 164 to 172 can optionally include wherein accumulating the accumulated cross-correlation based on one or more additional synchronization signal repetition periods includes determining, for each additional synchronization repetition period, a respective cross-correlation, accumulating each respective cross-correlation with the accumulated cross-correlation to obtain an updated accumulated cross-correlation, and determining whether the updated accumulated cross-correlation has an updated maxima value exceeding the predefined threshold.

In Example 174, the subject matter of Example 173 can optionally further include if the updated accumulated cross-correlation has an updated maxima value exceeding the predefined threshold, establishing synchronization with a second wireless device based on the updated accumulated cross-correlation.

In Example 175, the subject matter of any one of Examples 164 to 174 can optionally further include receiving a wireless signal and performing radio processing on the wireless signal to obtain the received signal.

Example 176 is a method of wireless communication at a wireless device, the method including determining a first cross-correlation between synchronization signal replica and a first subsection of a synchronization signal repetition period in a received signal, updating a subsection of an accumulated cross-correlation based on the first cross-correlation, determining whether a maxima value of the accumulated cross-correlation is greater than a predefined threshold, and if the maxima value of the accumulated cross-correlation is greater than the predefined threshold, establishing synchronization with a second wireless device based on the accumulated cross-correlation.

In Example 177, the subject matter of Example 176 can optionally include wherein the first subsection of the synchronization signal repetition period is equal in duration to the subsection of the accumulated cross-correlation.

In Example 178, the subject matter of Example 176 can optionally include wherein the first subsection of the synchronization signal repetition period is in the same time position in the synchronization signal repetition period as the subsection of the accumulated cross-correlation in the accumulated cross-correlation.

In Example 179, the subject matter of any one of Examples 176 to 178 can optionally further include, if the maxima value of the accumulated cross-correlation is not greater than the predefined threshold determining a second cross-correlation between the synchronization signal replica and a second subsection of the synchronization signal repetition period in the received signal, updating a second subsection of the accumulated cross-correlation based on the second cross-correlation, and determining whether a maxima value of the accumulated cross-correlation is greater than the predefined threshold.

In Example 180, the subject matter of Example 179 can optionally further include, if the maxima value of the accumulated cross-correlation is not greater than the predefined threshold, continuing to update the accumulated cross-correlation based on one or more additional subsections of the received signal until a maxima value of the accumulated cross-correlation is greater than the predefined threshold.

In Example 181, the subject matter of Example 179 or 180 can optionally further include, if the maxima value of the accumulated cross-correlation is greater than the predefined threshold, establishing synchronization with a second wireless device based on accumulated cross-correlation.

In Example 182, the subject matter of any one of Examples 179 to 181 can optionally include wherein the second subsection is the same duration as the first subsection and is immediately after the first subsection in the received signal.

In Example 183, the subject matter of any one of Examples 176 to 181 can optionally include wherein establishing synchronization with the second wireless device based on the accumulated cross-correlation includes determining a time offset based on a peak value of the accumulated cross-correlation, and aligning transmission or reception in time based on the time offset.

In Example 184, the subject matter of Example 183 can optionally include wherein establishing synchronization with the second wireless device based on the accumulated cross-correlation further includes determining a frequency offset based on the peak value, and compensating carrier frequency offset based on the frequency offset.

In Example 185, the subject matter of Example 183 or 184 can optionally include wherein determining the time offset based on the peak value includes identifying a sample of the accumulated cross-correlation at which the peak value occurs and determining the time offset based on the sample.

In Example 186, the subject matter of Example 185 can optionally include wherein the sample indicates an approximate time location in the received signal of a synchronization signal transmitted by the second wireless device.

In Example 187, the subject matter of any one of Examples 183 to 186 can optionally include wherein the peak value is the same as the maxima value.

In Example 188, the subject matter of any one of Examples 183 to 186 can optionally further include, if the maxima value of the accumulated cross-correlation exceeds a predefined threshold normalizing the gains of the accumulated cross-correlation across a plurality of subsections of the accumulated cross-correlation to obtain a normalized cross-correlation, and identifying the peak value from the normalized cross-correlation.

In Example 189, the subject matter of any one of Examples 176 to 186 can optionally include wherein the synchronization signal replica is a replica of a synchronization signal with repetition period equal in duration to the first synchronization signal repetition period.

In Example 190, the subject matter of any one of Examples 176 to 186 can optionally include wherein the synchronization signal repetition period includes a plurality of subsections equal in duration to the first subsection.

In Example 191, the subject matter of any one of Examples 176 to 190 can optionally further include receiving a wireless signal and performing radio processing on the wireless signal to obtain the received signal.

Example 192 is a method of wireless communication at a wireless device, the method including determining a first cross-correlation between synchronization signal replica and a first subsection of a synchronization signal repetition period in a received signal, updating a subsection of an accumulated cross-correlation based on the first cross-correlation, determining whether a maxima value of the subsection of the accumulated cross-correlation is greater than a predefined threshold, and if the maxima value of the accumulated cross-correlation is greater than the predefined threshold, normalizing the gains of a plurality of subsections of the accumulated cross-correlation to obtain a normalized accumulated cross-correlation, detecting a peak value of the normalized accumulated cross-correlation, and establishing synchronization with a second wireless device based on the peak value.

In Example 193, the subject matter of Example 192 can optionally include wherein normalizing the gains of the plurality of subsections of the accumulated cross-correlation to obtain the normalized accumulated cross-correlation includes normalizing the gains of the plurality of subsections of the accumulated cross-correlation based on automatic gain control factors applied to the received signal.

In Example 194, the subject matter of Example 192 or 193 can optionally include wherein detecting the peak value of the normalized accumulated cross-correlation includes identifying a maximum-valued sample of the normalized accumulated cross-correlation as the peak value.

In Example 195, the subject matter of Example 192 can optionally include wherein the first subsection of the synchronization signal repetition period is equal in duration to the subsection of the accumulated cross-correlation.

In Example 196, the subject matter of Example 192 can optionally include wherein the first subsection of the synchronization signal repetition period is in the same time position in the synchronization signal repetition period as the subsection of the accumulated cross-correlation in the accumulated cross-correlation.

In Example 197, the subject matter of any one of Examples 192 to 196 can optionally further include, if the maxima value of the accumulated cross-correlation is not greater than the predefined threshold determining a second cross-correlation between the synchronization signal replica and a second subsection of the synchronization signal repetition period in the received signal, updating a second subsection of the accumulated cross-correlation based on the second cross-correlation, and determining whether a maxima value of the second subsection of the accumulated cross-correlation is greater than the predefined threshold.

In Example 198, the subject matter of Example 197 can optionally further include, if the maxima value of the second subsection of the accumulated cross-correlation is not greater than the predefined threshold, continuing to update the accumulated cross-correlation based on one or more additional subsections of the received signal until a maxima value of one of the one or more additional subsections of the accumulated cross-correlation is greater than the predefined threshold.

In Example 199, the subject matter of Example 197 or 198 can optionally further include, if the maxima value of the second subsection of the accumulated cross-correlation is greater than the predefined threshold, normalizing the gains of the plurality of subsections of the accumulated cross-correlation to obtain a normalized accumulated cross-correlation, detecting a peak value of the normalized accumulated cross-correlation, and establishing synchronization with a second wireless device based on the peak value.

In Example 200, the subject matter of any one of Examples 197 to 200 can optionally include wherein the second subsection is the same duration as the first subsection and is immediately after the first subsection in the received signal.

In Example 201, the subject matter of any one of Examples 192 to 200 can optionally include wherein establishing synchronization with the second wireless device based on the peak value includes determining a time offset based on the peak value, and aligning transmission or reception in time based on the time offset.

In Example 202, the subject matter of Example 201 can optionally include wherein establishing synchronization with the second wireless device based on the peak value further includes determining a frequency offset based on the peak value, and compensating carrier frequency offset based on the frequency offset.

In Example 203, the subject matter of Example 201 or 202 can optionally include wherein determining the time offset based on the peak value includes identifying a sample of the accumulated cross-correlation at which the peak value occurs and determining the time offset based on the sample.

In Example 204, the subject matter of Example 203 can optionally include wherein the sample indicates an approximate time location in the received signal of a synchronization signal transmitted by the second wireless device.

In Example 205, the subject matter of any one of Examples 192 to 204 can optionally include wherein the synchronization signal replica is a replica of a synchronization signal with repetition period equal in duration to the first synchronization signal repetition period.

In Example 206, the subject matter of any one of Examples 192 to 205 can optionally include wherein the synchronization signal repetition period includes a plurality of subsections equal in duration to the first subsection.

In Example 207, the subject matter of any one of Examples 192 to 206 can optionally further include receiving a wireless signal and performing radio processing on the wireless signal to obtain the received signal.

In Example 208, the subject matter of Example 207 can optionally include wherein performing the radio processing on the wireless signal to obtain the received signal includes performing automatic gain control on the wireless signal with different gain factors over time, wherein normalizing the gains of the plurality of subsections of the accumulated cross-correlation to obtain the normalized accumulated cross-correlation includes normalizing the accumulated cross-correlation based on the different gain factors.

Example 209 is a method of wireless communication at a wireless device, the method including determining a first cross-correlation between a synchronization signal replica and a first synchronization signal repetition period in a received signal, determining a second cross-correlation between the synchronization signal replica and a second synchronization signal repetition period in the received signal, accumulating the first cross-correlation with the second cross-correlation to obtain an accumulated cross-correlation, determining whether a maxima value of the accumulated cross-correlation meets a termination condition, if the maxima value of the accumulated cross-correlation meets the termination condition, establishing synchronization with a second wireless device based on the accumulated cross-correlation, and if the maxima value does not meet the termination condition, accumulating the accumulated cross-correlation based on one or more additional synchronization signal repetition periods.

In Example 210, the subject matter of Example 209 can optionally include wherein the termination condition is based on whether the maxima value exceeds a predefined threshold, the method further including the features of any one of Examples 165 to 175.

Example 211 is a method of wireless communication at a wireless device, the method including determining a plurality of cross-correlations between a synchronization signal replica and a plurality of synchronization signal repetition periods in a received signal, accumulating the plurality of cross-correlations to obtain an accumulated cross-correlation, determining a radio measurement based on the accumulated cross-correlation, comparing the radio measurement to a predefined threshold, and if the radio measurement meets a first predefined relationship with the predefined threshold, updating the accumulated cross-correlation based on an additional plurality of synchronization signal repetition periods of the received signal, if the radio measurement meets a second predefined relationship with the predefined threshold, establishing synchronization with a second wireless device based on the accumulated cross-correlation.

In Example 212, the subject matter of Example 211 can optionally include wherein establishing synchronization with the second wireless device includes identifying a peak value of the accumulated cross-correlation, determining a time offset based on the peak value, and aligning transmission or reception in time based on the time offset.

In Example 213, the subject matter of Example 212 can optionally include wherein establishing synchronization with the second wireless device further includes determining a frequency offset based on the peak value, and compensating for carrier frequency offset based on the frequency offset.

In Example 214, the subject matter of Example 212 or 213 can optionally include wherein determining the time offset based on the peak value includes identifying a sample of the accumulated cross-correlation at which the peak value occurs and determining the time offset based on the sample.

In Example 215, the subject matter of Example 214 can optionally include wherein the sample indicates an approximate time location in the received signal of a synchronization signal transmitted by the second wireless device.

In Example 216, the subject matter of any one of Examples 211 to 215 can optionally include wherein the synchronization signal replica is a replica of a synchronization signal with a repetition period equal in duration to the first synchronization signal repetition period.

In Example 217, the subject matter of any one of Examples 211 to 216 can optionally include wherein the accumulated cross-correlation has the same duration as the plurality of synchronization signal repetition periods.

In Example 218, the subject matter of any one of Examples 211 to 217 can optionally include wherein the plurality of synchronization signal repetition periods are the same duration as the additional plurality of synchronization periods.

In Example 219, the subject matter of any one of Examples 211 to 217 can optionally include wherein updating the accumulated cross-correlation based on the additional plurality of synchronization signal repetition periods of the received signal includes determining an additional plurality of cross-correlations between the synchronization signal replica and the additional plurality of synchronization signal repetition periods, accumulating the additional plurality of cross-correlations with the accumulated cross-correlation to obtain an updated accumulated cross-correlation, determining an updated radio measurement based on the updated accumulated cross-correlation, comparing the updated radio measurement to the predefined threshold, and if the radio measurement meets the second predefined relationship with the predefined threshold, establishing synchronization with a second wireless device based on the updated accumulated cross-correlation.

In Example 220, the subject matter of any one of Examples 211 to 219 can optionally include wherein the radio measurement is a signal-to-noise ratio, and wherein the first predefined relationship is the radio measurement being less than the predefined threshold and the second predefined relationship is the radio measurement being greater than the predefined threshold.

In Example 221, the subject matter of any one of Examples 211 to 219 can optionally include wherein the radio measurement is a signal power, and wherein the first predefined relationship is the radio measurement being less than the predefined threshold and the second predefined relationship is the radio measurement being greater than the predefined threshold.

In Example 222, the subject matter of any one of Examples 211 to 219 can optionally include wherein the radio measurement is a time offset estimate variance or a frequency offset estimate variance, and wherein the first predefined relationship is the radio measurement being greater than the predefined threshold and the second predefined relationship is the radio measurement being less than the predefined threshold.

In Example 223, the subject matter of any one of Examples 211 to 222 can optionally include wherein determining the radio measurement based on the accumulated cross-correlation includes determining a time offset based on a peak value of the accumulated cross-correlation, processing the received signal based on the time offset to obtain reference signal symbols, and determining the radio measurement based on the reference signal symbols.

In Example 224, the subject matter of any one of Examples 211 to 222 can optionally include wherein determining the radio measurement based on the accumulated cross-correlation includes determining a frequency offset based on a peak value of the accumulated cross-correlation, processing the received signal based on the frequency offset to obtain reference signal symbols, and determining the radio measurement based on the reference signal symbols.

Example 225 is a method of wireless communication at a wireless device, the method including determining a plurality of cross-correlations between a synchronization signal replica and a plurality of synchronization signal repetition periods in a received signal, accumulating the plurality of cross-correlations to obtain an accumulated cross-correlation, determining a radio measurement based on the accumulated cross-correlation, determining whether the radio measurement meets a termination condition, if the radio measurement does not meet the termination condition, updating the accumulated cross-correlation based on an additional plurality of synchronization signal repetition periods of the received signal, and if the radio measurement meets the termination condition, establishing synchronization with a second wireless device based on the accumulated cross-correlation.

In Example 226, the subject matter of Example 225 can optionally include wherein the termination condition is based on whether the radio measurement exceeds a predefined threshold, the method further including the features of any one of Examples 211 to 224.

Example 227 is a wireless device including a correlator configured to determine a first cross-correlation between a synchronization signal replica and a first synchronization signal repetition period in a received signal, and further configured to determine a second cross-correlation between the synchronization signal replica and a second synchronization signal repetition period in the received signal, an accumulator configured to accumulate the first cross-correlation with the second cross-correlation to obtain an accumulated cross-correlation, and a sync controller configured to, if a maxima value of the accumulated cross-correlation exceeds a predefined threshold, establish synchronization with a second wireless device based on the accumulated cross-correlation, wherein the accumulator is configured to, if the maxima value does not exceed the predefined threshold, accumulate the accumulated cross-correlation based on one or more additional synchronization signal repetition periods.

In Example 228, the subject matter of Example 227 can optionally further include a radio frequency transceiver configured to receive a wireless signal via one or more antennas to obtain the received signal and to provide the received signal to the correlator.

In Example 229, the subject matter of Example 227 or 228 can optionally further include one or more demodulators, wherein the sync controller is configured to establish synchronization with the second wireless device based on the accumulated cross-correlation by determining a time offset based on a peak value of the accumulated cross-correlation, wherein the one or more demodulators are configured to align reception of the received signal in time based on the time offset.

In Example 230, the subject matter of Example 229 can optionally include wherein the sync controller is further configured to establish synchronization with the second wireless device based on the accumulated cross-correlation by determining a frequency offset based on the peak value and wherein the one or more demodulators are configured to compensate for carrier frequency offset based on the frequency offset.

In Example 231, the subject matter of Example 229 or 230 can optionally include wherein the sync controller is configured to determine the time offset based on the peak value by identifying a sample of the accumulated cross-correlation at which the peak value occurs and determining the time offset based on the sample.

In Example 232, the subject matter of Example 231 can optionally include wherein the sample indicates an approximate time location in the received signal of a synchronization signal transmitted by the second wireless device.

In Example 233, the subject matter of any one of Examples 229 to 232 can optionally include wherein the peak value is the same as the maxima value.

In Example 234, the subject matter of any one of Examples 229 to 232 can optionally include wherein the sync controller is configured to, if the maxima value of the accumulated cross-correlation exceeds a predefined threshold normalize the gains of the accumulated cross-correlation to obtain a normalized cross-correlation, and identify the peak value from the normalized cross-correlation.

In Example 235, the subject matter of any one of Examples 227 to 232 can optionally include wherein the synchronization signal replica is a replica of a synchronization signal with a repetition period equal in duration to the first synchronization signal repetition period.

In Example 236, the subject matter of any one of Examples 227 to 235 can optionally include wherein the accumulated cross-correlation has the same duration as the first synchronization signal repetition period.

In Example 237, the subject matter of any one of Examples 227 to 236 can optionally include wherein, if the maxima value does not exceed the predefined threshold the correlators are configured to determine, for each additional synchronization repetition period, a respective cross-correlation, and the accumulator is configured to accumulate the accumulated cross-correlation based on one or more additional synchronization signal repetition periods by accumulating each respective cross-correlation with the accumulated cross-correlation to obtain an updated accumulated cross-correlation, the wireless device further including a max searcher configured to determine whether the updated accumulated cross-correlation has an updated maxima value exceeding the predefined threshold.

In Example 238, the subject matter of Example 237 can optionally include wherein the sync controller is further configured to, if the updated accumulated cross-correlation has an updated maxima value exceeding the predefined threshold, establish synchronization with a second wireless device based on the updated accumulated cross-correlation.

Example 239 is a wireless device including a correlator configured to determine a first cross-correlation between synchronization signal replica and a first subsection of a synchronization signal repetition period in a received signal, an accumulator configured to update a subsection of an accumulated cross-correlation based on the first cross-correlation, a max searcher configured to determine whether a maxima value of the accumulated cross-correlation is greater than a predefined threshold, and a sync controller configured to, if the maxima value of the accumulated cross-correlation is greater than the predefined threshold, establish synchronization with a second wireless device based on the accumulated cross-correlation.

In Example 240, the subject matter of Example 239 can optionally further include a radio frequency transceiver configured to receive a wireless signal via one or more antennas to obtain the received signal, and to provide the received signal to the correlator.

In Example 241, the subject matter of Example 239 or 240 can optionally include wherein the first subsection of the synchronization signal repetition period is equal in duration to the subsection of the accumulated cross-correlation.

In Example 242, the subject matter of Example 239 or 240 can optionally include wherein the first subsection of the synchronization signal repetition period is in the same time position in the synchronization signal repetition period as the subsection of the accumulated cross-correlation in the accumulated cross-correlation.

In Example 243, the subject matter of any one of Examples 239 to 242 can optionally include wherein, if the maxima value of the accumulated cross-correlation is not greater than the predefined threshold the correlator is configured to determine a second cross-correlation between the synchronization signal replica and a second subsection of the synchronization signal repetition period in the received signal, the accumulator is configured to update a second subsection of the accumulated cross-correlation based on the second cross-correlation, and the max searcher is configured to determine whether a maxima value of the accumulated cross-correlation is greater than the predefined threshold.

In Example 244, the subject matter of Example 243 can optionally include wherein, if the maxima value of the accumulated cross-correlation is not greater than the predefined threshold, the accumulator is configured to continue to update the accumulated cross-correlation based on one or more additional subsections of the received signal until a maxima value of the accumulated cross-correlation is greater than the predefined threshold.

In Example 245, the subject matter of Example 243 or 244 can optionally include wherein, if the maxima value of the accumulated cross-correlation is greater than the predefined threshold, the sync controller is configured to establish synchronization with a second wireless device based on the accumulated cross-correlation.

In Example 246, the subject matter of any one of Examples 243 to 245 can optionally include wherein the second subsection is the same duration as the first subsection and is immediately after the first subsection in the received signal.

In Example 247, the subject matter of any one of Examples 239 to 246 can optionally further include one or more demodulators, wherein the sync controller is configured to establish synchronization with the second wireless device based on the accumulated cross-correlation by determining a time offset based on a peak value of the accumulated cross-correlation, wherein the one or more demodulators are configured to align reception of the received signal in time based on the time offset.

In Example 248, the subject matter of Example 247 can optionally include wherein the sync controller is further configured to determine a frequency offset based on the peak value and wherein the one or more demodulators are configured to compensate the received signal for carrier frequency offset based on the frequency offset.

In Example 249, the subject matter of Example 247 or 248 can optionally include wherein the sync controller is configured to determine the time offset based on the peak value by identifying a sample of the accumulated cross-correlation at which the peak value occurs and determining the time offset based on the sample.

In Example 250, the subject matter of Example 249 can optionally include wherein the sample indicates an approximate time location in the received signal of a synchronization signal transmitted by the second wireless device.

In Example 251, the subject matter of any one of Examples 239 to 250 can optionally include wherein the synchronization signal replica is a replica of a synchronization signal with a repetition period equal in duration to the first synchronization signal repetition period.

In Example 252, the subject matter of any one of Examples 239 to 250 can optionally include wherein the synchronization signal repetition period includes a plurality of subsections equal in duration to the first subsection.

Example 253 is a wireless device including a correlator configured to determine a first cross-correlation between synchronization signal replica and a first subsection of a synchronization signal repetition period in a received signal, an accumulator configured to update a subsection of an accumulated cross-correlation based on the first cross-correlation, a max searcher configured to determine whether a maxima value of the subsection of the accumulated cross-correlation is greater than a predefined threshold, and a sync controller configured to, if the maxima value of the accumulated cross-correlation is greater than the predefined threshold, normalize the gains of a plurality of subsections of the accumulated cross-correlation to obtain a normalized accumulated cross-correlation, detect a peak value of the normalized accumulated cross-correlation, and establish synchronization with a second wireless device based on the peak value.

In Example 254, the subject matter of Example 253 can optionally include wherein the sync controller is configured to normalize the gains of the plurality of subsections of the accumulated cross-correlation to obtain a normalized accumulated cross-correlation by normalizing the gains of the plurality of subsections of the accumulated cross-correlation based on automatic gain control factors applied to the received signal.

In Example 255, the subject matter of Example 253 or 254 can optionally include wherein the sync controller is configured to detect the peak value of the normalized accumulated cross-correlation by identifying a maximum-valued sample of the normalized accumulated cross-correlation as the peak value.

In Example 256, the subject matter of Example 253 can optionally include wherein the first subsection of the synchronization signal repetition period is equal in duration to the subsection of the accumulated cross-correlation.

In Example 257, the subject matter of Example 253 can optionally include wherein the first subsection of the synchronization signal repetition period is in the same time position in the synchronization signal repetition period as the subsection of the accumulated cross-correlation in the accumulated cross-correlation.

In Example 258, the subject matter of any one of Examples 253 to 257 can optionally include wherein, if the maxima value of the accumulated cross-correlation is not greater than the predefined threshold the correlator is configured to determine a second cross-correlation between the synchronization signal replica and a second subsection of the synchronization signal repetition period in the received signal, the accumulator is configured to update a second subsection of the accumulated cross-correlation based on the second cross-correlation, and the max searcher is configured to determine whether a maxima value of the second subsection of the accumulated cross-correlation is greater than the predefined threshold.

In Example 259, the subject matter of Example 258 can optionally include wherein, if the maxima value of the second subsection of the accumulated cross-correlation is not greater than the predefined threshold, the accumulator is configured to continue to update the accumulated cross-correlation based on one or more additional subsections of the received signal until a maxima value of one of the one or more additional subsections of the accumulated cross-correlation is greater than the predefined threshold.

In Example 260, the subject matter of Example 258 or 259 can optionally include wherein, if the maxima value of the second subsection accumulated cross-correlation is greater than the predefined threshold, the sync controller is configured to normalize the gains of the plurality of subsections of the accumulated cross-correlation to obtain a normalized accumulated cross-correlation, detect a peak value of the normalized accumulated cross-correlation, and establish synchronization with a second wireless device based on the peak value.

In Example 261, the subject matter of any one of Examples 258 to 260 can optionally include wherein the second subsection is the same duration as the first subsection and is immediately after the first subsection in the received signal.

In Example 262, the subject matter of any one of Examples 253 to 260 can optionally include wherein the sync controller is configured to establish synchronization with the second wireless device based on the peak value by determining a time offset based on the peak value, and aligning transmission or reception in time based on the time offset.

In Example 263, the subject matter of Example 262 can optionally include wherein the sync controller is configured to establish synchronization with the second wireless device based on the peak value further by determining a frequency offset based on the peak value, and compensating carrier frequency offset based on the frequency offset.

In Example 264, the subject matter of Example 262 or 263 can optionally include wherein the sync controller is configured to determine the time offset based on the peak value by identifying a sample of the accumulated cross-correlation at which the peak value occurs and determining the time offset based on the sample.

In Example 265, the subject matter of Example 264 can optionally include wherein the sample indicates an approximate time location in the received signal of a synchronization signal transmitted by the second wireless device.

In Example 266, the subject matter of any one of Examples 253 to 265 can optionally include wherein the synchronization signal replica is a replica of a synchronization signal with repetition period equal in duration to the first synchronization signal repetition period.

In Example 267, the subject matter of any one of Examples 253 to 265 can optionally include wherein the synchronization signal repetition period includes a plurality of subsections equal in duration to the first subsection.

In Example 268, the subject matter of any one of Examples 253 to 267 can optionally further include one or more antennas configured to receive a wireless signal and a radio frequency transceiver configured to perform radio processing on the wireless signal to obtain the received signal.

In Example 269, the subject matter of Example 268 can optionally include wherein the radio transceiver is configured to perform the radio processing on the wireless signal to obtain the received signal by performing automatic gain control on the wireless signal with different gain factors over time, wherein the sync controller is configured to normalize the gains of the plurality of subsections of the accumulated cross-correlation to obtain the normalized accumulated cross-correlation by normalizing the accumulated cross-correlation based on the different gain factors.

Example 270 is a wireless device including a correlator configured to determine a first cross-correlation between a synchronization signal replica and a first synchronization signal repetition period in a received signal, and to determine a second cross-correlation between the synchronization signal replica and a second synchronization signal repetition period in the received signal, an accumulator configured to accumulate the first cross-correlation with the second cross-correlation to obtain an accumulated cross-correlation, a max searcher configured to determine whether a maxima value of the accumulated cross-correlation meets a termination condition, and a sync controller configured to, if a maxima value of the accumulated cross-correlation meets the termination condition, establish synchronization with a second wireless device based on the accumulated cross-correlation, wherein the accumulator is configured to, if the maxima value does not meet the termination condition, accumulate the accumulated cross-correlation based on one or more additional synchronization signal repetition periods.

In Example 271, the subject matter of Example 270 can optionally include wherein the termination condition is based on whether the maxima value exceeds a predefined threshold, the wireless device further including the features of any one of Examples 228 to 238.

Example 272 is a wireless device including a correlator configured to determine a first cross-correlation between a synchronization signal replica and a first subsection of a synchronization signal repetition period in a received signal, an accumulator configured to update a subsection of an accumulated cross-correlation based on the first cross-correlation, a max searcher configured to determine whether a maxima value of the accumulated cross-correlation meets a termination condition, and a sync controller configured to, if the maxima value of the accumulated cross-correlation meets the termination condition, establish synchronization with a second wireless device based on the accumulated cross-correlation.

In Example 273, the subject matter of Example 272 can optionally include wherein the termination condition is based on whether the maxima value exceeds a predefined threshold, the wireless device further including the features of any one of Examples 240 to 252.

Example 274 is a wireless device including a correlator configured to determine a plurality of cross-correlations between a synchronization signal replica and a plurality of synchronization signal repetition periods in a received signal, an accumulator configured to accumulate the plurality of cross-correlations to obtain an accumulated cross-correlation, a radio estimator configured to determine a radio measurement based on the accumulated cross-correlation, and a sync controller configured to compare the radio measurement to a predefined threshold, wherein, if the radio measurement meets a first predefined relationship with the predefined threshold, the accumulator is configured to update the accumulated cross-correlation based on an additional plurality of synchronization signal repetition periods of the received signal, and wherein, if the radio measurement meets a second predefined relationship with the predefined threshold, the sync controller is configured to establish synchronization with a second wireless device based on the accumulated cross-correlation.

In Example 275, the subject matter of Example 274 can optionally further include a radio frequency transceiver configured to receive a wireless signal via one or more antennas to obtain the received signal, and to provide the received signal to the correlator.

In Example 276, the subject matter of Example 274 or 275 can optionally further include one or more demodulators, wherein the sync controller is configured to establish synchronization with the second wireless device by determining a time offset based on a peak value of the accumulated cross-correlation and wherein the one or more demodulators are configured to align reception of the received signal based on the time offset.

In Example 277, the subject matter of Example 276 can optionally include wherein the sync controller is further configured to determine a frequency offset based on the peak value, and wherein the one or more demodulators are configured to compensate for carrier frequency offset in the received signal based on the frequency offset.

In Example 278, the subject matter of Example 276 or 277 can optionally include wherein the sync controller is configured to determine the time offset based on the peak value by identifying a sample of the accumulated cross-correlation at which the peak value occurs and determining the time offset based on the sample.

In Example 279, the subject matter of Example 278 can optionally include wherein the sample indicates an approximate time location in the received signal of a synchronization signal transmitted by the second wireless device.

In Example 280, the subject matter of any one of Examples 274 to 279 can optionally include wherein the synchronization signal replica is a replica of a synchronization signal with a repetition period equal in duration to the first synchronization signal repetition period.

In Example 281, the subject matter of any one of Examples 274 to 280 can optionally include wherein the accumulated cross-correlation has the same duration as the plurality of synchronization signal repetition periods.

In Example 282, the subject matter of any one of Examples 274 to 281 can optionally include wherein, if the radio measurement meets a first predefined relationship with the predefined threshold the correlator is configured to determine an additional plurality of cross-correlations between the synchronization signal replica and the additional plurality of synchronization signal repetition periods, the accumulator is configured to update the accumulated cross-correlation based on the additional plurality of synchronization signal repetition periods by accumulating the additional plurality of cross-correlations with the accumulated cross-correlation to obtain an updated accumulated cross-correlation, the radio estimator is configured to determine an updated radio measurement based on the updated accumulated cross-correlation, the sync controller is configured to compare the updated radio measurement to the predefined threshold, and and, if the radio measurement meets the second predefined relationship with the predefined threshold, the sync controller is configured to establish synchronization with a second wireless device based on the updated accumulated cross-correlation.

In Example 283, the subject matter of any one of Examples 274 to 282 can optionally include wherein the radio measurement is a signal-to-noise ratio, and wherein the first predefined relationship is the radio measurement being less than the predefined threshold and the second predefined relationship is the radio measurement being greater than the predefined threshold.

In Example 284, the subject matter of any one of Examples 274 to 282 can optionally include wherein the radio measurement is a signal power, and wherein the first predefined relationship is the radio measurement being less than the predefined threshold and the second predefined relationship is the radio measurement being greater than the predefined threshold.

In Example 285, the subject matter of any one of Examples 274 to 282 can optionally include wherein the radio measurement is a time offset estimate variance or a frequency offset estimate variance, and wherein the first predefined relationship is the radio measurement being greater than the predefined threshold and the second predefined relationship is the radio measurement being less than the predefined threshold.

In Example 286, the subject matter of any one of Examples 274 to 285 can optionally further include one or more demodulators, wherein the sync controller is configured to determine a time offset based on a peak value of the accumulated cross-correlation, wherein the one or more demodulators are configured to process the received signal based on the time offset to obtain reference signal symbols, an wherein the radio estimator is configured to determine the radio measurement based on the accumulated cross-correlation by determining the radio measurement based on the received reference signal symbols.

In Example 287, the subject matter of any one of Examples 274 to 285 can optionally further include one or more demodulators, wherein the sync controller is configured to determine a frequency offset based on a peak value of the accumulated cross-correlation, wherein the one or more demodulators are configured to process the received signal based on the frequency offset to obtain reference signal symbols, and wherein the radio estimator is configured to determine the radio measurement based on the accumulated cross-correlation by determining the radio measurement based on the reference signal symbols.

Example 288 is a wireless device including a radio transceiver, and one or more processors configured to perform the method of any one of Examples 164 to 226.

Example 289 is a non-transitory computer readable medium storing instructions that, when executed by one or more processors of a wireless device, cause the wireless device to perform the method of any one of Examples 164 to 226.

Example 290 is a wireless device including one or more processors, and a memory storing instructions that, when executed by the one or more processors, cause the wireless device to perform the method of any one of Examples 164 to 226.

Example 291 is a wireless device including means for determining a first cross-correlation between a synchronization signal replica and a first synchronization signal repetition period in a received signal, means for determining a second cross-correlation between the synchronization signal replica and a second synchronization signal repetition period in the received signal, means for accumulating the first cross-correlation with the second cross-correlation to obtain an accumulated cross-correlation, means for, if a maxima value of the accumulated cross-correlation exceeds a predefined threshold, establishing synchronization with a second wireless device based on the accumulated cross-correlation, and means for if the maxima value does not exceed the predefined threshold, accumulating the accumulated cross-correlation based on one or more additional synchronization signal repetition periods.

Example 292 is a wireless device including means for determining a first cross-correlation between synchronization signal replica and a first subsection of a synchronization signal repetition period in a received signal, means for updating a subsection of an accumulated cross-correlation based on the first cross-correlation, means for determining whether a maxima value of the accumulated cross-correlation is greater than a predefined threshold, and means for, if the maxima value of the accumulated cross-correlation is greater than the predefined threshold, establishing synchronization with a second wireless device based on the accumulated cross-correlation.

Example 293 is a wireless device including means for determining a first cross-correlation between a synchronization signal replica and a first synchronization signal repetition period in a received signal, means for determining a second cross-correlation between the synchronization signal replica and a second synchronization signal repetition period in the received signal, means for accumulating the first cross-correlation with the second cross-correlation to obtain an accumulated cross-correlation, means for determining whether a maxima value of the accumulated cross-correlation meets a termination condition, means for, if a maxima value of the accumulated cross-correlation meets the termination condition, establishing synchronization with a second wireless device based on the accumulated cross-correlation, and means for if the maxima value does not meet the termination condition, accumulating the accumulated cross-correlation based on one or more additional synchronization signal repetition periods.

Example 294 is a wireless device including means for determining a first cross-correlation between a synchronization signal replica and a first subsection of a synchronization signal repetition period in a received signal, means for updating a subsection of an accumulated cross-correlation based on the first cross-correlation, means for determining whether a maxima value of the accumulated cross-correlation meets a termination condition, and means for, if the maxima value of the accumulated cross-correlation meets the termination condition, establishing synchronization with a second wireless device based on the accumulated cross-correlation.

Example 295 is a wireless device including means for determining a first cross-correlation between synchronization signal replica and a first subsection of a synchronization signal repetition period in a received signal, means for updating a subsection of an accumulated cross-correlation based on the first cross-correlation, means for determining whether a maxima value of the subsection of the accumulated cross-correlation is greater than a predefined threshold, and means for if the maxima value of the accumulated cross-correlation is greater than the predefined threshold, normalizing the gains of a plurality of subsections of the accumulated cross-correlation to obtain a normalized accumulated cross-correlation, detecting a peak value of the normalized accumulated cross-correlation, and establishing synchronization with a second wireless device based on the peak value.

Example 296 is a wireless device including means for determining a plurality of cross-correlations between a synchronization signal replica and a plurality of synchronization signal repetition periods in a received signal, means for accumulating the plurality of cross-correlations to obtain an accumulated cross-correlation, means for determining a radio measurement based on the accumulated cross-correlation, means for comparing the radio measurement to a predefined threshold, and means for, if the radio measurement meets a first predefined relationship with the predefined threshold, updating the accumulated cross-correlation based on an additional plurality of synchronization signal repetition periods of the received signal, means for, if the radio measurement meets a second predefined relationship with the predefined threshold, establishing synchronization with a second wireless device based on the accumulated cross-correlation.

Example 297 is a wireless device including means for determining a plurality of cross-correlations between a synchronization signal replica and a plurality of synchronization signal repetition periods in a received signal, means for accumulating the plurality of cross-correlations to obtain an accumulated cross-correlation, means for determining a radio measurement based on the accumulated cross-correlation, means for determining whether the radio measurement meets a termination condition, and means for, if the radio measurement does not meet the termination condition, updating the accumulated cross-correlation based on an additional plurality of synchronization signal repetition periods of the received signal, means for, if the radio measurement meets the termination condition, establishing synchronization with a second wireless device based on the accumulated cross-correlation.

Example 298 is a wireless device including a message generator configured to generate an indication message to indicate a group of candidate transport formats of a transport format set, wherein each transport format corresponds to a set of parameters including at least a 2-tuple of parameters with one parameter indicating a modulation scheme and one parameter indicating a coding scheme for modulating and coding data to be transmitted, one or more decoders configured to determine transmitted data from a received data signal based on a first candidate transport format of the group of candidate transport formats, determine whether or not the determined transmitted data passes an error recognition test, determine transmitted data from the received data signal based on at least one further candidate transport format of the group of candidate transport formats, if the transmitted data determined based on the first candidate transport format does not pass the error recognition test.

In Example 299, the subject matter of Example 298 can optionally include wherein the one parameter indicating a coding scheme indicates a channel encoding scheme.

In Example 300, the subject matter of any one of Examples 298 or 299 can optionally include wherein the data to be transmitted corresponds to source encoded data.

In Example 301, the subject matter of any one of Examples 298 to 300 can optionally include wherein each transport format corresponds to a number of data transmission time slots which include at least part of one coded block of data to be transmitted.

In Example 302, the subject matter of any one of Examples 298 to 301 can optionally include wherein each transport format included by the indicated group of transport formats corresponds to a set of parameters with the one parameter indicating the modulation scheme indicating a common modulation scheme which is the same for all transport formats included by the indicated group.

In Example 303, the subject matter of Example 302 can optionally include wherein the one or more decoders are configured to process the received data signal based on the common modulation scheme when determining the transmitted data based on the first candidate transport format and/or when determining the transmitted data based on the at least one further candidate transport format.

In Example 304, the subject matter of any one of Examples 298 to 303 can optionally include wherein, when processing the received data signal based on a candidate transport format to determine the transmitted data, the one or more decoders are configured to process the received data signal by demodulating and decoding a number of data transmission time slots, the number corresponding to the candidate transport format.

In Example 305, the subject matter of any one of Examples 298 to 303 can optionally include wherein the one or more decoders are configured to process the received data signal by demodulating a first data transmission time slot and by applying a decoding processing to demodulated data of the first data transmission time slot when determining transmitted data based on the first candidate transport format.

In Example 306, the subject matter of Example 305 can optionally include wherein the one or more decoders are configured to determine whether or not the transmitted data determined by applying the decoding processing to the demodulated data of the first data transmission time slot passes the error recognition test when determining whether or not the transmitted data determined based on the first candidate transport format passes the error recognition test.

In Example 307, the subject matter of any one of Examples 305 or 306 can optionally include wherein the one or more decoders are configured to process the received data signal by demodulating at least one further data transmission time slot and by applying a decoding processing to a combination of the demodulated data of the first data transmission time slot and demodulated data of the at least one further data transmission time slot, when determining the transmitted data based on the at least one further candidate transport format.

In Example 308, the subject matter of Example 307 can optionally include wherein the data transmission time slot and the at least one further data transmission time slot are consecutive in time.

In Example 309, the subject matter of any one of Examples 307 or 308 can optionally include wherein the one or more decoders are configured to determine whether or not the transmitted data determined based on the at least one further candidate transport format passes the error recognition test by determining whether or not the transmitted data determined by applying the decoding processing to the combination of the demodulated data of the first data transmission time slot and the demodulated data of the at least one further data transmission time slot passes the error recognition test.

In Example 310, the subject matter of any one of Examples 298 to 309 can optionally include wherein the one or more decoders are configured to determine the transmitted data from the received data signal based on the first candidate transport format by detecting an error in the decoding of a first data transmission time slot of the received data signal, receiving a retransmission of the first data transmission slot, combining the first data transmission time slot with the retransmission to obtain a combined data transmission time slot, and decoding the combined data transmission time slot to obtain the transmitted data for the first candidate transport format.

In Example 311, the subject matter of Example 310 can optionally include wherein the one or more decoders are configured to detect the error in the decoding of the first data transmission time slot by decoding the first data transmission time slot to obtain decoded data, and detecting an error in the decoded data based on a redundancy check.

In Example 312, the subject matter of Example 310 or 311 can optionally include wherein the one or more decoders are further configured to request the retransmission of the first data transmission time slot after detecting the error and to receive the retransmission in response to the request.

In Example 313, the subject matter of any one of Examples 310 to 312 can optionally include wherein the one or more decoders are configured to combine the first data transmission time slot with the retransmission to obtain the combined data transmission time slot by combining demodulated data of the first data transmission time slot with demodulated data of the retransmission to obtain the combined data transmission time slot.

In Example 314, the subject matter of any one of Examples 298 to 313 can optionally include wherein the one or more decoders are configured to determine the transmitted data from the received data signal based on the first candidate transport format by decoding a first data transmission time slot of the received data signal to obtain the transmitted data, and wherein the one or more decoders are configured to determine transmitted data from the received data signal based on the at least one further candidate transport format by decoding a second data transmission time slot of the received data signal that occurs after the first data transmission time slot to obtain second transmitted data, combining the first transmitted data with the second transmitted data to obtain transmitted data corresponding to the further candidate transport format.

In Example 315, the subject matter of Example 314 can optionally include wherein the one or more decoders are further configured to determine whether the transmitted data corresponding to the further candidate transport format passes the error recognition test.

In Example 316, the subject matter of Example 315 can optionally include wherein the one or more decoders are further configured to, if the transmitted data corresponding to the further candidate transport format does not pass the error recognition test decode a third data transmission time slot of the received data signal that occurs after the second data transmission time slot to third second transmitted data, combine the first transmitted data, the second transmitted data, and the third transmitted data to obtain transmitted data corresponding to a third candidate transport format, and determine whether the transmitted data corresponding to a third candidate transport format passes the error recognition test.

In Example 317, the subject matter of any one of Examples 314 to 316 can optionally include wherein the first candidate transport format, the further candidate transport format, and the third candidate transport format differ in the number of data transmission time slots to which a transport block of data is mapped.

In Example 318, the subject matter of any one of Examples 298 to 309 can optionally include wherein the one or more decoders are further configured to determine transmitted data from the received data signal based on a predefined default candidate transport format included by the transport format set and corresponding to a transport block of data to be transmitted with a size which meets a predefined size criterion.

In Example 319, the subject matter of Example 318 can optionally include wherein the one or more decoders are configured to determine whether or not the transmitted data determined based on the predefined default candidate transport format passes the error recognition test, and wherein the one or more decoders are configured to determine the transmitted data based on the first candidate transport format of the group of candidate transport formats, if the transmitted data determined based on the predefined default candidate transport format does not pass the error recognition test.

In Example 320, the subject matter of any one of Examples 318 or 319 can optionally include wherein the predefined default candidate transport format corresponds to a single data transmission time slot.

In Example 321, the subject matter of any one of Examples 318 to 320 can optionally include wherein the default candidate transport format corresponds to a set of parameters where the one parameter indicating the coding scheme indicates a coding scheme corresponding to a code rate meeting a predefined code rate criterion.

In Example 322, the subject matter of any one of Examples 318 to 321 can optionally include wherein the default candidate transport format corresponds to a set of parameters where the one parameter indicating the coding scheme indicates a coding scheme corresponding to a code rate smaller than a smallest code rate of coding schemes indicated by corresponding parameters of the candidate transport formats included by the group of candidate transport formats.

In Example 323, the subject matter of any one of Examples 298 to 322 can optionally further include an estimator configured to estimate a channel quality based on a received control data signal, wherein the indication message indicates the group of candidate transport formats based on the estimated channel quality.

In Example 324, the subject matter of Example 323 can optionally further include a receiver configured to receive the control data via device-to-device communication.

In Example 325, the subject matter of Example 324 can optionally include wherein the estimator is configured to estimate the channel quality based on a device-to-device scheduling request included by the received control data signal.

In Example 326, the subject matter of Example 325 can optionally include wherein the scheduling request includes a reference signal, and wherein the estimator is configured to estimate the channel quality based on the reference signal.

In Example 327, the subject matter of any one of Examples 298 to 326 can optionally include wherein the error recognition test corresponds to a cyclic redundancy test.

In Example 328, the subject matter of any one of Examples 298 to 327 can optionally further include a receiver configured to receive the data signal.

Example 329 is a wireless device including a message generator configured to generate an indication message to indicate a group of candidate transport formats of a transport format set, where each transport format included by the transport format set indicates at least a modulation and coding scheme for modulation and coding of layer-2 payload data, one or more decoders configured to determine layer-2 payload data from a received data signal based on a first candidate transport format of the group of candidate transport formats, determine whether or not the determined layer-2 payload data passes an error recognition test, determine layer-2 payload data from the received data signal based on at least one further candidate transport format of the group of candidate transport formats, if the layer-2 payload data determined based on the first candidate transport format does not pass the error recognition test.

In Example 330, the subject matter of Example 329 can optionally include wherein each transport format included by the transport format set further indicates a number of data transmission time slots which include at least part of one block of coded layer-2 payload data.

In Example 331, the subject matter of any one of Examples 329 to 330 can optionally include wherein transport formats included by the group of transport formats indicate a same common modulation scheme.

In Example 332, the subject matter of Example 331 can optionally include wherein the one or more decoders are configured to process the received data signal based on the common modulation scheme when determining the layer-2 payload data based on the first candidate transport format and/or when determining the layer-2 payload data based on the at least one further candidate transport format.

In Example 333, the subject matter of any one of Examples 329 to 332 can optionally include wherein, when processing the received data signal based on a candidate transport format to determine the layer-2 payload data, the one or more decoders are configured to process the received data signal by demodulating and decoding a number of data transmission time slots, the number corresponding to the candidate transport format.

In Example 334, the subject matter of any one of Examples 329 to 332 can optionally include wherein the one or more decoders are configured to process the received data signal by demodulating a first data transmission time slot and by applying a decoding processing to demodulated data of the first data transmission time slot when determining layer-2 payload data based on the first candidate transport format.

In Example 335, the subject matter of Example 334 can optionally include wherein the one or more decoders are configured to determine whether or not the layer-2 payload data determined by applying the decoding processing to the demodulated data of the first data transmission time slot passes the error recognition test when determining whether or not the layer-2 payload data determined based on the first candidate transport format passes the error recognition test.

In Example 336, the subject matter of any one of Examples 334 or 335 can optionally include wherein the one or more decoders are configured to process the received data signal by demodulating at least one further data transmission time slot and by applying a decoding processing to a combination of the demodulated data of the first data transmission time slot and demodulated data of the at least one further data transmission time slot, when determining the layer-2 payload data based on the at least one further candidate transport format.

In Example 337, the subject matter of Example 336 can optionally include wherein the data transmission time slot and the at least one further data transmission time slot are consecutive in time.

In Example 338, the subject matter of any one of Examples 336 or 337 can optionally include wherein the one or more decoders are configured to determine whether or not the layer-2 payload data determined based on the at least one further candidate transport format passes the error recognition test by determining whether or not the layer-2 payload data determined by applying the decoding processing to the combination of the demodulated data of the first data transmission time slot and the demodulated data of the at least one further data transmission time slot passes the error recognition test.

In Example 339, the subject matter of any one of Examples 329 to 338 can optionally include wherein the one or more decoders are configured to determine the layer-2 payload data from the received data signal based on the first candidate transport format by detecting an error in the decoding of a first data transmission time slot of the received data signal, receiving a retransmission of the first data transmission slot, combining the first data transmission time slot with the retransmission to obtain a combined data transmission time slot, and decoding the combined data transmission time slot to obtain the transmitted data for the first candidate transport format.

In Example 340, the subject matter of Example 339 can optionally include wherein the one or more decoders are configured to detect the error in the decoding of the first data transmission time slot by decoding the first data transmission time slot to obtain decoded data, and detecting an error in the decoded data based on a redundancy check.

In Example 341, the subject matter of Example 338 or 339 can optionally include wherein the one or more decoders are further configured to request the retransmission of the first data transmission time slot after detecting the error and to receive the retransmission in response to the request.

In Example 342, the subject matter of any one of Examples 339 to 341 can optionally include wherein the one or more decoders are configured to combine the first data transmission time slot with the retransmission to obtain a combined data transmission time slot by combining demodulated data of the first data transmission time slot with demodulated data of the retransmission to obtain the combined data transmission time slot.

In Example 343, the subject matter of any one of Examples 329 to 342 can optionally include wherein the one or more decoders are configured to determine the layer-2 payload data from the received data signal based on the first candidate transport format by decoding a first data transmission time slot of the received data signal to obtain the layer-2 payload data, and wherein the one or more decoders are configured to determine layer-2 payload data from the received data signal based on the at least one further candidate transport format by decoding a second data transmission time slot of the received data signal that occurs after the first data transmission time slot to obtain second layer-2 payload data, combining the first layer-2 payload data with the second layer-2 payload data to obtain layer-2 payload data corresponding to the further candidate transport format.

In Example 344, the subject matter of Example 343 can optionally include wherein the one or more decoders are further configured to determine whether the layer-2 payload data corresponding to the further candidate transport format passes the error recognition test.

In Example 345, the subject matter of Example 344 can optionally include wherein the one or more decoders are further configured to, if the layer-2 payload data corresponding to the further candidate transport format does not pass the error recognition test decode a third data transmission time slot of the received data signal that occurs after the second data transmission time slot to third second layer-2 payload data, combine the first layer-2 payload data, the second layer-2 payload data, and the third layer-2 payload data to obtain layer-2 payload data corresponding to a third candidate transport format, and determine whether the layer-2 payload data corresponding to a third candidate transport format passes the error recognition test.

In Example 346, the subject matter of any one of Examples 343 to 345 can optionally include wherein the first candidate transport format, the further candidate transport format, and the third candidate transport format differ in the number of data transmission time slots to which a transport block of data is mapped.

In Example 347, the subject matter of any one of Examples 329 to 338 can optionally include wherein the one or more decoders are further configured to determine layer-2 payload data from the received data signal based on a predefined default candidate transport format included by the transport format set and corresponding to a transport block of layer-2 payload data with a size which meets a predefined size criterion.

In Example 348, the subject matter of Example 347 can optionally include wherein the one or more decoders are configured to determine whether or not the layer-2 payload data determined based on the predefined default candidate transport format passes the error recognition test, and wherein the one or more decoders are configured to determine the layer-2 payload data based on the first candidate transport format of the group of candidate transport formats, if the layer-2 payload data determined based on the predefined default candidate transport format does not pass the error recognition test.

In Example 349, the subject matter of any one of Examples 347 or 348 can optionally include wherein the predefined default candidate transport format indicates a single data transmission time slot.

In Example 350, the subject matter of any one of Examples 347 to 349 can optionally include wherein the default candidate transport format indicates a coding scheme corresponding to a code rate meeting a predefined code rate criterion.

In Example 351, the subject matter of any one of Examples 347 to 350 can optionally include wherein the default candidate transport format indicates a coding scheme corresponding to a code rate smaller than a smallest code rate of coding schemes indicated by the candidate transport formats included by the group of candidate transport formats.

In Example 352, the subject matter of any one of Examples 347 to 351 can optionally further include an estimator configured to estimate a channel quality based on a received control data signal, wherein the indication message indicates the group of candidate transport formats based on the estimated channel quality.

In Example 353, the subject matter of any one of Examples 329 to 352 can optionally further include a receiver configured to receive the control data signal via device-to-device communication.

In Example 354, the subject matter of Example 353 can optionally include wherein the estimator is configured to estimate the channel quality based on a device-to-device scheduling request included by the received control data signal.

In Example 355, the subject matter of any one of Examples 353 or 354 can optionally include wherein the scheduling request includes a reference signal, and wherein the estimator is configured to estimate the channel quality based on the reference signal.

In Example 356, the subject matter of any one of Examples 329 to 355 can optionally include wherein the error recognition test corresponds to a cyclic redundancy test.

In Example 357, the subject matter of any one of Examples 329 to 356 can optionally further include a receiver configured to receive the data signal.

Example 358 is a communication method of a wireless device including generating an indication message to indicate a group of candidate transport formats of a transport format set, wherein each transport format corresponds to a set of parameters including at least a 2-tuple of parameters with one parameter indicating a modulation scheme and one parameter indicating a coding scheme for modulating and coding data to be transmitted, the method including determining transmitted data from a received data signal based on a first candidate transport format of the group of candidate transport formats, determining whether or not the determined transmitted data passes an error recognition test, determining transmitted data from the received data signal based on at least one further candidate transport format of the group of candidate transport formats, if the transmitted data determined based on the first candidate transport format does not pass the error recognition test.

In Example 359, the subject matter of Example 358 can optionally include wherein the one parameter indicating a coding scheme indicates a channel encoding scheme.

In Example 360, the subject matter of any one of Examples 358 or 359 can optionally include wherein the data to be transmitted corresponds to source encoded data.

In Example 361, the subject matter of any one of Examples 358 to 360 can optionally include wherein each transport format corresponds to a number of data transmission time slots which include at least part of one coded block of data to be transmitted.

In Example 362, the subject matter of any one of Examples 358 to 361 can optionally include wherein each transport format included by the indicated group of transport formats corresponds to a set of parameters with the one parameter indicating the modulation scheme indicating a common modulation scheme which is the same for all transport formats included by the indicated group.

In Example 363, the subject matter of Example 362 can optionally further include processing the received data signal based on the common modulation scheme when determining the transmitted data based on the first candidate transport format and/or when determining the transmitted data based on the at least one further candidate transport format.

In Example 364, the subject matter of any one of Examples 358 to 363 can optionally further include, when processing the received data signal based on a candidate transport format to determine the transmitted data, processing the received data signal by demodulating and decoding a number of data transmission time slots, the number corresponding to the candidate transport format.

In Example 365, the subject matter of any one of Examples 358 to 363 can optionally further include processing the received data signal by demodulating a first data transmission time slot and by applying a decoding processing to demodulated data of the first data transmission time slot when determining transmitted data based on the first candidate transport format.

In Example 366, the subject matter of Example 365 can optionally further include determining whether or not the transmitted data determined by applying the decoding processing to the demodulated data of the first data transmission time slot passes the error recognition test when determining whether or not the transmitted data determined based on the first candidate transport format passes the error recognition test.

In Example 367, the subject matter of any one of Examples 365 or 366 can optionally further include processing the received data signal by demodulating at least one further data transmission time slot and by applying a decoding processing to a combination of the demodulated data of the first data transmission time slot and demodulated data of the at least one further data transmission time slot, when determining the transmitted data based on the at least one further candidate transport format.

In Example 368, the subject matter of Example 367 can optionally include wherein the data transmission time slot and the at least one further data transmission time slot are consecutive in time.

In Example 369, the subject matter of any one of Examples 367 or 368 can optionally further include determining whether or not the transmitted data determined based on the at least one further candidate transport format passes the error recognition test by determining whether or not the transmitted data determined by applying the decoding processing to the combination of the demodulated data of the first data transmission time slot and the demodulated data of the at least one further data transmission time slot passes the error recognition test.

In Example 370, the subject matter of any one of Examples 358 to 369 can optionally include wherein determining the transmitted data from the received data signal based on the first candidate transport format includes detecting an error in the decoding of a first data transmission time slot of the received data signal, receiving a retransmission of the first data transmission slot, combining the first data transmission time slot with the retransmission to obtain a combined data transmission time slot, and decoding the combined data transmission time slot to obtain the transmitted data for the first candidate transport format.

In Example 371, the subject matter of Example 370 can optionally include wherein detecting the error in the decoding of the first data transmission time slot includes decoding the first data transmission time slot to obtain decoded data, and detecting an error in the decoded data based on a redundancy check.

In Example 372, the subject matter of Example 370 or 371 can optionally include wherein determining the transmitted data from the received data signal based on the first candidate transport format further includes requesting the retransmission of the first data transmission time slot after detecting the error and to receive the retransmission in response to the request.

In Example 373, the subject matter of any one of Examples 370 to 372 can optionally include wherein combining the first data transmission time slot with the retransmission to obtain the combined data transmission time slot includes combining demodulated data of the first data transmission time slot with demodulated data of the retransmission to obtain the combined data transmission time slot.

In Example 374, the subject matter of any one of Examples 358 to 373 can optionally include wherein determining the transmitted data from the received data signal based on the first candidate transport format includes decoding a first data transmission time slot of the received data signal to obtain the transmitted data, and wherein determining transmitted data from the received data signal based on the at least one further candidate transport format includes decoding a second data transmission time slot of the received data signal that occurs after the first data transmission time slot to obtain second transmitted data, combining the first transmitted data with the second transmitted data to obtain transmitted data corresponding to the further candidate transport format.

In Example 375, the subject matter of Example 374 can optionally further include determining whether the transmitted data corresponding to the further candidate transport format passes the error recognition test.

In Example 376, the subject matter of Example 375 can optionally further include, if the transmitted data corresponding to the further candidate transport format does not pass the error recognition test decoding a third data transmission time slot of the received data signal that occurs after the second data transmission time slot to third second transmitted data, combining the first transmitted data, the second transmitted data, and the third transmitted data to obtain transmitted data corresponding to a third candidate transport format, and determining whether the transmitted data corresponding to a third candidate transport format passes the error recognition test.

In Example 377, the subject matter of any one of Examples 374 to 376 can optionally include wherein the first candidate transport format, the further candidate transport format, and the third candidate transport format differ in the number of data transmission time slots to which a transport block of data is mapped.

In Example 378, the subject matter of any one of Examples 358 to 369 can optionally further include determining transmitted data from the received data signal based on a predefined default candidate transport format included by the transport format set and corresponding to a transport block of data to be transmitted with a size which meets a predefined size criterion.

In Example 379, the subject matter of Example 378 can optionally further include determining whether or not the transmitted data determined based on the predefined default candidate transport format passes the error recognition test, and determining the transmitted data based on the first candidate transport format of the group of candidate transport formats, if the transmitted data determined based on the predefined default candidate transport format does not pass the error recognition test.

In Example 380, the subject matter of any one of Examples 378 or 379 can optionally include wherein the predefined default candidate transport format corresponds to a single data transmission time slot.

In Example 381, the subject matter of any one of Examples 378 to 380 can optionally include wherein the default candidate transport format corresponds to a set of parameters where the one parameter indicating the coding scheme indicates a coding scheme corresponding to a code rate meeting a predefined code rate criterion.

In Example 382, the subject matter of any one of Examples 378 to 381 can optionally include wherein the default candidate transport format corresponds to a set of parameters where the one parameter indicating the coding scheme indicates a coding scheme corresponding to a code rate smaller than a smallest code rate of coding schemes indicated by corresponding parameters of the candidate transport formats included by the group of candidate transport formats.

In Example 383, the subject matter of any one of Examples 358 to 382 can optionally further include estimating a channel quality based on a received control data signal, wherein the indication message indicates the group of candidate transport formats based on the estimated channel quality.

In Example 384, the subject matter of Example 383 can optionally further include receiving the control data via device-to-device communication.

In Example 385, the subject matter of Example 384 can optionally further include estimating the channel quality based on a device-to-device scheduling request included by the received control data signal.

In Example 386, the subject matter of Example 385 can optionally include wherein the scheduling request includes a reference signal, the method further including estimating the channel quality based on the reference signal.

In Example 387, the subject matter of any one of Examples 358 to 386 can optionally include wherein the error recognition test corresponds to a cyclic redundancy test.

In Example 388, the subject matter of any one of Examples 358 to 387 can optionally further include a receiving the data signal.

Example 389 is a communication method of a wireless device including generating an indication message to indicate a group of candidate transport formats of a transport format set, where each transport format included by the transport format set indicates at least a modulation and coding scheme for modulation and coding of layer-2 payload data, the method including determining layer-2 payload data from a received data signal based on a first candidate transport format of the group of candidate transport formats, determining whether or not the determined layer-2 payload data passes an error recognition test, determining layer-2 payload data from the received data signal based on at least one further candidate transport format of the group of candidate transport formats, if the layer-2 payload data determined based on the first candidate transport format does not pass the error recognition test.

In Example 390, the subject matter of Example 389 can optionally include wherein each transport format included by the transport format set further indicates a number of data transmission time slots which include at least part of one block of coded layer-2 payload data.

In Example 391, the subject matter of any one of Examples 389 to 390 can optionally include wherein transport formats included by the group of transport formats indicate a same common modulation scheme.

In Example 392, the subject matter of Example 391 can optionally further include processing the received data signal based on the common modulation scheme when determining the layer-2 payload data based on the first candidate transport format and/or when determining the layer-2 payload data based on the at least one further candidate transport format.

In Example 393, the subject matter of any one of Examples 389 to 392 can optionally further include, when processing the received data signal based on a candidate transport format to determine the layer-2 payload data, processing the received data signal by demodulating and decoding a number of data transmission time slots, the number corresponding to the candidate transport format.

In Example 394, the subject matter of any one of Examples 389 to 392 can optionally further include processing the received data signal by demodulating a first data transmission time slot and by applying a decoding processing to demodulated data of the first data transmission time slot when determining layer-2 payload data based on the first candidate transport format.

In Example 395, the subject matter of Example 394 can optionally further include determining whether or not the layer-2 payload data determined by applying the decoding processing to the demodulated data of the first data transmission time slot passes the error recognition test when determining whether or not the layer-2 payload data determined based on the first candidate transport format passes the error recognition test.

In Example 396, the subject matter of any one of Examples 394 or 395 can optionally further include processing the received data signal by demodulating at least one further data transmission time slot and by applying a decoding processing to a combination of the demodulated data of the first data transmission time slot and demodulated data of the at least one further data transmission time slot, when determining the layer-2 payload data based on the at least one further candidate transport format.

In Example 397, the subject matter of Example 396 can optionally include wherein the data transmission time slot and the at least one further data transmission time slot are consecutive in time.

In Example 398, the subject matter of any one of Examples 396 or 397 can optionally further include determining whether or not the layer-2 payload data determined based on the at least one further candidate transport format passes the error recognition test by determining whether or not the layer-2 payload data determined by applying the decoding processing to the combination of the demodulated data of the first data transmission time slot and the demodulated data of the at least one further data transmission time slot passes the error recognition test.

In Example 399, the subject matter of any one of Examples 389 to 398 can optionally include wherein determining the layer-2 payload data from the received data signal based on the first candidate transport format includes detecting an error in the decoding of a first data transmission time slot of the received data signal, receiving a retransmission of the first data transmission slot, combining the first data transmission time slot with the retransmission to obtain a combined data transmission time slot, and decoding the combined data transmission time slot to obtain the layer-2 payload data for the first candidate transport format.

In Example 400, the subject matter of Example 399 can optionally include wherein detecting the error in the decoding of the first data transmission time slot includes decoding the first data transmission time slot to obtain decoded data, and detecting an error in the decoded data based on a redundancy check.

In Example 401, the subject matter of Example 399 or 400 can optionally include wherein determining the layer-2 payload data from the received data signal based on the first candidate transport format further includes requesting the retransmission of the first data transmission time slot after detecting the error and to receive the retransmission in response to the request.

In Example 402, the subject matter of any one of Examples 399 to 401 can optionally include wherein combining the first data transmission time slot with the retransmission to obtain the combined data transmission time slot includes combining demodulated data of the first data transmission time slot with demodulated data of the retransmission to obtain the combined data transmission time slot.

In Example 403, the subject matter of any one of Examples 389 to 402 can optionally include wherein determining the layer-2 payload data from the received data signal based on the first candidate transport format includes decoding a first data transmission time slot of the received data signal to obtain the layer-2 payload data, and wherein determining layer-2 payload data from the received data signal based on the at least one further candidate transport format includes decoding a second data transmission time slot of the received data signal that occurs after the first data transmission time slot to obtain second layer-2 payload data, combining the first layer-2 payload data with the second layer-2 payload data to obtain layer-2 payload data corresponding to the further candidate transport format.

In Example 404, the subject matter of Example 403 can optionally further include determining whether the layer-2 payload data corresponding to the further candidate transport format passes the error recognition test.

In Example 405, the subject matter of Example 404 can optionally further include, if the layer-2 payload data corresponding to the further candidate transport format does not pass the error recognition test decoding a third data transmission time slot of the received data signal that occurs after the second data transmission time slot to third second layer-2 payload data, combining the first layer-2 payload data, the second layer-2 payload data, and the third layer-2 payload data to obtain layer-2 payload data corresponding to a third candidate transport format, and determining whether the layer-2 payload data corresponding to a third candidate transport format passes the error recognition test.

In Example 406, the subject matter of any one of Examples 403 to 405 can optionally include wherein the first candidate transport format, the further candidate transport format, and the third candidate transport format differ in the number of data transmission time slots to which a transport block of data is mapped.

In Example 407, the subject matter of any one of Examples 389 to 398 can optionally further include determining layer-2 payload data from the received data signal based on a predefined default candidate transport format included by the transport format set and corresponding to a transport block of layer-2 payload data with a size which meets a predefined size criterion.

In Example 408, the subject matter of Example 407 can optionally further include determining whether or not the layer-2 payload data determined based on the predefined default candidate transport format passes the error recognition test, and determining the layer-2 payload data based on the first candidate transport format of the group of candidate transport formats, if the layer-2 payload data determined based on the predefined default candidate transport format does not pass the error recognition test.

In Example 409, the subject matter of any one of Examples 407 or 408 can optionally include wherein the predefined default candidate transport format indicates a single data transmission time slot.

In Example 410, the subject matter of any one of Examples 407 to 409 can optionally include wherein the default candidate transport format indicates a coding scheme corresponding to a code rate meeting a predefined code rate criterion.

In Example 411, the subject matter of any one of Examples 407 to 410 can optionally include wherein the default candidate transport format indicates a coding scheme corresponding to a code rate smaller than a smallest code rate of coding schemes indicated by the candidate transport formats included by the group of candidate transport formats.

In Example 412, the subject matter of any one of Examples 407 to 411 can optionally further include estimating a channel quality based on a received control data signal, wherein the indication message indicates the group of candidate transport formats based on the estimated channel quality.

In Example 413, the subject matter of any one of Examples 389 to 412 can optionally further include receiving the control data signal via device-to-device communication.

In Example 414, the subject matter of Example 413 can optionally further include estimating the channel quality based on a device-to-device scheduling request included by the received control data signal.

In Example 415, the subject matter of any one of Examples 413 or 414 can optionally include wherein the scheduling request includes a reference signal, the method further including estimating the channel quality based on the reference signal.

In Example 416, the subject matter of any one of Examples 389 to 415 can optionally include wherein the error recognition test corresponds to a cyclic redundancy test.

In Example 417, the subject matter of any one of Examples 389 to 416 can optionally further include receiving the data signal.

Example 418 is a communication device configured to perform synchronization in device to device (D2D) communications, the communication device comprising a receiver configured to receive a plurality of synchronization sequences over a plurality of frequencies; a determiner configured to determine a number of the received synchronization sequences; and an adjuster configured to adjust a time during which the receiver is tuned to each frequency of the plurality of frequencies based on the determination.

In Example 419, the subject matter of Example 418 can optionally include wherein the receiver is configured to receive a second plurality of synchronization sequences based on the adjusted time, wherein the second plurality of synchronization sequences is different than the plurality of synchronization sequences.

In Example 420, the subject matter of any one of Examples 418-419 can optionally include wherein the receiver is configured to tune to each frequency of the plurality of frequencies for a frame duration.

In Example 421, the subject matter of Example 420 can optionally include wherein the frame duration is equal for each of the plurality of frequencies.

In Example 422, the subject matter of any one of Examples 418-421 can optionally include wherein the receiver is configured to switch between the plurality of frequencies according to a predetermined order.

In Example 423, the subject matter of Example 422 can optionally include wherein the predetermined order is communicated to the communication device from an external source.

In Example 424, the subject matter of any one of Examples 418-423 can optionally include wherein the determiner is configured to correlate and/or average the plurality of synchronization sequences over an extended period of time to determine the number of received synchronization sequences and compare the number of synchronization sequences to a threshold.

In Example 425, the subject matter of Example 424 can optionally include wherein the threshold is based on a successful synchronization with a source device transmitting the plurality of synchronization sequences.

In Example 426, the subject matter of Example 425 can optionally include wherein the successful synchronization is determined based on a detection probability for a signal-to-noise ratio (SNR) of a channel of the communication device and the source device.

In Example 427, the subject matter of any one of Examples 425-426 can optionally include wherein the determiner is configured to determine the successful synchronization based on an information comprising a number of synchronization sequences per frequency of the plurality of frequencies.

In Example 428, the subject matter of any one of Examples 425-427 can optionally include wherein the determiner is configured to determine the successful synchronization based on an information comprising a signal to noise ratio (SNR) of a channel of the communication device and the source device.

In Example 429, the subject matter of Example 428 can optionally include wherein the information comprises a detection probability of the synchronization sequences transmitted from the source device.

In Example 430, the subject matter of Example 429 can optionally include wherein the detection probability is at least 80%.

In Example 431, the subject matter of any one of Examples 429-430 can optionally include wherein the detection probability is about 90%.

In Example 432, the subject matter of any one of Examples 418-431 can optionally include wherein the adjuster is configured to adjust a starting point of the time for which the receiver is tuned to each frequency by a time correction.

In Example 433, the subject matter of Example 432 can optionally include wherein the time correction is dependent on a number of synchronization sequences required to be received per frequency of the plurality of frequencies and a detection probability for a given SNR.

In Example 434, the subject matter of any one of Examples 432-433 can optionally include wherein the adjuster adjusts a starting point of the time the receiver is tuned to each frequency by the time correction in a first direction in the time domain.

In Example 435, the subject matter of Example 434 can optionally include wherein the determiner is configured to determine a second number of the received synchronization sequences based on the reception of synchronization sequences at the adjusted time.

In Example 436, the subject matter of Example 435 can optionally include wherein the adjuster adjusts a starting point of the adjusted time the receiver is tuned to each frequency by a multiple of the time correction in a second direction in the time domain, wherein the second direction is opposite of the first direction.

In Example 437, the subject matter of any one of Examples 418-436 can optionally include wherein the determiner is configured to correlate and/or average the plurality of synchronization sequences over an extended period of time to determine the number of received synchronization sequences and compare the number of synchronization sequences to a threshold for each respective iteration of one or more iterations.

In Example 438, the subject matter of Example 437 can optionally include wherein the adjuster is configured to adjust the time for which the receiver is tuned to each frequency of the plurality of frequencies based on the determination in each respective iteration of the one or more iterations, wherein the time frame the receiver is tuned to each frequency is different in each respective iteration, wherein the time is relative to a timing of a source device transmitting the each iteration of the plurality of synchronization sequences.

In Example 439, the subject matter of Example 438 can optionally include wherein in each respective iteration of the one or more iterations, the adjuster adjusts the time for which the receiver is tuned to each frequency at a time correction relative to the time correction of a previous iteration.

In Example 440, the subject matter of Example 439 can optionally include wherein the time correction is a multiple of the time correction of the previous iteration and the time correction is in an opposite direction in the time domain with respect to the time correction of the previous iteration.

In Example 441, the subject matter of Example 440 can optionally include wherein the multiple of the time correction increases in absolute value with each respective iteration.

In Example 442, the subject matter of Example 441 can optionally include wherein the multiple of the time correction of the previous iteration decreases in absolute value with each respective iteration.

In Example 443, the subject matter of any one of Examples 437-442 can optionally include wherein the time correction, ?Timing_offset?_(nth_Sync_Proc), of each respective iteration of the one or more iterations is determined by:

?Timing_offset?_(nth_Sync_Proc)=n*T_(time_correction) for n=1,3,5,7, . . .

?Timing_offset?_(nth_Sync_Proc)=–n?*rT?_(time_correction) for n=2,4,6,8, . . .

where n is the number of iteration after the first iteration of the one or more iteration, and Ttime_correction is based on a number of synchronization sequences required to be received by the communication device per frequency of the plurality of frequencies.

In Example 444, the subject matter of any one of Examples 437-443 can optionally include wherein the determiner is configured to set an upper limit for the one or more iterations.

In Example 445, the subject matter of Example 444 can optionally include wherein the upper limit is determined based on an accuracy of a local oscillator of the communication device.

In Example 446, the subject matter of any one of Examples 418-445 can optionally include wherein the communication device is configured to synchronize with a source device transmitting the plurality of synchronization sequences once the determination that the number of the received synchronization sequences meets a threshold.

In Example 447, the subject matter of Example 446 can optionally include wherein there is no external source providing synchronization between the source device and the communication device during the synchronization in D2D communications.

Example 448 is a method for a communication device to perform a synchronization in device to device (D2D) communications, the method comprising: receiving a plurality of synchronization sequences transmitted over a plurality of frequencies via a receiver; determining a number of the received synchronization sequences; and adjusting a time during which the receiver is tuned to each frequency of the plurality of frequencies based on the determination.

In Example 449, the subject matter of Example 448 can optionally include further comprising receiving a second plurality of synchronization sequences based on the adjusted time, wherein the second plurality of synchronization sequences is different than the plurality of synchronization sequences.

In Example 450, the subject matter of any one of Examples 448-449 can optionally include further comprising tuning to each frequency of the plurality of frequencies for a frame duration.

In Example 451, the subject matter of Example 450 can optionally include wherein the frame duration is equal for each of the plurality of frequencies.

In Example 452, the subject matter of any one of Examples 448-451 can optionally include further comprising switching between the plurality of frequencies according to a predetermined order.

In Example 453, the subject matter of Example 452 can optionally include wherein the predetermined order is communicated to the communication device from an external source.

In Example 454, the subject matter of any one of Examples 448-453 can optionally include further comprising comparing the number of received synchronization sequences to a threshold.

In Example 455, the subject matter of Example 454 can optionally include wherein the threshold is based on a successful synchronization with a source device transmitting the plurality of synchronization sequences.

In Example 456, the subject matter of Example 455 can optionally include wherein the successful synchronization is determined based on a detection probability for a signal-to-noise ratio (SNR) of a channel of the communication device and the source device.

In Example 457, the subject matter of any one of Examples 455-456 can optionally include further comprising determining the successful synchronization based on an information comprising a number of synchronization sequences per frequency of the plurality of frequencies.

In Example 458, the subject matter of any one of Examples 455-457 can optionally include further comprising determining the successful synchronization based on an information comprising a signal to noise ratio (SNR) of a channel of the communication device and the source device.

In Example 459, the subject matter of Example 458 can optionally include wherein the information comprises a detection probability of the synchronization sequences transmitted from the source device.

In Example 460, the subject matter of Example 459 can optionally include wherein the detection probability is at least 80%.

In Example 461, the subject matter of any one of Examples 459-460 can optionally include wherein the detection probability is about 90%.

In Example 462, the subject matter of any one of Examples 448-451 can optionally include further comprising adjusting a starting point of the time for which the receiver is tuned to each frequency by a time correction.

In Example 463, the subject matter of Example 462 can optionally include wherein the time correction is dependent on a number of synchronization sequences required to be received per frequency of the plurality of frequencies and a detection probability for a given SNR.

In Example 464, the subject matter of any one of Examples 462-463 can optionally include further comprising adjusting a starting point of the time the receiver is tuned to each frequency by the time correction in a first direction in the time domain.

In Example 465, the subject matter of Example 464 can optionally include further comprising determining a second number of the received synchronization sequences based on the reception of synchronization sequences at the adjusted time.

In Example 466, the subject matter of Example 465 can optionally include further comprising adjusting a starting point of the adjusted time the receiver is tuned to each frequency by a multiple of the time correction in a second direction in the time domain, wherein the second direction is opposite of the first direction.

In Example 467, the subject matter of any one of Examples 448-466 can optionally include further comprising comparing the number of received synchronization sequences to a threshold for each respective iteration of one or more iterations.

In Example 468, the subject matter of Example 467 can optionally include further comprising adjusting the time for which the receiver is tuned to each frequency of the plurality of frequencies based on the determination in each respective iteration of the one or more iterations, wherein the time the receiver is tuned to each frequency is different in each respective iteration, wherein the time is relative to a timing of a source device transmitting the plurality of synchronization sequences.

In Example 469, the subject matter of Example 468 can optionally include wherein in each respective iteration of the one or more iterations, the adjuster adjusts the time for which the receiver is tuned to each frequency at a time correction relative to the time correction of a previous iteration.

In Example 470, the subject matter of Example 469 can optionally include wherein the time correction is a multiple of the time correction of the previous iteration and the time correction is in an opposite direction in the time domain with respect to the time correction of the previous iteration.

In Example 471, the subject matter of Example 470 can optionally include wherein the multiple of the time correction increases in absolute value with each respective iteration.

In Example 472, the subject matter of Example 471 can optionally include wherein the multiple of the time correction of the previous iteration decreases in absolute value with each respective iteration.

In Example 473, the subject matter of any one of Examples 467-472 can optionally include wherein the time correction, ?Timing_offset?_(nth_Sync_Proc), of each respective iteration of the one or more iterations is determined by:

?Timing_offset?_(nth_Sync_Proc)=n*T_(time_correction) for n=1,3,5,7, . . .
?Timing_offset?_(nth_Sync_Proc)=−n?*rT?_(time_correction) for n=2,4,6,8, . . .

where n is the number of iteration after the first iteration of the one or more iteration, and Ttime_correction is based on a number of synchronization sequences required to be received by the communication device per frequency of the plurality of frequencies.

In Example 474, the subject matter of any one of Examples 467-473 can optionally include further comprising setting an upper limit for the one or more iterations.

In Example 475, the subject matter of Example 474 can optionally include wherein the upper limit is determined based on an accuracy of a local oscillator of the communication device.

In Example 476, the subject matter of any one of Examples 448-475 can optionally include comprising synchronizing with a source device transmitting the plurality of synchronization sequences once the determination that the number of the received synchronization sequences meets a threshold.

In Example 477, the subject matter of Example 476 can optionally include wherein there is no external source providing synchronization between the source device and the communication device during the synchronization in D2D communications.

Example 478 is one or more non-transitory computer-readable media storing instructions thereon that, when executed by at least one processor of a communication device, direct the communication device to perform the method of any one of claims 448-477.

Example 479 is a communication device with one or more processors configured to: receive a plurality of synchronization sequences transmitted over a plurality of frequencies; determine a number of the received synchronization sequences; and adjust a time for which a receiver of the communication device is tuned to each frequency of the plurality of frequencies based on the determination.

Example 480 is a communication device comprising: means to receive a plurality of synchronization sequences transmitted over a plurality of frequencies; means to determine a number of the received synchronization sequences; and means to adjust a time for which a receiver of the communication device is tuned to each frequency of the plurality of frequencies based on the determination.

Example 481 is a communication device configured to control a radio frequency (RF) receiver to perform synchronization in device to device (D2D) communications, the communication device including an offset determiner configured to determine a maximum timing offset based on a last correction of the communication device to a master timing in D2D communications, and a RF receiver power adjuster configured to adjust a power of the RF receiver based on the maximum timing offset.

In Example 482, the subject matter of Example 481 can optionally include wherein the maximum timing offset is also based on an inaccuracy of a local oscillator of the communication device.

In Example 483, the subject matter of any one of Examples 481-482 can optionally include wherein the RF receiver power adjuster is configured to adjust the power of the RF receiver based on an expected time of reception of a synchronization sequence of a plurality of synchronization sequences and the maximum timing offset.

In Example 484, the subject matter of Example 483 can optionally include wherein the expected time of reception of the synchronization sequence is determined based on the last synchronization of the communication device to a master timing.

In Example 485, the subject matter of any one of Examples 483-484 can optionally include wherein the RF receiver power adjuster is configured to turn on the RF receiver during the expected time of reception of each of the plurality of synchronization sequences.

In Example 486, the subject matter of any one of Examples 483-485 can optionally include wherein the RF receiver power adjuster is configured to turn off the RF receiver outside of the expected time of reception of each of the plurality of synchronization sequences.

In Example 487, the subject matter of any one of Examples 481-486 can optionally include wherein the maximum timing offset, Max_(timing_offset), is determined according to Max_(timing_offset)=(T_current-T_(last_sync))*N_Drift, where Tcurrent is a current time and T_(last_sync) is a time of the last correction of the communication device to the master timing, and NDrift is a worst case inaccuracy of a local oscillator of the communication device.

In Example 488, the subject matter of Example 487 can optionally include wherein the radio frequency (RF) receiver power adjuster is configured to turn on the power of an RF receiver for a duration according to duration=2*Max_(timing_offset)+T_(dur_sync_seq), where T_(dur_sync_seq) is a duration of a synchronization sequence of the plurality of synchronization sequences.

In Example 489, the subject matter of any one of Examples 481-487 can optionally include wherein the communication device is configured to perform a correction of the communication device to the master timing after at least one of a successful synchronization in D2D communications or via an external synchronization source.

In Example 490, the subject matter of Example 489 can optionally include wherein the external synchronization source is a Global Navigation Satellite System (GNSS) time fix.

In Example 491, the subject matter of Example 490 can optionally include wherein the GNSS time fix is a Global Positioning System (GPS) time fix.

In Example 492, the subject matter of Example 489 can optionally include wherein the external synchronization source is a network access node.

In Example 493, the subject matter of Example 492 can optionally include wherein the network access node is a 3GPP network access node or a wireless internet access point.

In Example 494, the subject matter of any one of Examples 492-493 can optionally include wherein a Coordinated Universal Time (UTC) is acquired from the 3GPP network access node or the wireless internet access point.

In Example 495, the subject matter of Example 494 can optionally include wherein the GPS time is derived from the UTC.

In Example 496, the subject matter of any one of Examples 481-495 can optionally further include a memory to store a time of the last correction of the communication device to the master timing.

In Example 497, the subject matter of any one of Examples 481-496 can optionally include wherein the RF receiver is configured to receive a plurality of synchronization sequences from a source device.

In Example 498, the subject matter of Example 497 can optionally include wherein the plurality of synchronization sequences are received over a plurality of frequencies.

Example 499 is a method for a communication device to perform a synchronization in device to device (D2D) communications, the method including determining a maximum timing offset based on a last correction of the communication device to a master timing in D2D communications, and adjusting a power of an RF receiver of the communication device based on the maximum timing offset.

In Example 500, the subject matter of Example 499 can optionally include wherein the maximum timing offset is also based on an inaccuracy of a local oscillator of the communication device.

In Example 501, the subject matter of any one of Examples 499-500 can optionally include wherein the RF receiver power adjuster is configured to adjust the power of the RF receiver based on an expected time of reception of a synchronization sequence of a plurality of synchronization sequences and the maximum timing offset.

In Example 502, the subject matter of Example 501 can optionally include wherein the expected time of reception of the synchronization sequence is determined based on the last synchronization of the communication device to a master timing.

In Example 503, the subject matter of any one of Examples 501-502 can optionally include wherein the RF receiver power adjuster is configured to turn on the RF receiver during the expected time of reception of each of the plurality of synchronization sequences.

In Example 504, the subject matter of any one of Examples 501-503 can optionally include wherein the RF receiver power adjuster is configured to turn off the RF receiver outside of the expected time of reception of each of the plurality of synchronization sequences.

In Example 505, the subject matter of any one of Examples 499-504 can optionally include wherein the maximum timing offset, $Max\_(timing\_offset)$, is determined according to $Max\_(timing\_offset)=(T\_current-T\_(last\_sync))*N\_Drift$, where Tcurrent is a current time and $T\_(last\_sync)$ is a time of the last correction of the communication device to the master timing, and NDrift is a worst case inaccuracy of a local oscillator of the communication device.

In Example 506, the subject matter of Example 505 can optionally include wherein the radio frequency (RF) receiver power adjuster is configured to turn on the power of an RF receiver to for a duration according to $duration=2*Max\_(timing\_offset)+T\_(dur\_sync\_seq)$, where $T\_(dur\_sync\_seq)$ is a duration of a synchronization sequence of the plurality of synchronization sequences.

In Example 507, the subject matter of any one of Examples 499-506 can optionally include wherein the communication device is configured to perform a correction of the communication device to the master timing after at least one of a successful synchronization in D2D communications or via an external synchronization source.

In Example 508, the subject matter of Example 507 can optionally include wherein the external synchronization source is a Global Navigation Satellite System (GNSS) time fix.

In Example 509, the subject matter of Example 508 can optionally include wherein the GNSS time fix is a Global Positioning System (GPS) time fix.

In Example 510, the subject matter of Example 507 can optionally include wherein the external synchronization source is a network access node.

In Example 511, the subject matter of Example 510 can optionally include wherein the network access node is a 3GPP network access node or a wireless internet access point.

In Example 512, the subject matter of any one of Examples 510-511 can optionally include wherein a Coordinated Universal Time (UTC) is acquired from the 3GPP network access node or the wireless internet access point.

In Example 513, the subject matter of Example 512 can optionally include wherein the GPS time is derived from the UTC.

In Example 514, the subject matter of any one of Examples 499-513 can optionally further include storing a time of the last correction of the communication device to the master timing.

In Example 515, the subject matter of any one of Examples 499-514 can optionally further include receive a plurality of synchronization sequences from a source device.

In Example 516, the subject matter of Example 515 can optionally include wherein the plurality of synchronization sequences are received over a plurality of frequencies.

Example 517 is one or more non-transitory computer-readable media storing instructions thereon that, when executed by at least one processor of a communication device, direct the communication device to perform the method of any one of Examples 499-512.

Example 518 is a communication device with one or more processors configured to determine a maximum timing offset based on a last correction of the communication device to a master timing in D2D communications, and adjust a power of an RF receiver of the communication device based on the maximum timing offset.

Example 519 is a communication device including means to determine a maximum timing offset based on a last correction of the communication device to a master timing in D2D communications, and means to adjust a power of an RF receiver of the communication device based on the maximum timing offset.

Example 520 is a communication device configured to operate on a device-to-device (D2D) network, the communication device including a channel quality estimator configured to estimate one or more channel quality indications for a single-tone transmission of the D2D network, a noise estimate selector configured to select at least one of a noise estimation for single-tone transmissions of the D2D network or a noise estimation for multi-tone transmissions of the D2D network, based on the one or more estimated channel quality indications for the single-tone transmission of the D2D network, and a transport format selector configured to select a transport format from a plurality of transport formats available to the communication device, based on at least one of the noise estimation for single-tone transmissions of the D2D network or the noise estimation for multi-tone transmissions of the D2D network.

In Example 521, the subject matter of Example 520 can optionally further include a transceiver configured to transmit a scheduling grant to a further communication device over the D2D network, wherein the scheduling grant indicates the selected transport format for the further communication device to use in a subsequent data transmission to the communication device.

Example 522 is a communication device configured to operate on a device-to-device (D2D) network, the communication device including a channel quality estimator configured to estimate one or more channel quality indications for a single-tone transmission of the D2D network, a noise estimate selector configured to select at least one of a noise estimation for single-tone transmissions of the D2D network or a noise estimation for multi-tone transmissions of the D2D network, based on the one or more estimated channel quality indications for the single-tone transmission of the D2D network, a transport format selector configured to select a transport format from a plurality of transport formats available to the communication device, based on at least one of the noise estimation for single-tone transmissions of the D2D network or the noise estimation for multi-tone transmissions of the D2D network.

In Example 523, the subject matter of any one of Examples 521 to 522 can optionally include wherein the transceiver is further configured to receive the single tone transmission from the further communication device via the D2D network.

In Example 524, the subject matter of Example 523 can optionally include wherein the single tone transmission includes a scheduling request from the further communication device, and the scheduling request indicates an amount of data the further communication device requests to transmit to the communication device.

In Example 525, the subject matter of any one of Examples 521 to 524 can optionally include wherein the transceiver is further configured to receive a multi-tone transmission from the further communication device via the D2D network.

In Example 526, the subject matter of Example 525 can optionally include wherein the multi-tone transmission includes a plurality of reference symbols from the further communication device, and the channel quality estimator is configured to estimate a parameter for the multi-tone transmission, based on the noise estimation for multi-tone transmissions of the D2D network.

In Example 527, the subject matter of any one of Examples 520 to 526 can optionally include wherein the channel quality estimator is configured to estimate a parameter for the single-tone transmission, based on the noise estimation for single-tone transmissions of the D2D network, and the estimated parameter for the single-tone transmission is an estimated signal-to-noise ratio for the single-tone transmission.

In Example 528, the subject matter of any one of Examples 526 to 527 can optionally include wherein the estimated parameter for the multi-tone transmission is an estimated signal-to-noise ratio for the multi-tone transmission.

In Example 529, the subject matter of any one of Examples 521 to 528 can optionally include wherein the selected transport format indicates a number of tones at which the subsequent data transmission to the communication device is modulated, and a number of data transmission bits of the subsequent data transmission to the communication device.

In Example 530, the subject matter of any one of Examples 521 to 529 can optionally include wherein the selected transport format further indicates a modulation scheme and code rate (MCS) of the subsequent data transmission to the communication device, and a bandwidth of the subsequent data transmission to the communication device.

In Example 531, the subject matter of any one of Examples 520 to 530 can optionally include wherein the one or more estimated channel quality indications for the single-tone transmission of the D2D network include one or more signal power measurements.

In Example 532, the subject matter of any one of Examples 521 to 531 can optionally include wherein the noise estimate selector is configured to select the noise estimation for single-tone transmissions of the D2D network, when a signal quality associated with the one or more estimated channel quality indications satisfies a criteria for single-tone transmission.

In Example 533, the subject matter of Example 532 can optionally include wherein the transport format selector is further configured to delay the selection of the transport format, when the signal quality associated with the one or more estimated channel quality indications does not satisfy the criteria for single-tone transmission.

In Example 534, the subject matter of any one of Examples 521 to 533 can optionally include wherein the noise estimate selector is configured to select the noise estimation for multi-tone transmissions of the D2D network, when the signal quality associated with the one or more estimated channel quality indications satisfies a criteria for multi-tone transmissions.

In Example 535, the subject matter of any one of Examples 521 to 533 can optionally include wherein the selected transport format includes a single-tone transmission.

In Example 536, the subject matter of any one of Examples 521 to 534 can optionally include wherein the selected transport format includes a multi-tone transmission.

In Example 537, the subject matter of any one of Examples 521 to 536 can optionally include wherein the transceiver is configured to transmit the scheduling grant to the further communication device over the D2D network as a single-tone transmission.

Example 538 is a method for a communication device configured to operate on a device-to-device (D2D) network, the method including estimating one or more channel quality indications for a single-tone transmission of the D2D network, selecting at least one of a noise estimation for single-tone transmissions of the D2D network or a noise estimation for multi-tone transmissions of the D2D network, based on the one or more estimated channel quality indications for the single-tone transmission of the D2D network, and selecting a transport format from a plurality of transport formats available to the communication device, based on at least one of the noise estimation for single-tone transmissions of the D2D network or the noise estimation for multi-tone transmissions of the D2D network.

In Example 539, the subject matter of Example 538 can optionally further include transmitting a scheduling grant to a further communication device over the D2D network, wherein the scheduling grant indicates the selected transport format for the further communication device to use in a subsequent data transmission to the communication device.

Example 541 is a method for a communication device configured to operate on a device-to-device (D2D) network, the method including estimating one or more channel quality indications for a single-tone transmission of the D2D network, selecting at least one of a noise estimation for single-tone transmissions of the D2D network or a noise estimation for multi-tone transmissions of the D2D network, based on the one or more estimated channel quality indications for the single-tone transmission of the D2D network, and selecting a transport format from a plurality of transport formats available to the communication device, based on at least one of the noise estimation for single-tone transmissions of the D2D network or the noise estimation for multi-tone transmissions of the D2D network, and transmitting a scheduling grant to a further communication device over the D2D network, wherein the scheduling grant indicates the selected transport format for the further communication device to use in a subsequent data transmission to the communication device.

In Example 541, the subject matter of Example 540 can optionally further include receiving the single tone transmission from the further communication device via the D2D network.

In Example 542, the subject matter of Example 541 can optionally include wherein the single tone transmission includes a scheduling request from the further communication device, and the scheduling request indicates an amount of data the further communication device requests to transmit to the communication device.

In Example 543, the subject matter of any one of Examples 539 to 542 can optionally further include receiving a multi-tone transmission from the further communication device via the D2D network.

In Example 544, the subject matter of Example 543 can optionally further include estimating a parameter for the multi-tone transmission, based on the noise estimation for multi-tone transmissions of the D2D network, wherein the multi-tone transmission includes a plurality of reference symbols from the further communication device.

In Example 545, the subject matter of any one of Examples 538 to 544 can optionally further include estimating a parameter for the single-tone transmission, based on the noise estimation for single-tone transmissions of the D2D network, and wherein the estimated parameter for the single-tone transmission is an estimated signal-to-noise ratio for the single-tone transmission.

In Example 546, the subject matter of any one of Examples 544 to 545 can optionally include wherein the estimated parameter for the multi-tone transmission is an estimated signal-to-noise ratio for the multi-tone transmission.

In Example 547, the subject matter of any one of Examples 539 to 546 can optionally include wherein the selected transport format indicates a number of tones at which the subsequent data transmission to the communication device is modulated, and a number of data transmission bits of the subsequent data transmission to the communication device.

In Example 548, the subject matter of any one of Examples 539 to 547 can optionally further include the selected transport format further indicates a modulation scheme and code rate (MCS) of the subsequent data transmission to the communication device, and a bandwidth of the subsequent data transmission to the communication device.

In Example 549, the subject matter of any one of Examples 538 to 548 can optionally include wherein the one or more estimated channel quality indications for the single-tone transmission of the D2D network include one or more signal power measurements.

In Example 550, the subject matter of any one of Examples 539 to 549 can optionally include wherein selecting at least one of the noise estimation for single-tone transmissions of the D2D network or the noise estimation for multi-tone transmissions of the D2D network, based on the one or more estimated channel quality indications for the single-tone transmission of the D2D network includes selecting the noise estimation for single-tone transmissions of the D2D network, when a signal quality associated with the one or more estimated channel quality indications satisfies a criteria for single-tone transmission.

In Example 551, the subject matter of Example 550 can optionally further include delaying the selection of the transport format, when the signal quality associated with the one or more estimated channel quality indications does not satisfy the criteria for single-tone transmission.

In Example 552, the subject matter of any one of Examples 539 to 551 can optionally include wherein selecting at least one of the noise estimation for single-tone transmissions of the D2D network or the noise estimation for multi-tone transmissions of the D2D network, based on the one or more estimated channel quality indications for the single-tone transmission of the D2D network includes selecting the noise estimation for multi-tone transmissions of the D2D network, when the signal quality associated with the one or more estimated channel quality indications satisfies a criteria for multi-tone transmissions.

In Example 553, the subject matter of any one of Examples 539 to 552 can optionally include wherein the selected transport format includes a single-tone transmission.

In Example 554, the subject matter of any one of Examples 539 to 553 can optionally include wherein the selected transport format includes a multi-tone transmission.

In Example 555, the subject matter of any one of Examples 539 to 554 can optionally further include transmitting the scheduling grant to the further communication device over the D2D network as a single-tone transmission.

Example 556 is one or more non-transitory computer readable media storing instructions thereon that when executed by at least one processor of a device, direct the device to perform the method of estimating one or more channel quality indications for a single-tone transmission of a device-to-device (D2D) network, selecting at least one of a noise estimation for single-tone transmissions of the D2D network or a noise estimation for multi-tone transmissions of the D2D network, based on the one or more estimated channel quality indications for the single-tone transmission of the D2D network, and selecting a transport format from a plurality of transport formats available to the communication device, based on at least one of the noise estimation for single-tone transmissions of the D2D network or the noise estimation for multi-tone transmissions of the D2D network.

Example 557 is one or more non-transitory computer readable media storing instructions thereon that when executed by at least one processor of a device, direct the device to perform the method of estimating one or more channel quality indications for a single-tone transmission of a device-to-device (D2D) network, selecting at least one of a noise estimation for single-tone transmissions of the D2D network or a noise estimation for multi-tone transmissions of the D2D network, based on the one or more estimated channel quality indications for the single-tone transmission of the D2D network, and selecting a transport format from a plurality of transport formats available to the communication device, based on at least one of the noise estimation for single-tone transmissions of the D2D network or the noise estimation for multi-tone transmissions of the D2D network, and transmitting a scheduling grant to a further communication device over the D2D network, wherein the scheduling grant indicates the selected transport format for the further communication device to use in a subsequent data transmission to the communication device.

Example 558 is one or more non-transitory computer readable media storing instructions thereon that when executed by at least one processor of a device, direct the device to perform the method of any one of any one of Examples 538 to 555.

Example 559 is one or more non-transitory computer readable media storing instructions thereon that when executed by at least one processor of a device, direct the device to perform the method of any one of any one of Examples 538 to 555.

Example 560 is a device including a processor, and a memory storing instructions that when executed by the processor cause the processor to perform the method of estimating one or more channel quality indications for a single-tone transmission of a device-to-device (D2D) network, selecting at least one of a noise estimation for single-tone transmissions of the D2D network or a noise estimation for multi-tone transmissions of the D2D network, based on the one or more estimated channel quality indications for the single-tone transmission of the D2D network, and selecting a transport format from a plurality of transport formats available to the communication device, based on at least one of the noise estimation for single-tone transmissions of the D2D network or the noise estimation for multi-tone transmissions of the D2D network.

Example 561 is a device including a processor, and a memory storing instructions that when executed by the processor cause the processor to perform the method of estimating one or more channel quality indications for a single-tone transmission of a device-to-device (D2D) network, selecting at least one of a noise estimation for single-tone transmissions of the D2D network or a noise estimation for multi-tone transmissions of the D2D network, based on the one or more estimated channel quality indications for the single-tone transmission of the D2D network, and selecting a transport format from a plurality of transport formats available to the communication device, based on at least one of the noise estimation for single-tone transmissions of the D2D network or the noise estimation for multi-tone transmissions of the D2D network, and transmitting a scheduling grant to a further communication device over the D2D network, wherein the scheduling grant indicates the selected transport format for the further communication device to use in a subsequent data transmission to the communication device.

Example 562 is a device including a processor, and a memory storing instructions that when executed by the processor cause the processor to perform the method of any one of any one of Examples 538 to 555.

Example 563 is a communication device connected to a radio communication network, the communication device including means for estimating one or more channel quality indications for a single-tone transmission of a device-to-device (D2D) network, means for selecting at least one of a noise estimation for single-tone transmissions of the D2D network or a noise estimation for multi-tone transmissions of the D2D network, based on the one or more estimated channel quality indications for the single-tone transmission of the D2D network, and means for selecting a transport format from a plurality of transport formats available to the communication device, based on at least one of the noise estimation for single-tone transmissions of the D2D network or the noise estimation for multi-tone transmissions of the D2D network.

Example 564 is a communication device connected to a radio communication network, the communication device including means for estimating one or more channel quality indications for a single-tone transmission of a device-to-device (D2D) network, means for selecting at least one of a noise estimation for single-tone transmissions of the D2D network or a noise estimation for multi-tone transmissions of the D2D network, based on the one or more estimated channel quality indications for the single-tone transmission of the D2D network, and means for selecting a transport format from a plurality of transport formats available to the communication device, based on at least one of the noise estimation for single-tone transmissions of the D2D network or the noise estimation for multi-tone transmissions of the D2D network, and means for transmitting a scheduling grant to a further communication device over the D2D network, wherein the scheduling grant indicates the selected transport format for the further communication device to use in a subsequent data transmission to the communication device.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A wireless device comprising:
a digital receiver configured to estimate a frequency offset between a local frequency and a reference frequency of a received synchronization signal;
a frequency controller configured to determine, based on the frequency offset, a correction to the local frequency that compensates temperature-based frequency drift in the local frequency; and
a frequency tuner configured to adjust the local frequency based on the correction to obtain a corrected local frequency;
wherein the frequency controller is configured to determine the correction based on a control loop including a delay element that delays an output of the control loop to obtain a delayed output, a first proportional factor before the delay element that weights the frequency offset, and a second proportional factor after the delay element that weights the delayed output.

2. The wireless device of claim 1, wherein the digital receiver is configured to estimate the frequency offset between the local frequency and the reference frequency of the received synchronization signal by:
generating a local reference signal based on the local frequency;
determining a cross-correlation between the local reference signal and the received synchronization signal;
determining a phase offset between the local reference signal and the received synchronization signal based on the cross-correlation; and
estimating the frequency offset based on the phase offset.

3. The wireless device of claim 1, wherein the correction is a frequency correction instruction and the frequency controller is configured to send the frequency correction instruction to the frequency tuner, and wherein the frequency tuner is configured to adjust the local frequency based on the correction to obtain a corrected local frequency by sampling a native clock signal of the wireless device based on the frequency correction instruction to obtain the corrected local frequency.

4. The wireless device of claim 1, wherein the first proportional factor and the second proportional factor produce a combined factor that tunes a gain of the control loop to 1.

5. The wireless device of claim 1, wherein the digital receiver is a baseband physical layer receiver.

6. The wireless device of claim 1, wherein the frequency controller is configured to determine the correction by applying a second-order low-pass control loop to the frequent offset to obtain the correction.

7. The wireless device of claim 1, wherein the frequency controller is configured to determine the correction based on a control loop including a delay element that delays an output of the control loop to obtain a delayed output, a first proportional factor before the delay element that weights the frequency offset, and a second proportional factor after the delay element that weights the delayed output.

8. The wireless device of claim 1, wherein the first proportional factor and the second proportional factor produce a combined factor that tunes a gain of the control loop to 1.

9. The wireless device of claim 1, wherein an output of the control loop based on a sum of the weighted delayed output and the weighed frequency offset.

10. The wireless device of claim 1, wherein the frequency controller is configured to repeatedly determined updated corrections over time based on varying frequency offsets and the frequency tuner is configured to repeatedly adjust the local frequency over time based on the updated corrections, wherein the updated corrections compensate for temperature-based frequency drift in the local frequency.

11. The wireless device of claim 1, wherein the updated corrections average out a measurement noise over time that is present in the estimating of the frequency offset.

12. The wireless device of claim 1, wherein the frequency controller is configured to repeatedly determine the updated corrections based on a control loop that weights a current sample of the frequency offset to obtain a weighted sample and adds the weighted sample to a past sample of the correction.

\* \* \* \* \*